(12) United States Patent
Powderly et al.

(10) Patent No.: US 12,067,209 B2
(45) Date of Patent: Aug. 20, 2024

(54) LIGHT-EMITTING USER INPUT DEVICE FOR CALIBRATION OR PAIRING

(71) Applicant: Magic Leap, Inc., Plantation, FL (US)

(72) Inventors: James M. Powderly, Ft. Lauderdale, FL (US); Savannah Niles, Ft. Lauderdale, FL (US); Christopher David Nesladek, San Francisco, CA (US); Isioma Osagbemwenorue Azu, Ft. Lauderdale, FL (US); Marshal Ainsworth Fontaine, St. Augustine, FL (US); Haney Awad, Miami, FL (US); William Wheeler, Ft. Lauderdale, FL (US); Brian David Schwab, Sunrise, FL (US); Brian Edward Oliver Bucknor, Miramar, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 18/148,316

(22) Filed: Dec. 29, 2022

(65) Prior Publication Data
US 2023/0221831 A1 Jul. 13, 2023

Related U.S. Application Data

(63) Continuation of application No. 15/965,696, filed on Apr. 27, 2018, now Pat. No. 11,112,932, and a
(Continued)

(51) Int. Cl.
G06F 3/04815 (2022.01)
G02B 27/01 (2006.01)
(Continued)

(52) U.S. Cl.
CPC ..... *G06F 3/04815* (2013.01); *G02B 27/0172* (2013.01); *G06F 3/011* (2013.01);
(Continued)

(58) Field of Classification Search
CPC .. G06F 3/04815; G06F 3/011; G06F 3/03547; G06F 3/041; G06F 3/0416;
(Continued)

(56) References Cited

U.S. PATENT DOCUMENTS

| 5,704,151 A | 1/1998 | West et al. |
| D432,131 S | 10/2000 | Jones et al. |

(Continued)

FOREIGN PATENT DOCUMENTS

| CN | 101194220 A | 6/2008 |
| CN | 105117016 A | 12/2015 |

(Continued)

OTHER PUBLICATIONS

Sandisk Clip Sport Plus MP3 Player at least at https://www.youtube.com/watch?v=HPrnBTFIxhY (Year: 2016).*
(Continued)

*Primary Examiner* — Mark Edwards
(74) *Attorney, Agent, or Firm* — Tobias Intellectual Property Law, PLLC

(57) ABSTRACT

A light emitting user input device can include a touch sensitive portion configured to accept user input (e.g., from a user's thumb) and a light emitting portion configured to output a light pattern. The light pattern can be used to assist the user in interacting with the user input device. Examples include emulating a multi-degree-of-freedom controller, indicating scrolling or swiping actions, indicating presence of objects nearby the device, indicating receipt of notifications, assisting pairing the user input device with another device, or assisting calibrating the user input device. The light emitting user input device can be used to provide user input to a wearable device, such as, e.g., a head mounted display device.

16 Claims, 60 Drawing Sheets

Related U.S. Application Data continuation of application No. 17/384,663, filed on Jul. 23, 2021, now Pat. No. 11,573,677, which is a continuation of application No. 15/965,702, filed on Apr. 27, 2018, now Pat. No. 11,163,416.

(60) Provisional application No. 62/490,863, filed on Apr. 27, 2017.

(51) Int. Cl.

| | | |
|---|---|---|
| *G06F 3/01* | (2006.01) | |
| *G06F 3/02* | (2006.01) | |
| *G06F 3/03* | (2006.01) | |
| *G06F 3/0346* | (2013.01) | |
| *G06F 3/0354* | (2013.01) | |
| *G06F 3/038* | (2013.01) | |
| *G06F 3/041* | (2006.01) | |
| *G06F 3/04847* | (2022.01) | |
| *G06F 3/04883* | (2022.01) | |
| *G06F 3/04886* | (2022.01) | |
| *G06T 19/00* | (2011.01) | |
| *G06V 10/145* | (2022.01) | |
| *G06V 20/20* | (2022.01) | |
| *G06V 40/18* | (2022.01) | |
| *G09G 3/32* | (2016.01) | |
| *H04W 4/80* | (2018.01) | |

(52) U.S. Cl.
CPC ............ *G06F 3/016* (2013.01); *G06F 3/017* (2013.01); *G06F 3/02* (2013.01); *G06F 3/0308* (2013.01); *G06F 3/0346* (2013.01); *G06F 3/03547* (2013.01); *G06F 3/038* (2013.01); *G06F 3/041* (2013.01); *G06F 3/04847* (2013.01); *G06F 3/04883* (2013.01); *G06F 3/04886* (2013.01); *G06T 19/006* (2013.01); *G06V 10/145* (2022.01); *G06V 20/20* (2022.01); *G06V 40/18* (2022.01); *G09G 3/32* (2013.01); *G02B 2027/0178* (2013.01); *G06F 2203/0384* (2013.01); *G06F 2203/04103* (2013.01); *G06F 2203/04105* (2013.01); *G09G 2320/0626* (2013.01); *G09G 2354/00* (2013.01); *H04W 4/80* (2018.02)

(58) Field of Classification Search
CPC ............ G06F 3/04883; G02B 27/0172; G02B 2027/0178; G09G 2320/0626; G09G 2354/00; G09G 3/32; G06K 9/00671; G06T 19/006
USPC .......................................................... 345/419
See application file for complete search history.

(56) References Cited

U.S. PATENT DOCUMENTS

| | | |
|---|---|---|
| 6,850,221 B1 | 2/2005 | Tickle |
| D514,570 S | 2/2006 | Ohta |
| D563,480 S | 3/2008 | Blaseflug et al. |
| D565,668 S | 4/2008 | Baseflug et al. |
| D567,243 S | 4/2008 | Ashida et al. |
| D567,287 S | 4/2008 | Del Castillo et al. |
| D587,713 S | 3/2009 | Sutton |
| D589,515 S | 3/2009 | Brunner et al. |
| D594,066 S | 6/2009 | Oikawa et al. |
| D611,477 S | 3/2010 | Brunner et al. |
| D638,841 S | 5/2011 | Musick, Jr. et al. |
| D658,184 S | 4/2012 | Chang et al. |
| 8,179,604 B1 | 5/2012 | Prada Gomez et al. |
| D665,461 S | 8/2012 | Ikeda et al. |
| D675,644 S | 2/2013 | Frost et al. |
| 8,523,675 B2 | 9/2013 | Young et al. |
| D698,358 S | 1/2014 | Beams |
| 8,950,867 B2 | 2/2015 | Macnamara |
| D725,041 S | 3/2015 | Bailey et al. |
| 9,081,426 B2 | 7/2015 | Armstrong |
| D740,369 S | 10/2015 | Cho et al. |
| 9,215,293 B2 | 12/2015 | Miller |
| D749,044 S | 2/2016 | Huang |
| D752,529 S | 3/2016 | Loretan et al. |
| D753,095 S | 4/2016 | Jou et al. |
| 9,310,559 B2 | 4/2016 | Macnamara |
| D755,761 S | 5/2016 | Reynolds |
| 9,348,143 B2 | 5/2016 | Gao et al. |
| D758,367 S | 6/2016 | Natsume |
| D759,657 S | 7/2016 | Kujawski et al. |
| D763,359 S | 8/2016 | Kwong et al. |
| 9,417,452 B2 | 8/2016 | Schowengerdt et al. |
| D769,876 S | 10/2016 | Aoyagi et al. |
| 9,470,906 B2 | 10/2016 | Kaji et al. |
| 9,547,174 B2 | 1/2017 | Gao et al. |
| 9,671,566 B2 | 6/2017 | Abovitz et al. |
| 9,740,006 B2 | 8/2017 | Gao |
| D797,743 S | 9/2017 | Awad et al. |
| 9,791,700 B2 | 10/2017 | Schowengerdt et al. |
| 9,851,563 B2 | 12/2017 | Gao et al. |
| 9,857,591 B2 | 1/2018 | Welch et al. |
| 9,874,749 B2 | 1/2018 | Bradski |
| D828,337 S | 9/2018 | Li |
| D844,608 S | 4/2019 | Chen et al. |
| 10,444,849 B2 | 10/2019 | Li |
| 10,534,447 B2 | 1/2020 | Li |
| D884,700 S | 5/2020 | Shao et al. |
| D918,176 S | 5/2021 | Natsume et al. |
| D924,204 S | 7/2021 | Natsume et al. |
| D930,614 S | 9/2021 | Natsume et al. |
| 11,112,932 B2 | 9/2021 | Powderly et al. |
| 11,163,416 B2 | 11/2021 | Powederly et al. |
| 2002/0024675 A1 | 2/2002 | Foxlin |
| 2006/0028436 A1 | 2/2006 | Armstrong |
| 2006/0103633 A1 | 5/2006 | Gioeli |
| 2006/0181521 A1 | 8/2006 | Perreault et al. |
| 2006/0279554 A1 | 12/2006 | Shin et al. |
| 2006/0284792 A1 | 12/2006 | Foxlin |
| 2007/0081123 A1 | 4/2007 | Lewis |
| 2008/0036744 A1 | 2/2008 | Hartl |
| 2009/0002218 A1 | 1/2009 | Rigazio et al. |
| 2009/0090568 A1* | 4/2009 | Min .................. G06F 3/03547 178/18.06 |
| 2009/0295722 A1 | 12/2009 | Yamamoto |
| 2009/0299686 A1 | 12/2009 | Ho |
| 2010/0194687 A1 | 8/2010 | Corson |
| 2012/0127062 A1 | 5/2012 | Bar-Zeev et al. |
| 2012/0162549 A1 | 6/2012 | Gao et al. |
| 2013/0082922 A1 | 4/2013 | Miller |
| 2013/0104085 A1 | 4/2013 | Mlyniec et al. |
| 2013/0117377 A1 | 5/2013 | Miller |
| 2013/0125027 A1 | 5/2013 | Abovitz |
| 2013/0208234 A1 | 8/2013 | Lewis |
| 2013/0242262 A1 | 9/2013 | Lewis |
| 2014/0071539 A1 | 3/2014 | Gao |
| 2014/0176418 A1 | 6/2014 | Ramachandran et al. |
| 2014/0177023 A1 | 6/2014 | Gao et al. |
| 2014/0218468 A1 | 8/2014 | Gao et al. |
| 2014/0267420 A1 | 9/2014 | Schowengerdt |
| 2014/0306866 A1 | 10/2014 | Miller et al. |
| 2014/0320531 A1 | 10/2014 | Elvesjö |
| 2015/0016777 A1 | 1/2015 | Abovitz et al. |
| 2015/0103306 A1 | 4/2015 | Kaji et al. |
| 2015/0138101 A1 | 5/2015 | Park |
| 2015/0178939 A1 | 6/2015 | Bradski et al. |
| 2015/0193949 A1 | 7/2015 | Katz et al. |
| 2015/0205126 A1 | 7/2015 | Schowengerdt |
| 2015/0220110 A1 | 8/2015 | Brawer |
| 2015/0222883 A1 | 8/2015 | Welch |
| 2015/0222884 A1 | 8/2015 | Cheng |
| 2015/0261291 A1 | 9/2015 | Mikhailov et al. |
| 2015/0268415 A1 | 9/2015 | Schowengerdt et al. |
| 2015/0302652 A1 | 10/2015 | Miller et al. |
| 2015/0309263 A2 | 10/2015 | Abovitz et al. |

(56) References Cited

U.S. PATENT DOCUMENTS

| | | | |
|---|---|---|---|
| 2015/0317833 A1 | 11/2015 | Ebstyne et al. | |
| 2015/0326570 A1 | 11/2015 | Publicover et al. | |
| 2015/0346490 A1 | 12/2015 | TeKolste et al. | |
| 2015/0346495 A1 | 12/2015 | Welch et al. | |
| 2016/0011419 A1 | 1/2016 | Gao | |
| 2016/0026253 A1 | 1/2016 | Bradski et al. | |
| 2016/0062489 A1 | 3/2016 | Li | |
| 2016/0239096 A1 | 8/2016 | Okuno et al. | |
| 2016/0259404 A1 | 9/2016 | Woods | |
| 2017/0182957 A1 | 6/2017 | Watson et al. | |
| 2017/0290290 A1* | 10/2017 | Trottier | A01K 5/0291 |
| 2017/0308258 A1* | 10/2017 | Xu | G06F 13/14 |
| 2017/0357333 A1 | 12/2017 | Balan et al. | |
| 2018/0053284 A1 | 2/2018 | Rodriguez et al. | |
| 2018/0091304 A1 | 3/2018 | Brook et al. | |
| 2018/0173417 A1 | 6/2018 | Foresti | |
| 2018/0314406 A1 | 11/2018 | Powederly et al. | |
| 2018/0314416 A1 | 11/2018 | Powderly et al. | |
| 2022/0019333 A1 | 1/2022 | Powderly | |

FOREIGN PATENT DOCUMENTS

| | | |
|---|---|---|
| JP | 2008-521136 A | 6/2008 |
| JP | 2008-541222 A | 11/2008 |
| JP | 2005092435 B | 4/2009 |
| JP | 2010-015535 A | 1/2010 |
| JP | 2011-024613 A | 2/2011 |
| JP | 2009265921 A | 2/2011 |
| JP | 2012507011 A | 3/2012 |
| JP | 2013-515999 A | 5/2013 |
| JP | 2015-072582 A | 4/2015 |
| JP | 2016162368 A | 9/2016 |
| JP | 2017-511082 A | 4/2017 |
| KR | 2016-0005720 | 1/2016 |
| WO | WO 2011/078926 | 6/2011 |
| WO | WO 2016/061196 | 4/2016 |
| WO | WO 2016/104922 | 6/2016 |
| WO | WO 2017/048519 | 3/2017 |
| WO | WO 2018/201067 | 11/2018 |

OTHER PUBLICATIONS

International Search Report and Written Opinion for PCT Application No. PCT/US18/29988, dated Aug. 30, 2018.
International Preliminary Report on Patentability for PCT Application No. PCT/US18/29988, dated Oct. 29, 2019.
"Force Touch", Wikipedia, retrieved Jan. 29, 2017, in 3 pages. URL: https://en.wikipedia.org/wiki/Force_Touch.
ARToolKit: https://web.archive.org/web/20051013062315/http://www.hitl.washington.edu:80/artoolkit/documentation/hardware.htm, archived Oct. 13, 2005.
Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.
Azuma, "Predictive Tracking for Augmented Realty," TR95-007, Department of Computer Science, UNC-Chapel Hill, NC, Feb. 1995.
Bimber, et al., "Spatial Augmented Reality—Merging Real and Virtual Worlds," 2005 https://web.media.mit.edu/~raskar/book/BimberRaskarAugmentedRealityBook.pdf.
Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).
Nilsson, L.G, "Another touch screen technology tips up", SemiAccurate, Dec. 30, 2009, retrieved Jan. 29, 2017, in 4 pages. URL: http://semiaccurate.com/2009/12/30/newtouchscreentechnologytips/.
Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).
CA3139648 Office Action dated Jan. 10, 2023.
CN2018800425864 Office Action dated Mar. 14, 2023.
EP22197905.7 Extended European Search Report dated Jan. 30, 2023.

* cited by examiner

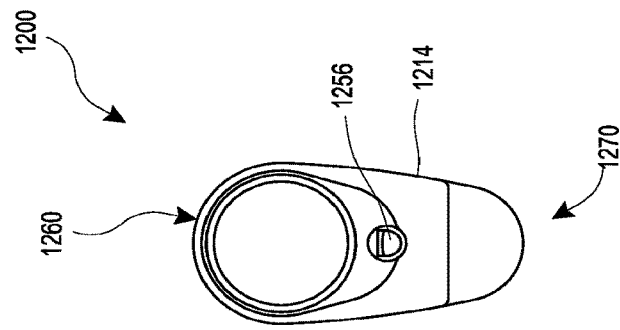
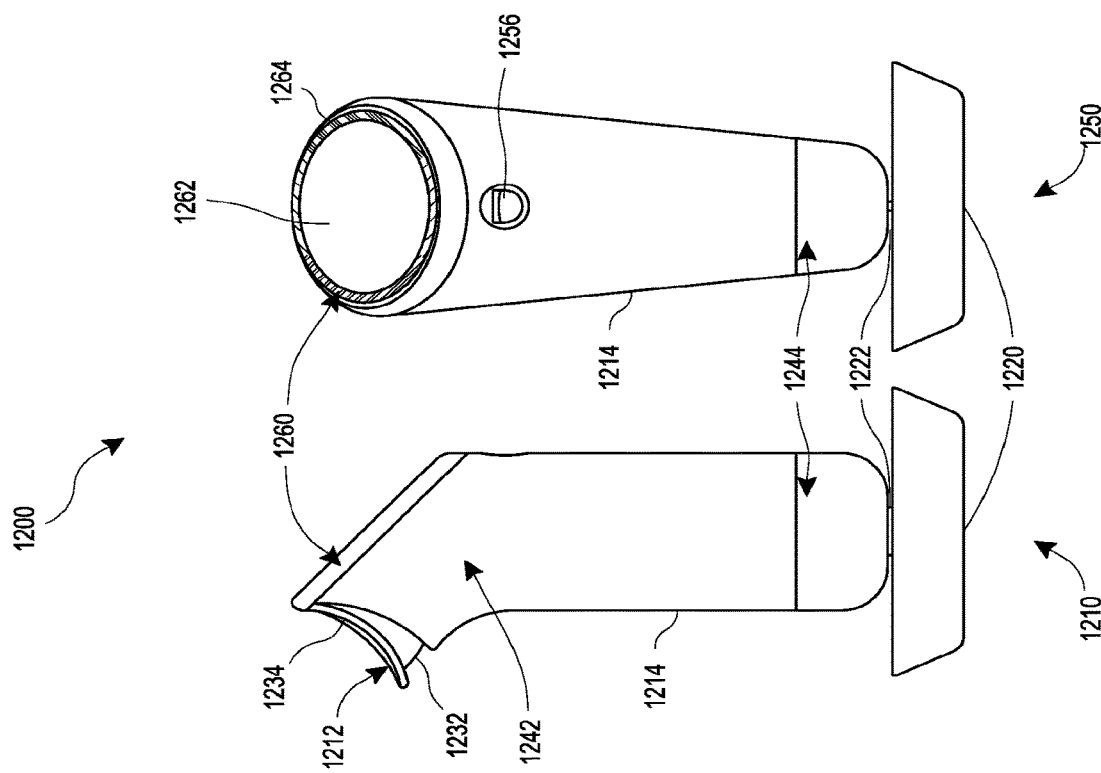

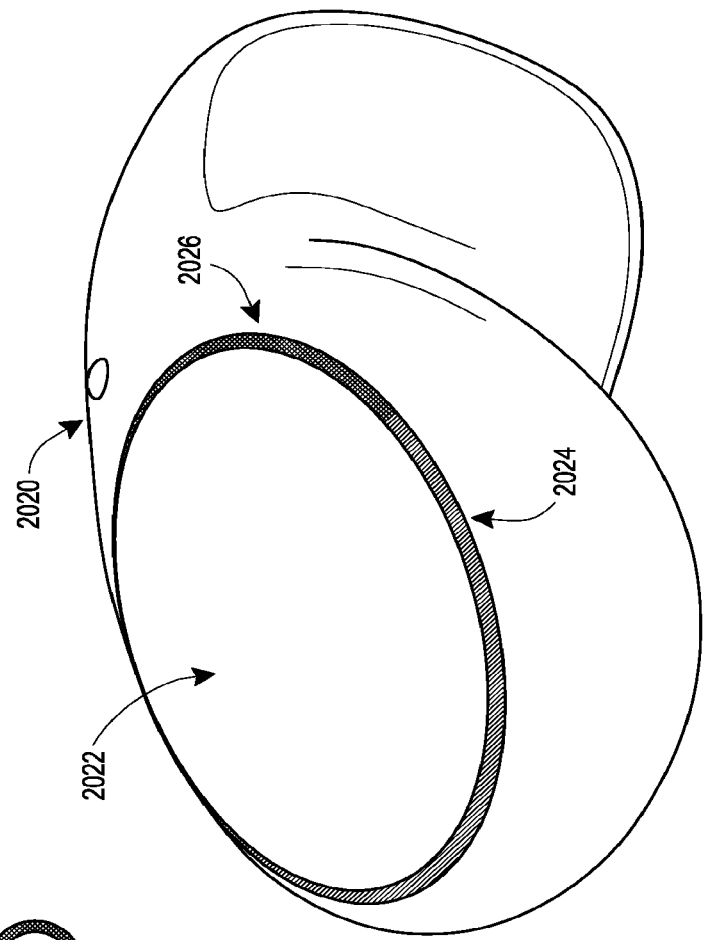
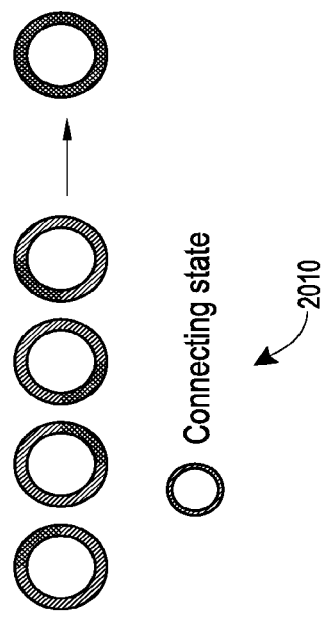
FIG. 20A

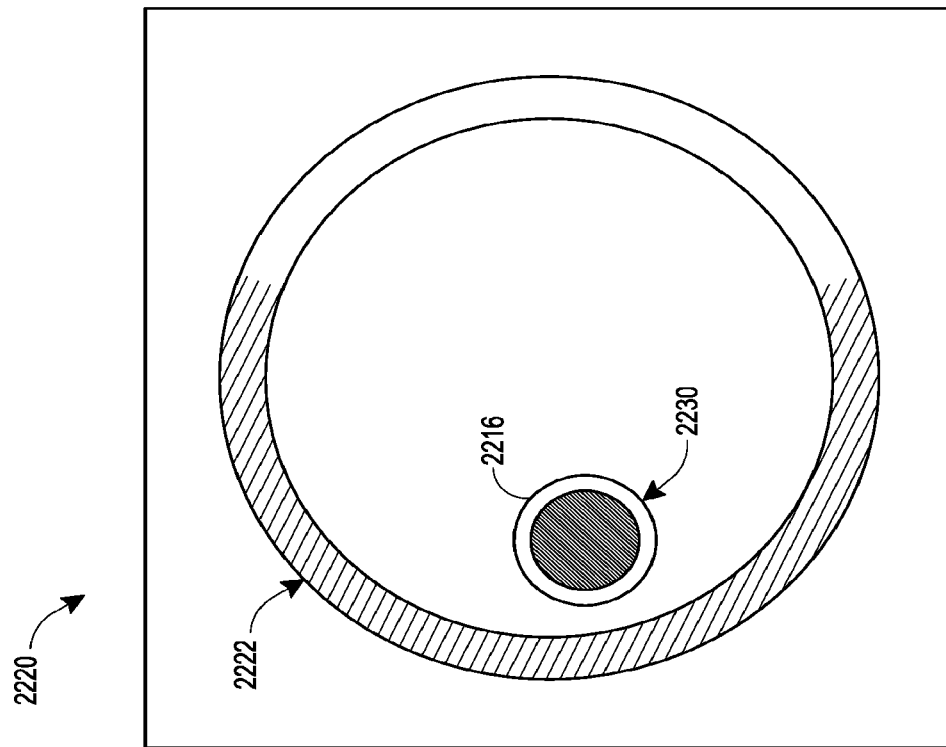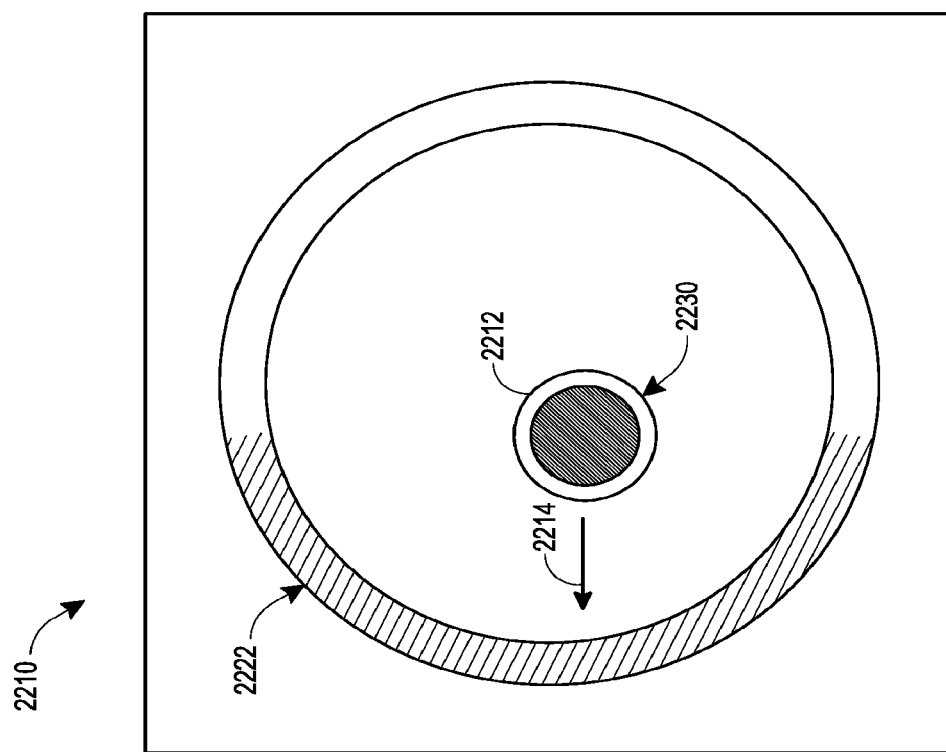
FIG. 22A

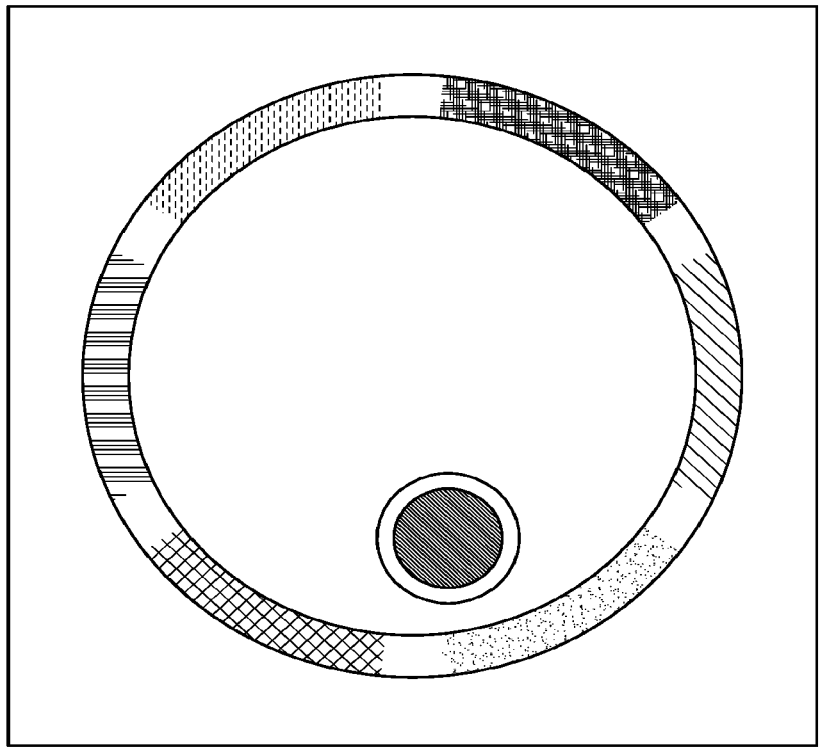
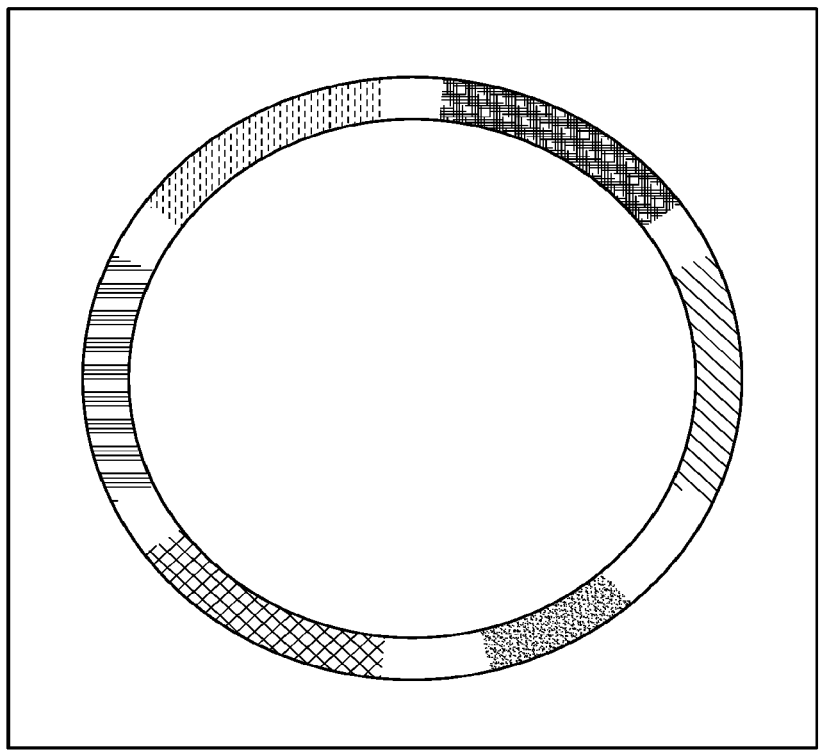
FIG. 22C

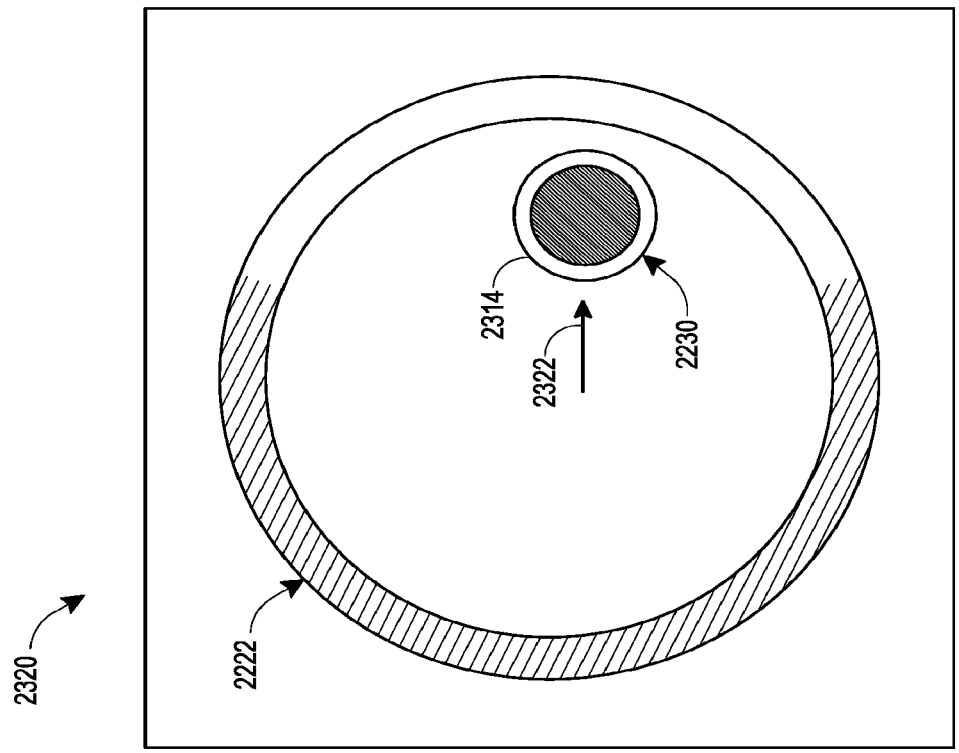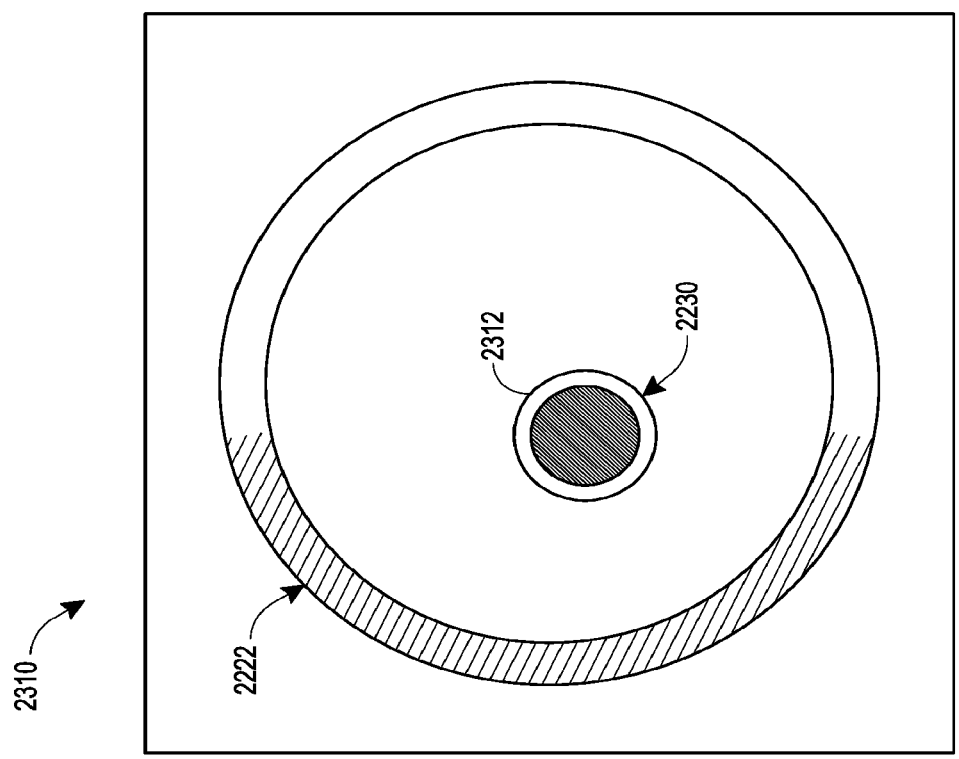
FIG. 23

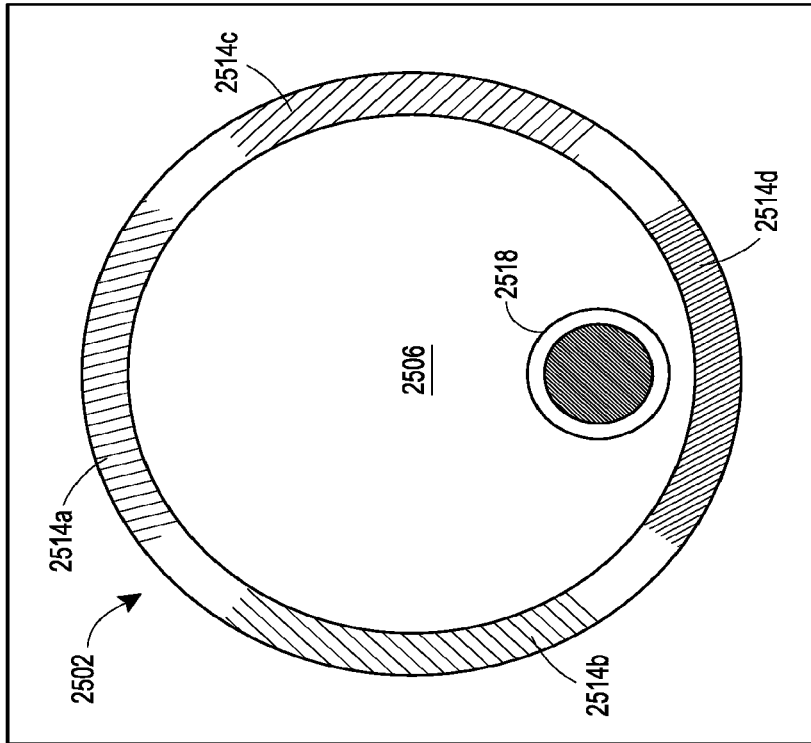
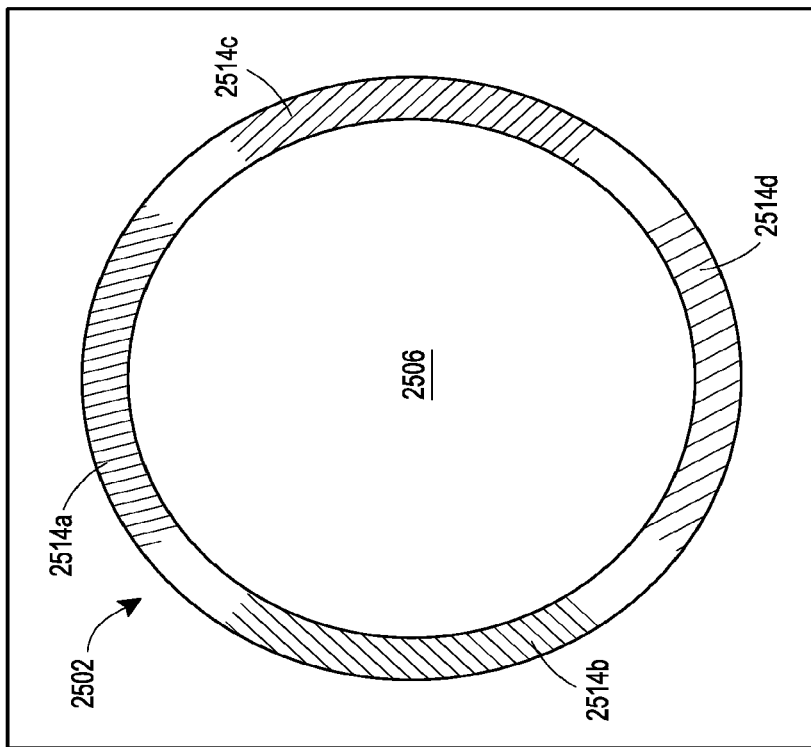
FIG. 25B

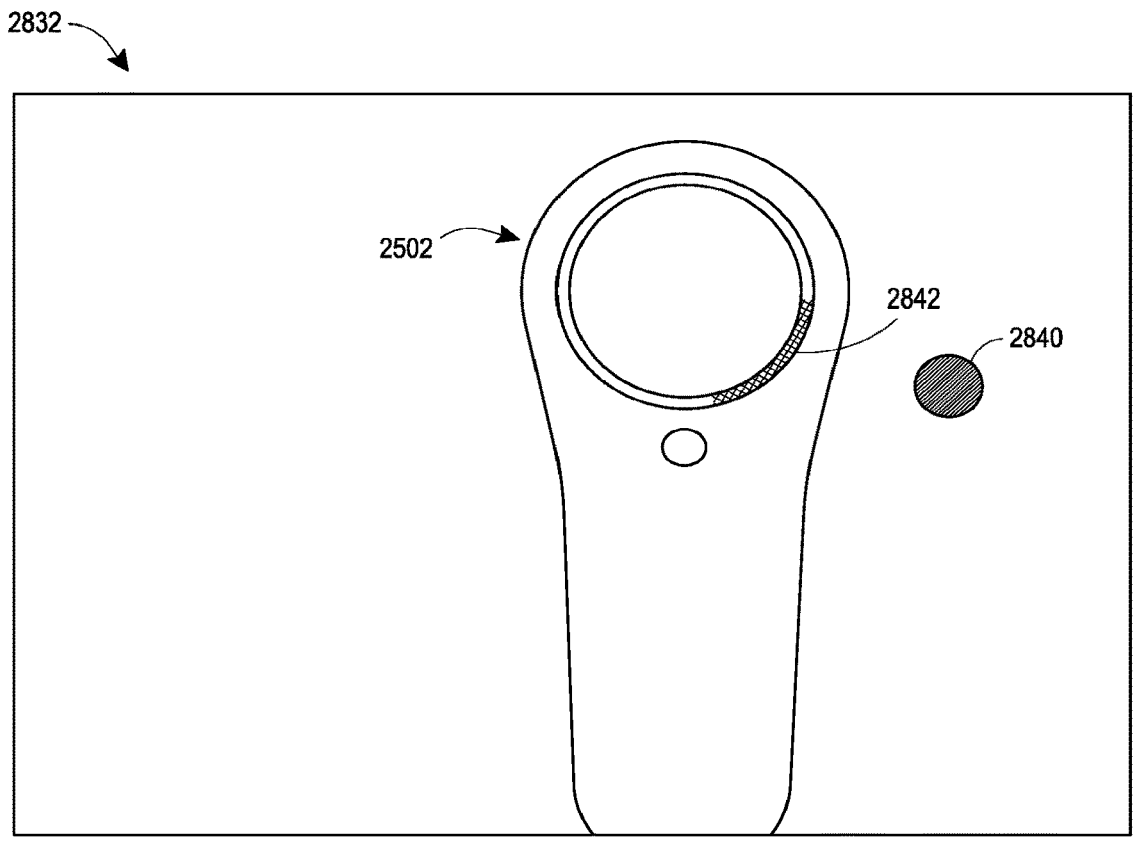
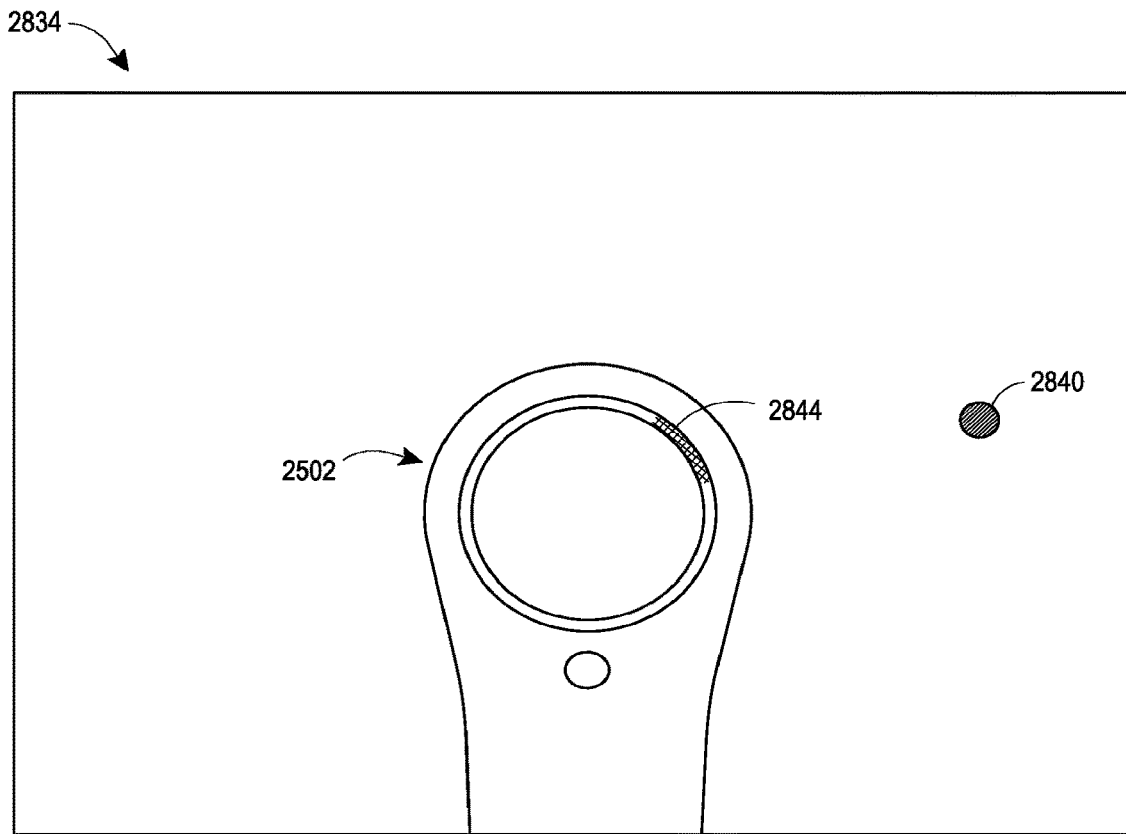
FIG. 28B

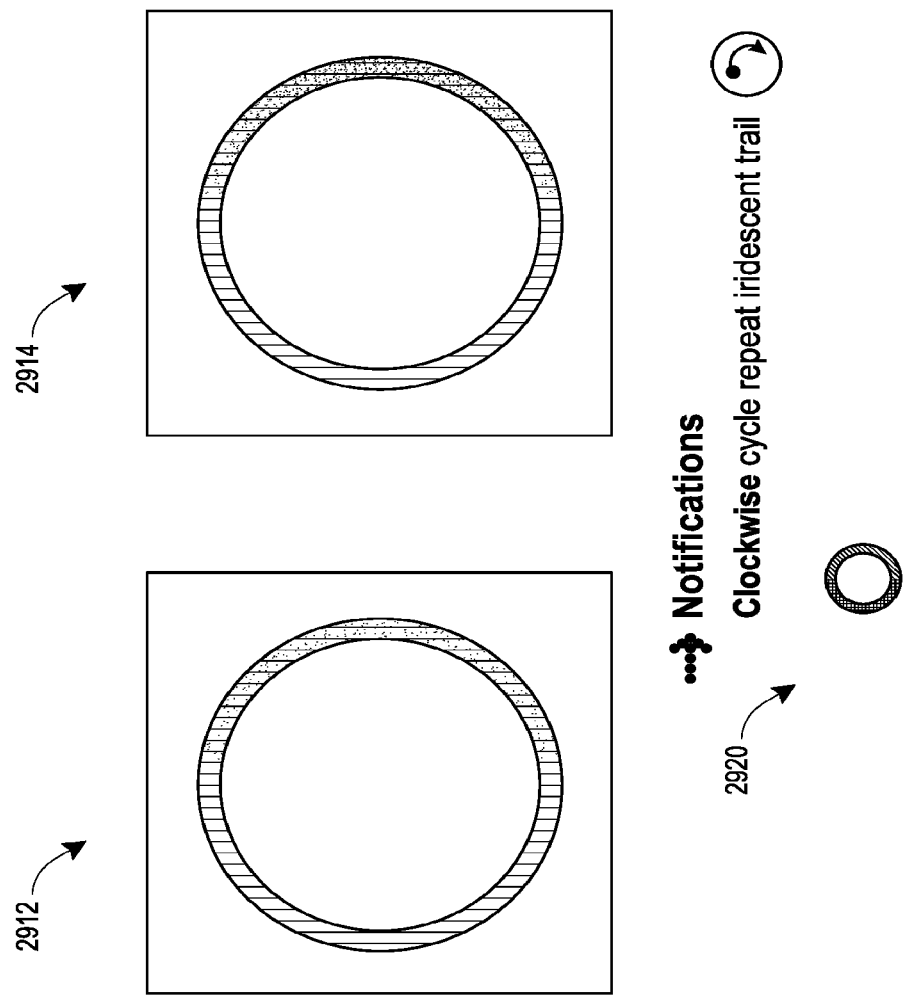

LIGHT-EMITTING USER INPUT DEVICE FOR CALIBRATION OR PAIRING

CROSS-REFERENCE TO RELATED APPLICATIONS

This application is a continuation of U.S. application Ser. No. 17/384,663, filed Jul. 23, 2021, entitled "LIGHT-EMITTING USER INPUT DEVICE FOR CALIBRATION OR PAIRING," which is a continuation of U.S. application Ser. No. 15/965,702, filed Apr. 27, 2018, entitled "LIGHT-EMITTING USER INPUT DEVICE FOR CALIBRATION OR PAIRING," which claims the benefit of priority under 35 U.S.C. § 119(e) to U.S. Provisional Application No. 62/490,863, filed on Apr. 27, 2017, entitled "LIGHT-EMITTING USER INPUT DEVICE," and U.S. application Ser. No. 17/384,663 is also a continuation of U.S. application Ser. No. 15/965,696, filed Apr. 27, 2018, entitled "LIGHT-EMITTING USER INPUT DEVICE," which claims benefit of priority under 35 U.S.C. § 119(e) to U.S. Provisional Application No. 62/490,863, filed Apr. 27, 2017, entitled "LIGHT-EMITTING USER INPUT DEVICE," the disclosure of which is hereby incorporated by reference herein in its entirety.

FIELD

The present disclosure relates to virtual reality and augmented reality imaging and visualization systems and more particularly to a light emitting user input device associated with the imaging and visualization systems.

BACKGROUND

Modern computing and display technologies have facilitated the development of systems for so called "virtual reality" "augmented reality" or "mixed reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user; a mixed reality, or "MR", related to merging real and virtual worlds to produce new environments where physical and virtual objects co-exist and interact in real time. As it turns out, the human visual perception system is very complex, and producing a VR, AR, or MR technology that facilitates a comfortable, natural-feeling, rich presentation of virtual image elements amongst other virtual or real-world imagery elements is challenging. Systems and methods disclosed herein address various challenges related to VR, AR and MR technology.

SUMMARY

Examples of a light-emitting user input device are disclosed. Embodiments of the user input device can be used to provide input to an AR, VR, or MR device. The light-emitting user input device can also provide visual information of events or objects associated with the AR/VR/MR device to the user or people in the user's environment.

The light emitting user input device can include a touch sensitive portion configured to accept a user input (e.g., from a user's thumb) and a light emitting portion configured to output a light pattern. The light pattern can be used to assist the user in interacting with the user input device. Examples include emulating a multi-degree-of-freedom controller, indicating scrolling or swiping actions, indicating presence of objects nearby the device, indicating receipt of notifications, assisting calibrating the user input device, or assisting pairing the user input device with another device. The light emitting user input device can be used to provide user input to a head mounted display system such as, e.g., a mixed reality display device.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

BRIEF DESCRIPTION OF THE DRAWINGS

FIG. 12A illustrates side and front (user-facing) views of an example of a totem.

FIG. 12B illustrates a top view of another example of a totem.

FIGS. 20A and 20B illustrate examples of indicating a wireless pairing process between a mixed reality device and a totem with a halo.

FIGS. 22A and 22B illustrate example light placement or movement patterns that are used as cues for user interactions.

FIG. 22C illustrates another example of using a light pattern to provide an indication of an available user interface operation.

FIG. 23 illustrates an example of using a light pattern as an alert to indicate an incorrect or improper user interaction.

FIG. 25B illustrates an example interactive use of a totem with two interactable regions.

FIGS. 28A and 28B illustrate examples of providing information of objects via placement and movement of light patterns.

FIG. 29A illustrates example light placement or movement patterns indicating the receipt of a notification.

Figure 1:
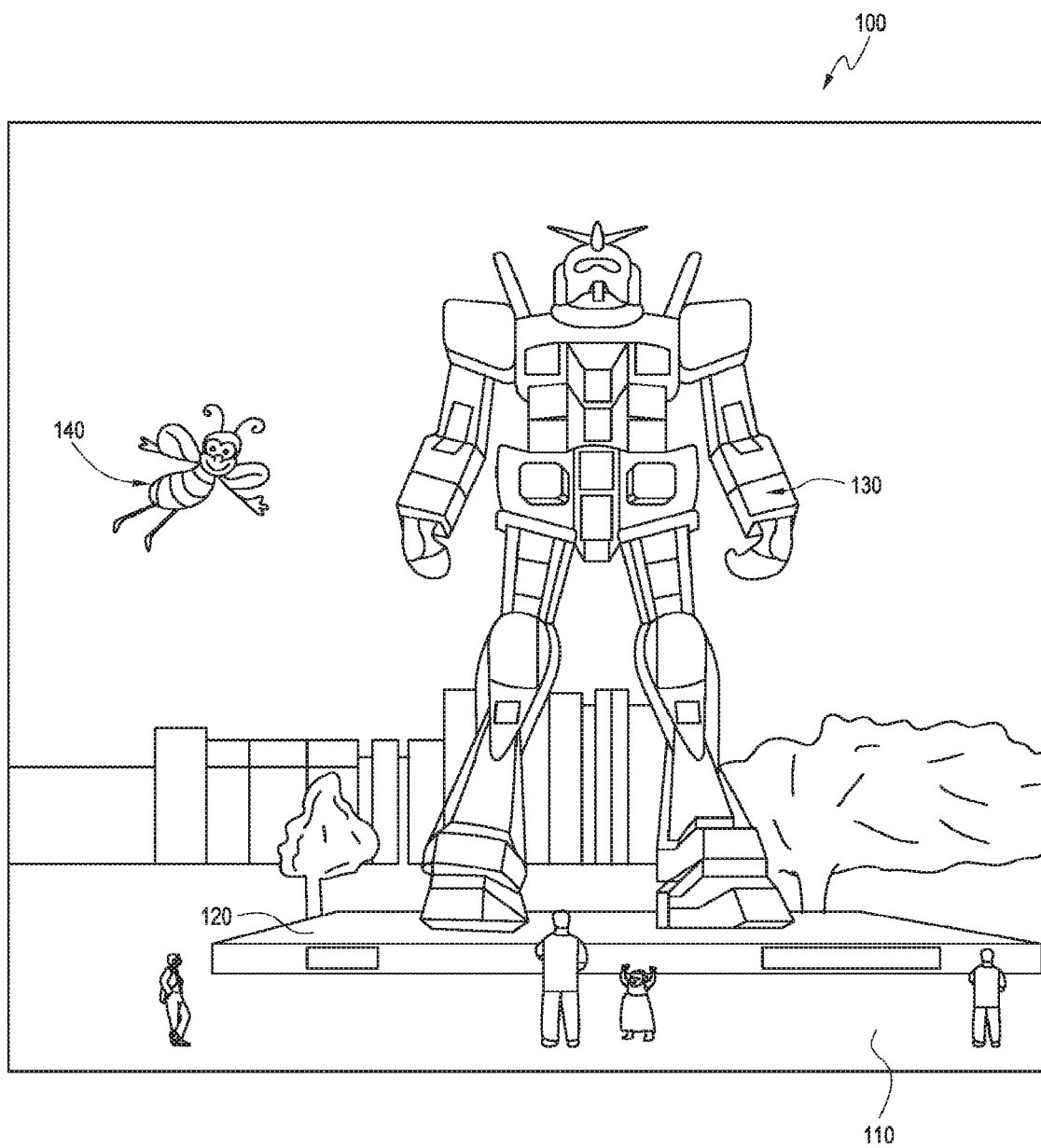
FIG. 1 depicts an illustration of a mixed reality scenario with certain virtual reality objects, and certain physical objects viewed by a person.

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview of a Light-Emitting User Input Device

A touch sensitive user input device can support user inputs such as swiping, tapping, clicking, pressing, etc. For example, when a user uses a touchpad to browse a website, the user can use one finger (e.g., the thumb) to swipe left and right to move the webpage left and right or tap up and down to move the webpage up and down. In order to achieve more user interface functionalities, such as, e.g., snapping content to a desired location, scrolling, or resizing the content, the touch sensitive user input device often requires multiple figures. For example, the user may use two fingers to enlarge the webpage and use one finger to move within the webpage. When the touchpad is part of a handheld user input device for a wearable device (which may include AR/VR/MR wearable display), however, the user may not have as many fingers available to interact with the touchpad. For example, the user may use the thumb to interact with the touchpad while use other fingers to hold the totem. As a result, the types of user interface functionalities that can be achieved by the touchpad of conventional handheld devices may significantly decrease.

To ameliorate this problem, the touchpad of embodiments of the totem described herein can be divided into multiple interactable regions where each region may be mapped to one or more types of user interface interactions. For example, the touchpad may include a touch surface which is near the center of the touchpad and an outer region at least partially surrounding the touch surface. The outer region may include a light guide configured to output light patterns (e.g., the placement, illumination, color and/or movement of the light) that assist the user in interacting with the totem. The light patterns outputted by the light guide may sometimes be referred to herein as a "halo," because the light patterns may appear to surround a central, touch-sensitive portion of the totem. The light guide may be on top of a touch sensor such that the user can interact with the light guide and provide touch sensitive input to the totem via the light guide region. When the user actuates the touch surface, the totem may simulate cursor actions (such as, e.g., moving forward and back on a browser). However, if a user wants to perform other types user interface operations (such as, e.g., scrolling a webpage), the user may actuate the light guide. In some examples, the light guide may not be touch-sensitive. The user can actuate a region near the light guide (e.g., a region on the touch pad which may be surrounded by the light guide) to actuate the totem.

As another example, the touch surface can be divided into two interactable regions with one region supporting the user's touch actions (such as e.g., simulating the functions of a multiple degree of freedom (DOF) directional d-pad) while another region supporting the user's swiping actions. The touch surface with two interactable regions may include concentric rings with one inner ring (as the first interactable region) and one outer ring (as the second interactable region). In this example, the light guide surrounding the touch surface may or may not be interactable but it can provide the visual feedback related to user's interactions or related to the wearable system. As will further be described herein, the type of user interactions supported by an interactable region may be changed dynamically based on events in the virtual environment or objects that the user is interacting with. For example, the outer region may be used as a d-pad when a user is browsing a web whereas the same region may support a swipe interaction (e.g., a circulate swipe) when a user is playing a virtual game.

In some embodiments, the light guide of the totem can provide cues for user interactions. For example, the halo can be used to inform a user a type and a location of an available user interaction or to indicate current user interactions. As an example, a light emitting diode (LED) underneath the light guide may light up to indicate to the user that the user can touch or tap the portion of the touch surface where the LED lights up to select a virtual element on a wearable display. The LED may also be used in connection with haptic feedback (e.g., provided by a haptic actuator in the totem) or audio feedback (e.g., provided by a speaker of a wearable device) to provide indications of user interactions or to guide user interactions.

When the totem is used with a wearable device, the user interface experience can be extended to the 3D environment surrounding the user. However, the user's field of view (FOV) perceived through the wearable display may be smaller than the natural FOV of the human eye or smaller than the entire environment surrounding the user. Thus, there may be physical or virtual objects in the user's environment that are initially outside the FOV of the augmented reality display but which may subsequently move into the FOV of the wearable display (e.g., objects that can move relative to the user) or may subsequently become perceivable if the user's body, head, or eye pose changes (which will change the user's FOV). For example, in the context of a game, the user may be trying to find an avatar of a robot. If the robot is just outside the current FOV of the user, the user may receive no cues from the wearable display that the robot is nearby. If the user moves his or her head slightly, the robot may suddenly enter the user's FOV, which may be startling to the user. Further, if the user's FOV through the wearable display is relatively small, it may be difficult for the user to find the robot unless the user turns her head or gaze directly at the robot.

To improve the user interface experience, the totem may provide information about the objects outside of the user's FOV. For example, the totem can provide, on the outer region of the touchpad, a visual halo (e.g., emitted via the light guide) for a corresponding object outside of the user's current FOV. The light placement or the movement pattern of the halo can be used to indicate information associated with the object, for example, a brighter or larger halo may indicate the object is closer to the FOV whereas a dimmer or smaller halo may indicate the object is farther from the FOV. Similarly, the color of the halo may be used to indicate the type of the object. For example, a competitor avatar (in a virtual game) may be associated with a red halo while a teammate's avatar (in the virtual game) may be associated with a green halo. As another example, a flashing iridescent halo may indicate a system notification or warning. The light patterns of the halo may change as the object in the user's environment changes or as the user changes the pose.

Additionally or alternatively, the light patterns of the halo may be used indicate the progress of a process. For example, while the totem is charging, the totem may display a halo which corresponds to the percentage of the charge for the battery. For example, when the battery is only 25% charged, the totem may display ¼ of a halo (e.g., a 90 degree arc). When the battery is charged to 100%, the totem may display the entire halo. The light placement or movement patterns of the halo may also provide an indication of the user's interactions to a person in the user's environment. For example, when the user is recording a video using an augmented realty device, the LED halo may blink red to reinforce to others nearby that the display is in the recording mode so that others nearby will not accidentally interrupt or interfere with the user's recording session.

Embodiments of the totem described herein may be programmable. For example, the placement or the movement light patterns may be customized by an application developer or by a user, in various embodiments. The halo may be customized based on the types of applications (e.g., via an application programming interface (API)) that the user is interacting with. As an example, the light guide of the touchpad may be mapped to a 4-way d-pad (which corresponds to up, down, left, and right user interface operations) when a user is using a browser. As another example, the outer region of the touch surface may be mapped to a 3-way d-pad when the user is pacing a racing game, where the 3-way d-pad may correspond to left turn, right turn, and brake. A user may also customize the light placement or movement patterns of the halo. For example, the user can turn off the halo or change the color of the halo associated with receiving email notifications. The user can customize light patterns associated with the halo using the wearable display or by actuating the totem. Detailed examples of the totem, the halo, and user interface interactions using the totem and the wearable device are described below.

Although the example totems are described as being used together with a wearable system (or any type of AR, MR, or VR device), the example totems and techniques described herein can also be used with other systems. For example, the totems may be used to interact with a projector or a display (e.g., a television or computer display), a gaming system, an audio system, connectable devices in the Internet of Things (IoT), or another computing device.

Examples of 3D Display of a Wearable System

A wearable system (also referred to herein as an augmented reality (AR) system) can be configured to present 2D or 3D virtual images to a user. The images may be still images, frames of a video, or a video, in combination or the like. The wearable system may comprise a wearable device that can present a VR, AR, or MR environment, alone or in combination, for user interaction. The wearable device can include a wearable display device, such as, e.g., a head-mounted display (HMD). The wearable device can also include a beltpack which may comprise a central processing unit to handle some of the data processing for the wearable device, a battery, etc. In some situations, the wearable device can be used in interchangeably with an augmented reality device (ARD).

FIG. 1 depicts an illustration of a mixed reality scenario with certain virtual reality objects, and certain physical objects viewed by a person. In FIG. 1, an MR scene 100 is depicted wherein a user of an MR technology sees a real-world park-like setting 110 featuring people, trees, buildings in the background, and a concrete platform 120. In addition to these items, the user of the MR technology also perceives that he or she "sees" a robot statue 130 standing upon the real-world platform 120, and a cartoon-like avatar character 140 flying by which seems to be a personification of a bumble bee, even though these elements do not exist in the real world.

In order for the 3D display to produce a true sensation of depth, and more specifically, a simulated sensation of surface depth, it is desirable for each point in the display's visual field to generate the accommodative response corresponding to its virtual depth. If the accommodative response to a display point does not correspond to the virtual depth of that point, as determined by the binocular depth cues of convergence and stereopsis, the human eye may experience an accommodation conflict, resulting in unstable imaging, harmful eye strain, headaches, and, in the absence of accommodation information, almost a complete lack of surface depth.

VR, AR, and MR experiences can be provided by display systems having displays in which images corresponding to a plurality of depth planes are provided to a viewer. The images may be different for each depth plane (e.g., provide slightly different presentations of a scene or object) and may be separately focused by the viewer's eyes, thereby helping to provide the user with depth cues based on the accommodation of the eye required to bring into focus different image features for the scene located on different depth plane and/or based on observing different image features on different depth planes being out of focus. As discussed elsewhere herein, such depth cues provide credible perceptions of depth.

Figure 2:
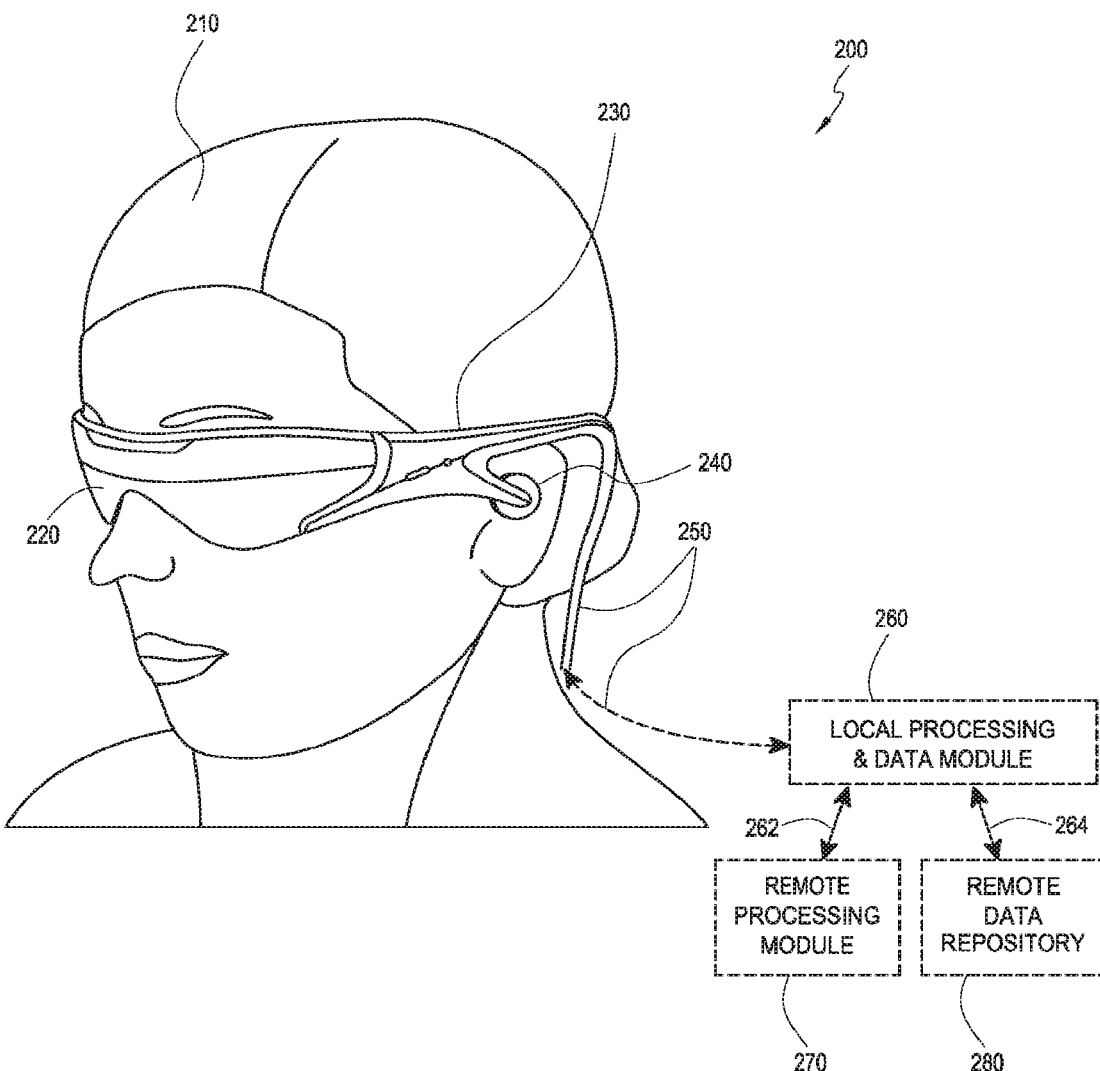
FIG. 2 schematically illustrates an example of a wearable system.

FIG. 2 illustrates an example of wearable system 200. The wearable system 200 can include a display 220, and various mechanical and electronic modules and systems to support the functioning of display 220. The display 220 may be coupled to a frame 230, which is wearable by a user, wearer, or viewer 210. The display 220 can be positioned in front of the eyes of the user 210. A portion of the wearable system (such as the display 220) may be worn on the head of the user.

In FIG. 2, a speaker 240 is coupled to the frame 230 and positioned adjacent the ear canal of the user (in some embodiments, another speaker, not shown, is positioned adjacent the other ear canal of the user to provide for stereo/shapeable sound control). The wearable system 200 can also include an outward-facing imaging system 464 (shown in FIG. 4) which observes the world in the environment around the user. The wearable system 100 can also include an inward-facing imaging system 462 (shown in FIG. 4) which can track the eye movements of the user. The inward-facing imaging system may track either one eye's movements or both eyes' movements. The inward-facing imaging system may be attached to the frame 230 and may be in electrical communication with the processing modules 260 and/or 270, which may process image information acquired by the inward-facing imaging system to determine, e.g., the pupil diameters and/or orientations of the eyes or eye pose of the user 210.

As an example, the wearable system 200 can use the outward-facing imaging system 464 and/or the inward-facing imaging system 462 to acquire images of a pose of the user. The pose may be used to determine a user's motion or synthesize an image of the user. The images acquired by the outward-facing imaging system 464 and/or the inward-facing imaging system 462 may be communicated to a second user in a telepresence session to create a tangible sense of the user's presence in the second user environment.

The display 220 can be operatively coupled 250, such as by a wired lead or wireless connectivity, to a local data processing module 260 which may be mounted in a variety of configurations, such as fixedly attached to the frame 230, fixedly attached to a helmet or hat worn by the user, embedded in headphones, or otherwise removably attached to the user 210 (e.g., in a backpack-style configuration, in a belt-coupling style configuration).

The local processing and data module 260 may comprise a hardware processor, as well as digital memory, such as non-volatile memory (e.g., flash memory), both of which may be utilized to assist in the processing, caching, and storage of data. The data may include data a) captured from sensors (which may be, e.g., operatively coupled to the frame 230 or otherwise attached to the user 210), such as image capture devices (e.g., cameras in the inward-facing imaging system and/or the outward-facing imaging system), microphones, inertial measurement units (IMUs), accelerometers, compasses, global positioning system (GPS) units, radio devices, and/or gyroscopes; and/or b) acquired and/or processed using remote processing module 270 and/or remote data repository 280, possibly for passage to the display 220 after such processing or retrieval. The local processing and data module 260 may be operatively coupled by communication links 262 and/or 264, such as via wired or wireless communication links, to the remote processing module 270 and/or remote data repository 280 such that these remote modules are available as resources to the local processing and data module 260. In addition, remote processing module 280 and remote data repository 280 may be operatively coupled to each other. The local processing & data module 260, the remote processing module 270, and the remote data repository 280 may each include a network interface to provide the communication over the communication links 262, 264.

In some embodiments, the remote processing module 270 may comprise one or more processors configured to analyze and process data and/or image information. In some embodiments, the remote data repository 280 may comprise a digital data storage facility, which may be available through the internet or other networking configuration in a "cloud" resource configuration. In some embodiments, all data is stored and all computations are performed in the local processing and data module, allowing fully autonomous use from a remote module.

The human visual system is complicated and providing a realistic perception of depth is challenging. Without being limited by theory, it is believed that viewers of an object may perceive the object as being three-dimensional due to a combination of vergence and accommodation. Vergence movements (i.e., rolling movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex." Likewise, a change in vergence will trigger a matching change in accommodation, under normal conditions. Display systems that provide a better match between accommodation and vergence may form more realistic and comfortable simulations of three-dimensional imagery.

Figure 3:
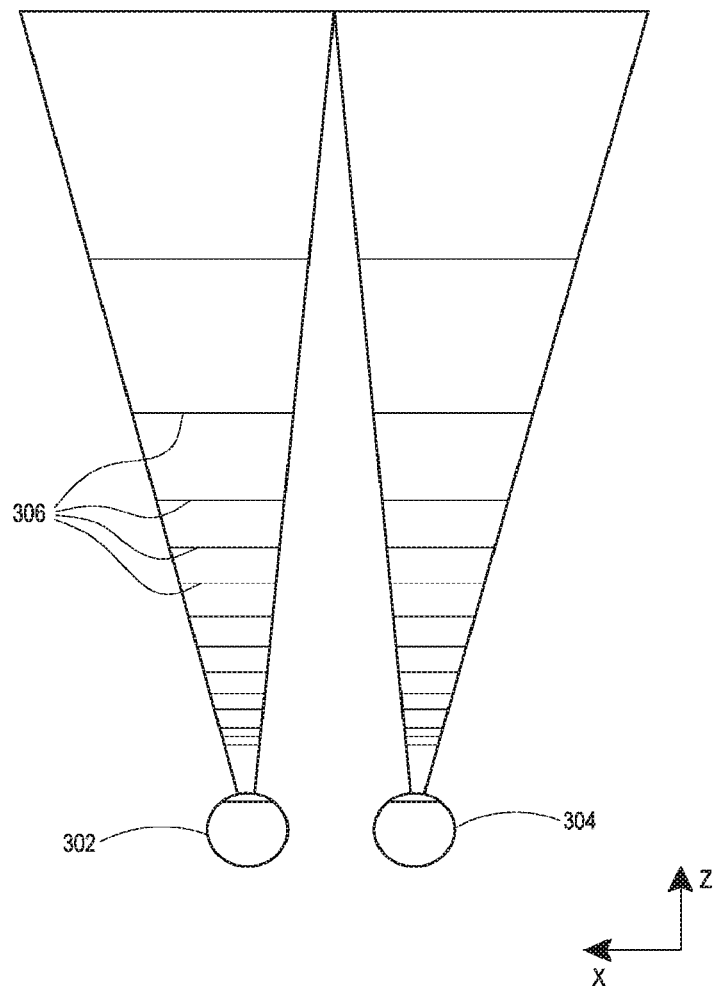
FIG. 3 schematically illustrates aspects of an approach for simulating three-dimensional imagery using multiple depth planes.

FIG. 3 illustrates aspects of an approach for simulating three-dimensional imagery using multiple depth planes. With reference to FIG. 3, objects at various distances from eyes 302 and 304 on the z-axis are accommodated by the eyes 302 and 304 so that those objects are in focus. The eyes 302 and 304 assume particular accommodated states to bring into focus objects at different distances along the z-axis. Consequently, a particular accommodated state may be said to be associated with a particular one of depth planes 306, with has an associated focal distance, such that objects or parts of objects in a particular depth plane are in focus when the eye is in the accommodated state for that depth plane. In some embodiments, three-dimensional imagery may be simulated by providing different presentations of an image for each of the eyes 302 and 304, and also by providing different presentations of the image corresponding to each of the depth planes. While shown as being separate for clarity of illustration, it will be appreciated that the fields of view of the eyes 302 and 304 may overlap, for example, as distance along the z-axis increases. In addition, while shown as flat for ease of illustration, it will be appreciated that the contours of a depth plane may be curved in physical space, such that all features in a depth plane are in focus with the eye in a particular accommodated state. Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes.

Waveguide Stack Assembly

Figure 4:
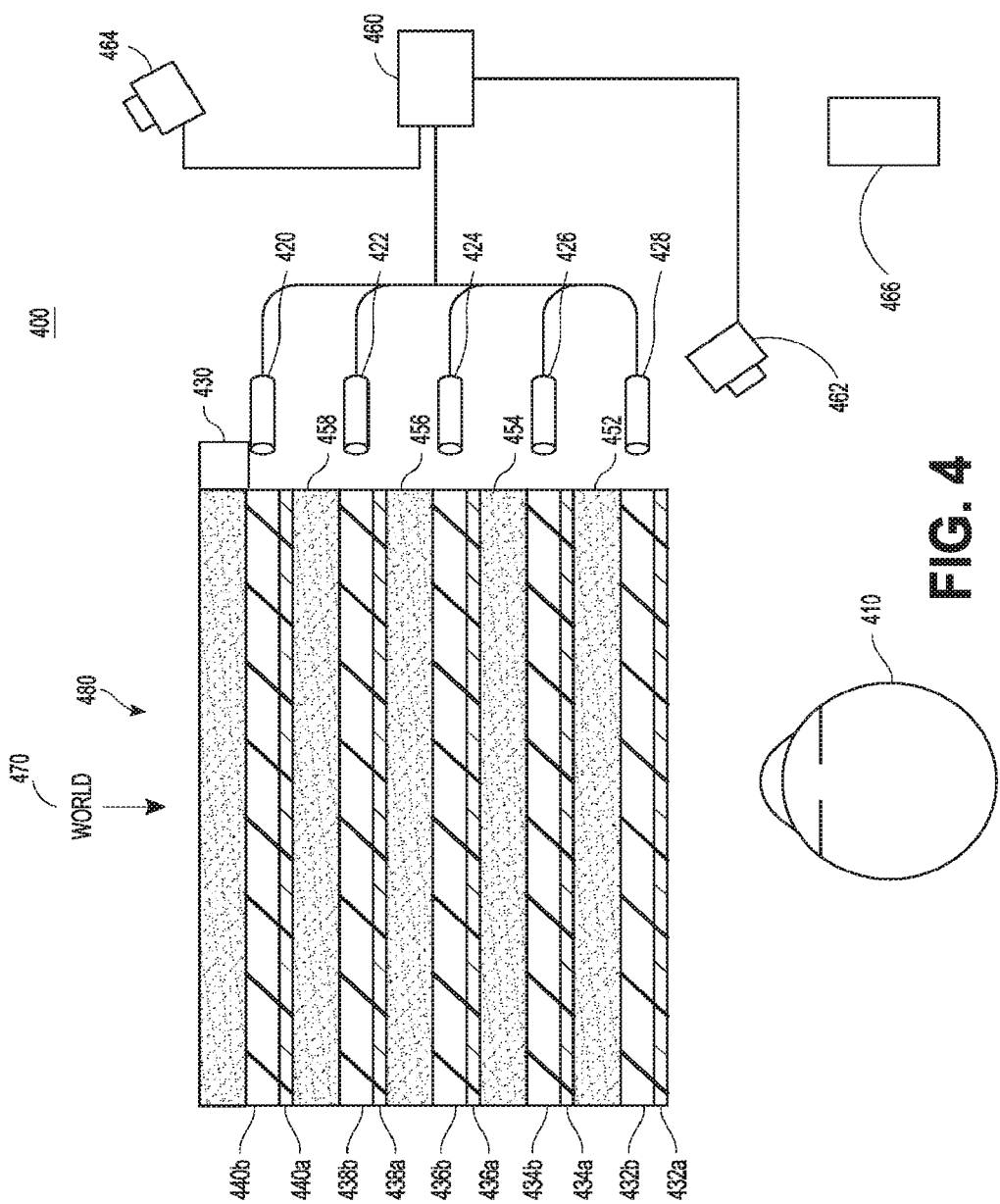
FIG. 4 schematically illustrates an example of a waveguide stack for outputting image information to a user.

FIG. 4 illustrates an example of a waveguide stack for outputting image information to a user. A wearable system 400 includes a stack of waveguides, or stacked waveguide assembly 480 that may be utilized to provide three-dimensional perception to the eye/brain using a plurality of waveguides 432b, 434b, 436b, 438b, 400b. In some embodiments, the wearable system 400 may correspond to wearable system 200 of FIG. 2, with FIG. 4 schematically showing some parts of that wearable system 200 in greater detail. For example, in some embodiments, the waveguide assembly 480 may be integrated into the display 220 of FIG. 2.

With continued reference to FIG. 4, the waveguide assembly 480 may also include a plurality of features 458, 456, 454, 452 between the waveguides. In some embodiments, the features 458, 456, 454, 452 may be lenses. In other embodiments, the features 458, 456, 454, 452 may not be lenses. Rather, they may simply be spacers (e.g., cladding layers and/or structures for forming air gaps).

The waveguides 432b, 434b, 436b, 438b, 440b and/or the plurality of lenses 458, 456, 454, 452 may be configured to send image information to the eye with various levels of wavefront curvature or light ray divergence. Each waveguide level may be associated with a particular depth plane and may be configured to output image information corresponding to that depth plane. Image injection devices 420, 422, 424, 426, 428 may be utilized to inject image information into the waveguides 440b, 438b, 436b, 434b, 432b, each of which may be configured to distribute incoming light across each respective waveguide, for output toward the eye 410. Light exits an output surface of the image injection devices 420, 422, 424, 426, 428 and is injected into a corresponding input edge of the waveguides 440b, 438b, 436b, 434b, 432b. In some embodiments, a single beam of light (e.g., a collimated beam) may be injected into each waveguide to output an entire field of cloned collimated beams that are directed toward the eye 410 at particular angles (and amounts of divergence) corresponding to the depth plane associated with a particular waveguide.

In some embodiments, the image injection devices 420, 422, 424, 426, 428 are discrete displays that each produce image information for injection into a corresponding waveguide 440b, 438b, 436b, 434b, 432b, respectively. In some other embodiments, the image injection devices 420, 422, 424, 426, 428 are the output ends of a single multiplexed display which may, e.g., pipe image information via one or more optical conduits (such as fiber optic cables) to each of the image injection devices 420, 422, 424, 426, 428.

A controller 460 controls the operation of the stacked waveguide assembly 480 and the image injection devices 420, 422, 424, 426, 428. The controller 460 includes programming (e.g., instructions in a non-transitory computer-readable medium) that regulates the timing and provision of image information to the waveguides 440b, 438b, 436b, 434b, 432b. In some embodiments, the controller 460 may be a single integral device, or a distributed system connected by wired or wireless communication channels. The controller 460 may be part of the processing modules 260 and/or 270 (illustrated in FIG. 2) in some embodiments.

The waveguides 440b, 438b, 436b, 434b, 432b may be configured to propagate light within each respective waveguide by total internal reflection (TIR). The waveguides 440b, 438b, 436b, 434b, 432b may each be planar or have another shape (e.g., curved), with major top and bottom surfaces and edges extending between those major top and bottom surfaces. In the illustrated configuration, the waveguides 440b, 438b, 436b, 434b, 432b may each include light extracting optical elements 440a, 438a, 436a, 434a, 432a that are configured to extract light out of a waveguide by redirecting the light, propagating within each respective waveguide, out of the waveguide to output image information to the eye 410. Extracted light may also be referred to as outcoupled light, and light extracting optical elements may also be referred to as outcoupling optical elements. An extracted beam of light is outputted by the waveguide at locations at which the light propagating in the waveguide strikes a light redirecting element. The light extracting optical elements (440a, 438a, 436a, 434a, 432a) may, for example, be reflective and/or diffractive optical features. While illustrated disposed at the bottom major surfaces of the waveguides 440b, 438b, 436b, 434b, 432b for ease of description and drawing clarity, in some embodiments, the light extracting optical elements 440a, 438a, 436a, 434a, 432a may be disposed at the top and/or bottom major surfaces, and/or may be disposed directly in the volume of the waveguides 440b, 438b, 436b, 434b, 432b. In some embodiments, the light extracting optical elements 440a, 438a, 436a, 434a, 432a may be formed in a layer of material that is attached to a transparent substrate to form the waveguides 440b, 438b, 436b, 434b, 432b. In some other embodiments, the waveguides 440b, 438b, 436b, 434b, 432b may be a monolithic piece of material and the light extracting optical elements 440a, 438a, 436a, 434a, 432a may be formed on a surface and/or in the interior of that piece of material.

With continued reference to FIG. 4, as discussed herein, each waveguide 440b, 438b, 436b, 434b, 432b is configured to output light to form an image corresponding to a particular depth plane. For example, the waveguide 432b nearest the eye may be configured to deliver collimated light, as injected into such waveguide 432b, to the eye 410. The collimated light may be representative of the optical infinity focal plane. The next waveguide up 434b may be configured to send out collimated light which passes through the first lens 452 (e.g., a negative lens) before it can reach the eye 410. First lens 452 may be configured to create a slight convex wavefront curvature so that the eye/brain interprets light coming from that next waveguide up 434b as coming from a first focal plane closer inward toward the eye 410 from optical infinity. Similarly, the third up waveguide 436b passes its output light through both the first lens 452 and second lens 454 before reaching the eye 410. The combined optical power of the first and second lenses 452 and 454 may be configured to create another incremental amount of wavefront curvature so that the eye/brain interprets light coming from the third waveguide 436b as coming from a second focal plane that is even closer inward toward the person from optical infinity than was light from the next waveguide up 434b.

The other waveguide layers (e.g., waveguides 438b, 440b) and lenses (e.g., lenses 456, 458) are similarly configured, with the highest waveguide 440b in the stack sending its output through all of the lenses between it and the eye for an aggregate focal power representative of the closest focal plane to the person. To compensate for the stack of lenses 458, 456, 454, 452 when viewing/interpreting light coming from the world 470 on the other side of the stacked waveguide assembly 480, a compensating lens layer 430 may be disposed at the top of the stack to compensate for the aggregate power of the lens stack 458, 456, 454, 452 below. Such a configuration provides as many perceived focal planes as there are available waveguide/lens pairings. Both the light extracting optical elements of the waveguides and the focusing aspects of the lenses may be static (e.g., not dynamic or electro-active). In some alternative embodiments, either or both may be dynamic using electro-active features.

With continued reference to FIG. 4, the light extracting optical elements 440a, 438a, 436a, 434a, 432a may be configured to both redirect light out of their respective waveguides and to output this light with the appropriate amount of divergence or collimation for a particular depth plane associated with the waveguide. As a result, waveguides having different associated depth planes may have different configurations of light extracting optical elements, which output light with a different amount of divergence depending on the associated depth plane. In some embodiments, as discussed herein, the light extracting optical elements 440a, 438a, 436a, 434a, 432a may be volumetric or surface features, which may be configured to output light at specific angles. For example, the light extracting optical elements 440a, 438a, 436a, 434a, 432a may be volume holograms, surface holograms, and/or diffraction gratings. Light extracting optical elements, such as diffraction gratings, are described in U.S. Patent Publication No. 2015/0178939, published Jun. 25, 2015, which is incorporated by reference herein in its entirety.

In some embodiments, the light extracting optical elements 440a, 438a, 436a, 434a, 432a are diffractive features that form a diffraction pattern, or "diffractive optical element" (also referred to herein as a "DOE"). Preferably, the DOE's have a relatively low diffraction efficiency so that only a portion of the light of the beam is deflected away toward the eye 410 with each intersection of the DOE, while the rest continues to move through a waveguide via total internal reflection. The light carrying the image information is thus divided into a number of related exit beams that exit the waveguide at a multiplicity of locations and the result is a fairly uniform pattern of exit emission toward the eye 304 for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets can be switched to substantially match the refractive index of the host material (in which case the pattern does not appreciably diffract incident light) or the microdroplet can be switched to an index that does not match that of the host medium (in which case the pattern actively diffracts incident light).

In some embodiments, the number and distribution of depth planes and/or depth of field may be varied dynamically based on the pupil sizes and/or orientations of the eyes of the viewer. Depth of field may change inversely with a viewer's pupil size. As a result, as the sizes of the pupils of the viewer's eyes decrease, the depth of field increases such that one plane not discernible because the location of that plane is beyond the depth of focus of the eye may become discernible and appear more in focus with reduction of pupil size and commensurate increase in depth of field. Likewise, the number of spaced apart depth planes used to present different images to the viewer may be decreased with decreased pupil size. For example, a viewer may not be able to clearly perceive the details of both a first depth plane and a second depth plane at one pupil size without adjusting the accommodation of the eye away from one depth plane and to the other depth plane. These two depth planes may, however, be sufficiently in focus at the same time to the user at another pupil size without changing accommodation.

In some embodiments, the display system may vary the number of waveguides receiving image information based upon determinations of pupil size and/or orientation, or upon receiving electrical signals indicative of particular pupil sizes and/or orientations. For example, if the user's eyes are unable to distinguish between two depth planes associated with two waveguides, then the controller 460 may be configured or programmed to cease providing image information to one of these waveguides. Advantageously, this may reduce the processing burden on the system, thereby increasing the responsiveness of the system. In embodiments in which the DOEs for a waveguide are switchable between on and off states, the DOEs may be switched to the off state when the waveguide does receive image information.

In some embodiments, it may be desirable to have an exit beam meet the condition of having a diameter that is less than the diameter of the eye of a viewer. However, meeting this condition may be challenging in view of the variability in size of the viewer's pupils. In some embodiments, this condition is met over a wide range of pupil sizes by varying the size of the exit beam in response to determinations of the size of the viewer's pupil. For example, as the pupil size decreases, the size of the exit beam may also decrease. In some embodiments, the exit beam size may be varied using a variable aperture.

The wearable system 400 can include an outward-facing imaging system 464 (e.g., a digital camera) that images a portion of the world 470. This portion of the world 470 may be referred to as the field of view (FOV) and the imaging system 464 is sometimes referred to as an FOV camera. The entire region available for viewing or imaging by a viewer may be referred to as the field of regard (FOR). The FOR may include 4π steradians of solid angle surrounding the wearable system 400. In some implementations of the wearable system 400, the FOR may include substantially all of the solid angle around a user of the display system 400, because the user can move their head and eyes to look at objects surrounding the user (in front, in back, above, below, or on the sides of the user). Images obtained from the outward-facing imaging system 464 can be used to track gestures made by the user (e.g., hand or finger gestures), detect objects in the world 470 in front of the user, and so forth.

The wearable system 400 can also include an inward-facing imaging system 466 (e.g., a digital camera), which observes the movements of the user, such as the eye movements and the facial movements. The inward-facing imaging system 466 may be used to capture images of the eye 410 to determine the size and/or orientation of the pupil of the eye 304. The inward-facing imaging system 466 can be used to obtain images for use in determining the direction the user is looking (e.g., eye pose) or for biometric identification of the user (e.g., via iris identification). In some embodiments, at least one camera may be utilized for each eye, to separately determine the pupil size and/or eye pose of each eye independently, thereby allowing the presentation of image information to each eye to be dynamically tailored to that eye. In some other embodiments, the pupil diameter and/or orientation of only a single eye 410 (e.g., using only a single camera per pair of eyes) is determined and assumed to be similar for both eyes of the user. The images obtained by the inward-facing imaging system 466 may be analyzed to determine the user's eye pose and/or mood, which can be used by the wearable system 400 to decide which audio or visual content should be presented to the user. The wearable system 400 may also determine head pose (e.g., head position or head orientation) using sensors such as IMUs (e.g., accelerometers, gyroscopes, etc.).

The wearable system 400 can include a user input device 466 by which the user can input commands to the controller 460 to interact with the wearable system 400. For example, the user input device 466 can include a trackpad, a touchscreen, a joystick, a multiple degree-of-freedom (DOF) controller, a capacitive sensing device, a game controller, a keyboard, a mouse, a directional pad (D-pad), a wand, a haptic device, a totem, a smartphone, a smartwatch, a tablet, and so forth, in combination or the like. A multi-DOF controller can sense user input in some or all possible translations (e.g., left/right, forward/backward, or up/down) or rotations (e.g., yaw, pitch, or roll) of the controller. The user can interact with the user input device 466 or objects (e.g., virtual or physical objects) in his or her environment by, e.g., by clicking on a mouse, tapping on a touch pad, swiping on a touch screen, hovering over or touching a capacitive button, pressing a key on a keyboard or a game controller (e.g., a 5-way d-pad), pointing a joystick, wand, or totem toward the object, pressing a button on a remote control, or other interactions with a user input device. The actuation of the user input device 466 may cause the wearable system to perform a user interface operation, such as, e.g., displaying a virtual user interface menu associated with an object, animating the user's avatar in a game, etc. As described herein, the user input device 466 may be configured to emit light. The light patterns may represent information associated with an object in the user's environment, the user's interaction with the user input device 466 or a wearable device, and so on.

In some cases, the user may use a finger (e.g., a thumb) to press or swipe on a touch-sensitive input device to provide input to the wearable system 400 (e.g., to provide user input to a user interface provided by the wearable system 400). The user input device 466 may be held by the user's hand during the use of the wearable system 400. The user input device 466 can be in wired or wireless communication with the wearable system 400. The user input device 466 may comprise embodiments of the totem described herein. The totem can include a touch surface which can allow a user to actuate the totem by swiping along a trajectory or tapping, etc.

Figure 5:
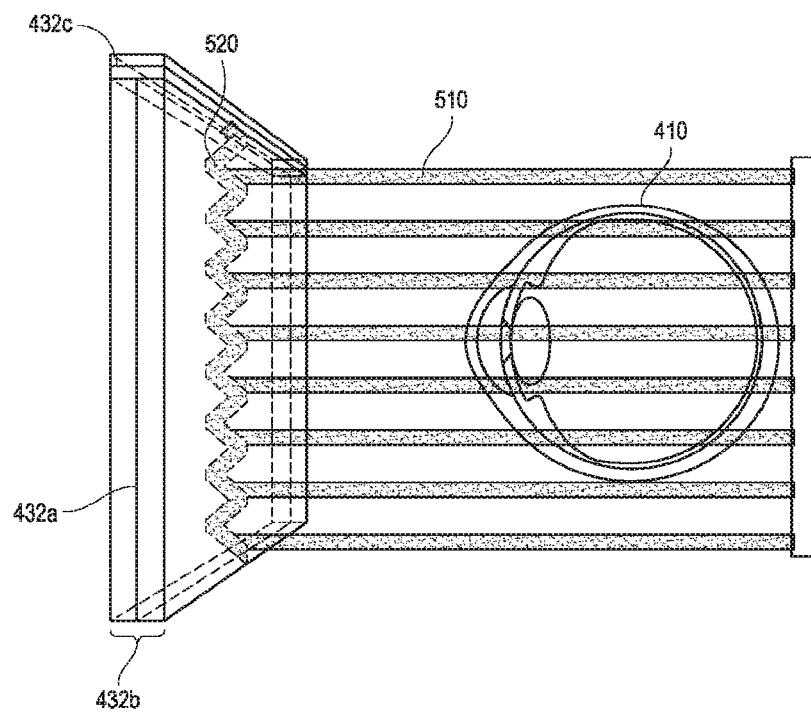
FIG. 5 shows example exit beams that may be outputted by a waveguide.

FIG. 5 shows an example of exit beams outputted by a waveguide. One waveguide is illustrated, but it will be appreciated that other waveguides in the waveguide assembly 480 may function similarly, where the waveguide assembly 480 includes multiple waveguides. Light 520 is injected into the waveguide 432b at the input edge 432c of the waveguide 432b and propagates within the waveguide 432b by TIR. At points where the light 520 impinges on the DOE 432a, a portion of the light exits the waveguide as exit beams 510. The exit beams 510 are illustrated as substantially parallel but they may also be redirected to propagate to the eye 410 at an angle (e.g., forming divergent exit beams), depending on the depth plane associated with the waveguide 432b. It will be appreciated that substantially parallel exit beams may be indicative of a waveguide with light extracting optical elements that outcouple light to form images that appear to be set on a depth plane at a large distance (e.g., optical infinity) from the eye 410. Other waveguides or other sets of light extracting optical elements may output an exit beam pattern that is more divergent, which would require the eye 410 to accommodate to a closer distance to bring it into focus on the retina and would be interpreted by the brain as light from a distance closer to the eye 410 than optical infinity.

Figure 6:
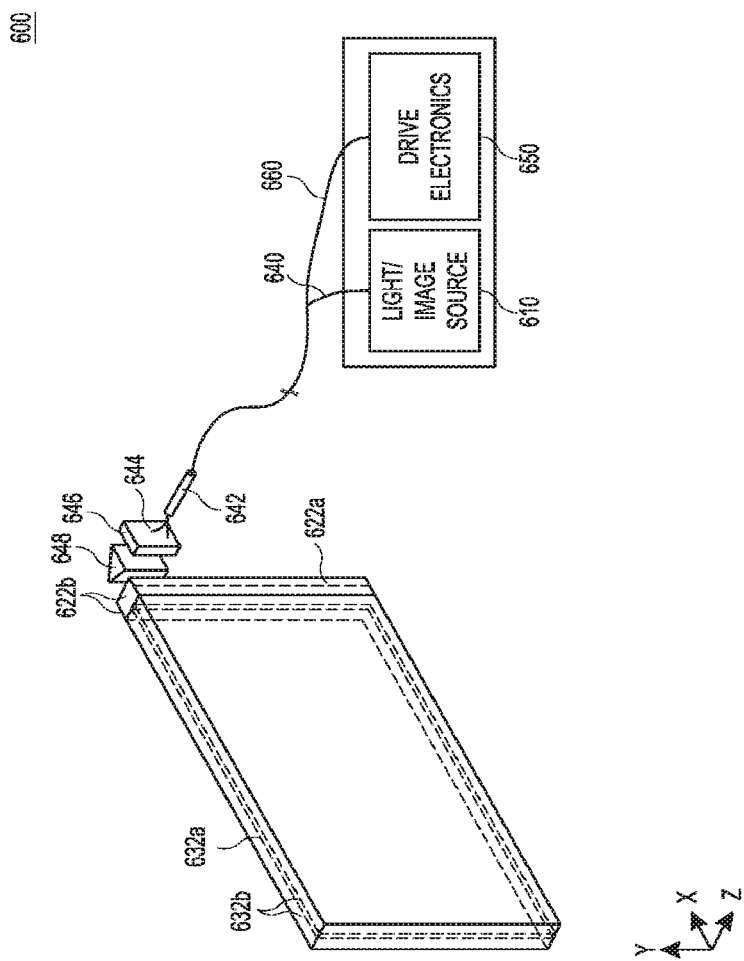
FIG. 6 is a schematic diagram showing an optical system including a waveguide apparatus, an optical coupler subsystem to optically couple light to or from the waveguide apparatus, and a control subsystem, used in the generation of a multi-focal volumetric display, image, or light field.

FIG. 6 is a schematic diagram showing an optical system including a waveguide apparatus, an optical coupler subsystem to optically couple light to or from the waveguide apparatus, and a control subsystem, used in the generation of a multi-focal volumetric display, image, or light field. The optical system can include a waveguide apparatus, an optical coupler subsystem to optically couple light to or from the waveguide apparatus, and a control subsystem. The optical system can be used to generate a multi-focal volumetric, image, or light field. The optical system can include one or more primary planar waveguides 632a (only one is shown in FIG. 6) and one or more DOEs 632b associated with each of at least some of the primary waveguides 632a. The planar waveguides 632b can be similar to the waveguides 432b, 434b, 436b, 438b, 440b discussed with reference to FIG. 4. The optical system may employ a distribution waveguide apparatus to relay light along a first axis (vertical or Y-axis in view of FIG. 6), and expand the light's effective exit pupil along the first axis (e.g., Y-axis). The distribution waveguide apparatus, may, for example include a distribution planar waveguide 622b and at least one DOE 622a (illustrated by double dash-dot line) associated with the distribution planar waveguide 622b. The distribution planar waveguide 622b may be similar or identical in at least some respects to the primary planar waveguide 632b, having a different orientation therefrom. Likewise, at least one DOE 622a may be similar or identical in at least some respects to the DOE 632a. For example, the distribution planar waveguide 622b and/or DOE 622a may be comprised of the same materials as the primary planar waveguide 632b and/or DOE 632a, respectively. Embodiments of the optical display system 600 shown in FIG. 6 can be integrated into the wearable system 200 shown in FIG. 2.

The relayed and exit-pupil expanded light is optically coupled from the distribution waveguide apparatus into the one or more primary planar waveguides 632b. The primary planar waveguide 632b relays light along a second axis, preferably orthogonal to first axis, (e.g., horizontal or X-axis in view of FIG. 6). Notably, the second axis can be a non-orthogonal axis to the first axis. The primary planar waveguide 632b expands the light's effective exit pupil along that second axis (e.g., X-axis). For example, the distribution planar waveguide 622b can relay and expand light along the vertical or Y-axis, and pass that light to the primary planar waveguide 632b which relays and expands light along the horizontal or X-axis.

The optical system may include one or more sources of colored light (e.g., red, green, and blue laser light) 610 which may be optically coupled into a proximal end of a single mode optical fiber 640. A distal end of the optical fiber 640 may be threaded or received through a hollow tube 8 of piezoelectric material. The distal end protrudes from the tube 642 as fixed-free flexible cantilever 644. The piezoelectric tube 642 can be associated with four quadrant electrodes (not illustrated). The electrodes may, for example, be plated on the outside, outer surface or outer periphery or diameter of the tube 642. A core electrode (not illustrated) is also located in a core, center, inner periphery or inner diameter of the tube 642.

Drive electronics 650, for example electrically coupled via wires 660, drive opposing pairs of electrodes to bend the piezoelectric tube 642 in two axes independently. The protruding distal tip of the optical fiber 644 has mechanical modes of resonance. The frequencies of resonance can depend upon a diameter, length, and material properties of the optical fiber 644. By vibrating the piezoelectric tube 8 near a first mode of mechanical resonance of the fiber cantilever 644, the fiber cantilever 644 is caused to vibrate, and can sweep through large deflections.

By stimulating resonant vibration in two axes, the tip of the fiber cantilever 644 is scanned biaxially in an area filling two dimensional (2-D) scan. By modulating an intensity of light source(s) 610 in synchrony with the scan of the fiber cantilever 644, light emerging from the fiber cantilever 644 forms an image. Descriptions of such a set up are provided in U.S. Patent Publication No. 2014/0003762, which is incorporated by reference herein in its entirety.

A component of an optical coupler subsystem collimates the light emerging from the scanning fiber cantilever 644. The collimated light is reflected by mirrored surface 648 into the narrow distribution planar waveguide 622b which contains the at least one diffractive optical element (DOE) 622a. The collimated light propagates vertically (relative to the view of FIG. 6) along the distribution planar waveguide 622b by total internal reflection (TIR), and in doing so repeatedly intersects with the DOE 622a. The DOE 622a preferably has a low diffraction efficiency. This causes a fraction (e.g., 10%) of the light to be diffracted toward an edge of the larger primary planar waveguide 632b at each point of intersection with the DOE 622a, and a fraction of the light to continue on its original trajectory down the length of the distribution planar waveguide 622b via TIR.

At each point of intersection with the DOE 622a, additional light is diffracted toward the entrance of the primary waveguide 632b. By dividing the incoming light into multiple outcoupled sets, the exit pupil of the light is expanded vertically by the DOE 4 in the distribution planar waveguide 622b. This vertically expanded light coupled out of distribution planar waveguide 622b enters the edge of the primary planar waveguide 632b.

Light entering primary waveguide 632b propagates horizontally (relative to the view of FIG. 6) along the primary waveguide 632b via TIR. As the light intersects with DOE 632a at multiple points as it propagates horizontally along at least a portion of the length of the primary waveguide 632b via TIR. The DOE 632a may advantageously be designed or configured to have a phase profile that is a summation of a linear diffraction pattern and a radially symmetric diffractive pattern, to produce both deflection and focusing of the light. The DOE 632a may advantageously have a low diffraction efficiency (e.g., 10%), so that only a portion of the light of the beam is deflected toward the eye of the view with each intersection of the DOE 632a while the rest of the light continues to propagate through the primary waveguide 632b via TIR.

At each point of intersection between the propagating light and the DOE 632a, a fraction of the light is diffracted toward the adjacent face of the primary waveguide 632b allowing the light to escape the TIR, and emerge from the face of the primary waveguide 632b. In some embodiments, the radially symmetric diffraction pattern of the DOE 632a additionally imparts a focus level to the diffracted light, both shaping the light wavefront (e.g., imparting a curvature) of the individual beam as well as steering the beam at an angle that matches the designed focus level.

Accordingly, these different pathways can cause the light to be coupled out of the primary planar waveguide 632b by a multiplicity of DOEs 632a at different angles, focus levels, and/or yielding different fill patterns at the exit pupil. Different fill patterns at the exit pupil can be beneficially used to create a light field display with multiple depth planes. Each layer in the waveguide assembly or a set of layers (e.g., 3 layers) in the stack may be employed to generate a respective color (e.g., red, blue, green). Thus, for example, a first set of three adjacent layers may be employed to respectively produce red, blue and green light at a first focal depth. A second set of three adjacent layers may be employed to respectively produce red, blue and green light at a second focal depth. Multiple sets may be employed to generate a full 3D or 4D color image light field with various focal depths.

Other Components of the Wearable System

In many implementations, the wearable system may include other components in addition or in alternative to the components of the wearable system described above. The wearable system may, for example, include one or more haptic devices or components. The haptic device(s) or component(s) may be operable to provide a tactile sensation to a user. For example, the haptic device(s) or component(s) may provide a tactile sensation of pressure and/or texture when touching virtual content (e.g., virtual objects, virtual tools, other virtual constructs). The tactile sensation may replicate a feel of a physical object which a virtual object represents, or may replicate a feel of an imagined object or character (e.g., a dragon) which the virtual content represents. In some implementations, haptic devices or components may be worn by the user (e.g., a user wearable glove). In some implementations, haptic devices or components may be held by the user.

The wearable system may, for example, include one or more physical objects which are manipulable by the user to allow input or interaction with the wearable system. These physical objects may be referred to herein as totems. Some totems may take the form of inanimate objects, such as for example, a piece of metal or plastic, a wall, a surface of table. In certain implementations, the totems may not actually have any physical input structures (e.g., keys, triggers, joystick, trackball, rocker switch). Instead, the totem may simply provide a physical surface, and the wearable system may render a user interface so as to appear to a user to be on one or more surfaces of the totem. For example, the wearable system may render an image of a computer keyboard and trackpad to appear to reside on one or more surfaces of a totem. For instance, the wearable system may render a virtual computer keyboard and virtual trackpad to appear on a surface of a thin rectangular plate of aluminum which serves as a totem. The rectangular plate does not itself have any physical keys or trackpad or sensors. However, the wearable system may detect user manipulation or interaction or touches with the rectangular plate as selections or inputs made via the virtual keyboard and/or virtual trackpad. The user input device 466 (shown in FIG. 4) may be an embodiment of a totem, which may include a trackpad, a touchpad, a trigger, a joystick, a trackball, a rocker switch, a mouse, a keyboard, a multi-degree-of-freedom controller, or another physical input device. A user may use the totem, alone or in combination with poses, to interact with the wearable system and/or other users.

Examples of haptic devices and totems usable with the wearable devices, HMD, ARD, and display systems of the present disclosure are described in U.S. Patent Publication No. 2015/0016777, which is incorporated by reference herein in its entirety.

Example Wearable Systems, Environments, and Interfaces

A wearable system may employ various mapping related techniques in order to achieve high depth of field in the rendered light fields. In mapping out the virtual world, it is advantageous to know all the features and points in the real world to accurately portray virtual objects in relation to the real world. To this end, FOV images captured from users of the wearable system can be added to a world model by including new pictures that convey information about various points and features of the real world. For example, the wearable system can collect a set of map points (such as 2D points or 3D points) and find new map points to render a more accurate version of the world model. The world model of a first user can be communicated (e.g., over a network such as a cloud network) to a second user so that the second user can experience the world surrounding the first user.

Figure 7:
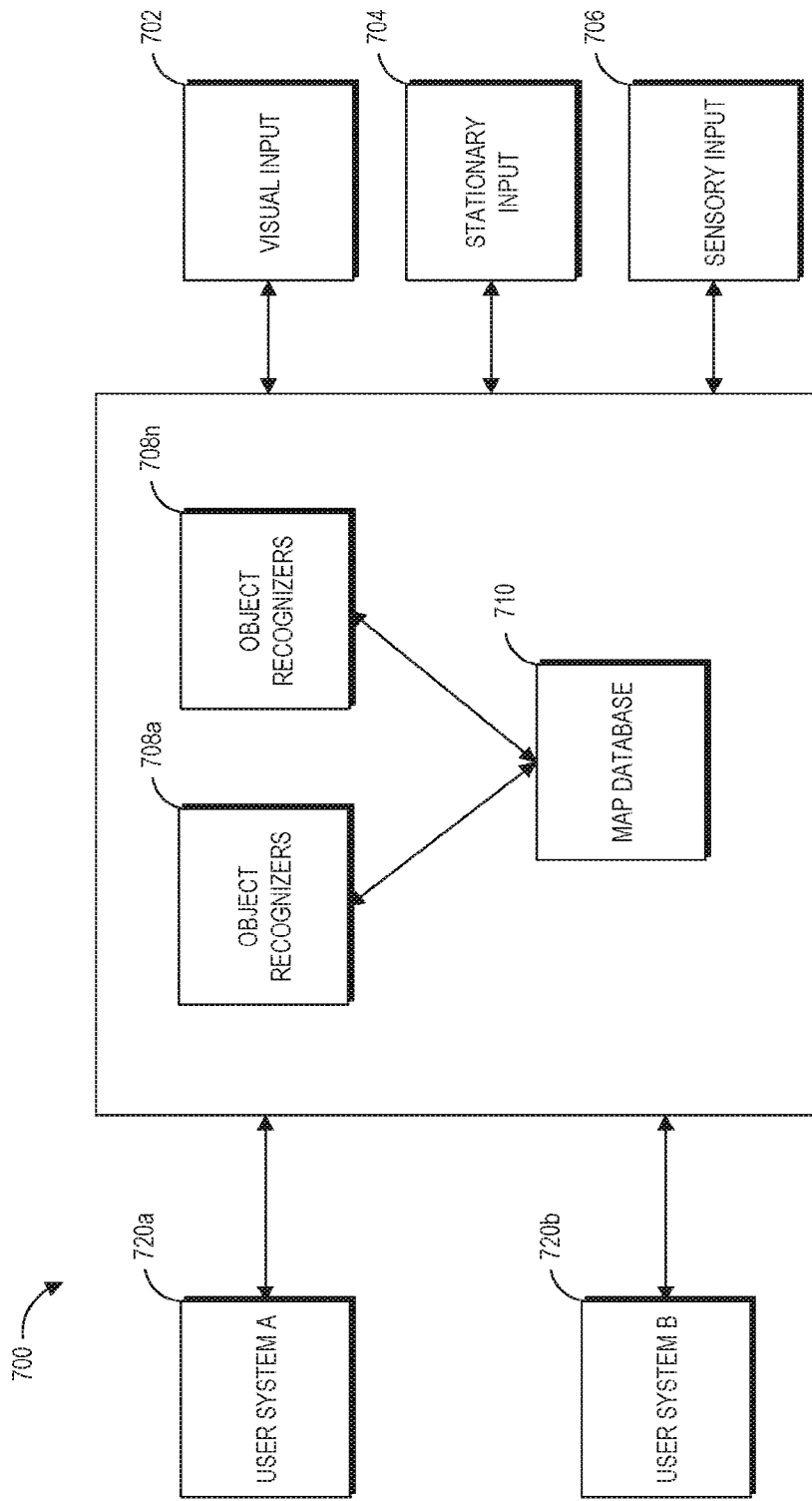
FIG. 7 is a block diagram of an example of a wearable system.

FIG. 7 is a block diagram of an example of an MR environment 700. The MR environment 700 may be configured to receive input (e.g., visual input 702 from the user's wearable system, stationary input 704 such as room cameras, sensory input 706 from various sensors, gestures, totems, eye tracking, user input from the user input device 466, etc.) from various user systems 720a, 720b. The user systems 720a, 720b can comprise one or more user wearable systems (e.g., wearable system 200 and/or display system 220) and/or stationary room systems (e.g., room cameras, etc.). The wearable systems can use various sensors (e.g., accelerometers, gyroscopes, temperature sensors, movement sensors, depth sensors, GPS sensors, inward-facing imaging system, outward-facing imaging system, etc.) to determine the location and various other attributes of the environment of the user. This information may further be supplemented with information from stationary cameras in the room that may provide images and/or various cues from a different point of view. The image data acquired by the cameras (such as the room cameras and/or the cameras of the outward-facing imaging system) may be reduced to a set of mapping points.

One or more object recognizers 708 can crawl through the received data (e.g., the collection of points) and recognize and/or map points, tag images, attach semantic information to objects with the help of a map database 710. The map database 710 may comprise various points collected over time and their corresponding objects. The various devices and the map database can be connected to each other through a network (e.g., LAN, WAN, etc.) to access the cloud.

Based on this information and collection of points in the map database, the object recognizers 708a to 708n may recognize objects in an environment. For example, the object recognizers can recognize faces, persons, windows, walls, user input devices, televisions, other objects in the user's environment, etc. One or more object recognizers may be specialized for object with certain characteristics.

For example, the object recognizer 708a may be used to recognizer faces, while another object recognizer may be used recognize totems.

The object recognitions may be performed using a variety of computer vision techniques. For example, the wearable system can analyze the images acquired by the outward-facing imaging system 464 (shown in FIG. 4) to perform scene reconstruction, event detection, video tracking, object recognition, object pose estimation, learning, indexing, motion estimation, or image restoration, etc. One or more computer vision algorithms may be used to perform these tasks. Non-limiting examples of computer vision algorithms include: Scale-invariant feature transform (SIFT), speeded up robust features (SURF), oriented FAST and rotated BRIEF (ORB), binary robust invariant scalable keypoints (BRISK), fast retina keypoint (FREAK), Viola-Jones algorithm, Eigenfaces approach, Lucas-Kanade algorithm, Horn-Schunk algorithm, Mean-shift algorithm, visual simultaneous location and mapping (vSLAM) techniques, a sequential Bayesian estimator (e.g., Kalman filter, extended Kalman filter, etc.), bundle adjustment, Adaptive thresholding (and other thresholding techniques), Iterative Closest Point (ICP), Semi Global Matching (SGM), Semi Global Block Matching (SGBM), Feature Point Histograms, various machine learning algorithms (such as e.g., support vector machine, k-nearest neighbors algorithm, Naive Bayes, neural network (including convolutional or deep neural networks), or other supervised/unsupervised models, etc.), and so forth.

The object recognitions can additionally or alternatively be performed by a variety of machine learning algorithms. Once trained, the machine learning algorithm can be stored by the HMD. Some examples of machine learning algorithms can include supervised or non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, a-priori algorithms), artificial neural network algorithms (such as, for example, Perceptron), deep learning algorithms (such as, for example, Deep Boltzmann Machine, or deep neural network), dimensionality reduction algorithms (such as, for example, Principal Component Analysis), ensemble algorithms (such as, for example, Stacked Generalization), and/or other machine learning algorithms. In some embodiments, individual models can be customized for individual data sets. For example, the wearable device can generate or store a base model. The base model may be used as a starting point to generate additional models specific to a data type (e.g., a particular user in the telepresence session), a data set (e.g., a set of additional images obtained of the user in the telepresence session), conditional situations, or other variations. In some embodiments, the wearable HMD can be configured to utilize a plurality of techniques to generate models for analysis of the aggregated data. Other techniques may include using pre-defined thresholds or data values.

The wearable system can also supplement recognized objects with semantic information to give life to the objects. For example, if the object recognizer recognizes a set of points to be a door, the system may attach some semantic information (e.g., the door has a hinge and has a 90 degree movement about the hinge). If the object recognizer recognizes a set of points to be a totem, the wearable system may attach semantic information that the totem can be paired (e.g., via Bluetooth) with the wearable system. Over time the map database grows as the system (which may reside locally or may be accessible through a wireless network) accumulates more data from the world. Once the objects are recognized, the information may be transmitted to one or more wearable systems. For example, the MR environment 700 may include information about a scene happening in California. The environment 700 may be transmitted to one or more users in New York. Based on data received from an FOV camera and other inputs, the object recognizers and other software components can map the points collected from the various images, recognize objects etc., such that the scene may be accurately "passed over" to a second user, who may be in a different part of the world. The environment 700 may also use a topological map for localization purposes.

Figure 8:
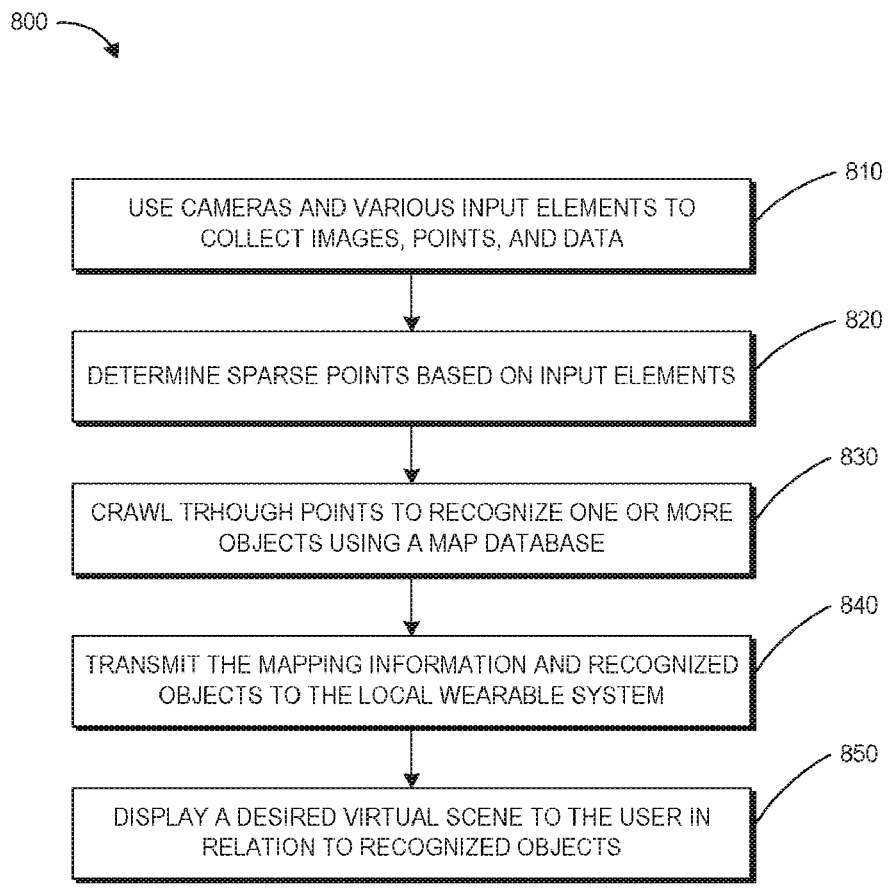
FIG. 8 is a process flow diagram of an example of a method of rendering virtual content in relation to recognized objects.

FIG. 8 is a process flow diagram of an example of a method 800 of rendering virtual content in relation to recognized objects. The method 800 describes how a virtual scene may be represented to a user of the MR system (e.g., a wearable system). The user may be geographically remote from the scene. For example, the user may be New York, but may want to view a scene that is presently going on in California, or may want to go on a walk with a friend who resides in California.

At block 810, the wearable system may receive input from the user and other users regarding the environment of the user. This may be achieved through various input devices, and knowledge already possessed in the map database. The user's FOV camera, sensors, GPS, eye tracking, etc., convey information to the system at block 810. The system may determine sparse points based on this information at block 820. The sparse points may be used in determining pose data (e.g., head pose, eye pose, body pose, and/or hand gestures) that can be used in displaying and understanding the orientation and position of various objects in the user's surroundings. The object recognizers 708a, 708n may crawl through these collected points and recognize one or more objects using a map database at block 830. This information may then be conveyed to the user's individual wearable system at block 840, and the desired virtual scene may be accordingly displayed to the user at block 850. For example, the desired virtual scene (e.g., user in CA) may be displayed at the appropriate orientation, position, etc., in relation to the various objects and other surroundings of the user in New York.

Figure 9:
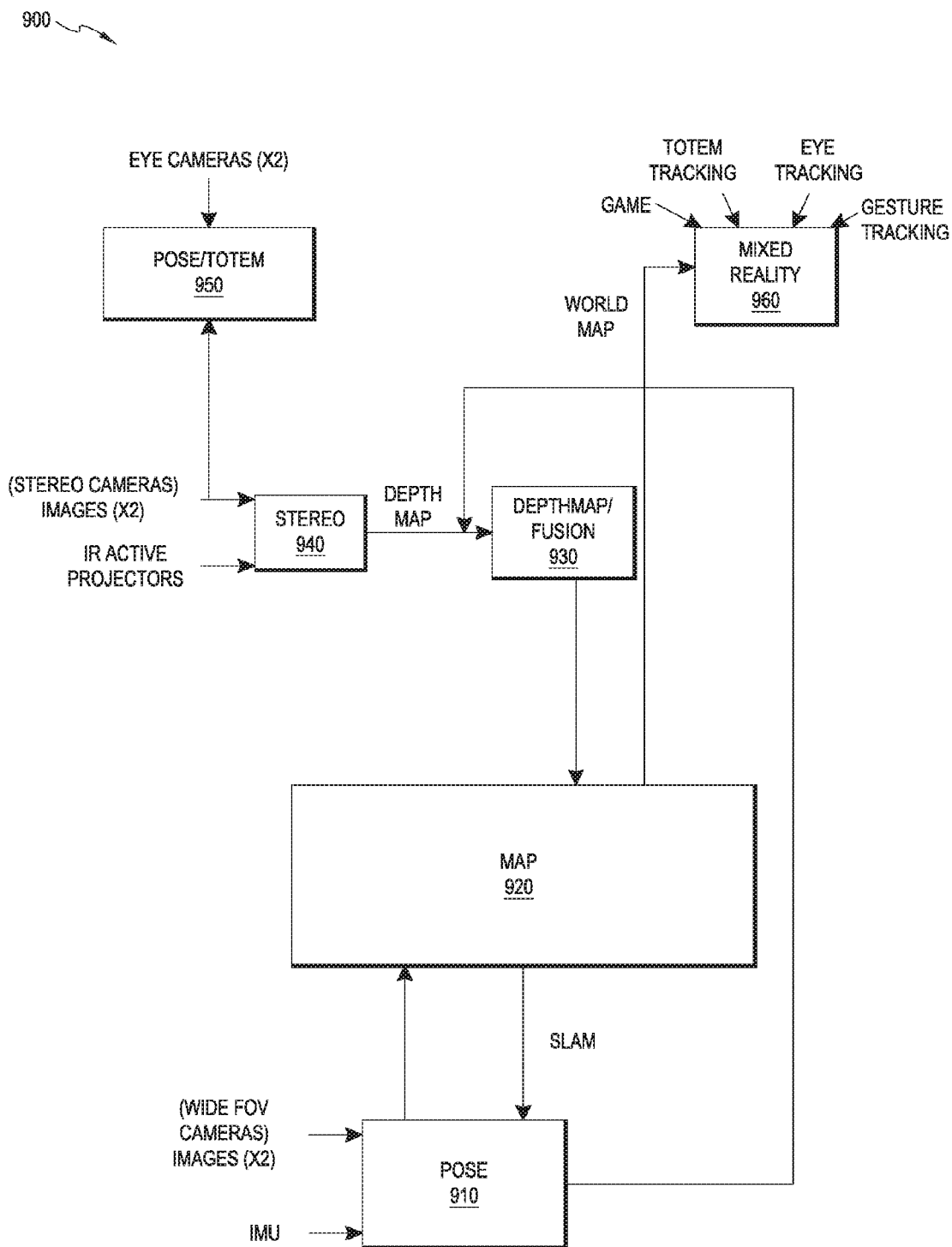
FIG. 9 is a block diagram of another example of a wearable system.

FIG. 9 is a block diagram of another example of a wearable system. In this example, the wearable system 900 comprises a map, which may include map data for the world. The map may partly reside locally on the wearable system, and may partly reside at networked storage locations accessible by wired or wireless network (e.g., in a cloud system). A pose process 910 may be executed on the wearable computing architecture (e.g., processing module 260 or controller 460) and utilize data from the map to determine position and orientation of the wearable computing hardware or user. Pose data may be computed from data collected on the fly as the user is experiencing the system and operating in the world. The data may comprise images, data from sensors (such as inertial measurement devices, which generally comprise accelerometer and gyroscope components) and surface information pertinent to objects in the real or virtual environment.

A sparse point representation may be the output of a simultaneous localization and mapping (SLAM or V-SLAM, referring to a configuration wherein the input is images/visual only) process. The system can be configured to not only find out where in the world the various components are, but what the world is made of. Pose may be a building block that achieves many goals, including populating the map and using the data from the map.

In one embodiment, a sparse point position may not be completely adequate on its own, and further information may be needed to produce a multifocal AR, VR, or MR experience. Dense representations, generally referring to depth map information, may be utilized to fill this gap at least in part. Such information may be computed from a process referred to as Stereo 940, wherein depth information is determined using a technique such as triangulation or time-of-flight sensing. Image information and active patterns (such as infrared patterns created using active projectors) may serve as input to the Stereo process 940. A significant amount of depth map information may be fused together, and some of this may be summarized with a surface representation. For example, mathematically definable surfaces are efficient (e.g., relative to a large point cloud) and digestible inputs to other processing devices like game engines. Thus, the output of the Stereo process (e.g., a depth map) 940 may be combined in the Fusion process 930. Pose may be an input to this Fusion process 930 as well, and the output of Fusion 930 becomes an input to populating the map process 920. Sub-surfaces may connect with each other, such as in topographical mapping, to form larger surfaces, and the map becomes a large hybrid of points and surfaces.

To resolve various aspects in a mixed reality process 960, various inputs may be utilized. For example, in the embodiment depicted in FIG. 9, Game parameters may be inputs to determine that the user of the system is playing a monster battling game with one or more monsters at various locations, monsters dying or running away under various conditions (such as if the user shoots the monster), walls or other objects at various locations, and the like. The world map may include information regarding where such objects are relative to each other, to be another valuable input to mixed reality. Pose relative to the world becomes an input as well and plays a key role to almost any interactive system.

Controls or inputs from the user are another input to the wearable system 900. As described herein, user inputs can include visual input, gestures, totems, audio input, sensory input, etc. In order to move around or play a game, for example, the user may need to instruct the wearable system 900 regarding what he or she wants to do. Beyond just moving oneself in space, there are various forms of user controls that may be utilized. In one embodiment, a totem, another user input device, or an object such as a toy gun may be held by the user and tracked by the system. The system preferably will be configured to know that the user is holding the item and understand what kind of interaction the user is having with the item (e.g., if the totem or object is a gun, the system may be configured to understand location and orientation, as well as whether the user is clicking a trigger or other sensed button or element which may be equipped with a sensor, such as an IMU, which may assist in determining what is going on, even when such activity is not within the field of view of any of the cameras.)

Hand gesture tracking or recognition may also provide input information. The wearable system 900 may be configured to track and interpret hand gestures for button presses, for gesturing left or right, stop, grab, hold, etc. For example, in one configuration, the user may want to flip through emails or a calendar in a non-gaming environment, or do a "fist bump" with another person or player. The wearable system 900 may be configured to leverage a minimum amount of hand gesture, which may or may not be dynamic. For example, the gestures may be simple static gestures like open hand for stop, thumbs up for ok, thumbs down for not ok; or a hand flip right, or left, or up/down for directional commands.

Eye tracking is another input (e.g., tracking where the user is looking to control the display technology to render at a specific depth or range). In one embodiment, vergence of the eyes may be determined using triangulation, and then using a vergence/accommodation model developed for that particular person, accommodation may be determined.

With regard to the camera systems, the example wearable system 900 shown in FIG. 9 can include three pairs of cameras: a relative wide FOV or passive SLAM pair of cameras arranged to the sides of the user's face, a different pair of cameras oriented in front of the user to handle the Stereo imaging process 940 and also to capture hand gestures and totem/object tracking in front of the user's face. The cameras in the three pairs of cameras may be a part of the outward-facing imaging system 464 (shown in FIG. 4). The wearable system 900 can include eye tracking cameras (which may be a part of an inward-facing imaging system 462 shown in FIG. 4) oriented toward the eyes of the user in order to triangulate eye vectors and other information. The wearable system 900 may also comprise one or more textured light projectors (such as infrared (IR) projectors) to inject texture into a scene.

Figure 10:
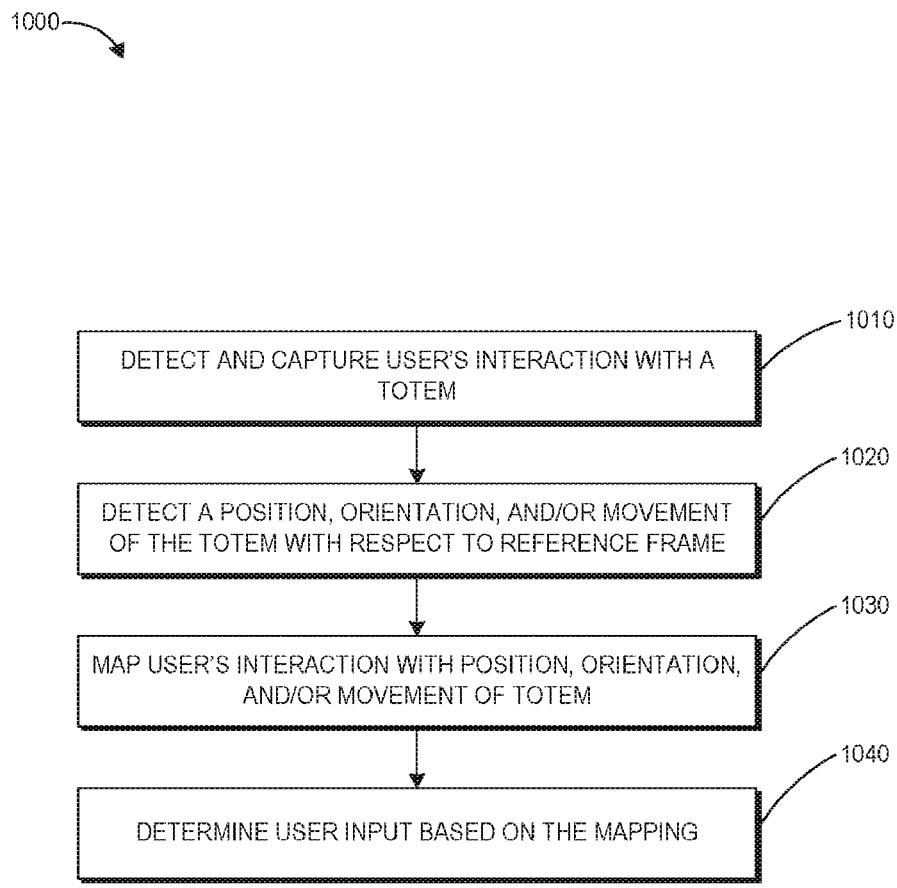
FIG. 10 is a process flow diagram of an example of a method for determining user input to a wearable system.

FIG. 10 is a process flow diagram of an example of a method 1000 for determining user input to a wearable system. In this example, the user may interact with a totem. The user may have multiple totems. For example, the user may have designated one totem for a social media application, another totem for playing games, etc. At block 1010, the wearable system may detect a motion of a totem. The movement of the totem may be recognized through the user's FOV camera or may be detected through sensors (e.g., haptic glove, image sensors, hand tracking devices, eye-tracking cameras, head pose sensors, etc.).

Based at least partly on the detected gesture, eye pose, head pose, or input through the totem, the wearable system detects a position, orientation, and/or movement of the totem (or the user's eyes or head or gestures) with respect to a reference frame, at block 1020. The reference frame may be a set of map points based on which the wearable system translates the movement of the totem (or the user) to an action or command. At block 1030, the user's interaction with the totem is mapped. Based on the mapping of the user interaction with respect to the reference frame 1020, the system determines the user input at block 1040.

For example, the user may move a totem or physical object back and forth to signify turning a virtual page and moving on to a next page or moving from one user interface (UI) display screen to another UI screen. As another example, the user may move their head or eyes to look at different real or virtual objects in the user's FOR. If the user's gaze at a particular real or virtual object is longer than a threshold time, the real or virtual object may be selected as the user input. In some implementations, the vergence of the user's eyes can be tracked and an accommodation/vergence model can be used to determine the accommodation state of the user's eyes, which provides information on a depth plane on which the user is focusing. In some implementations, the wearable system can use raycasting techniques to determine which real or virtual objects are along the direction of the user's head pose or eye pose. In various implementations, the ray casting techniques can include casting thin, pencil rays with substantially little transverse width or casting rays with substantial transverse width (e.g., cones or frustums).

The user interface may be projected by the display system as described herein (such as the display 220 in FIG. 2). It may also be displayed using a variety of other techniques such as one or more projectors. The projectors may project images onto a physical object such as a canvas or a globe. Interactions with user interface may be tracked using one or more cameras external to the system or part of the system (such as, e.g., using the inward-facing imaging system 462 or the outward-facing imaging system 464).

Figure 11:
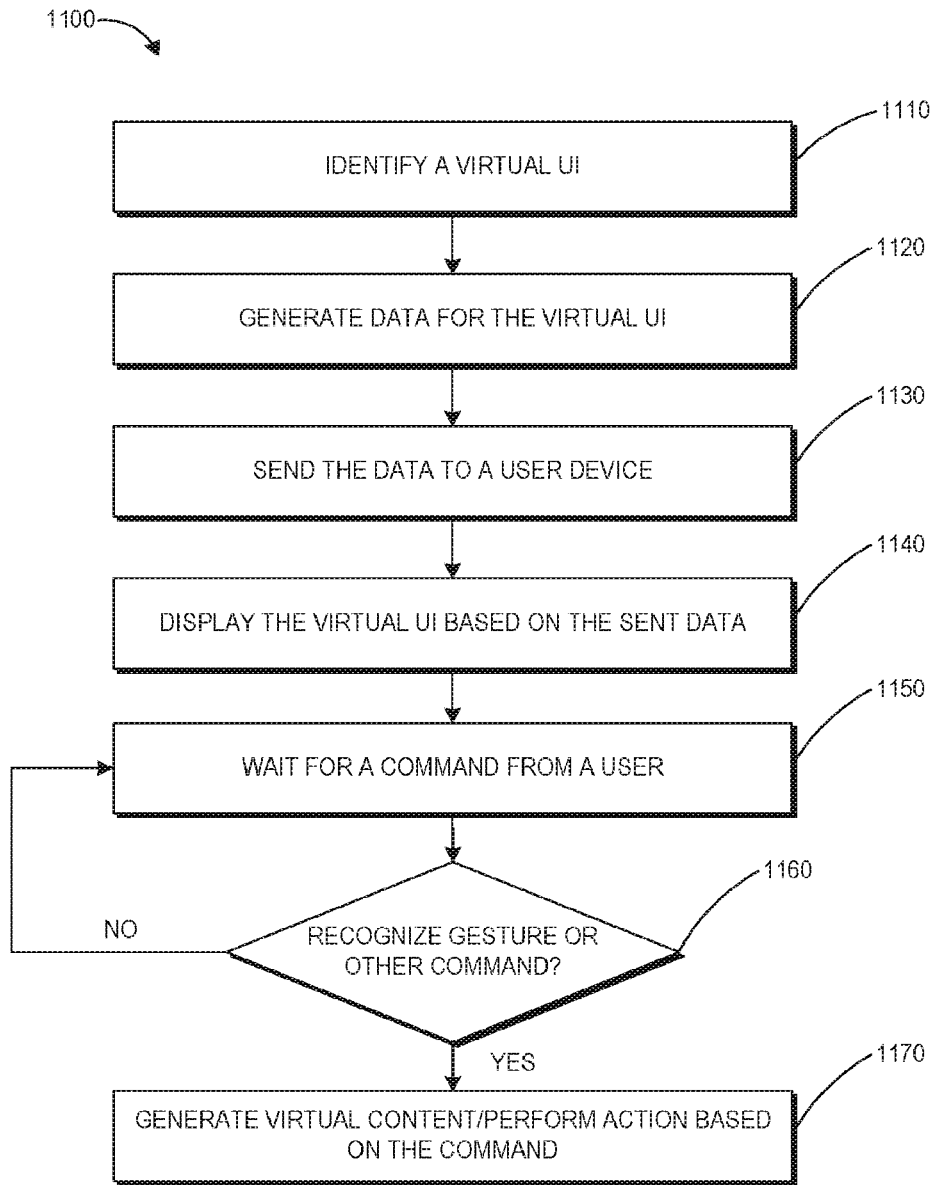
FIG. 11 is a process flow diagram of an example of a method for interacting with a virtual user interface.

FIG. 11 is a process flow diagram of an example of a method 1100 for interacting with a virtual user interface. The method 1100 may be performed by the wearable system described herein.

At block 1110, the wearable system may identify a particular UI. The type of UI may be predetermined by the user. The wearable system may identify that a particular UI needs to be populated based on a user input (e.g., gesture, visual data, audio data, sensory data, direct command, etc.). At block 1120, the wearable system may generate data for the virtual UI. For example, data associated with the confines, general structure, shape of the UI etc., may be generated. In addition, the wearable system may determine map coordinates of the user's physical location so that the wearable system can display the UI in relation to the user's physical location. For example, if the UI is body centric, the wearable system may determine the coordinates of the user's physical stance, head pose, or eye pose such that a ring UI can be displayed around the user or a planar UI can be displayed on a wall or in front of the user. If the UI is hand centric, the map coordinates of the user's hands may be determined. These map points may be derived through data received through the FOV cameras, sensory input, or any other type of collected data.

At block 1130, the wearable system may send the data to the display from the cloud or the data may be sent from a local database to the display components. At block 1140, the UI is displayed to the user based on the sent data. For example, a light field display can project the virtual UI into one or both of the user's eyes. Once the virtual UI has been created, the wearable system may simply wait for a command from the user to generate more virtual content on the virtual UI at block 1150. For example, the UI may be a body centric ring around the user's body. The wearable system may then wait for the command (a gesture, a head or eye movement, input from a user input device, etc.), and if it is recognized (block 1160), virtual content associated with the command may be displayed to the user (block 1170).

Additional examples of wearable systems, UI, and user experiences (UX) are described in U.S. Patent Publication No. 2015/0016777, which is incorporated by reference herein in its entirety.

Overview of an Example Totem

As described with reference to FIGS. 4 and 7-10, a user can perform various user interface operations on a display (e.g., display 220) using the user input device 466 (such as, e.g., a totem). FIG. 12A illustrates an example embodiment of a totem 1200, showing side 1210 and front (user-facing) 1250 views. The totem 1200 may be the user input device 466 (shown in FIG. 4) alone or in combination with other user input devices. The totem 1200 can be sized and shaped so as to be handheld. Further examples of user input devices (such as, e.g., totems) in one or more of the various embodiments disclosed herein are shown and described in U.S. patent application Ser. No. 15/683,677, filed Aug. 22, 2017, with ornamental appearances the same as or similar to the totem controller of U.S. Design patent application Ser. No. 29/575,031, filed Aug. 22, 2016, both of the aforementioned applications are hereby incorporated by reference herein in their entireties.

The totem 1200 shown in FIG. 12A can include a body 1214 having a trigger 1212, a home button 1256, and a touchpad 1260, although more or fewer buttons, triggers, or features can be included in other example totems. A light guide 1264 can substantially surround the touchpad 1260. In the examples shown in FIGS. 12A and 12B, the light guide 1264 is substantially annular (e.g., a circular ring) that substantially surrounds a circular touchpad 1260. In other embodiments, the touchpad 1260 and the light guide 1264 can be shaped differently. For example, the touchpad 1260 can be polygonally shaped (e.g., square, rectangular, hexagonal, etc.) or oval, and the light guide can have a shape (e.g., circular, oval, polygonal, etc.) that substantially surrounds the touchpad.

The trigger, home button, and touchpad can accept user inputs (e.g., by being pulled, depressed, or touched, respectively). The light guide 1264 can be illuminated to display light patterns. In some embodiments, the light guide 1264 is touch sensitive and can receive user input. The totem 1200 can be removably attached to a base 1220 when not being held by the user. The base 1220 may include an electrical power connection (e.g., to a wall socket) and can be used to charge the totem 1200 when the totem is attached to the base 1220.

Examples of a Trigger

The trigger 1212 can be located on the upper portion of the totem body 1214 that faces away from the user. The trigger 1212 can include a touch surface 1234 and a touch sensor (not shown in FIG. 12A), which can receive a user input. A touch sensor can sense a user's finger on (or near) the touch surface 1234 and the movement of the user's finger on the touch surface 1234. Additionally or alternatively, the trigger 1212 can include a button 1232 which the user can press. The button 1232 can include a pressure sensor which can detect when a user presses the button 1232. The button 1232 may be pressed 6-8 mm from its resting position. In some embodiments, the trigger 1212 can include multiple buttons such as, e.g., select, back, option, etc.

The trigger 1212 may be implemented, for example, using an Alps force sensor. The trigger 1212 (or the button 1232) can also be implemented using an analog or digital button. The trigger 1212 may be associated with a microprocessor. The microprocessor may reserve two general-purpose input/output (GPIO) pins for various functions of the trigger 1212.

In some implementations, the trigger 1212 can be configured to provide haptic feedback. The trigger 1212 can include a haptic actuator, such as, e.g., linear resonant actuator (LRA), eccentric rotating mass (ERM), piezo actuator, etc. For example, the trigger 1212 can employ an S-Type LRA (such as, e.g., an S-type Alps haptic on an analog button 1232) to generate a vibration.

A user can actuate the trigger 1212 using various hand gestures. For example, the user can actuate the trigger 1212 by touching, swiping, tapping, pressing, etc. The trigger 1212 can provide rich touch features where various user interface interactions may be associated with different hand gestures used to actuate the trigger 1212. For example, a user can switch between an AR interface and a VR interface by pressing the trigger 1212. As another example, the user can swipe the virtual objects in and out of the user's FOV by swiping on the touch surface 1234 of the trigger. The user interface interactions can also be associated with the duration of the actuation. The totem 1200 can record the duration of the press and determine a user interface operation based on the duration of the press. For example, pressing the trigger 1212 for an extended duration (such as e.g., for 3-5 seconds) may cause the wearable system to exit a program (such as e.g., a movie) while a quick press of the trigger may cause the wearable system to select a virtual object in the user's direction of gaze.

The trigger may be actuated in conjunction with other components of the totem or a pose of the user to perform a user interface operation. For example, the user may press the trigger 1212 while swiping on the touchpad 1260 to move a virtual object. As another example, the user can press the trigger 1212 with his or her right thumb and move his or her arm to the right to move a virtual object rightward.

The trigger 1212 can also be configured to provide an indication to the user that one or more user interface operations are available. For example, when the trigger 1212 is pressed for an extended duration, the wearable system may enable a user to change the settings of a game. To indicate to the user that he or she can now change the settings, the wearable system may provide a haptic feedback (such as, e.g., a vibration) on the trigger 1212 (or on the body of the totem). In addition to or in alternative to providing an indication that an user interface operation are available, the haptic feedback can also be used to inform the user that he or she has actuated the trigger 1212 using a certain gesture (such as e.g., tapping or pressing).

In other embodiments, some or all of the above-described functionality of the trigger 1212 can be implemented by other buttons or touch-sensitive surfaces of the totem 1200. For example, as described below with reference to FIG. 17B, a button (also referred to as a bumper) can perform some or all of the functionality of the trigger 1212 (or the home button 1256).

Other examples of a totem 1200 are described with reference to FIGS. 17A and 17B.

Examples of a Touchpad

The totem can include a touchpad 1260 located on the upper front portion of the totem body 1214 that faces toward the user. The touchpad 1260 can include a touch surface 1262 and a light guide 1264. In some examples, the architecture and/or functionality of the touchpad 1260 may be substantially the same as or similar to that which is described in U.S. patent application Ser. No. 15/683,677, which as mentioned above is incorporated by reference herein in its entirety. In the illustrated example, the light guide 1264 substantially surrounds the touch surface 1262. The touchpad 1260 can include various interactable regions. For example, the user can actuate the touch surface 1262, the light guide 1262, alone or in combination. The touch surface 1262 can further include multiple interactable regions, with each region being mapped to a type of user input (or a user interface operation).

The touch surface 1262 may be a circular surface with a diameter in the range of 27 mm-40 mm. The touch surface 1262 may also be other shapes, such as, e.g., oval, rectangle, triangle, diamond, irregular, etc. In certain implementations, the touchpad 1260 may have a less than 50 ms traffic-to-pilot (T2P) latency.

The touch surface 1262 can be substantially surrounded by a light guide 1264. For example, in various embodiments, the light guide 1264 may subtend an angular distance around the touch surface of greater than 90 degrees, greater than 180 degrees, greater than 270 degrees, or up to a full 360 degrees. The light guide 1264 can be illuminated to display a halo with various placement and movement of light patterns. The light guide 1264 can diffuse the light generated by light sources 1330 (e.g., LEDs) of the touchpad to display the halo, so that the illumination from individual, discrete light sources is merged. The light guide 1264 can comprise a diffusive optical element formed from, e.g., plastic or polymeric material formed into a ring shape, which can transmit (and diffuse) the light from the light sources 1330 to a viewer of the totem 1200 (see, e.g., FIGS. 13A-14A). The light guide can be transparent or translucent. In various embodiments, the light guide 1264 can comprise diffuser sheets, diffuser films, an etched waveguide, a transmissive optical element comprising layers of particles, irregular surfaces, holographs, white surfaces, ground glass, polytetrafluoroethylene (PTFE or Teflon), opal glass, greyed glass, colored gel, and so forth. Embodiments of a light guide comprising optically diffusive material advantageously may diffuse and spread out the light from the light sources 1330 so that the light guide appears to have an overall, substantially continuous glow (when all light sources are illuminated) rather than appearing as discrete, individual light sources (if the light guide were substantially transparent).

The touchpad can include a number of red, green, blue (RGB) LEDs (such as, e.g., 6-24 RGB LEDs). The light placement or movement patterns of the halo can provide visual indications of the user's interactions with the totem or other components of the wearable system, the status of a progress associated with the wearable system, the objects in the user's environment, etc. See, for example, the LEDs 1383a of FIG. 13C or the LEDs 1394a of FIG. 13E.

The light sources can include (additionally or alternatively) emitters that radiate in non-visible portions of the electromagnetic spectrum, e.g., infrared or ultraviolet. In such embodiments, a camera on the wearable device may be sensitive to the corresponding non-visible spectrum and can image non-visible light displayed by these emitters. Accordingly, the totem 1200 and the wearable device can exchange information via such a non-visible spectral modality. For example, the totem 1200 and an HMD can exchange device pairing information using the non-visible spectral modality.

The touchpad 1260 can include a force-haptic component underneath the touch surface 1262 and a portion of the light guide 1264. The force-haptic component can include a haptic actuator for providing haptic feedback to a user via the touch surface 1262 or the light guide 1264. The haptic feedback can be used alone or in combination with the visual halo to provide an indication of the user's interaction with the totem or the objects in the user's environment.

The force-haptic component can also include a touch detector for detecting a user's actuation of the touchpad. The force-haptic component may be implemented using a tough-type Alps LRA. The force-haptic component can include a strain gauge with an analog-to-digital converter (ADC).

The touchpad 1260 can employ a hybrid control technique such as, e.g., a trackpoint-style hybrid velocity control input technique, a hybrid force and velocity technique, etc. The touchpad 1260 can use the ADC to enable such input technique. In certain implementations, the sensitivity of the touchpad may be less than 5 Newtons. Additional structural examples of the touchpad 1260 are further described with reference to FIGS. 13A and 14E.

The touchpad 1260 can provide rich touch features for various user interface experiences. For example, the user can use the touchpad 1260 (alone or in conjunction with other components of the totem or the wearable system) to move or orient virtual objects. The touchpad 1260 can also be used as a virtual keyboard to input texts.

Examples of a Body of the Totem

The body 1214 of the totem 1200 may be in the shape of a torch (see e.g., FIG. 12A), in which the body comprises an elongated cylinder, which may angle outward towards the top of the totem so that it is more frustoconical in shape (which may make it easier or more comfortable to be held in the user's hand). The body 1214 may include indentations for the user's fingers, which may assist in gripping and holding the totem. FIG. 12B is a top view 1270 that illustrates another example of the totem 1200. In this embodiment, the body 1214 is ovoid in shape so that it may fit more in the palm of a user's hand or be more stable when put on a surface (e.g., a table). In some examples, the ornamental appearance of the body 1214 of the totem 1200 may be substantially the same as or similar to that of the totem controller, which is shown and described in U.S. Design patent application Ser. No. 29/575,031, filed Aug. 22, 2016, which as mentioned above is incorporated by reference herein in its entirety. Other shapes for the body 1214 are possible such as an elongated body having a cross-section that is oval, polygonal, etc. The cross-section of the body 1214 may be substantially symmetric so that the totem 1200 can be easily held in the user's left hand or the user's right hand.

The body 1214 can include an upper portion 1242 which can include the trigger 1212 and the touchpad 1260. The body 1214 can also include a bottom portion 1244. The bottom portion 1244 may include an interface such that the totem 1200 can be removably attached to the base 1220. For example, the bottom portion 1244 may be connected to the base 1220 via a connection interface 1222 (such as, e.g., a USB-C connection) when the totem 1200 is charging. As another example, the bottom portion 1244 may be connected to another computing device (such as a home computer) via the base 1220. When connected to a computer, the user can accordingly configure the light placement or movement patterns of the halo (on the touchpad 1260) via a programming interface (described below with reference to FIGS. 18A-18D) on the computing device.

The touchpad 1260 can be angled so that the touch surface 1264 and the light guide 1262 are easily viewable by the user, when the totem 1200 is held in the user's hand. The angle of the touchpad 1260 to the horizontal can be in a range from about 10-60 degrees. It follows that the body 1214 can take on a more frustoconical shape by virtue of such an angle. As described above, this shape may make the totem 1200 easier or more comfortable for the user to hold in their hand. In some embodiments, the angle of the touchpad 1260 to the horizontal can be in a range from about 15-30 degrees. The trigger 1212 can be disposed opposite to the touchpad 1260 so that it is easily depressible with the user's index finger, when the totem 1200 is held in the user's hand.

In some embodiments, the bottom portion 1244 can include an illuminated power indicator. The illuminated power indicator may include one or more RGB LEDs. The light placement or movement patterns of the LED power indicator may be used to provide information related to the remaining battery or the battery charging status for the LED totem.

The body 1214 can be configured to provide haptic feedback to a user. The body 1214 can include a haptic actuator 1760 (shown in FIGS. 17A, 17B) for providing the haptic feedback. The haptic actuator 1760 may be implemented with tough type LRA or ERM haptics. Details of the components associated with the body 1214 are described with reference to FIGS. 17A, 17B.

Examples of a Home Button

The totem 1200 can include a home button 1256. The home button 1256 can be located on the body 1214 of the totem 1200. When a user actuates the home button 1256, the wearable system may perform various user interface operations, such as, e.g., returning/opening the main menu of an application or the display, exiting a program, selecting an application, etc. In some embodiments, when the user actuates the home button 1256, the wearable system may enter into or wake up from a sleep mode, turn on or off the virtual content on the display, etc.

The wearable system may perform operations based on how the user actuates the home button 1256. For example, if the user actuates the home button 1256 for an extended duration of time, the display may be turned off. As another example, if the user presses the home button 1256 twice, the display may present the main page of the display while if the user press the home button once, the display may present the main menu of the game application with which the user is currently interacting. Other functionality can be implemented by the home button 1256, e.g., a quick tap on the button can bring up an application launcher user interface; within an application, a quick tap may bring up the application's menu or a long press may suspend the application and bring up the application launcher user interface.

The home button 1256 can include an RGB LED indicator which can be used to indicate the current status of the totem or the wearable display (such as whether it is turned on/off), the battery status of the totem, the wearable display, or other components of the wearable system.

In various embodiments, the totem 1200 includes both a home button 1256 and a trigger 1212 or includes only one of these user-input elements (or additional buttons such as the bumper 1266 described with reference to FIG. 17B). The totem 1200 can be configured or shaped differently than shown. For example, the home button 1256 may be implemented as part of the trigger (rather than as part of the body 1214). As yet another example, the touchpad 1260 or the home button 1256 can provide visual indication for the progress of charging the totem 1200. Many variations are possible, and the accompanying figures are intended to illustrate example embodiments but not to limit the scope of the disclosure.

Examples of a Base

As described with reference to the body 1214 of the totem, the body 1214 of the totem 1200 may be removably attached to the base 1220. An interface between the base and the totem can permit electrical charging, access to data in the totem or to provide software updates, etc. For example, the base 1220 can include a universal serial bus (USB) plug which can plug into a USB port on the bottom portion 1244 of the body 1214. The base 1220 can further be connected to a power outlet using a power cord for charging the totem. The base can also connect with other computing devices such as personal computers, televisions, projectors, etc., using wired or wireless communication channels.

Examples of Actuating a Totem

The totem 1200 can support various input techniques such as, e.g., touching, swiping, scrolling, rotary dialing, clicking, pressing, d-pad emulation, etc. In some embodiments, the totem 1200 can support inertial swipes. For example, when a user swipes along a trajectory on the touchpad 1260, a virtual object may continue moving along the trajectory even though the user's finger has stopped swiping. The totem 1200 can also support edge swipes, such as, e.g., swiping on the horizontal or vertical edge of the touchpad 1260 or the light guide 1264.

A user can actuate the totem 1200 using various hand gestures and body poses. For example, a user can swipe or touch the touchpad 1260 or the trigger 1212. In some embodiments (such as e.g., embodiments 1210 and 1250), the totem 1200 can support 6DOF user interactions. For example, the user can rotate the totem 1200 to rotate a game avatar. As further described with reference to FIGS. 17A, 17B, the totem 1200 can use an environmental sensor 1710 (such as an IMU) to detect the user's movement. In other embodiments (such as, e.g., the example the totem 1200 shown in FIG. 12B), the totem can support 3DOF (rather than 6DOF). In these embodiments, the totem can detect and translate the surge, heave, and sway movements of the users but not the pitch, yaw, and roll movements, or vice versa.

Although the examples are described with reference to handheld devices, similar techniques may also be applied to a user input device designed for seated and tabletop controls.

Example Structures of a Touchpad

Cross-Sectional Views of the Touchpad

Figure 13A:
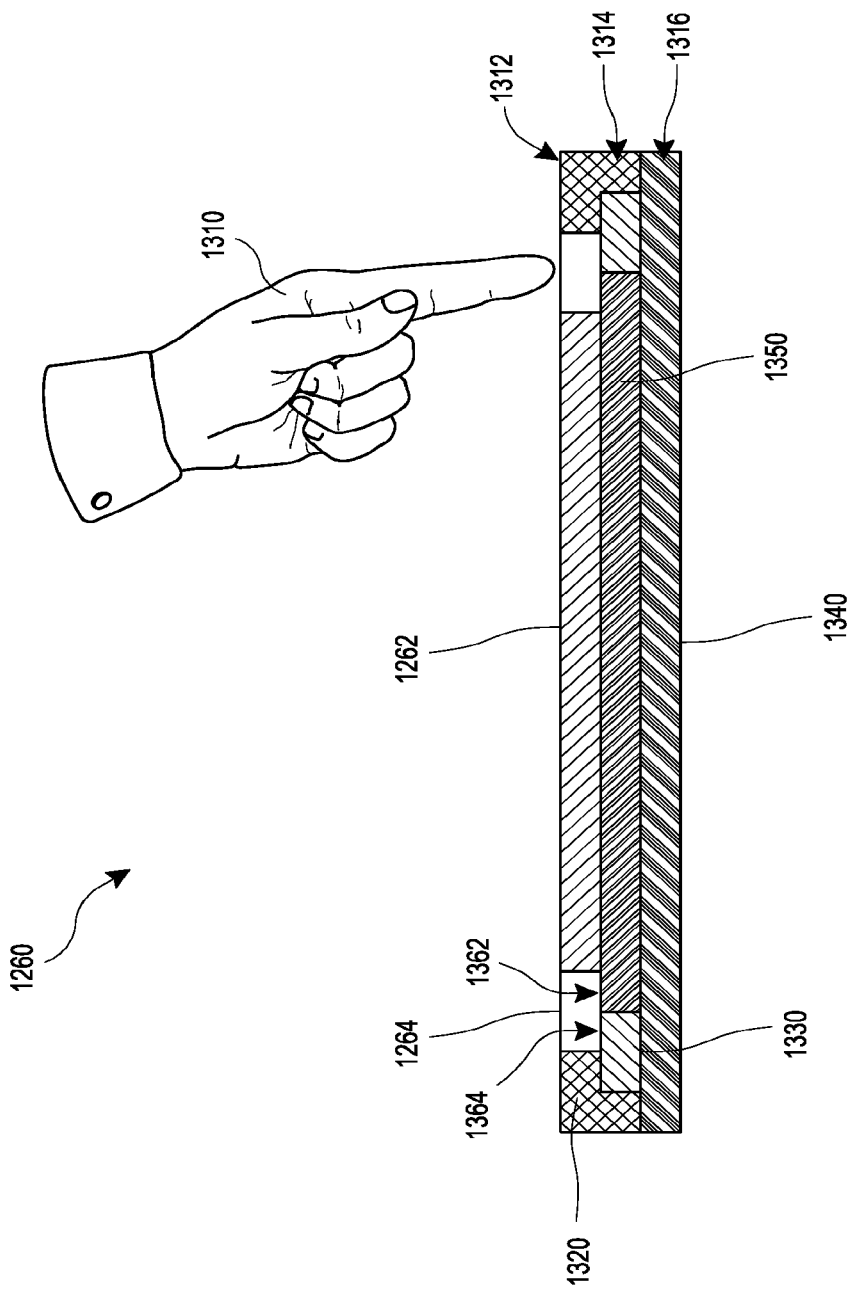
FIG. 13A illustrates a cross-sectional view of an example touchpad of a totem.

FIG. 13A illustrates a cross-sectional view of an example touchpad 1260 of a totem 1200. The example touchpad 1260 may be part of the totem 1200 described with reference to FIGS. 12A and 12B. The touchpad 1260 can include 3 layers: the top layer 1312, the middle layer 1314, and the bottom layer 1316.

The bottom layer 1316 can include a printed circuit board (PCB) 1340. The PCB 1340 can mechanically support and electronically connect to one or more components on the middle layer 1314 such as light sources 1330 (e.g., LEDs) and a touch sensor 1350. The PCB 1340 can also support the armature 1320. Additionally or alternatively, the PCB 1340 can electronically connect other components of the totem such as, e.g., haptic actuators (e.g., the actuators for the touchpad 1260, the trigger 1212, or the body 1214, etc.), microprocessors, etc.

The middle layer 1314 of the touchpad 1260 can include a touch sensor 1350. The touch sensor 1350 may be an example of the force-haptic component described with reference to FIG. 12A. The touch sensor 1350 can use various touch screen technologies (such as, e.g., resistive or capacitive sensor technologies) to determine a user's actuation of the touchpad 1260 or to provide haptic feedback. The touch sensor 1350 can be configured to enable multi-touch technologies where it can distinguish between different levels of forces being applied to the touch surface 1262 (and the light guide 1264). The touch sensor 1350 can provide sensitivity in three orthogonal directions (e.g., XYZ). Example touch screen technologies that may be employed by the touch sensor 1350 are described in FIG. 13B.

In FIG. 13A, the LEDs 1330 can be positioned in-between the touch sensor 1350 and the armature 1320. The middle layer 1314 can include 6 to 12 LEDs, though other numbers (e.g., 3, 15, 18, 20, etc.) of LEDs may also be possible. The LEDs can be positioned substantially uniformly around the circumference of the light guide (see, e.g., the top views in FIGS. 13E and 14A) or some LEDs may be positioned more closely to each other than in a uniform spacing. The LEDs 1330 may comprise a single color LED (such as, e.g., a blue-violet LED), a bi-color LED, an RGB LED (or other multiple-color LEDs), a white LED, an organic LED (OLED), a quantum dot LED, an infrared LED, an ultraviolet LED, etc., alone or in combination. The LEDs 1330 may be controlled by a microprocessor (e.g., on the PCB board 1340). For example, by independently adjusting each color (red, green, and blue) of an RGB LED using the microprocessor, a wide range of colors (e.g., a large color gamut) may be generated by the RGB LED. The light patterns generated by the LEDs can be associated with user interactions with the totem or the wearable system, as well as be associated with the objects in the user's environment. In some examples, the light patterns can also be referred to as the light placement or movement patterns of the halo.

The armature 1320 may span the top layer 1312 and the middle layer 1314. The armature 1320 can hold the middle layer 1314 and the top layer 1312 together. A portion of the armature may touch the top portion of the LEDs 1330.

The top layer can include the light guide 1264 and the touch surface 1262, in addition to a portion of the armature 1320. The touch surface 1262 may be surrounded by the light guide 1264 and may sit on top of the touch sensor 1350. The user can actuate the touch surface 1262 using hand gestures. The touch surface 1262 can also provide haptic feedback to the user. A portion of the light guide 1264 may be overlaid on top of the touch sensor 1350 and the user can accordingly actuate the light guide 1264. In some embodiments, the light guide may not be touchable (e.g., because the touch sensor 1350 is not underneath the light guide 1264). However, the light guide may still provide visual or haptic feedback.

The light guide 1264 may be in-between the armature 1320 and the touch surface 1262 on the top layer 1312. The light guide 1264 may include a first portion 1362 and a second portion 1364. The first portion 1362 of the light guide 1264 can be overlaid on top of the LEDs 1330. The light guide 1264 can diffuse the light generated by the LEDs 1330 so as to spread the light out over an extent of the light guide 1264 that is larger than the individual LED packages, which may provide a more pleasing visual appearance. The light patterns can provide visual feedback associated with the user's interactions with the wearable system or the touchpad 1260. The light patterns can also provide information associated with objects in the user's environment (such as the relative positions between a user and an object).

The second portion 1364 of the light guide 1264 may be positioned over the touch sensor 1350. For example, the light guide 1264 may be positioned with a 0.75 mm to 2 mm inset over the touch sensor 1350. Because a portion of the touch sensor 1350 can extend under the light guide 1264, the light guide 1264 can not only provide visual and haptics feedback but also can be actuated by the user. As shown by the finger 1310, the user can actuate the light guide 1264, for example, by touching, tapping, swiping, or pressing the light guide 1264. Accordingly, when the user actuates the light guide 1264, the totem can simulate user interface experiences such as, e.g., tapping on selectively illuminated "buttons" or "arcs" of light on the light guide.

The light guide 1264 does not have to be positioned over the touch sensor 1350. As a result, the user may not be able to actuate the light guide 1264 to interact with the totem or the wearable device. In some implementations, although the second portion of the 1364 is positioned over the touch sensor 1350, the processor 1770 or the local processing & data module 260 may be configured not to recognize the user's input on the light guide 1264. As a result, the light guide 1264 may be used to provide visual or haptic feedback but may not be responsive when a user actuates the light guide 1264.

Figure 13B:
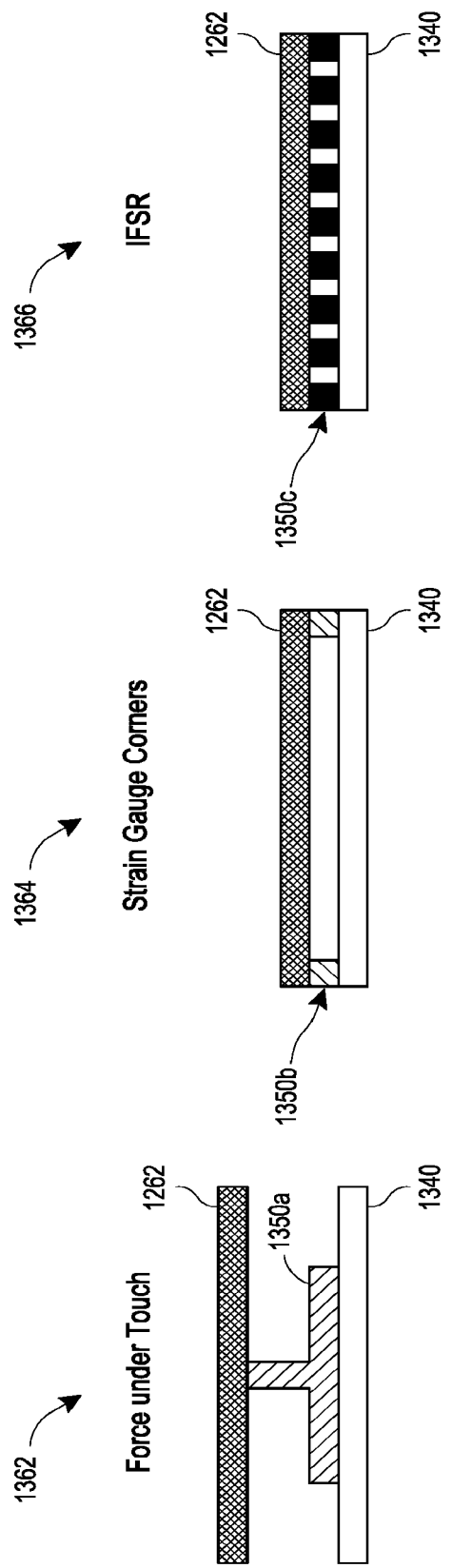
FIG. 13B illustrates examples of touch screen technologies.

FIG. 13B illustrates examples of touch screen technologies. In these examples, the touch sensor 1350 (e.g., 1350a, 1350b, and 1350) is sandwiched in-between the touch surface 1262 and the PCB 1340. The embodiment 1362 of the touch screen technology illustrates an example of the force under touch technology. In this example, the touch sensor 1350a can comprise a pressure sensitive sensor which can detect multiple levels of force exerted on the touch surface 1262. In certain embodiments, the touch sensor 1350 can also be configured to relay haptic feedback to the touch surface 1262.

In the example 1364, the touch sensor 1350b may comprise strain gauges. The strain gauges may be located underneath the edge of the touch surface 1262. When a user actuates the touch surface 1262, the touch sensor 1350b can determine the user's gesture (e.g., a press or a tap gesture) by measuring the strains of the touch surface 1262.

The example 1366 illustrates an interpolating force-sensitive resistance touch sensor technology (IFSR). The touch sensor 1350c can use force sensitive resistors whose level of sensitivity can change depending on the level of pressure. Accordingly, the touch sensor 1350c may detect multiple levels of force exerted on the touch surface 1262.

Figure 13C:
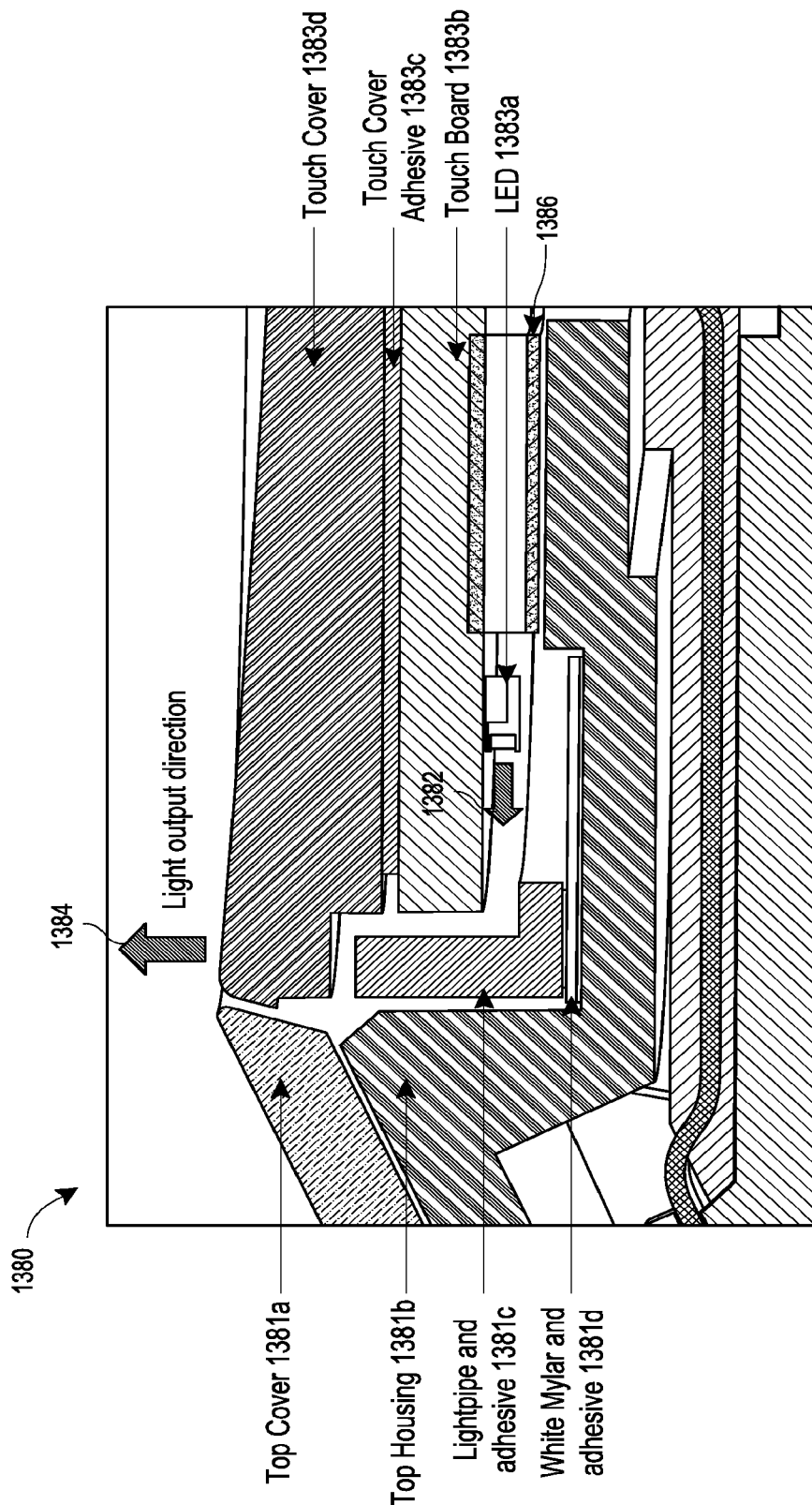
FIGS. 13C and 13D illustrate additional cross-sectional views of the example touchpad of a totem.
Figure 13D:
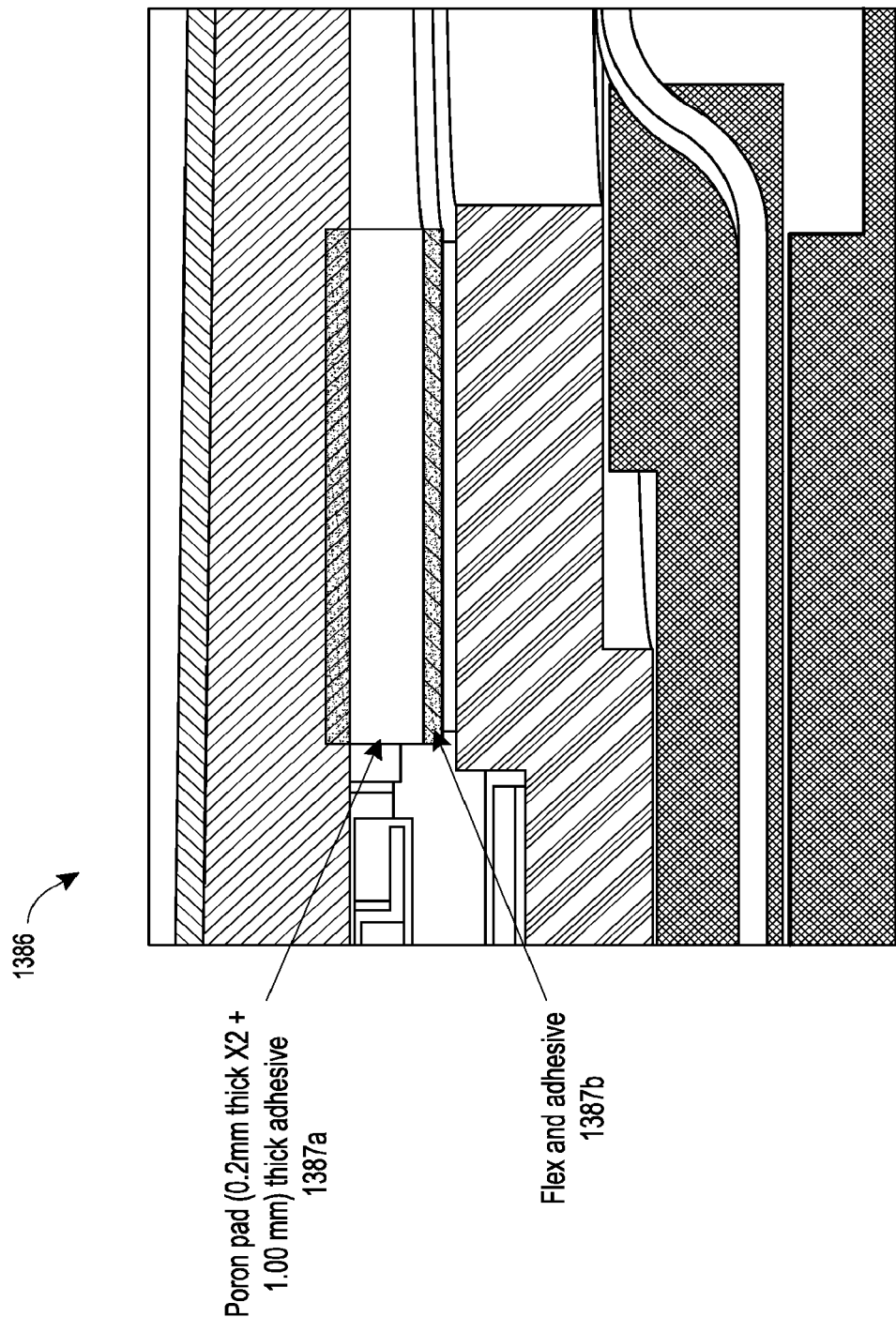

FIGS. 13C and 13D illustrate additional cross-sectional views of an example touchpad of a totem. The cross-sectional view 1380 shows a top cover 1381a and a top housing 1381b underneath the top cover 1381a. Either the top cover 1381a or the top housing 1381b, or the combination may be part of the armature 1320 shown in FIG. 13A. The top housing may be attached to a light guide 1264 (e.g., light pipe 1381c) with the adhesive. The light pipe can be transparent or translucent. In various embodiments, the light pipe 1381c can comprise diffuser sheets, diffuser films, an etched waveguide, a transmissive optical element comprising layers of particles, irregular surfaces, holographs, white surfaces, ground glass, polytetrafluoroethylene (PTFE or Teflon), opal glass, greyed glass, colored gel, and so forth. Embodiments of a light pipe comprising optically diffusive material advantageously may diffuse and spread out the light from the LEDs 1383a so that the light output in the direction 1384 appears to have an overall, substantially continuous glow (when all LEDs are illuminated) rather than appearing as discrete, individual LEDs (if the light pipe were substantially transparent).

The top housing 1381b can also be attached to a white Mylar 1381c (or other reflective sheeting) using the adhesive. The top housing can enclose one or more LEDs 1383a. For example, the top housing may include an RGB LED which includes a package of a red LED, a green LED, and a blue LED. Therefore, if the touchpad includes 12 RGB LEDs, the touchpad may include 12 top housing structures each includes an RGB LED. As another example, the top housing may include all 12 RGB LEDs for the touchpad.

The top cover is adjacent to the touch cover 1383d. The touch cover may be an embodiment of the touch surface 1262 shown in FIG. 13A. The touch cover may be attached to the touch board 1383 using touch cover adhesive 1383c. The touch board include an embodiment of the force-haptic component described with reference to FIG. 12A. As further described with reference to FIG. 13D, an adhesive stack 1386 may be sandwiched in-between a portion of the touch board and a portion of the top housing. The adhesive stack 1386 may be used to fixatedly attach the portion of the touch board with the top portion of the top housing.

The adhesive stack 1386 may include two layers: a shock-absorbing foam pad (e.g., Poron, available from the Rogers Corp. Rogers, CT), and a flex and adhesive layer. The top portion of the poron pad 1387a may be attached to the bottom portion of the touch board and the bottom portion of the poron pad may be attached to the flex and adhesive layer 1387b. The flex and adhesive layer may be attached to the top housing. The poron pad may be composed of two 0.2 mm thick and one 1.00 mm thick adhesives. The one 1.00 mm adhesive may be positioned in-between the two 0.2 mm thick adhesives. Alternatively, one of the two 0.2 mm thick adhesives may be in-between the 1.00 mm thick adhesive and the other 0.2 mm thick adhesive.

With reference back to FIG. 13C, one or more LEDs 1383a may be attached to the touch board. The LED can emit light in the direction 1382. The light may reach the light pipe, which can transmit the light in the light output direction 1384 through total internal reflection (TIR). The bottom portion of the light pipe can also be attached to a portion of the white Mylar. The white Mylar (or other reflective sheeting) may reflect a portion of the light emitted by the LED to increase the amount of light output in the light output direction 1384. The light pipe may diffuse light from the LED so that the light output appears as more of a angularly continuous output rather than individual, discrete light sources.

Bottom Views of the Touchpad

Figure 13E:
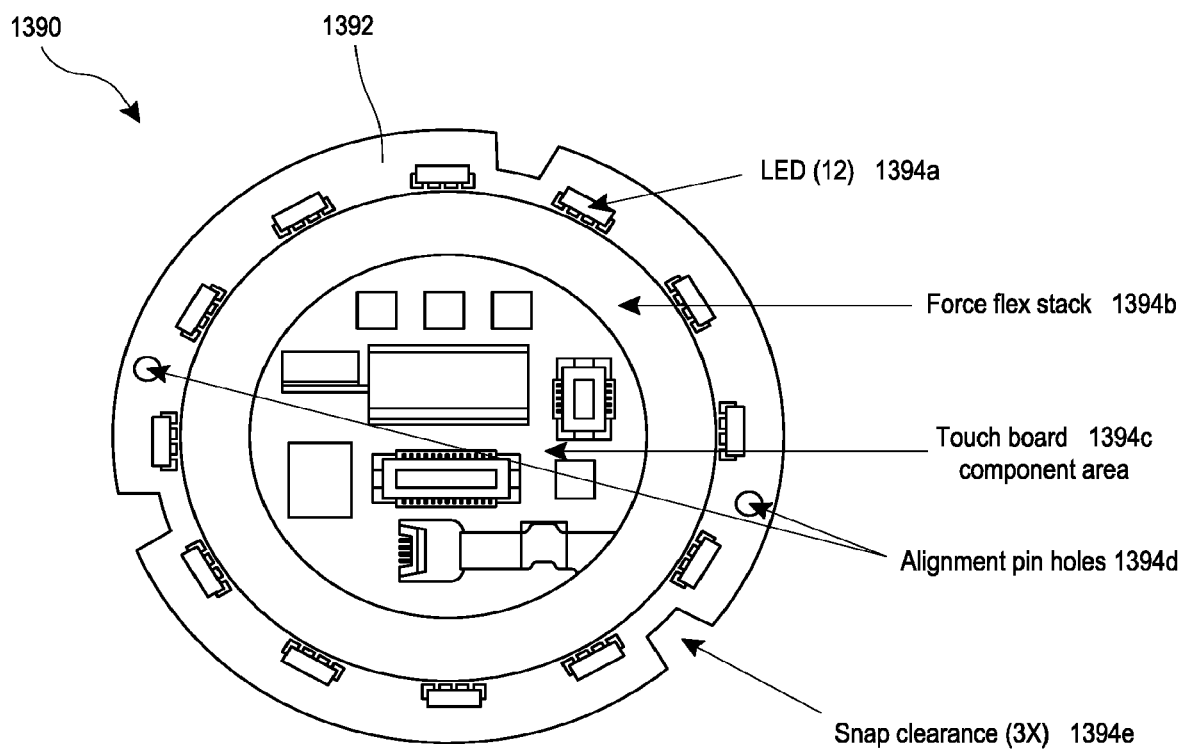
FIG. 13E illustrates a bottom view of the example touchpad.

FIG. 13E illustrates a bottom view of an example touchpad. The touchpad 1390 may be an embodiment of the touchpad 1260. The touchpad 1390 can include 12 LEDs 1394a, though other numbers of LEDs are also possible. The 12 LEDs 1394a are equally spaced circumferentially in this example, although in other examples (such as the examples described with reference to FIGS. 14B and 15), the spacing among the LEDs may not necessarily be equal. The 12 LEDs may be located on the bottom of the touchpad. The touchpad can selectively illuminate the LEDs to create a light pattern which may appear as a halo around the touch pad.

The LEDs can be attached to the housing 1392. The housing can have two alignment pin holes and three snap clearances 1394e. The two alignment pin holes may be on the opposite end of the diameter of the touchpad. The three snap clearances may be spaced equally. The alignment pin holes 1394d and the snap clearances 1394e may be used to orient and position the touchpad in relation to the totem body. The snap clearances 1394e may also be used to fix the touchpad 1390 to the totem body.

The touchpad 1390 can employ a touch screen technology such as, e.g., a force flex stack 1394b. A portion of the force flex stack 1394b may be overlaid on top of the touch board component area 1394c. The force flex stack 1394b may include the touch surface 1262, alone or in combination with the touch sensor 1350. The force flex stack can detect user input on the touchpad 1390, such as, e.g., pressing, swiping, tapping, touching, etc.

In certain embodiments, the touch board component area may include the PCB 1340. The touch board component area can include a force-haptic component (such as, e.g., a haptic actuator), a microprocessor, one or more communication units (such as, e.g., an ADC), etc.

Top View of the Touchpad

Figure 14A:
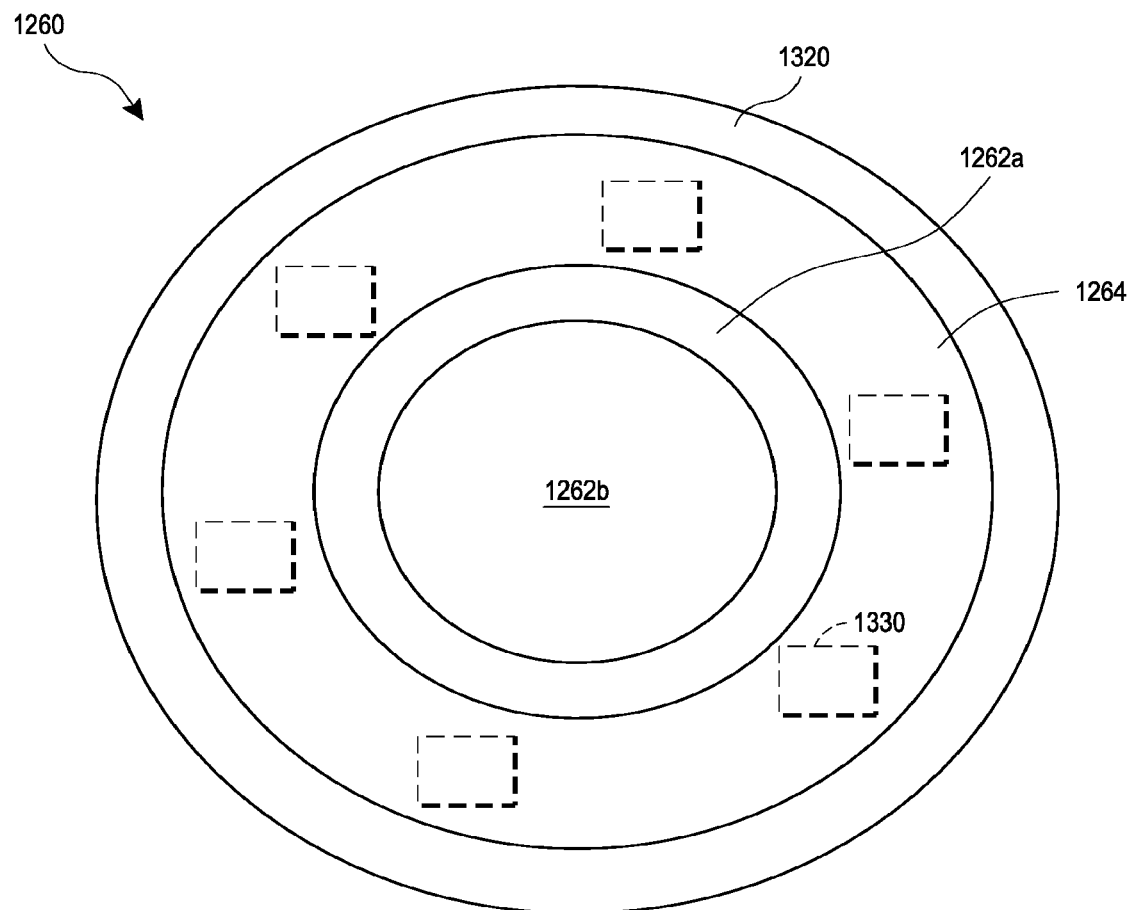
FIG. 14A illustrates a top view of an example touchpad of a totem.

FIG. 14A illustrates a top view of an example touchpad of a totem. The touchpad 1260 in FIG. 14A can include the armature 1320, the light guide 1264, and the touch surface 1262 (which may further be broken down into interactable regions 1262a and 1262b). The light guide 1264 may be positioned on top of the light sources (e.g., LEDs) 1330 (shown in dashed lines in FIG. 14A).

Advantageously, in this embodiment, the touchpad 1260 can be divided into three interactable regions: the light guide 1264, the first portion of the touch surface 1262a, and the second portion of the touch surface 1262b. As described with reference to FIGS. 12 and 13A, each interactable region may be mapped to a type of user interaction. For example, the user can touch the light guide 1264 to move forward/backward on a browser while swipe on second portion the touch surface 1262b to move the web content upward/downward. The user can also swipe in a circular motion on the first portion of the touch surface 1262a to move a virtual object closer (or farther) away from the user.

Although this example includes three interactable regions, the totem may include more or less interactable regions in other embodiments. For example, rather than dividing the touch surface into two interactable regions (corresponding to the first portion 1262a and the second portion 1262b), the touch surface may be divided into 4 interactable regions with each region occupies a quadrant of the touch surface. The touch surface may also include only one intractable region. Additionally or alternatively, the light guide 1264 may not be interactable, because for example the processor 1770 or another module of the wearable system may not be programmed to recognize the user input from the light guide 1264 or the touch sensor 1350 does not extend underneath the light guide 1264.

The type of interactions mapped to a touch region may also be customized based on the type of user interactions. For example, when a user is watching a television, the touchpad may simulate a 4 way d-pad (up, down, left, right) on the light guide 1264. But if the user is browsing a webpage, the light guide 1264 may support backward/forward user interface operations.

The interactable regions can also provide visual or haptic feedback to the user. For example, the touch surface 1262 can be configured to provide haptic feedback while the light guide 1264 can provide both haptic feedback and visual feedback (e.g., via the light placement or movement patterns of the LED halo).

Layout of Light Sources

Figure 14B:
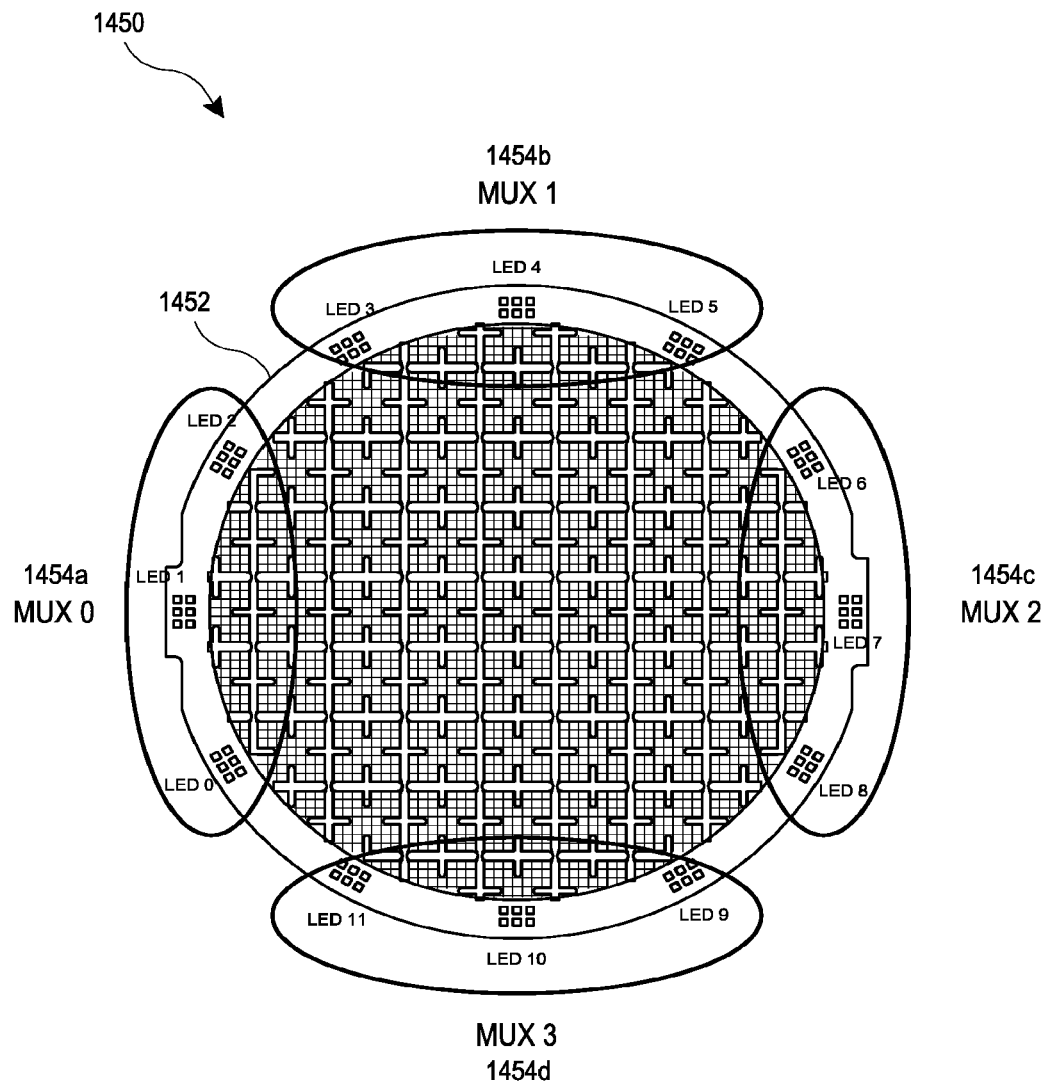
FIG. 14B illustrates an overview of an example layout of LEDs associated with the touchpad.

FIG. 14B illustrates an overview of an example layout of light sources (e.g., LEDs) associated with the touchpad. FIG. 14B shows a touchpad 1450 which has a visible circular surface 1452 with 12 LEDs (illustrated as LED 0, LED 2 . . . LED 11) on the perimeter. These 12 LEDs can be used to represent specific information when they are lit in a specific sequence. For example, each LED may be assigned to a bit thus resulting in a 12 bit word. As described with reference to FIGS. 24B, 20A, and 20B, the outward-facing imaging system 464 of a wearable device can capture the display sequence of the LEDs. The wearable device can then analyze the images and to extract information from the display sequence. The extracted information may be used, for example, to pair the totem with the wearable device, calibrate the totem, etc. For example, when LEDs 0, 3, 6, 9 are illuminated, the wearable device may recognize that a pairing between the wearable device and the totem is initiated. Accordingly, the wearable device may search for wireless (e.g., Bluetooth) devices in its environment to determine whether there are any new devices (such as the totem associated with the LEDs). When the LEDs are multi-colored LEDs (such as e.g., RGB LEDs), the amount of information represented the LED light patterns may increase (for example, to be more than the 12 bit word). For example, the blue light at the LEDs 6, 7, 8 may indicate that the totem is in a pairing mode while the yellow light at the LEDs 6, 7, 8 may indicate that the totem is in a charging mode.

In some embodiments, the LEDs may be divided (e.g., multiplexed) into multiple groups that are separately illuminated. Each group may be used to represent specific information. FIG. 14B shows four example groups (illustrated as MUX 0 (1454a), MUX 1 (1454b), MUX 2 (1454c), and MUX 3 (1454d)), with each group including three LEDs. For example, when the LEDs of MUX 1 are illuminated (e.g., the LEDs 3, 4, 5), the wearable device may recognize that the totem is currently indicating the totem's upward movement, whereas when the LEDs of MUX0 are illuminated, the wearable device may recognize that the totem is rotated to the left, and so forth.

In other embodiments, a different number or layout of light sources or multiplexed groups can be utilized and a different amount of information (e.g., a word length different from 12 bits) may be represented by illuminated groups or sequences of LEDs.

As previously described with reference to FIG. 12A, the light source can emit light in the non-visible spectrum (e.g., infrared or ultraviolet light). Such light can be captured by a wearable device and the light pattern in the non-visible spectrum can also be used to convey the information from the totem to the wearable device. The information may include the totem's device information (e.g., for pairing the totem with the wearable device), or other types of information, such as, e.g., the totem's status (e.g., whether it is low in battery, whether the connection is established, devices that are currently paired with the totem, etc.).

Figure 15:
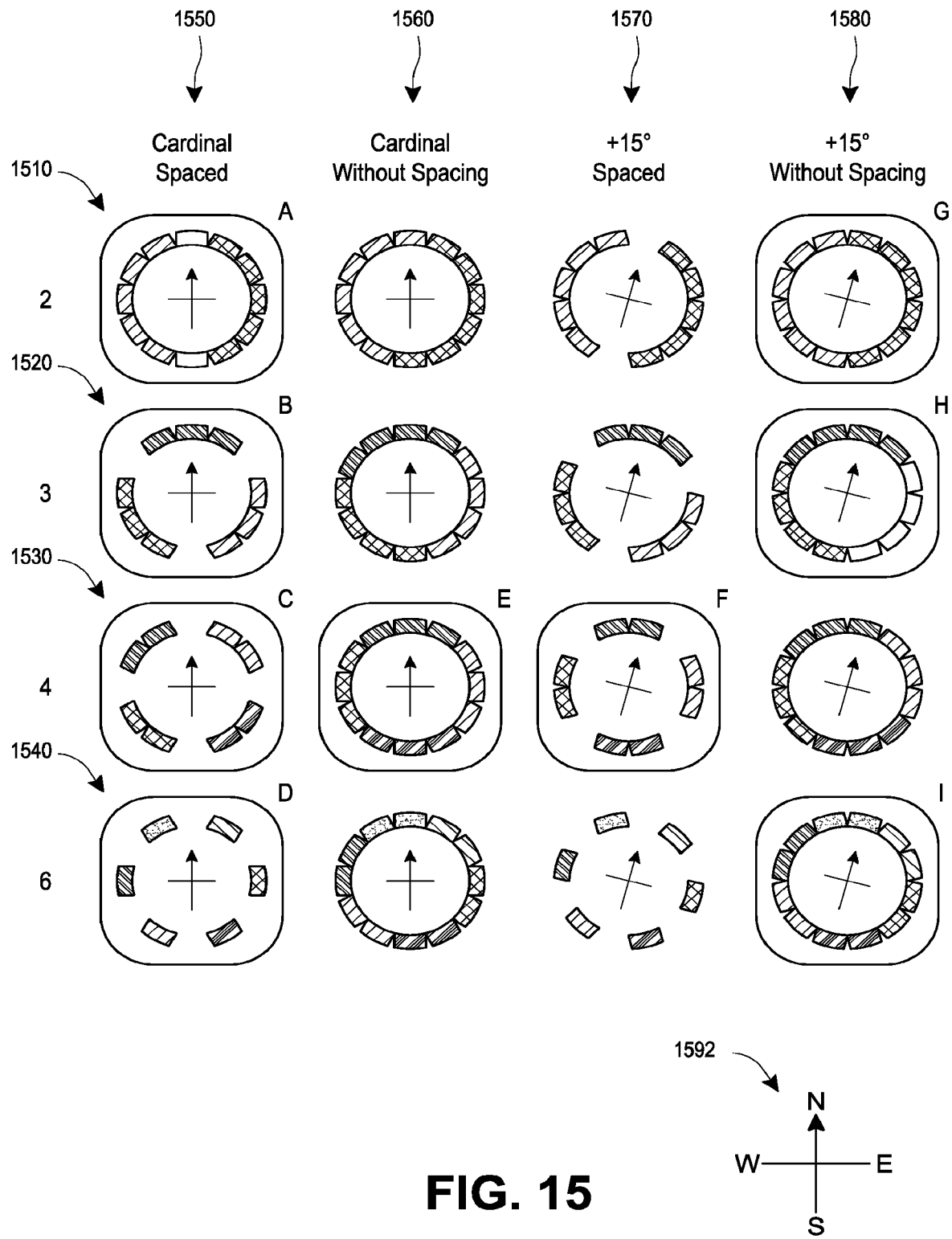
FIG. 15 illustrates example LED layouts or patterns of light from an LED layout.

FIG. 15 illustrates example LED layouts or patterns of light from an LED layout. In this example, the LEDs are placed cardinally, e.g., with reference to a North-East-South-West (NESW) coordinate system 1592, in which North may point away from the user, South toward the user, East toward the user's right, and West toward the user's left, when the totem is held in the user's hand. The coordinate system 1592 may be rotated by a certain degree. For example, the layouts in the column 1550 are cardinally placed with reference to a neutral position, where the coordinate system 1592 is not rotated. In contrast, the layouts in columns 1570 and 1580 are rotated 15 degrees clockwise from the cardinal position shown in the NESW coordinate system 1592.

The LED layouts may be user adjustable. For example, the touchpad (or the light guide) on the totem may be mechanically rotatable. As an example, the LED layout of a totem may initially include a 15 degree rotation clockwise for a right-handed user. However, when a left-handed user uses the same totem, the left-handed user can rotate the touchpad 30 degrees counter-clockwise to allow better interactions the touchpad using his or her thumb. The example layouts in the columns 1560 and 1580 can be composed of 12 LEDs. These LEDs can be placed adjacent to each other. For example, the 12 LEDs can be placed next to each other without spacing to form a circular layout as illustrated in pattern I.

In some embodiments, two neighboring LEDs may be placed with a space in-between (as illustrated by patterns in the columns 1550 and 1570). The space may roughly be the size of one LED. For example, the pattern D shown in column 1550 and row 1540 may include 6 LEDs where they are placed roughly in the same distance part from each other. However, in some situations, to produce the pattern in the columns 1550 and 1570, the totem may selectively turn off or does not include one or more LEDs. For example, the pattern D may include 12 LEDs (rather than 6 LEDs) and 6 out of the 12 LEDs may not be illuminated in pattern D. In contrast, if the user changes the user interface operations, more or fewer than the 6 LEDs as shown in pattern D may be illuminated. Advantageously, in some embodiments, the totem can save on battery consumption because fewer LEDs are used (with spacing between them) or because the LEDs can be selectively turned off to achieve a desired illumination pattern (such as those shown in FIG. 15). In addition, by spacing the illuminated LEDs apart from each other (either physically or by not illuminating some intermediate LEDs), the user may not need to move his or her thumb to a precise location in order to perform a certain user interface operation, which can reduce user fatigue in some situations.

The LEDs may be divided into multiple groups (see, also, the example multiplexed groups described with reference to FIG. 14B). Rows 1510, 1520, 1530, and 1540 of FIG. 15 illustrate examples ways of grouping the LEDs. For example, layouts A and G in row 1510 include 2 groups of LEDs with each group being represented by a different color. Layouts B and H in row 1520 include 3 groups; layouts C, D, and F in row 1530 include 4 groups, and layouts D and I include 6 groups. Each group of LEDs may have similar characteristics, such as, e.g., similar light patterns, similar reactions to user interactions (e.g., all light up at the same time), etc. Additionally or alternatively, as described with reference to FIG. 14B, each group of LEDs may be used to represent specific information. For example, a wearable device may determine that the user can entered into a video recording mode when its outward-facing imaging system captures that one or more LEDs associated with the top arc in pattern B lights up.

Advantageously the LED layouts may be aligned to the grip direction of the totem. Layouts A-I (highlighted in black) are such examples. In these layouts, when the user grabs the totem, the user can naturally reach the groups of the LEDs without significant adjustments of his or her hand.

In certain implementations, only a portion of the LEDs is user-interactable. An LED may be interactable if a user can actuate the LED (or the light guide associated with the LED). For example, pattern E includes 4 LED groups: the top arc, the bottom arc, the left arc, and the right arc, with each group having 3 LEDs. The user may be able to actuate the top and bottom arcs (e.g., by depressing the light guide above these arcs), but not the left and right arcs. However, the left and right arcs can still provide visual or haptic feedback alone or in combination with the top and bottom arcs. Similar considerations apply to the other layouts shown in FIG. 15.

In addition to or in alternative physical positions of the LEDs, the patterns in FIG. 15 can be light patterns illuminated by the LEDs. For example, the totem can present the pattern E by illuminating a ring of 12 LEDs while present the pattern D by illuminating every other LEDs in the ring of 12 LEDs. As another example, rather than user rotating the touchpad or the light guide, the totem can be programmed to adjust the placement of the halo based on whether the user is left-handed or right-handed. The totem may display an arc at the 1 o'clock position for a left-handed user but display the same arc the 11 o'clock position for a right-handed user. The arc may be associated with a user interface operation, such as, e.g., moving a webpage upward.

Although many embodiments of the user input device are described in terms of the totem 1200, this is for illustration and is not a limitation on the types of user input device usable with the wearable system 200. For example, in other embodiments, a display screen (or variant thereof) may be used to display the illumination shapes and patterns to a user. For instance, in some of these embodiments, a smart phone may be leveraged as a totem and may display various shapes and patterns on its screen. In some examples, the totem 1200 can include a display screen, which may be touch sensitive (similar to the surface of a smart phone). In some such embodiments comprising a display screen, the use of an illuminated light guide 1264 may be optional, since the display screen can be used to display the illumination patterns and transition sequences described herein.

Examples of Placement and Movement of Light Patterns

Figure 16A:
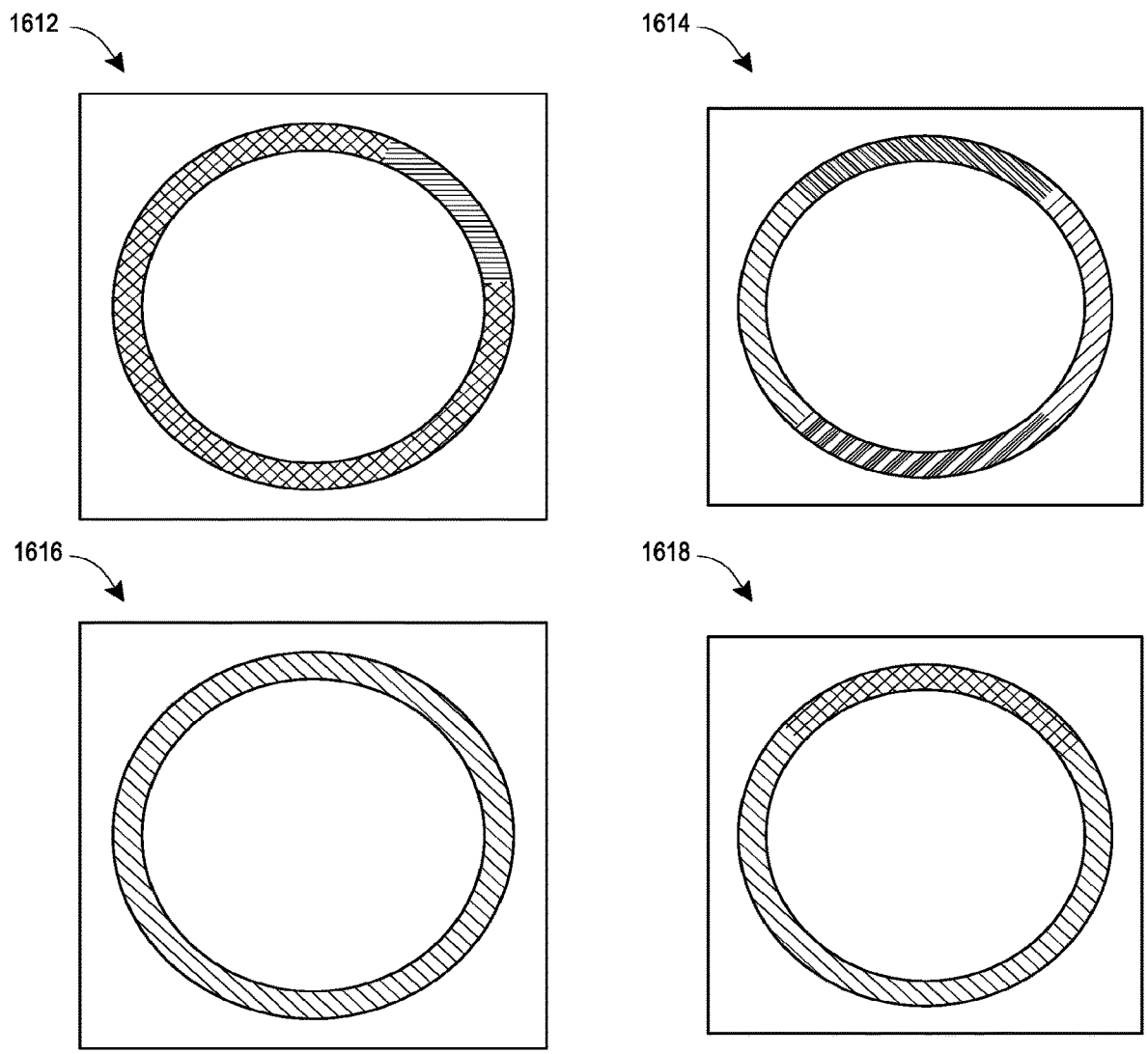
FIGS. 16A and 16B illustrate example placement or movement patterns of light emissions of a totem.
Figure 16B:
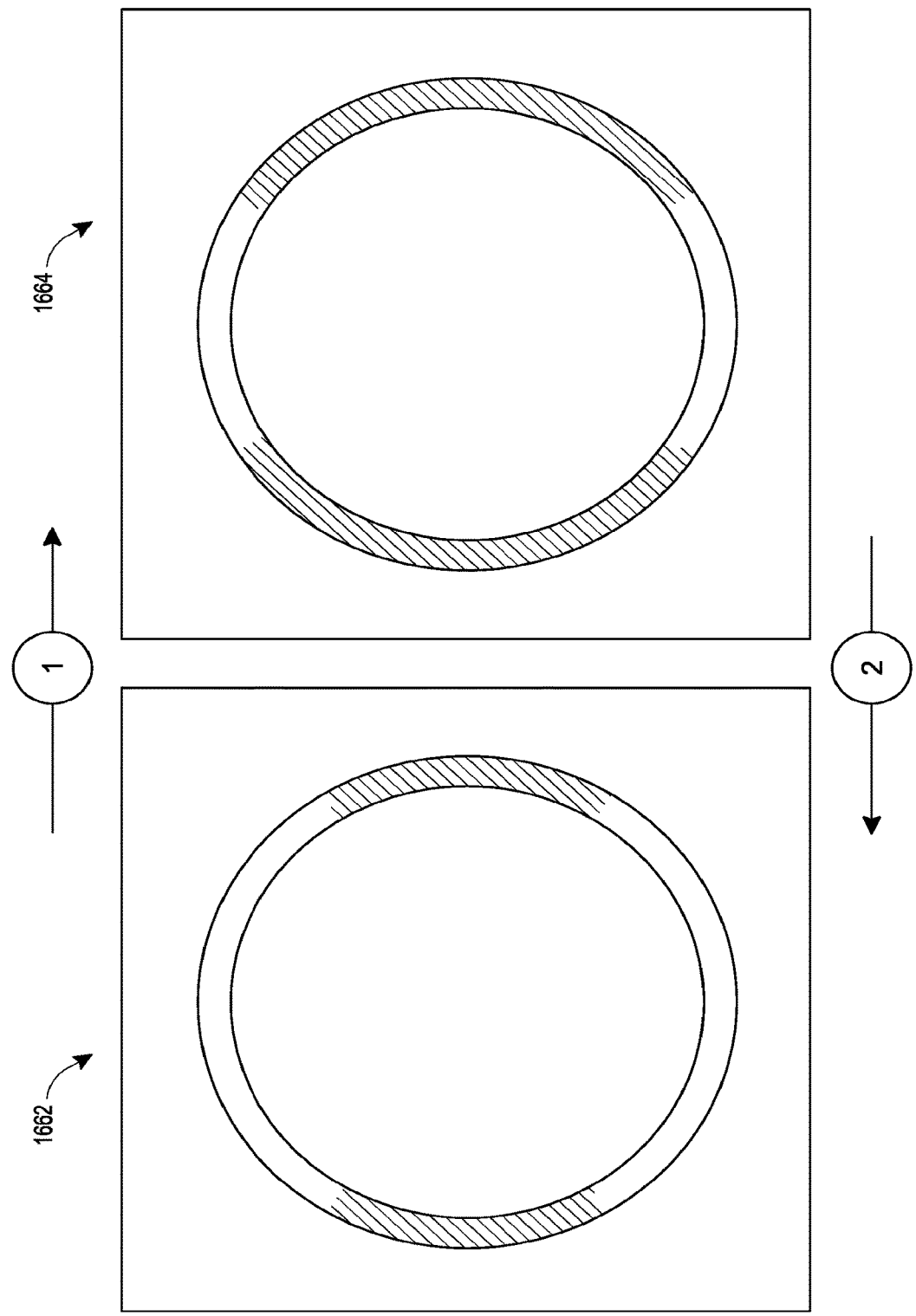

FIGS. 16A and 16B illustrate example placement or movement patterns of light emissions from a halo of a totem (or other type of light-emitting user input device). As described above, the halo may comprise an illuminated portion of the totem surrounding the touch pad region. As illustrated in the embodiments shown in FIGS. 16A and 16B, the light guide substantially diffuses the light emitted by individual light sources so that the halo appears as a ring or an arc-like portion of a ring rather than individual, discrete light sources.

The placement and movement of light patterns that can be projected by the halo can comprise one or more characteristics such as, e.g., shape, color, brightness, position, size, movement, animation, other visual effects (e.g., blink or flash, fade in, fade out), etc. For example, FIG. 16A illustrates four example patterns. In the pattern 1612, the halo is shown as a light blue color with a bright pink color at the 2 o'clock position. The halo in pattern 1614 has 4 colored arcs: yellow, green, blue, and red, which correspond to the top, bottom, left, and right positions (respectively) of the touchpad. The pattern 1616 shows a dark blue halo and the pattern 1618 shows a dark blue halo with a light blue arc on the top.

The light placement or movement patterns of the halo can provide visual feedback to the user and persons in the user's environment. The light placement or movement patterns may be determined based on contextual information, such as, e.g., a user's environment, a user's characteristics, information associated with an object, a process, a component of the wearable system, a user's interaction with the wearable system, etc.

As an example of generating a halo based on the user's environment, an environmental sensor 1710 (described below with reference to FIGS. 17A, 17B) in the totem 1200 can be a light sensor which can detect whether the user is in a light or dark environment. If the user is in a dark environment, the totem 1200 can display a halo with a brighter color (such as a white color) to help user to perceive the halo. On the other hand, if the user is in a bright environment, the totem 1200 may display a darker color to help the user to distinguish the halo from ambient light in the user's environment. As another example, in a dark room the intensity of the light in the halo may be decreased (e.g., a "night mode"), because it is easy to perceive the illuminated halo in a dark environment. Conversely, in a bright environment (e.g., outside in sunlight), the intensity of light in the halo may be increased, so that the halo patterns are visible in the bright environment.

The patterns in the halo can also be based on the user's characteristics, such as, e.g., the user's physiological data, demographic information (e.g., age, location, occupation, preferences, etc.), and so forth. For example, when the user is playing a racing game, the totem can display a halo corresponding to the user's direction of driving. The color of the halo may be red initially. However, when the wearable system (such as, e.g., the environmental sensor on the totem or the HMD) detects that the user's heart rate or respiratory rate exceeds a threshold condition, the wearable system may determine that the user is in an emotionally intense state. Accordingly, to soothe the user's emotional state, the wearable system may change the color of the halo from red to a blue (such as the pattern 1618, where the light blue arch illustrates the direction of driving).

Information associated with an object can include, for example, a notification or an alert associated with the object, characteristics of the object (such as, e.g., a function, a type, a location, a shape, an orientation, etc.), and so forth. As an example, the object may be a virtual email application that is displayed to the user by the HMD. A new email received by the virtual email application may be indicated to the user by a halo having an iridescent light pattern on the totem. As another example, the halo may be an indication of whether an object is perceivable in the user's environment. For example, in a treasure hunt game, the halo may correspond to a location of the treasure. If the treasure is located in the front right position of the user, the totem may display a halo at the 1 o'clock position of the light guide (see e.g., pattern 1612). As yet another example, if an object is not interactable by the user, the wearable system may be configured not to display the halo.

As described with reference to FIGS. 20A-21E, the halo can also be used to guide a process or to indicate the status of a process. For example, the wearable system can apply a computer vision algorithm to analyze the placement of the halo for pairing the totem with another device. The wearable system can also analyze appearance of the light patterns using the computer vision algorithm to calibrate the totem in a user's environment. When the pairing or the calibration status is complete, the totem may display the pattern 1616 to indicate to the user that the process has been completed.

The halo can further be used to indicate information associated with a component of the wearable system. For example, the totem may be used to locate a battery pack that is used to provide power to the wearable device. In this example, the battery pack may include an electro-magnetic emitter while the totem may include an electro-magnetic sensor. The electro-magnetic sensor can detect the magnetic field generated by the electro-magnetic emitter and calculate the relative positions between the totem and the battery pack accordingly. The halo as displayed by the totem can correspond to the relative positions between the totem and the battery pack (to help the user to find the battery pack). For example, a halo with a large arc at the 3 o'clock position may indicate that the battery pack is near the user and to the user's right. However, a halo with a small arc at the 3' clock position may indicate that the battery pack is far away from the user but it is still to the user's right. As another example, when the power of the wearable device is low, the totem may display a halo with a small arc indicating that the battery is about to die. Although described in terms of a battery pack, any component of the wearable system or otherwise (e.g., a user's car keys) can include an electromagnetic emitter that can be tracked by the totem, which can illuminate the halo to assist the user in finding the component.

The halo can also provide an indication of a user's interaction with the wearable system. Advantageously, this indication may inform a person in the user's environment of the user's current interactions. For example, when a user is recording a video, the halo may be flickering in red. Accordingly, a person next to the user will be able to see this flickering red light pattern and know that he or she should not interrupt the user's video recording experience. As another example, when a user wins a level in a game, the halo might light up with the same colors as the level of the game to show to the user's friends that the user has passed the level.

In addition to or in alternative to visual feedback, the halo can guide user interactions. For example, the halo may show 4 arcs (top, bottom, left, and right) with different colors (as illustrated by the effect 1614) to indicate that the user can use the touchpad of the totem as a d-pad. As another example, while a user is watching a television program using the display 220, the totem may present the halo pattern 1662 in FIG. 16B. In the pattern 1662 includes a red arc and a blue arc. The arc length for the red arc and the blue arc may be approximately 0.25n. However, when the user actuates the totem (such as by tapping the touch surface of the totem), the totem may present a fade-in effect (as illustrated by process 1 in FIG. 16B) of the arcs. As a result of the fade-in effect, the length of the red arc and the blue arc may be increased from approximately 0.25n to 0.75n as shown in the pattern 1664. The brightness of the red and blue arcs may also increase due to the fade-in effect. This increased brightness and arc lengths may provide user with a clearer indication that the user can swipe leftward or rightward on the touch surface. But when the totem detects that the user has not interacted with the totem for a threshold duration of time. The totem may present the fade-out effect as illustrated by process 2 in FIG. 16B. Accordingly, the halo is changed from the pattern 1664 to 1662. As a result, the size of the arcs and the brightness of the arcs will decrease. Advantageously, by reducing the size of the arcs and the brightness of the arcs, the totem may reduce the battery consumption when the user is not interacting with the totem.

In some embodiments, the totem 1200 can present the halo in conjunction with haptic, audio, visual, or other effects to provide information associated with contextual information or to guide a user's interaction.

Other Components of the Totem

Figure 17A:
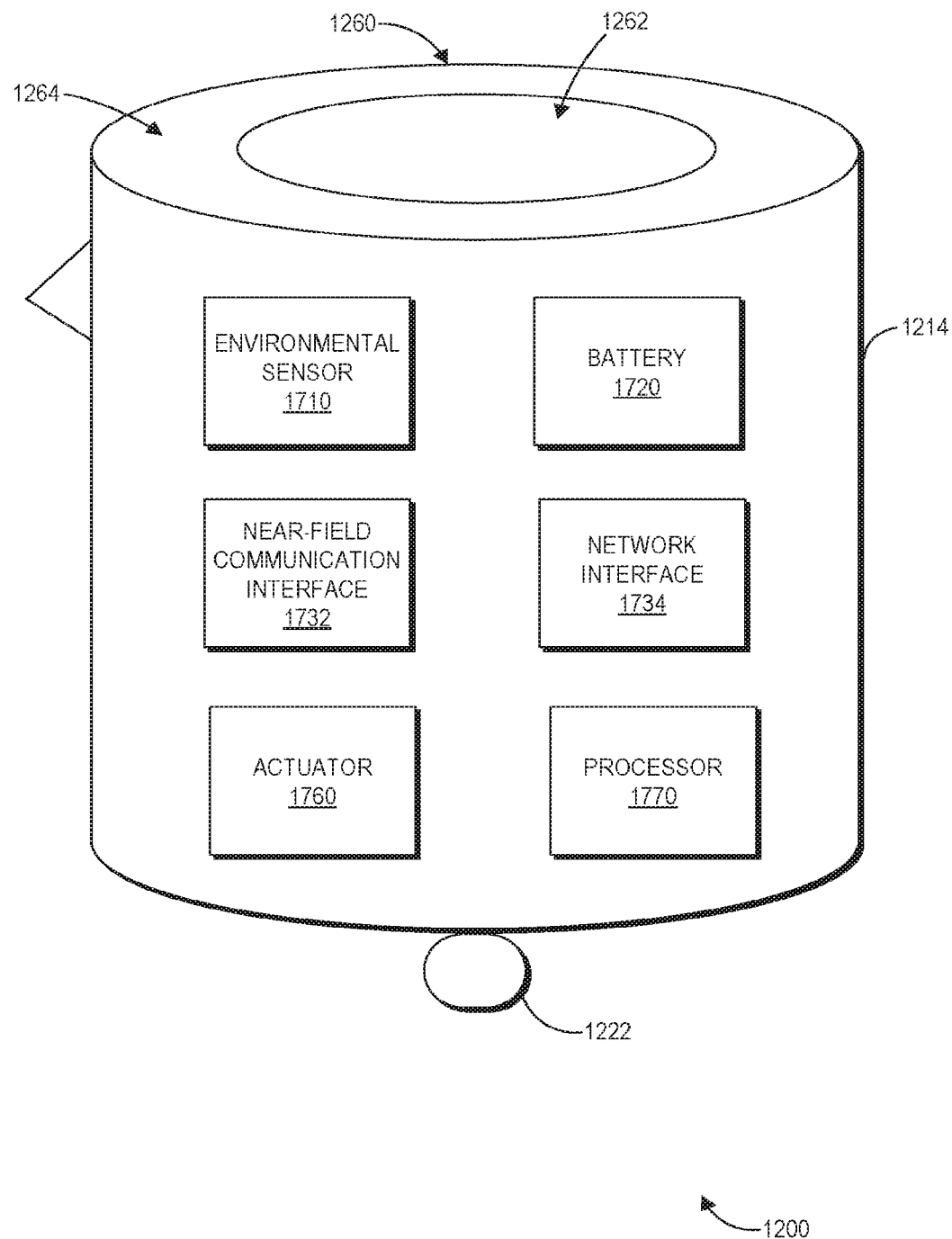
FIG. 17A is a block diagram that illustrates example components of a totem.
Figure 17B:
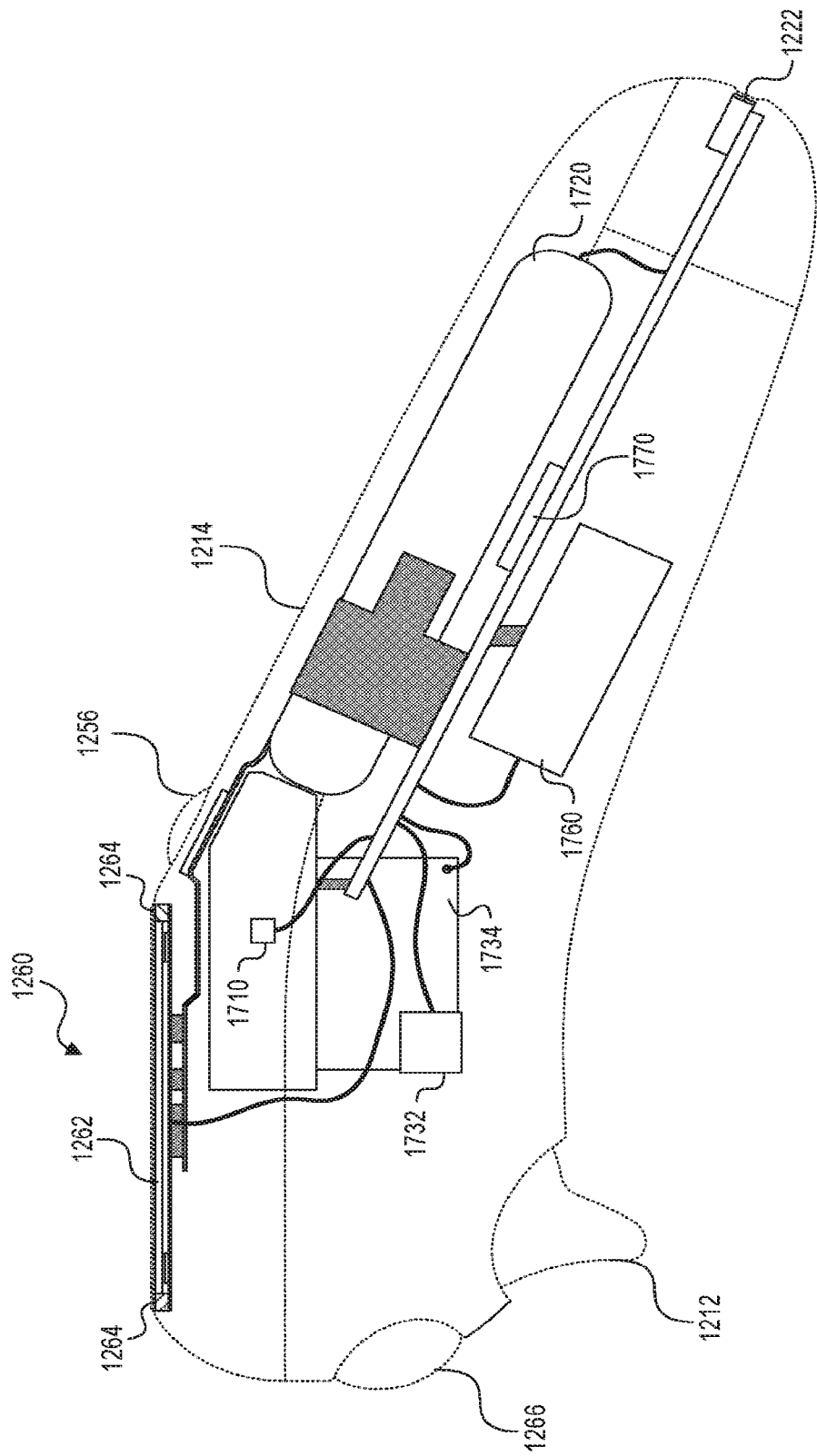
FIG. 17B is a side cross-section view illustrating components of another example totem.

FIGS. 17A and 17B illustrate examples of components of a totem 1200. The example totem 1200 can include a touchpad 1260 (which can include a touch surface 1262 and a light guide 1264), a trigger 1212, and a totem body 1214 as described with reference to FIGS. 12A and 12B. The light guide 1264 may comprise user-interactable regions (e.g., touch sensitive) and may at least partially or completely surround the touch surface 1262. The totem 1200 can also include a variety of components, at least some of which may be disposed inside the body 1214 of the totem. These components will be described further below and can include an environmental sensor 1710, a battery 1720, a near-field communication (NFC) interface 1732, a network interface 1734, a haptic actuator 1760, and a processor 1770. A connection interface 1222 can be disposed at the bottom of the body 1214 to, for example, removably attach the totem 1200 to a base. The connection interface 1222 can be used to provide electrical power to charge the battery 1720 and to provide a communication link between the components of the totem and external devices (e.g., a computing device).

Bumper

The totem 1200 can include a button 1266 (referred to as a bumper) that in the example shown in FIG. 17B is located at the front end of the totem, above the trigger 1212 and below the touchpad 1260. The bumper 1266 may provide an ergonomically comfortable place for the user to rest his or her forefinger. The bumper 1266 can comprise a touch sensitive surface implemented as, e.g., a depressible button, a capacitive touch sensor, a force-haptic element, etc.

In the example shown in FIG. 17B, the user can actuate the totem 1200 primarily using three fingers, e.g., the thumb to actuate the home button 1256 or the touchpad 1260, the forefinger to actuate the bumper 1266, and the middle finger to actuate the trigger 1212. Such a three-finger accuatable totem can permit the user to rapidly and efficiently provide user input without excessive and tiring use of just one finger (as may occur with mouse setups for desktop computers). The different buttons 1212, 1256, 1266 can provide different functionality, e.g., depending on whether a user is working within an application, scrolling through an application launcher, selecting objects in the environment, etc. In some cases, a user may use just the forefinger to switch back and forth between pressing the bumper or pulling the trigger.

As examples of bumper functionality, tapping the bumper while the user is looking at an application can bring up an options menu for that application, while long pressing the bumper can activate a manipulation sequence for virtual objects in the environment. For example, a long hold of the bumper can grab an object, and a long press on the bumper while pointing the totem 1200 toward the object can activate direct manipulation of the object (e.g., to move or re-orient the object). Tapping the bumper (or pulling the trigger) in a manipulation sequence can end the sequence.

Environmental Sensors

An environmental sensor 1710 can be configured to detect objects, stimuli, people, animals, locations, or other aspects of the environment around the user. The environmental sensors may include image capture devices (e.g., cameras), microphones, IMUs, accelerometers, compasses, global positioning system (GPS) units, radio devices, gyroscopes, altimeters, barometers, chemical sensors, humidity sensors, temperature sensors, external microphones, light sensors (e.g., light meters), timing devices (e.g., clocks or calendars), or any combination or subcombination thereof. In some embodiments, the environmental sensors may also include a variety of physiological sensors. These sensors can measure or estimate the user's physiological parameters such as heart rate, respiratory rate, galvanic skin response, blood pressure, encephalographic state, and so on. Environmental sensors may further include emissions devices configured to receive signals such as laser, visible light, invisible wavelengths of light, or sound (e.g., audible sound, ultrasound, or other frequencies). In some embodiments, one or more environmental sensors (e.g., cameras or light sensors) may be configured to measure the ambient light (e.g., luminance) of the environment (e.g., to capture the lighting conditions of the environment). Physical contact sensors, such as touch sensors, strain gauges, curb feelers, or the like, may also be included as environmental sensors.

The information acquired by the environmental sensor 1710 may be used to determine the light placement or movement patterns of the halo displayed on the totem. For example, the environmental sensor can determine the relative positions between the user and a physical object in the user's environment using a GPS sensor or an electro-magnetic sensor (for detecting an electromagnetic signal associated with the physical object). The totem may present a halo whose placement can correspond to the location of the physical object. For example, if the object is in front of the user, the totem can present a halo in the 12 o'clock direction on the light guide 1264.

Additionally or alternatively, the information acquired by the environmental sensor 1710 can be used for one or more user interface operations. For example, the totem 1200 can detect the totem's 6DOF movement using the IMUs. For example, when the user rotates the totem 1200 while playing a game, an avatar (or other virtual object) controlled by the user (and displayed to the user via a wearable device) can rotate accordingly based on the movement data acquired by the IMUs. Additionally or alternatively to moving or rotating the totem 1200, the user can provide input on the touchpad 1260. For example, movement of the user's thumb toward or away from the user (e.g., along the long axis of the totem) can move the virtual object toward or away from the user. Movement of the user's thumb in a transverse direction back and forth on the touchpad 1260 can scale the size of the virtual object (e.g., from larger to smaller or vice versa) or rotation of the user's thumb around the touchpad can rotate the virtual object.

Although in this example, the environmental sensor is located on the totem 1200, in some embodiments, the environmental sensor may be located at other components of the wearable system described herein. For example, an environmental sensor (such as a camera or a physiological sensor) may be part of the display 220 of the wearable system 200 (shown in FIG. 2).

Battery

The battery 1720 stores electric power for the totem 1200. The totem can determine the current status of the battery 1720 using the processor 1770. For example, the processor 1770 can measure and calculate the amount of power left in the battery 1720, whether the battery 1720 is currently being used, and the remaining life of the battery 1720 (such as when the battery 1720 will need to be replaced). As further described in FIGS. 21A-21E, the current status of the battery 1720 may be visualized via visual feedback presented on the light guide 1264, the home button 1256, an LED power indicator located on the bottom portion 1244 (e.g., shown in FIG. 12A) of the totem body 1214, or the display.

The totem 1200 can also determine the power consumption level of the totem using the processor 1770. For example, the totem can estimate the power consumption based on the estimated current required to output a certain light signature. The light signature may include a certain light placement or movement pattern of a halo associated with an indication of a process, a status, an object, or a user interaction. As an example of estimated electric currents associated with light signatures, the totem 1200 may require 5.6 mA to perform a 3 or 6 DOF calibration; 48 mA to find an object in the user's environment or to indicate a direction; and 54 mA to perform a wireless (e.g., Bluetooth) pairing. As another example of estimated currents for light signatures, 14.85 mA of the current may be consumed to provide an indication that the battery is less than 15%; 21.6 mA may be used to indicate that the totem is in a sleep mode or in an idle state; and 72.4 mA of current may be supplied to provide incoming notifications (such as, e.g., of new messages).

These estimated electric currents are merely examples. The specific amount of electric power needed may depend on various factors such as the type of LEDs used, the color of the LED, the placement and movement light patterns of a halo, etc. For example, the totem battery 1720 may drain 2 hours faster if every RGB LED of the touchpad 1260 is set to display white at 100% brightness all the time rather than displaying green at 100% brightness. This is because when an RGB LED displays green, only ⅓ of the LED (e.g., the green LED in the RGB LED) is utilized but when an RGB LED displays white, all LEDs in the RGB LED) are utilized.

To reduce the overall power consumption, the LEDs (particularly the LEDs that are interactable) may be spaced apart so as to reduce the total number of LEDs on the touchpad. For example, the totem may employ the layouts shown in the columns 1550 and 1570 in FIG. 15. Advantageously, in some embodiments, by spacing the LEDs apart, the power consumption may be reduced by up to 50%. The specific amount of reduction of the power consumption may depend on the layout of the LEDs. For example, the pattern D in FIG. 15 may have lower power consumption than the pattern A because pattern D has fewer LEDs being illuminated. As another example for reducing the power consumption, the totem can run the LEDs with less brightness (such as, e.g., at <40% brightness).

The totem can manage the power consumption based on the objects that the user is interacting. The totem can turn off the LEDs that do not have an active user interface option. For example, the totem may simulate a d-pad using LED layout E shown in FIG. 15. However, during a game, the downward button may be disabled at a certain level. Accordingly, the totem may be configured not to display the bottom arc. Additionally or alternatively, the totem can manage the power consumption based on the status of the totem, the display, or other components of the wearable system. For example, the totem can turn the halo off after detecting a certain amount of inactivity. The totem can make such detection by calculating the amount of movement data of the totem acquired by the IMU.

In some embodiments, the wearable system may include a battery pack which may be attached to the user (such as, e.g., at the user's waist). The battery pack may be connected to the totem or the wearable device to supply power. The battery 1720 may be part of the battery pack or may be used in connection with the battery pack to supply electricity to the totem 1200.

Near-Field Communication (NFC) Interface and Network Interface

The NFC interface 1732 and the network interface 1734 can be configured to allow the totem to pair or communicate with a target object, such as e.g., another totem (or other user input device), a wearable display, a personal computer, a headphone, a key, a server, or another physical object. The NFC interface 1732 can be used for short-range wireless communications (such as when totem is in 10 cm or less distance from the target object). In some embodiments, the NFC employs electromagnetic induction between two loop antennas when NFC-enabled devices—for example a totem and an HMD—are positioned close to each other (within about 10 cm) and wirelessly exchange information. This exchange of information may be operated within the globally available unlicensed radio frequency ISM band of 13.56 MHz over an ISO/IEC 18000-3 air interface at rates ranging from 106 to 424 Kbit/s. A variety of communications protocols and data exchange formats may be used for the NFC. Some non-limiting examples include: ISO/IEC 14443 and Felicia, ISO/ICE 18092, the standards defined by the NFC Forum and the GSMA group, etc.

The network interface 1734 can be configured to establish a connection and communicate with the target object via a network. The network may be a LAN, a WAN, a peer-to-peer network, radio frequency, Bluetooth, Wi-Fi, a cloud based network, or any other type of communication network.

For example, the totem and the wearable device may be paired using a wireless communication protocol such as, e.g., Bluetooth Low Energy (BLE). BLE may be advantageous in some embodiments because it can maintain bandwidth during BLE audio streaming. As further described with reference to FIGS. 20A-20C, various techniques may be used to pair the wearable device with the totem. For example, the wearable system can detect a certain light pattern presented by the totem by analyzing images of the totem obtained by an outward-facing camera. The detection of the light pattern can trigger the wearable system to start the pairing process. During the pairing process, the user may interact with the wearable display via a dialog box or user interface (UI) wizard to specify the settings and parameters associated with the totem, the wearable display, the type of information shared between the totem and the wearable display, the type of communication channel, etc.

Although in this example, the NFC interface 1732 and the network interface 1734 are illustrated as separate components, in some embodiments, the NFC interface 1732 and the network interface 1734 may be part of the same communication device or system.

Haptic Actuator

The totem 1200 can include a haptic actuator 1760. As described with reference to FIG. 12A, the haptic actuator 1760 can provide a haptic feedback to the user. One or more haptic actuators 1760 may be implemented in the totem 1200. A haptic actuator may be located at the trigger 1212, the touchpad 1260, or the totem body 1214.

The haptic feedback may be provided based on the user's interactions, the contextual information associated with an object or the user, status of the totem or other components of the wearable device, etc.

Processor

The hardware processor 1770 can be configured to process data acquired by the environmental sensor 1710. The processor 1770 can also receive from and send data to another device (such as the wearable display or another paired device) via the NFC interface 1732 or the network interface 1734. The processor 1770 can analyze these data to determine the placement or movement patterns of the halo at a given time. In some embodiments, the processor 1770 may work in conjunction with another computing device (such as, e.g., the wearable device, a remote server, or a personal computer) to analyze. For example, the processor 1770 may detect the user's movement using the environmental sensor 1710. The processor 1770 can pass the user's movement data to the local processing and data module 260 or the remote processing module 270 for further analysis. The processor 1770 can receive the result of the analysis from the local processing and data module 260 or the remote processing module 270. For example, the processor 1770 can receive information on the position and movement trajectory of a competitor in a game. Based on this information, the processor 1770 can instruct the LEDs emit lights for displaying a halo corresponding to the position and movement trajectory of the competitor.

The hardware processor 1770 can process various user inputs from the user's actuation of the totem 1200. For example, the hardware processor 1770 can process user inputs on the touchpad 1260, the trigger 1212, the home button 1256, the bumper 1266, etc., as described with reference to FIGS. 12A-17B. As an example, the hardware processor can detect a user's hand gesture on the touchpad 1260 by processing signals from the touch sensors. As described herein, the hardware processor 1770 can process the user's input and instruct other components of the totem 1200 (such as, e.g., the LEDs or the actuator 1760) to provide an indication of the user's actuation of the totem 1200.

Connection Interface

As described with reference to FIG. 12A, the connection interface 1222 may be used to establish a connection with another device. The connection may be a wired connection. For example, the connection interface 1222 may comprise a USB connector. The connection interface 1222 may also comprise a USB port, such as, e.g., a USB-B type port, USB-A type port, a micro USB, or USB Type C port, etc. The connection interface 1222 can also include a power cord for connecting to a power source for charging.

The example components illustrated in FIGS. 17A and 17B are not limiting examples, and the totem 1200 can include fewer or more or different components than illustrated. For example, the totem 1200 may not have an NFC interface 1732. As another example, the totem 1200 can include an optical emitter configured to emit a light (such as an infrared light) or an electro-magnetic emitter configured to generate or sense a magnetic field (e.g., used for electro-magnetic tracking), etc. As yet another example, the NFC interface 1732 and the network interface 1734 may be part of the same communication system.

Examples of Configuring Placement and Movement of Light Patterns of a Halo

The illuminated halo described herein can be customized by a user of a wearable system, a developer, or another entity. For example, the user of the wearable system can set preferences associated with the placement and movement of light patterns of the halo. The preferences may be associated with the contextual information described with reference to FIGS. 16A and 16B. As an example, the user can set the color of a halo associated with a system notification (such as a low battery status) to blue while setting the color associated with a game object to red. The user can set his or her preferences via the wearable device alone or in combination with the totem. Based on the user's preferences, the totem can automatically present the illuminated halo when a user interacts with the wearable system. In some situations, the user can turn off the illuminated halo by actuating the totem (such as the trigger 1212 shown in FIG. 12A) or via poses. For example, the outward-facing imaging system 464 can capture a hand gesture of the user associated with turning off the halo. The wearable system can recognize the hand gesture from the images acquired by the outward-facing imaging system using a computer vision algorithm and accordingly instruct the totem to turn off the illuminated halo.

Figure 18A:
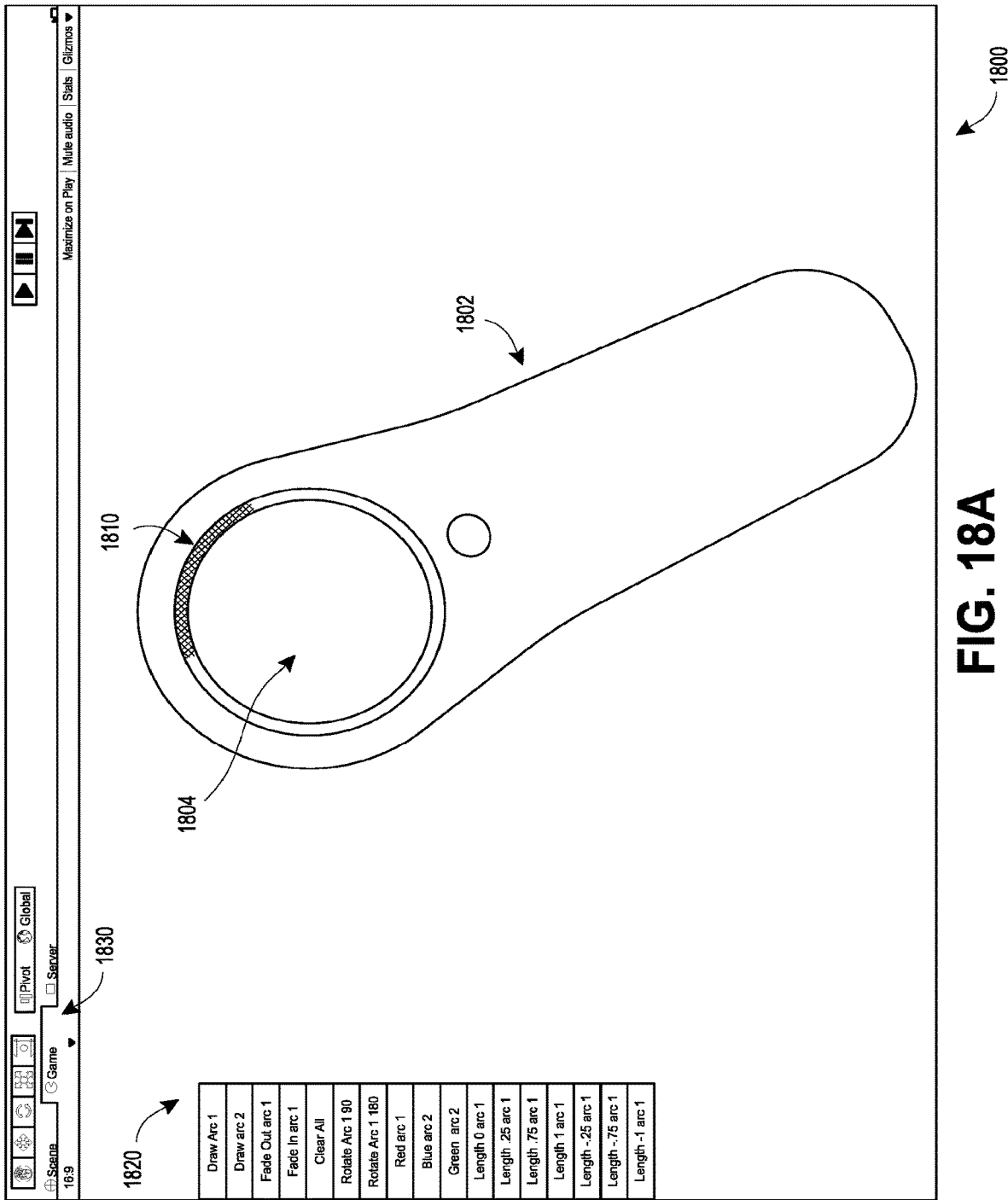
FIGS. 18A-18D illustrate an example programming interface for configuring placement or movement patterns for light emissions from a halo of a totem.

The placement and movement light patterns of the halo can also be configured using an application programming interface (API). FIGS. 18A-18D illustrate an example programming interface for configuring light placement or movement patterns of a halo. The API can be interacted with by a user or developer to set the light patterns of the halo of the totem. FIG. 18A shows an API that includes a visualization 1802 of a totem. The visualization 1802 of the totem includes an image of a halo 1810 displayed on a visualized touchpad 1804. In this example, the length of the halo 1810 is set to be 0.25, which can be about a quarter of the top circumference of the visualize touchpad 1804. The end points of the halo 1810 are at the 12 o'clock position and the 3 o'clock position.

The programming interface 1800 can include an application bar 1830. The application bar 1830 can include the types of applications for which the light patterns of the halo are configured. For example, in FIG. 18A, the user of the programming interface 1800 is configuring the light patterns associated with a game application. The user can also configure the light patterns associated with a web application, a system application, a scene (such as, e.g., the locations of the objects in the environment), a user's characteristics (such as, e.g., associating the pattern of a halo based on whether the user's right-handed or left-handed), and so on.

The programming interface 1800 can also include an arc configuration tab 1820. The arc configuration tab 1820 can include various options for configuring the shape (e.g., arcs, rings, etc.), size (e.g., angular arc length), color, visual effects, or orientation (e.g., N, S, E, or W) of the halo. Visual effects can include fade-in, fade-out, flash, blink, clockwise or counter-clockwise rotation, etc. For example, the programming interface 1800 can associate the halo 1810 (or a portion of the halo) with a fade-in or fade-out effect. The programming interface 1800 can also change the arc length, for example, from ¼ of the circumference to ¾ of the circumference of the halo. It can also change the rotation of the halo 1800 (e.g., from clockwise to counter-clockwise) or change the location of the halo 1800 (e.g., from the top right corner to the bottom right corner of the touch surface).

Figure 18B:
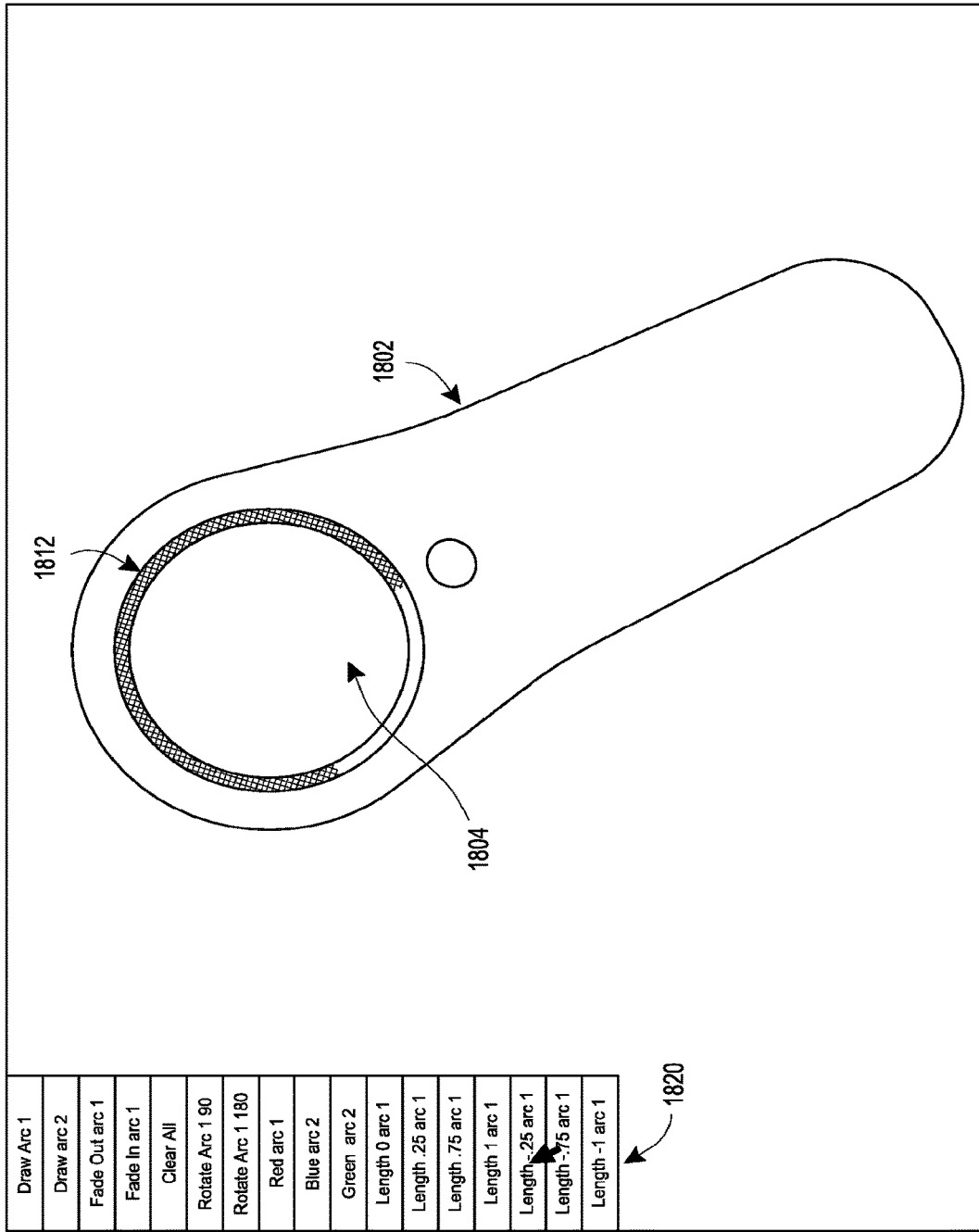

As an example of configuring in light placement or movement patterns of the halo using the arc configuration tab 1820, FIG. 18B shows an example halo 1812 when the length of the arc is set to be −0.25. In this example, the length of the arc in halo 1812 is about ¾ of the circumference of the touch surface. The end points of the halo 1812 are at the 9 o'clock position and the 6 o'clock position.

Figure 18C:
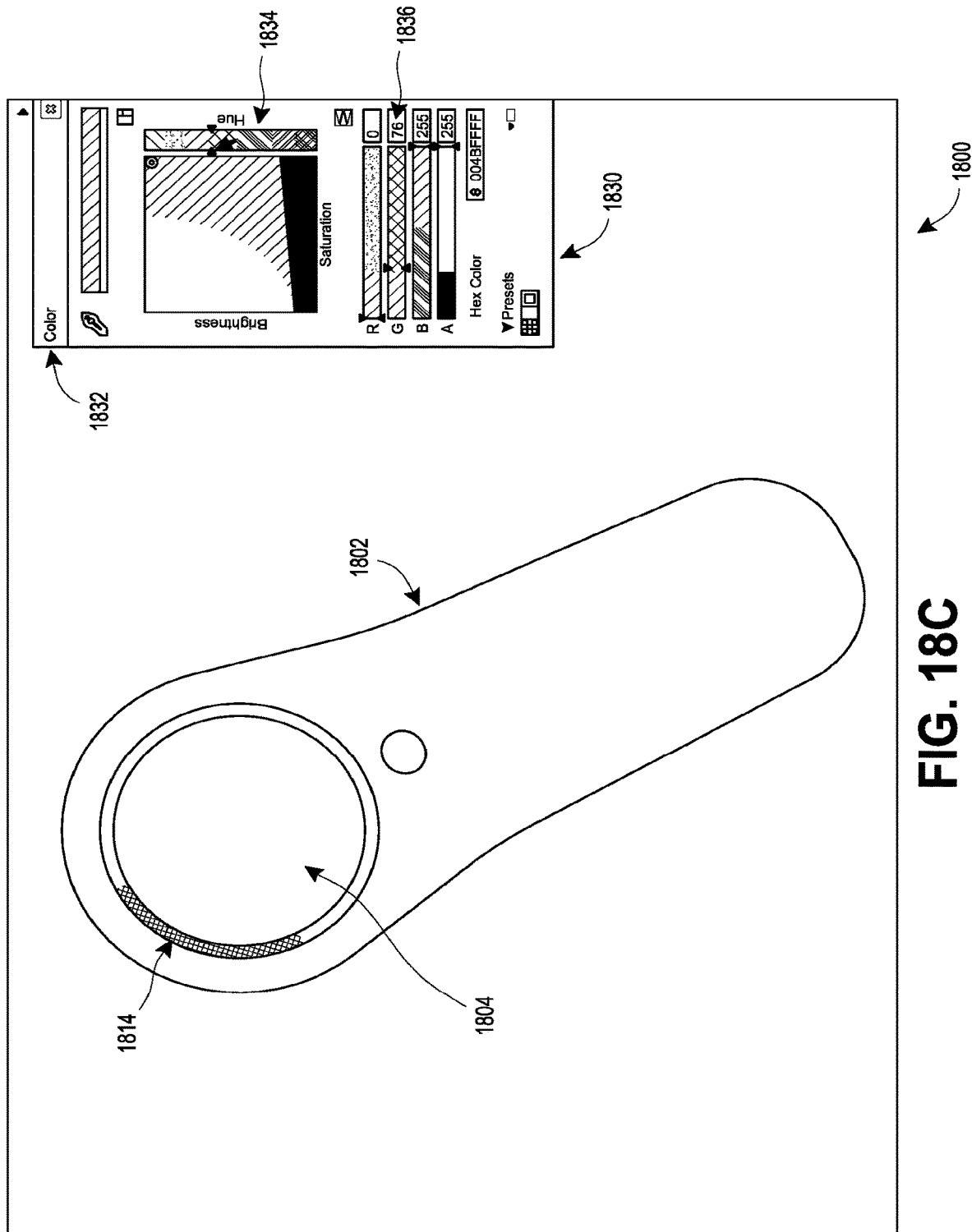

The programming interface 1800 can also include a color selection tool 1830 shown in FIG. 18C. The color selection tool 1830 can include a search bar 1832 in which a user of the programming interface can input the color of the halo. The color of the halo may be input in the format of Hypertext Markup Language (HTML) color code. The color selection tool 1830 can also include a color adjustment panel 1834 in which the user can adjust the saturation, brightness, and hue of a color. The color selection tool 1830 can also include an RGB tool 1836 which can select the color based on the relative ratio among RGB and the black/white color. The user can use a pointing device (e.g., a mouse) to select color, saturation, brightness, hue, etc. from the panels of the color selection tool.

In the example shown in FIG. 18C, the user has set the color of the halo 1814 to blue. The user can also change the color of the halo 1814 using the color selection tool 1830 or adjust the saturation, brightness, or hue of the selected color using the color adjustment panel 1834. In some embodiments, the color of the halo may be preset, e.g., based on a theme or style sheet. The wearable system may preset the color based on a system default color or based on contextual information. The user of the programming interface 1800 can change or adjust the preset color using the color selection tool 1830.

Figure 18D:
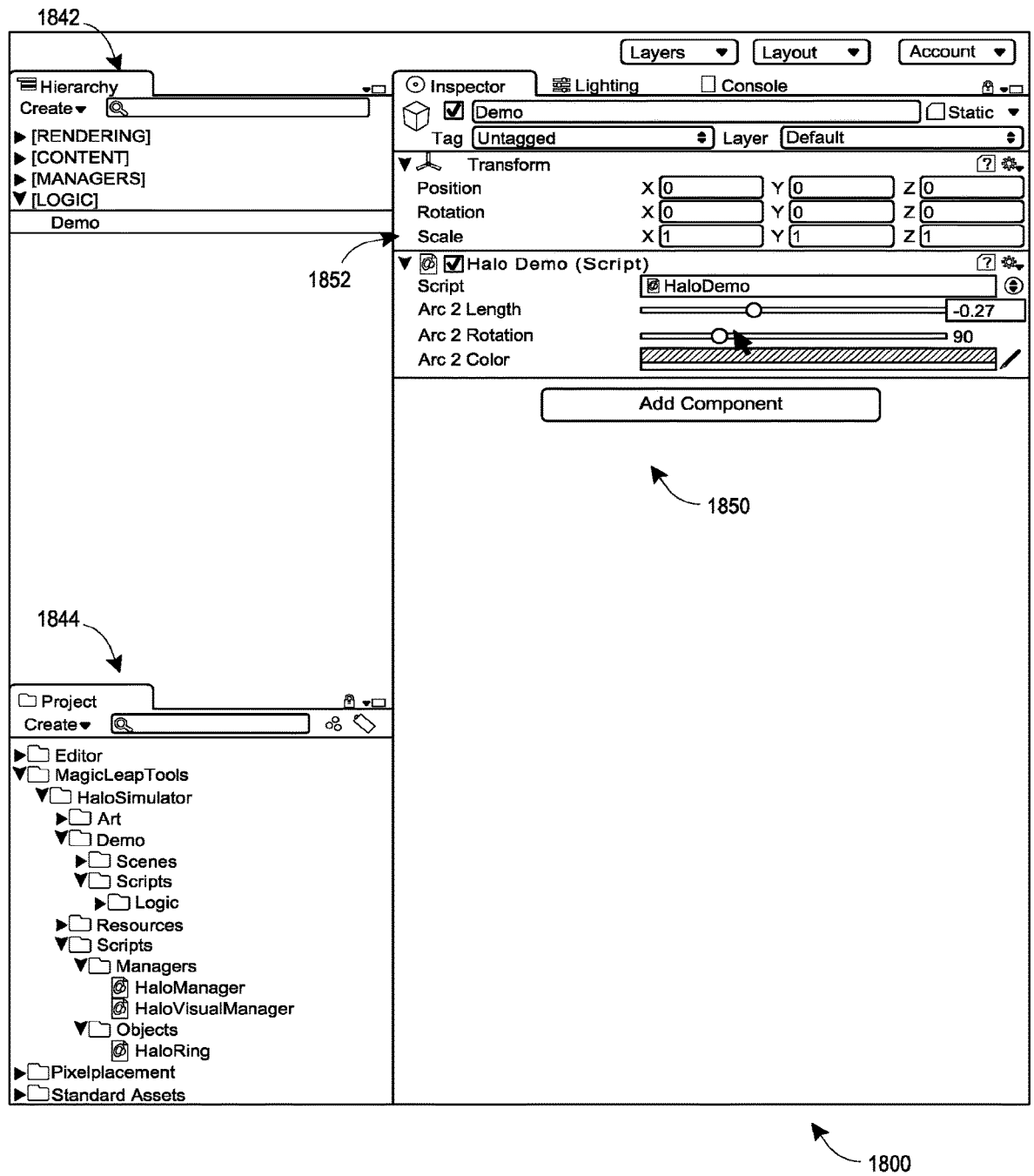

FIG. 18D illustrates another portion of the programming interface 1800, which includes a visualization tab 1842, a source code tab 1844, and a pattern adjustment tool 1850.

The pattern adjustment tool 1850 can be used configure the halo. For example, the user of the programming tool can adjust the sliders associated with the arc length, rotation, and color to provide various visual effect of a halo. The user can also adjust the position and rotation of the halo by setting an x, y, z coordinate values halo (as illustrated in the transformation tab 1852). The user can also adjust the lighting and movement effects associated with the totem, such as the fade-in/fade-out effect.

The visualization tab 1842 may be used to visualize one or more effects of the halo created by the pattern adjustment tool 1850, the arc configuration tab 1820, or the color selection tool 1830. As an example, the visualization tab 1842 may be associated with the visualization 1802 of the totem. When a user of the programming tool 1800 selects the visualization tab 1842, the programming tool 1800 may show the visualization 1802 of the totem so that the user can directly perceive the effect of the updates to the halo.

The source code tab 1844 includes source codes associated with the placement and movement light patterns of the totem. For example, when the user of the programming tool 1800 configures the halo using the arc configuration tab 1820, the color selection tool 1830, or the pattern adjustment tool 1850, the source codes may be automatically updated based on the user's selection. The source codes (or the executable version) can be communicated to the totem using a wired connection (e.g., via the connection interface 1222) or a wireless connection (e.g., via the network interface 1734). Additionally or alternatively, the source codes (or the executables) can be stored in the totem or the head-mounted device (such as, e.g., in the local processing & data module 260), which may be used to generate analog signals to control the light patterns of the LEDs 1330.

In some embodiments, a halo may be composed of multiple arcs (see example halo pattern 1614 in FIG. 16A). The programming tool 1800 can allow a user to configure each arc using the techniques described herein. The pattern adjustment tool 1850 shown in FIG. 18D can be used alone or in combination with the arc configuration tab 1820 and the color selection tool 1830 to configure the halo.

Although the examples in FIGS. 18A-18D are described with reference to configuring the light placement or movement patterns of the halo, similar techniques can also be used to configure haptic, audio, visual, or other effects.

Examples of Totem Calibration with a Halo

User input devices (such as the totem described herein) may require calibration to minimize errors and to improve user interaction experiences. For example, the IMUs of the totem may need to be calibrated to accurately detect and respond to the user's movement of the totem. The calibration is normally done at the time of manufacture (e.g., when the totem or the IMUs are manufactured). Post-manufacture calibration may be difficult because a user may not have a controlled and precise calibration system as the manufacturer of the totem has. However, it may be beneficial for a user to perform post-manufacture calibration because the degree of the user's motion may vary. For example, one user may move his or her arm to a greater degree than other users when the user sways his or her totem. In addition, it may be advantageous to provide a customized user experience so that the totem can have varying degrees of responsiveness tailored to different users. Some users may prefer a more sensitive totem (which may be responsive to a slight movement) while other users may prefer a less sensitive totem (which may not be configured to perform a user interface operation when there is a slight movement).

The wearable system and the totem described herein can advantageously support post-manufacture calibration without requiring the user to use the calibration system of the manufacturer. The totem can display a halo. When the user moves the totem 1200, the outward-facing imaging system 464 of the wearable system can capture an image of the totem and the illuminated halo. The shape of the halo as captured by the outward-facing imaging system 464 may be different based on the position and orientation of the totem. The wearable system can use object organizers 708 to identify the shape of the halo and accordingly determine the position and orientation of the totem. To calibrate an IMU of a totem, for example, the position and orientation of the totem as determined based on the images acquired by the outward-facing imaging system 464 can be compared with the position and orientation captured by the IMU. The wearable system can correct the IMU of the totem based on the comparison.

Figure 19A:
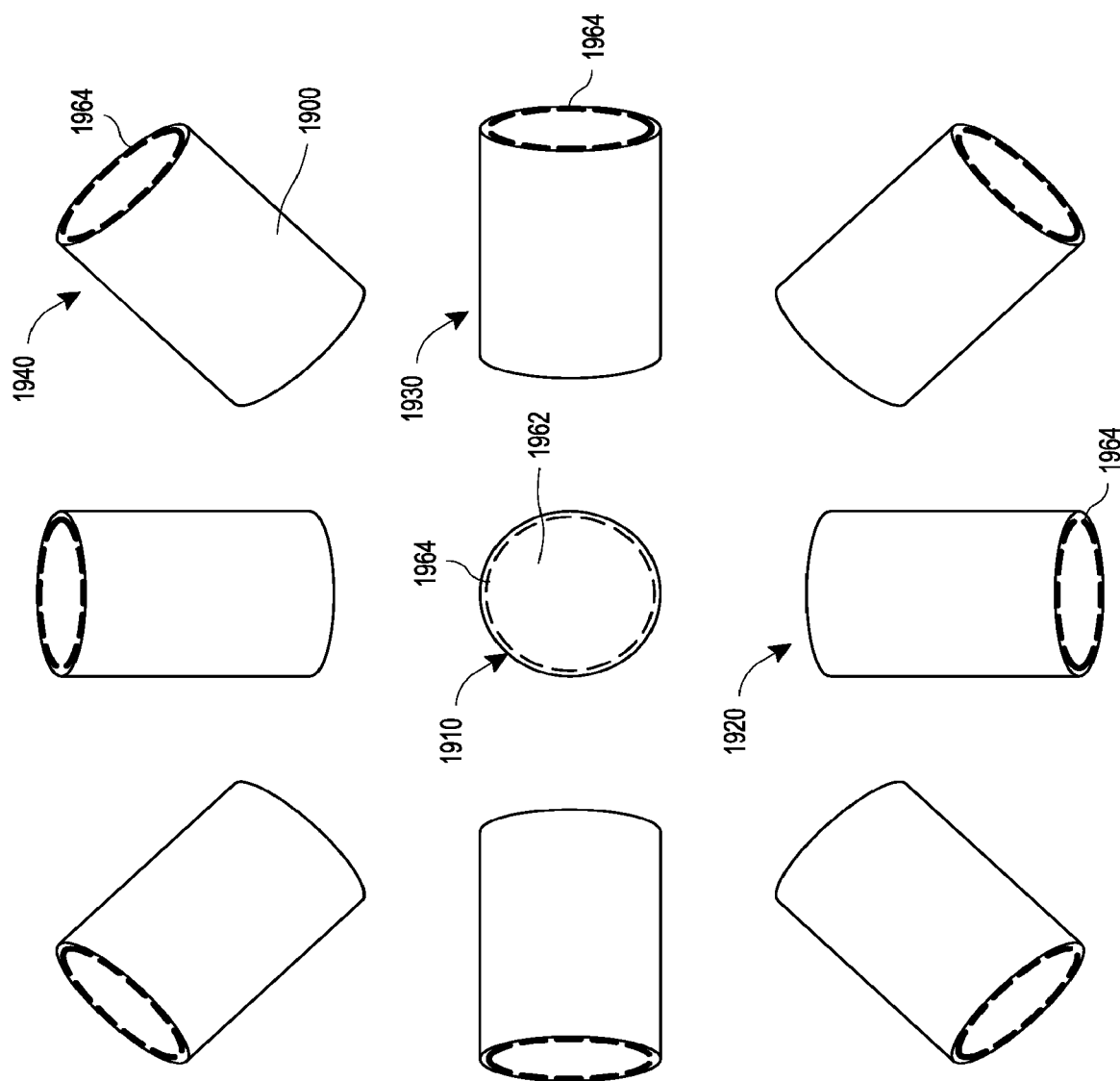
FIGS. 19A-19C illustrate examples of totem calibration using a halo of light emissions from the totem.

FIG. 19A illustrates an example of totem calibration using an illuminated halo. The example in FIG. 19A is described with reference to calibrating a totem 1900 but this is for illustration and is not intended to be limiting. The totem 1900 can have 3 degrees of freedom in this example. The 3DOF totem 1900 can include a circular touch surface 1962 and a circular light guide 1964 surrounding the touch surface 1962. The light guide 1964 can display a circular halo. The 3DOF totem 1900 can be an example of the totem 1200 described herein. Accordingly, the touch surface 1962 can be an example of the touch surface 1262 and the light guide 1264 can be an example of the light guide 1264.

In this example FIG. 19A, various poses (e.g., poses 1910, 1920, 1930, and 1940) of the totem are shown. A pose of a totem can include an orientation and a position of the totem. For example, the pose 1920 indicates that the user has pointed the totem downward. The pose 1930 shows that the totem is pointed to the right and the pose 1940 shows that the totem faces the top-right position. The pose 1910 may be a fiducial position which is associated with the natural resting position of the totem.

During a calibration process for an IMU of the totem, a wearable system can use its outward-facing imaging system 464 to capture an image of the user's environment. The image of the user's environment can include an image of the totem. The object recognizer 708 of the wearable system can apply a computer vision algorithm to identify the totem in the captured image. The object recognizer 708 can also apply a computer vision algorithm to identify the shape of the halo in the image. The wearable system can determine the position and orientation of the totem based on the shape of the halo alone or in combination with the image of the totem body. For example, the wearable system can identify a shape associated the fiducial position and calculate the changes to the shape associated with the fiducial position. Based on the changes to the shape associated with fiducial position, the wearable system can determine the changes of the totem's position and orientation based on the fiducial position. For example, a halo having the shape of a circle can be changed the shape of an ellipse if the normal to the circular shape points in a direction that is not directly toward the imaging camera. The wearable system can accordingly determine the current position and orientation of the totem based on the changes to the fiducial position.

As an example, the illuminated halo shown by the light guide 1964 can have a circular shape when the totem 1900 is at the fiducial position (as shown by the pose 1910). In addition, the outward-facing imaging system 464 may not perceive the body of the totem 1900 when the totem is at the fiducial position. With reference to the pose 1940, the wearable system can identify that a portion of the totem's body in a diagonal position based on the images acquired by the outward-facing imaging system 464. The wearable system can also identify that the illuminated halo at the pose 1940 of the totem has appears to have an elliptical, rather than a circular shape. Based on the observations of the totem body and the halo (among other possible information), the wearable system can determine that the totem is tilted to the right and is facing up. As another example, the shapes of the halos at poses 1920 and 1930 can both be ellipses. However, the major axis of the halo at the pose 1930 is in a vertical direction (and the minor axis at the pose 1930 is in a horizontal direction) while the major axis of the halo at the pose 1920 is in a horizontal direction (and the major axis at the pose 1920 is in a vertical direction). Therefore, the wearable system may determine that the totem is positioned horizontally (e.g., facing left or right) at the pose 1930 and determine that the totem is positioned vertically (e.g., facing up or down) at the pose 1920.

The fiducial position may be defined by the wearable system. In this example, the fiducial position is defined to be associated with the pose 1910. In other examples, the fiducial position may be associated with other poses (such as poses 1920, 1930, 1940, etc.) of the totem. Although in this example, the halo appears to be a circle at the fiducial position, the totem can illuminate other light patterns for totem calibration, which the wearable system can detect and analyze. For example, the totem can illuminate a square shape, a triangle (e.g., with 3 arcs surrounding the touch surface of the totem), a pattern of overlapping line segments (having for example cross-shaped arcs or 'x' shaped arcs), and so on. In certain embodiments, the light patterns may also include arcs with multiple colors (which may be useful for calibrating the totem with more degrees-of-freedom, such as, e.g., a 6DOF totem). For example, where the light pattern includes cross-shaped arcs, the totem can illuminate the light patterns as illustrated in FIG. 25B. The outward-facing imaging system 464 and the object recognizers 702 can use the similar techniques to determine the position and orientation of the totem regardless of the light patterns of a halo.

The wearable system can also receive data related to the totem's position and orientation from the IMU. For example, the wearable system can calculate the totem's orientation based on the data acquired from a gyroscope in the totem. The position and orientation data acquired by the IMU can be compared with those calculated based on the images of the totem. The wearable system can calibrate the IMUs based on this comparison. For example, the wearable system may determine that the totem 1900 is at pose 1940 based on the data acquired by the IMU. However, the position of the totem 1900 as observed by the wearable system may actually be at the pose 1930. Accordingly, the wearable system can associate the position and orientation observed by the IMU with the pose 1930 (as observed by the outward-facing imaging system 464) to calibrate the IMUs. In some embodiments, as an addition or alternative to calibrating the IMUs, the wearable system may store a calibration conversion (e.g., a lookup table) that corrects IMU readings so that they represent the calibrated (rather than raw) reading.

Figure 19B:
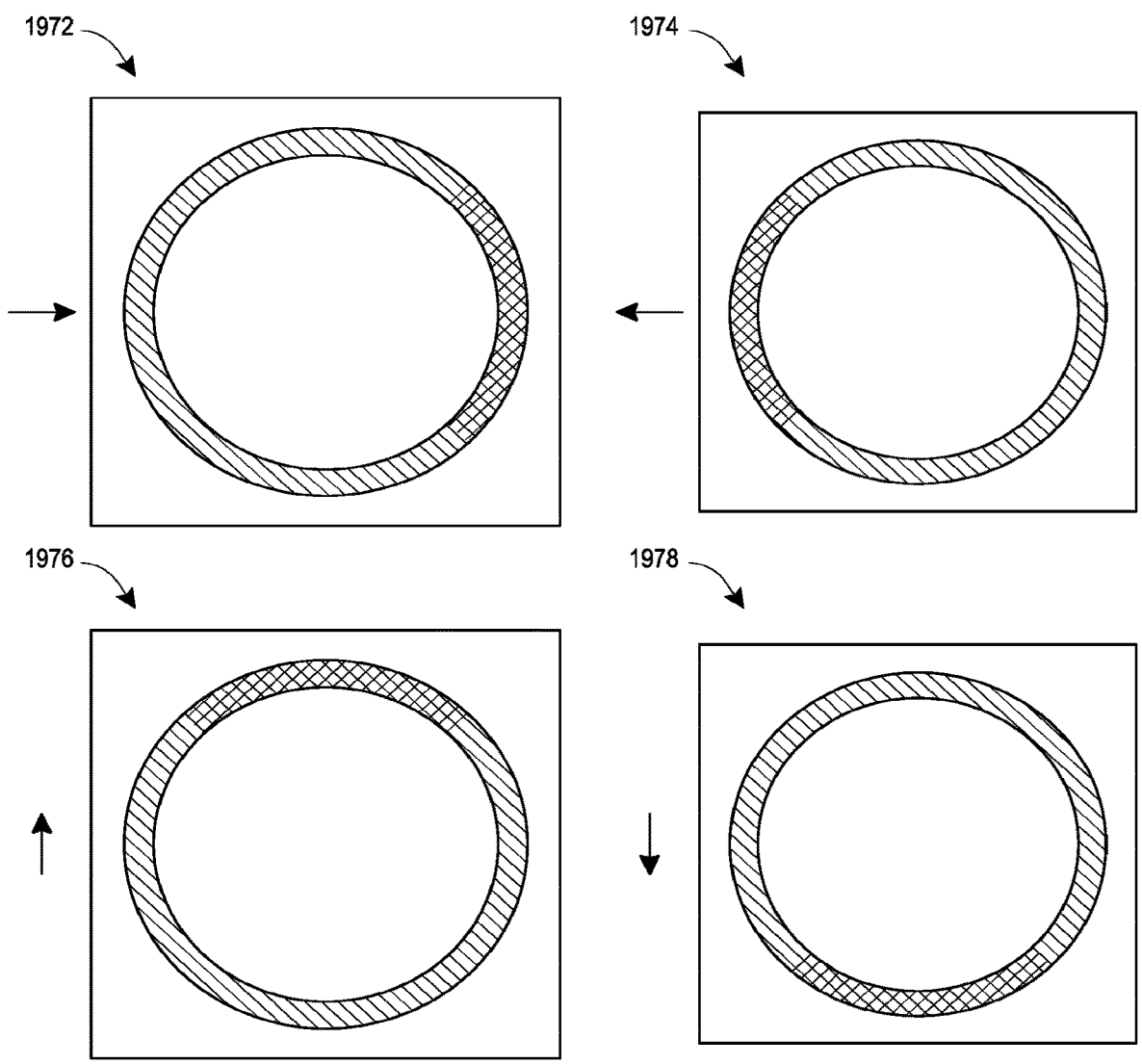

To facilitate the calibration process, a halo may be used to guide a user to move the totem to a certain pose (e.g., position or orientation). The wearable system can accordingly acquire the position or orientation of the totem using the outward-facing imaging system and the IMU. FIG. 19B illustrates an example of totem calibration where the light patterns are used as a guide for user movement. For example, the totem can show the patterns 1972, 1974, 1976, 1978. These patterns can correspond to MUX 2, 0, 1, 4 shown in FIG. 14B. For example, LED 3, LED 4, and LED 5 in MUX 1 may light up to show the pattern 1976.

During a calibration process, the totem presents the pattern 1972 to indicate to the user to move the totem rightward and presents the pattern 1974 to indicate to the user to move the totem leftward. When the totem presents the pattern 1976, the user can move the totem upward, but when the totem presents the pattern 1978, the user can move the totem downward. Once the totem (or the IMU) has been calibrated, the totem can present the pattern 1980 which shows a solid blue color forming a circular shape around the totem's touch surface. In addition to or in alternative to the pattern 1980, the totem can also employ other indications to show that the totem (or the IMU) has been calibrated. For example, the totem can provide a vibration (e.g., via the actuator 1760) or a sound (e.g., via the speaker 240). As another example, the totem can provide other visual indications, such as a fade-in or fade-out effect, a portion of a circular halo, or other visual schemes. In some embodiments, the totem (e.g., the processor 1770) can instruct the LEDs to stop illuminations when the calibration is completed.

Although FIG. 19A is described with reference to calibrating an IMU in a 3DOF totem 1900, similar techniques can also be used to calibrate a 6DOF totem or other types of user input device.

Figure 19C:
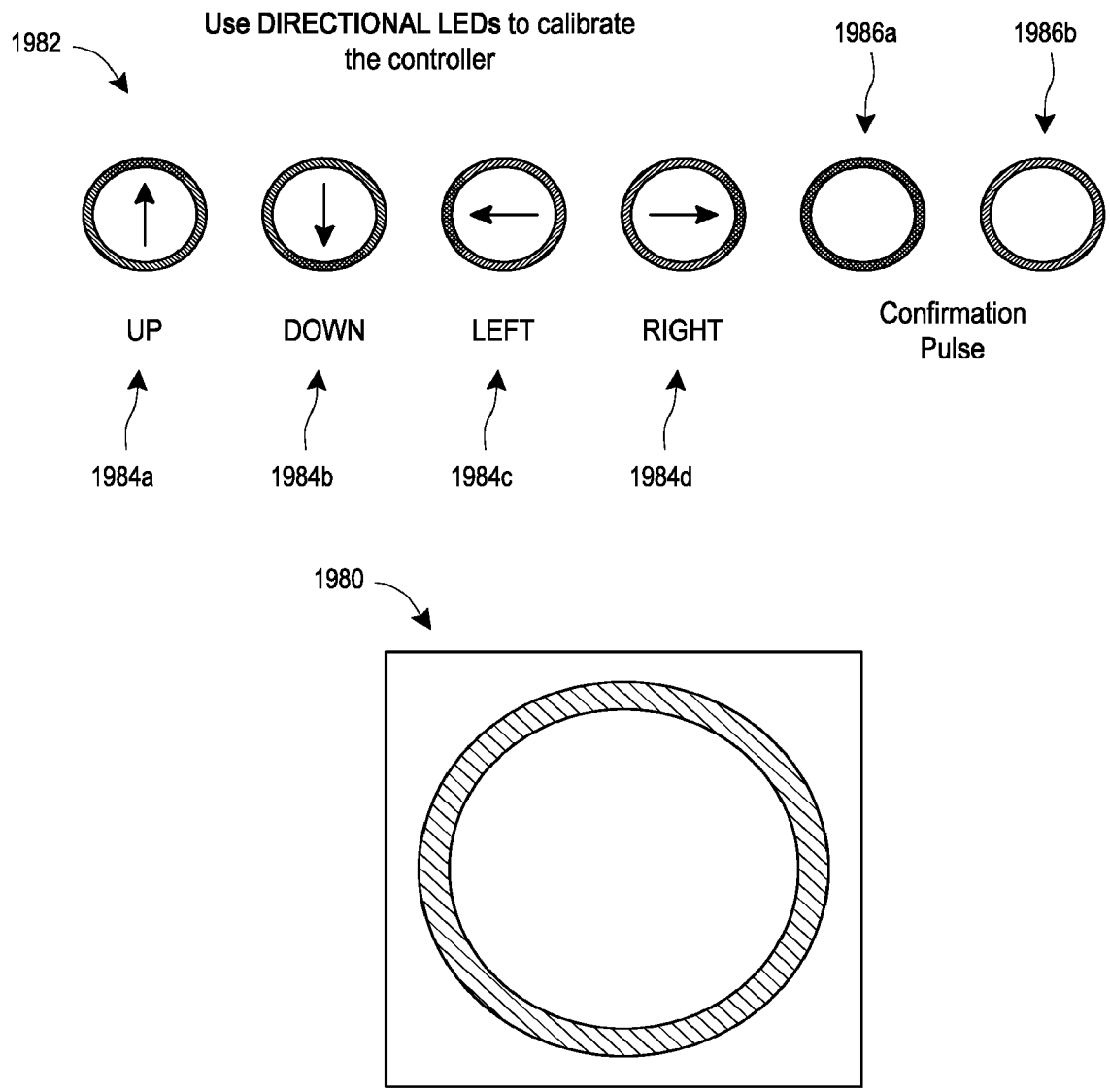

Process 1982 in FIG. 19C illustrates another example of the calibration process. The patterns 1984a, 1984b, 1984c, and 1984d indicate the current position/movement that the totem is currently calibrating. For example, the pattern 1984a (which shows an arc on the top of a circular touchpad) can indicate that the totem is currently calibrating itself associated with an upward movement while the pattern 1984b (which shows an arc on the bottom of a circular touchpad) can indicate that the totem is currently calibrating itself associated with an downward movement. As another example, the pattern 1984c (which shows an arc on the right of a circular touchpad) can indicate that the totem is currently being calibrated with respect to a rightward movement and the pattern 1984d (which shows an arc on the left of a circular touchpad) can indicate that the totem is currently being calibrated with respect to a leftward movement.

In some embodiments, the patterns 1984a, 1984b, 1984c, and 1984d may be triggered due to user interactions. For example, if the user moves the totem rightward, the totem can display the halo 1984d and accordingly calibrate the totem associated with this rightward movement. Additionally or alternatively, as described with reference to FIG. 19B, the patterns 1984a, 1984b, 1984c, and 1984d can automatically be lit up to guide the user to move the totem to a certain pose.

Once the totem has calibrated on all four directions (left, right, up, and down), the totem can present a confirmation pulse. The confirmation pulse may include displaying the patterns 1986a and 1986b in alternate. For example, the totem can change halo from the pattern 1986a to the pattern 1986b (and verse vice) every 0.1 second.

Although FIGS. 19A and 19B are described with reference to calibrating an IMU, similar techniques can also be used to calibrate other environmental sensors 1710.

In addition to or in alternative to guide a user through a totem calibration process, similar techniques can be used to calibrate a user's interactions with a specific object. For example, when the user starts to play a game, the light placement or movement patterns of a halo may be used to guide the user through a tutorial process. As an example, when totem shows the pattern 1984c, the user can move the totem leftward and the display can accordingly show a leftward movement of an avatar. The user can also associate the totem's movement with a particular user interface operation. For example, the user can perceive his or her avatar is in a running action after the avatar is created. The user can move the totem forward (away from the user) to set the forward movement of the totem to be associated with the running action.

In some embodiments, the light placement or movement patterns of the halo may be different based on the type of calibration. For example, a halo may be in a blue color when the IMU is calibrated while may be a green color when the user is configuring the movement of the totems for a game.

Example Processes of Totem Calibration

Figure 19D:
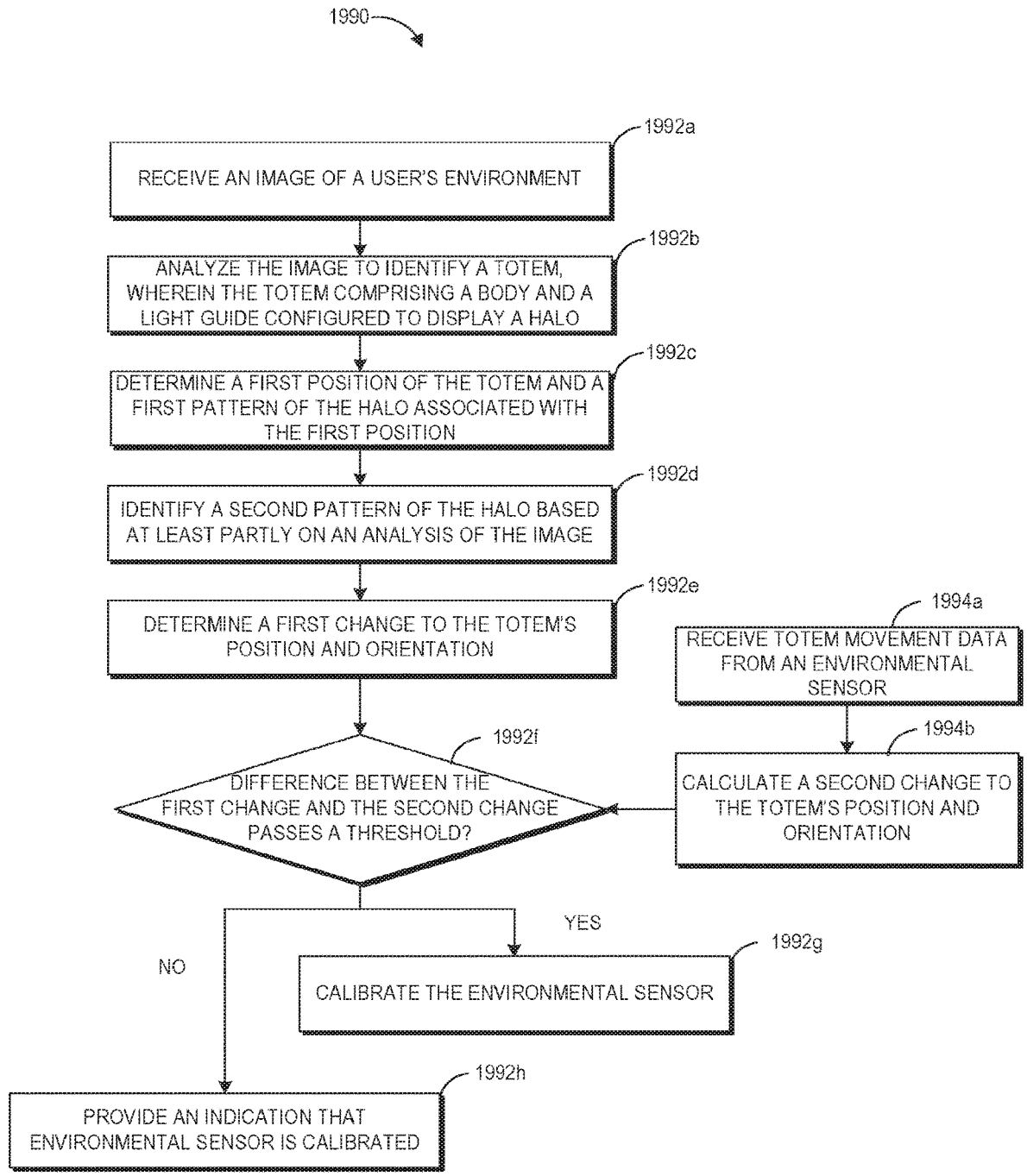
FIGS. 19D and 19E illustrate an example of totem calibration using light patterns associated with a halo.

FIG. 19D illustrates an example process 1990 of totem calibration using light patterns associated with a halo. The example process 1990 can be performed by the wearable system (such as, e.g., the local processing & data module 260 or remote processing module 270), alone or in combination with the totem.

At block 1992a of the example process 1990 in FIG. 19D, the wearable system can receive an image of a user's environment. The image may be acquired by the outward-facing imaging system 464 shown in FIG. 4.

At block 1992b, the wearable system can analyze the image to identify a totem (or a halo) in the image. The totem can include a body and a light guide. The light guide may be configured to display a halo. The wearable system can use the object recognizers 708 described with reference to FIG. 7 to identify the totem, the body of the totem, a halo, or the light guide. The object recognizers 708 may use computer vision algorithms to perform such identification.

At block 1992c, the wearable system can determine a first position of the totem. The first position may be a fiducial position. The fiducial position may be pre-defined by the wearable system, such as, e.g., the natural resting position of the totem. The fiducial position may also be identified or changed by the user. For example, a user may define the fiducial position to be the position associated with the pose 1910. The wearable system can determine a first light pattern of the halo associated with the fiducial position. The pattern associated with the fiducial position may be previously stored by the wearable system. In some embodiments, once the wearable system identifies the fiducial position, the wearable system may prompt a notification to the user requesting the user to hold the totem at the fiducial position and the wearable system can accordingly capture an image of the totem at the fiducial position.

At block 1992d, the wearable system can identify a second pattern of the halo based at least partly on an analysis of the image. The wearable system can analyze the image and identify the pattern using the object recognizers 708.

At block 1992e, the wearable system can determine a first change to the totem's position and orientation with the respect to the first position. For example, the wearable system analyze the change to the halo's pattern based on the pattern associated with the fiducial position and the pattern acquired by the outward-facing imaging system when the totem is at the updated position. In addition to the image analysis, the wearable system can also identify the second pattern of the halo or calculate the first change to the totem's position and orientation based on other information, such as the user interactions or data from one or more environmental sensors which are not being calibrated. For example, the user can provide an indication to show the change to the totem's position and orientation. The indication can be via poses or the user input device 466, such as, e.g., pointing a finger to the front indicating that the totem has been moved forward from its original position.

At block 1994a, the wearable system can also receive movement data associated with the totem from the environmental sensor that needs to be calibrated. The wearable system can accordingly calculate a second change to the totem's position and orientation based on the data received from the environmental sensor at block 1994b.

The wearable system can calculate the differences between the first change and the second change. At block 1992f, if the wearable system determines that the discrepancy between the first change and the second change passes a threshold condition, the wearable system can calibrate the environment sensor at block 1992g. Otherwise, the wearable system can determine that the environmental sensor does not need to be calibrated and provide an indication as shown in block 1992h. The indication may include a certain placement and movement of the halo pattern such as, e.g., the confirmation pulse shown in FIG. 19C, or haptic feedback. Additionally, the indication may be presented by the display 220, the speaker, etc.

In some situations, the wearable system can gather data associated with multiple positions and orientations of the totem, the wearable system can determine whether the environmental sensor needs to be calibrated or how the environmental sensor will be calibrated based on the gathered data. For example, the wearable system may determine that the IMU does not need to be calibrated when the totem is moving left and right but may need to be calibrated with respect to forward/backward movement. However, in order to calibrate for the forward/backward movement, the wearable system may also need to adjust the IMU for the detecting left/right movement. Accordingly, the wearable system may calculate the amount of adjustments needed for the forward/backward movement as well as the left/right movement even though the IMU may have already been able to detect left/right movement with reasonable accuracy.

Figure 19E:
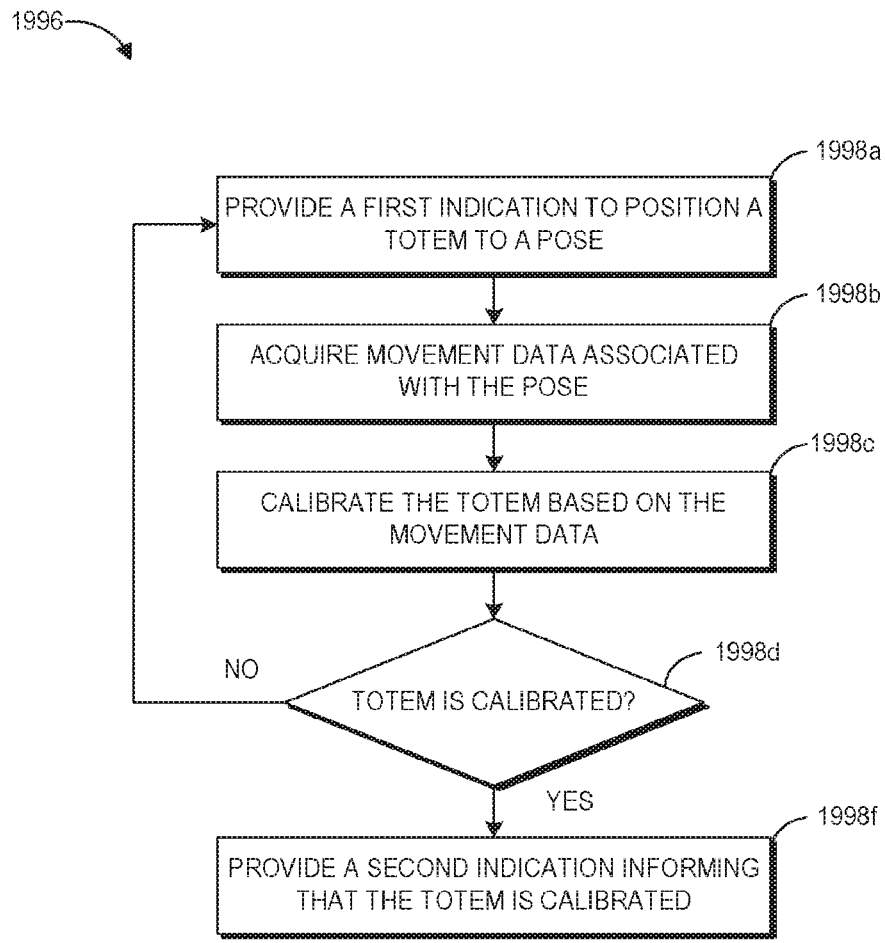

FIG. 19E illustrates another example process 1996 of totem calibration using light patterns associated with a halo. The example process 1996 can be performed by the totem or the wearable system described herein.

At block 1998a, the totem can provide a first indication of a totem's a pose. For example, the totem's light guide may display a halo with an arc located on the left side of the light guide. This arc can provide an indication to the user to move the totem to the left. In some embodiments, the indication can also be provided by the wearable display, or via haptic or audio feedback.

At block 1998b, the totem can acquire movement data associated with the pose. For example, as the user moves the totem leftward, the totem's IMU can detect the user's movement and communicate the movement data to a processor.

At block 1998c, the totem can be calibrated based on the movement data. For example, the totem can associate the movement detected by the IMU with a leftward motion.

At block 1998d, the totem can determine whether it has been calibrated. For example, if the IMU of the totem needs to be calibrated, the totem can determine whether the totem has been calibrated for 6DOF. Once the totem has been calibrated, at block 1998f, the totem can present a second indication informing that the totem is calibrated. For example, the totem can show a flashing green halo on the light guide to indicate that the totem is calibrated.

If the calibration process is unsuccessful, the process 1996 may return to the block 1998a to repeat the calibration.

Examples of Device Pairing with a Halo

Two devices may be required to establish a wireless communication link before they are paired up (e.g., via Bluetooth). When devices pair up, they can share information such as, e.g., addresses, names, and profiles of the users of the devices or the devices themselves or share the information stored in their respective memories. Once the two devices are paired, they can share a common secret key, which can allow them to bond again for future information sharing.

The device pairing can be tedious and sometimes require the users to enter unique information about their devices. For example, a user may manually input information of his or her device after his or her device (or the other user's device) completes an initial search for nearby devices. Although the devices can use NFC protocols to share information between the two devices for the pairing process, NFC components are often relatively large and costly.

To reduce or minimize the user interaction and simplify the pairing process between a totem and a wearable device, the totem can present a light pattern which can be analyzed and used for pairing. The light pattern can include a message used for pairing between the totem and the wearable device. The light pattern may be presented by a halo illuminated on the totem's LEDs. The message may include an indication to initiate a pairing process. For example, the light pattern can encode a trigger message which can cause the wearable device to search for nearby devices or to broadcast its device information to nearby devices. As another example, the light pattern can encode device information of the totem. The device information may be encrypted. Device information can include a device identifier (ID), operating system information (e.g., operating system version), firmware information, type of communication channel (e.g., Bluetooth, wireless channels) used for pairing, a digital key shared between the totem and the wearable display, etc. In certain implementations, the device ID may be provided or generated by the manufacturers, distributors, developers, or any suitable entity. Examples of device identifier may include Android identifier (ID), iPhone's Unique Identifier (UDID), iPhone's IdentifierForAdvertising (IFA or IDFA), cookie ID, login ID, Internet Protocol (IP) address, media access control (MAC) address, a hash of any of the above, a combination of any of the above, or the like. In some cases, the device identifier may be derived based on one or more hardware and/or software parameters of a device identified by the device identifier. For example, a device identifier may be derived from the IP address, operating system version, and locale setting of the device. In some embodiments, a device identifier may be used to identify the source or origin or a transaction, request, or network event. For example, a device identifier may include a user identifier, an account identifier, and the like. Additionally or alternatively, a device ID may be associated with an entity (e.g., user) using a device.

As an example, the totem may include a ring of LEDs on its perimeter (e.g., 12 LEDs disposed circumferentially around the touchpad). These 12 LEDs can be used to represent certain device information when they light up in a specific temporal sequence, spatial sequence, or a combination thereof. Each LED may be assigned to a bit and the ring of LEDs can represent, in this example, a 12 bit word. One or more of the LEDs can be display in sequence to show the necessary information for pairing. For example, the LED lights can be illuminated in a sequence to show a device identifier (ID) of the totem. Assuming the device ID is 2, and the binary representation of the number 2 is 10, the totem may light the LED 0 (shown in FIG. 14B) to represent the binary number 2 while other LEDs (e.g., LED 1-11) do not illuminate.

In certain implementations, the colors of one or more LED lights can also represent information used for pairing. For example, a red color may represent a certain manufacturer or model of the totem while a blue color of the LED lights may represent another manufacturer or model. The totem can also show a combination of manufacturer and model of the totem with the LED lights. For example, the totem can show manufacturer A and model M by illuminating LED 1 in blue while illuminating LED 3 in pink.

Furthermore, where each LED is assigned to a bit, the color of the LEDs can expand the amount of information that the LEDs can represent. For example, rather than one LED being assigned to one bit, an LED with a certain color may be assigned to one unit of information. Accordingly, if an LED light can illuminate 9 colors, the LED can be used to show the numbers 0-9 based on the illuminated colors. For example, when the LED is not illuminated, the wearable device can interpret it to be 0, while the color purple may represent the number 1, the color green may represent number 2, etc. As another examples, the LEDs can also represent letters in an alphabet (e.g., red being A, white being B, etc.).

The wearable device may be associated with a display and a camera (such as, e.g., the outward-facing imaging system 464). The camera can be used to capture the light sequence and then demodulate it to extract the usable information for automatic pairing. For example, the images captured by the camera can be analyzed using various computer vision algorithms described herein to extract the light patterns of the halo. The light patterns may be translated to a number, alphabet, word, etc., which can represent the device information of the totem. The wearable device can then use this device information for pairing with the totem.

Two totems may also be paired. For example, two friends may want to pair their totems to share their game controls while they are playing a video game using their respective wearable devices. In this example, the outward-facing imaging system of the first person's wearable device can obtain the light sequence on the second friend's totem (and vice versa). In first person's wearable device can extract device information of the second friend's totem and pass that information to the first friend's totem for pairing. In some implementations, a totem may also have a camera. Thus, a totem can capture the images of light patterns of another totem and achieve pairing of the two totems.

As another example, a wearable device (or an HMD) may be paired with two totems. The outward-facing imaging system can acquire images of the light patterns for one totem. Once the wearable device extracts the device information of one totem from its halo, the wearable device can pass the device information (of the wearable device or the other totem) to the other totem for pairing.

In addition to or in alternative to device pairing, similar techniques for communicating information by the totem can also be used to communicate other types of information. For example, the totem may communicate a user's profile information, or status of the totem to the wearable device using the light patterns illuminated by the totem.

Figure 20B:
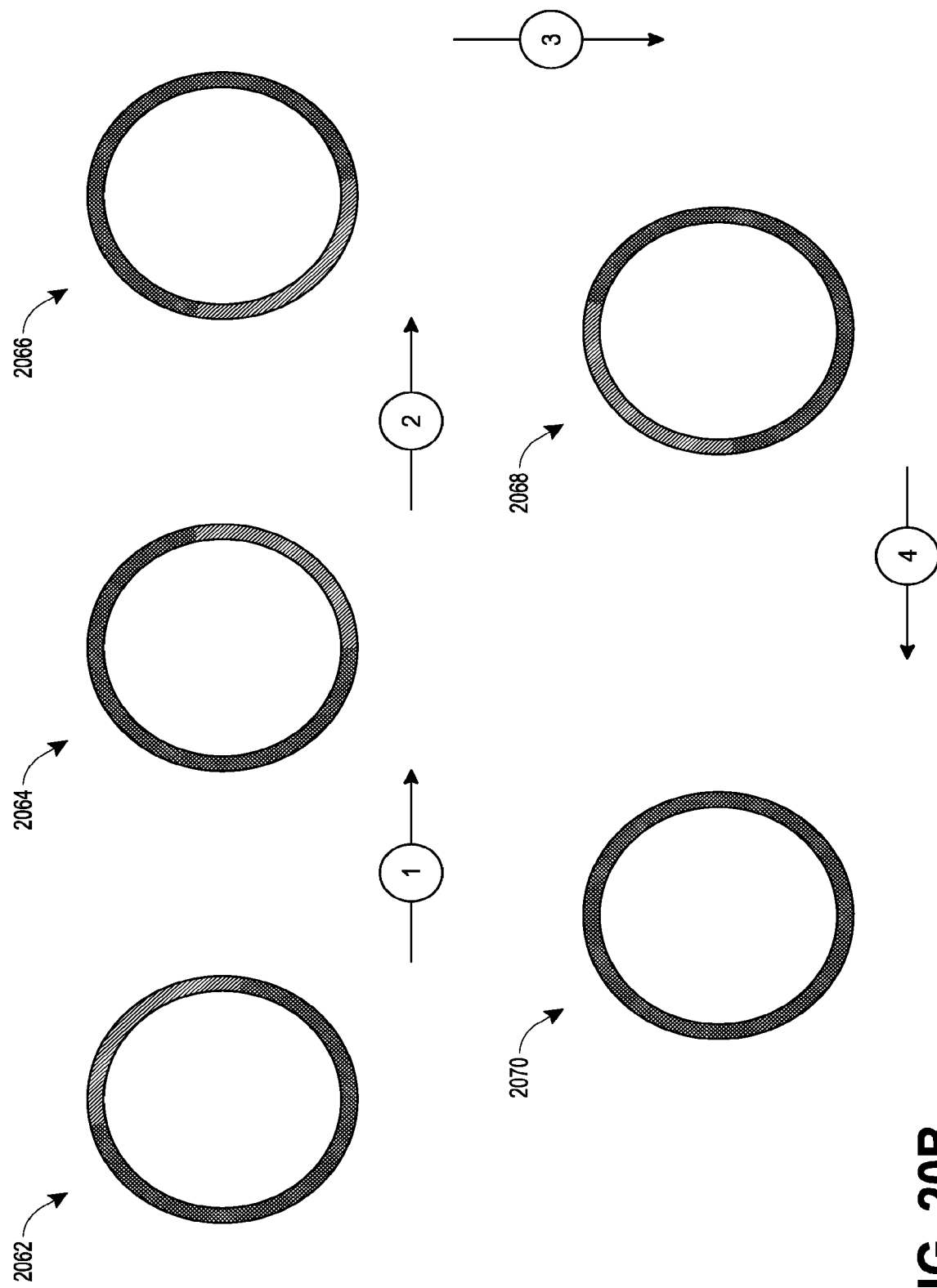

Advantageously, in some embodiments, the light placement or movement patterns of the totem can be used to indicate the progress of the wireless pairing between a totem and a wearable device or between two totems. FIGS. 20A and 20B illustrate examples of indicating a wireless (e.g., Bluetooth or WiFi) pairing process with a halo. The light patterns illustrated in these two figure can be used to show the progress of a device pairing process via wireless communications (e.g., where a totem or device broadcasts it device information to other devices wirelessly) or through the light patterns described with reference to FIG. 14B.

FIG. 20A shows a totem 2020 which can have a touchpad 2022 and a display region 2026. The totem 2020 may be an example of the totem 1200 and the touchpad 2022 may be an embodiment of the touchpad 1260. The display region 2026 may include a ring of LEDs and a light guide diffusing the light emitted by the LEDs. In some embodiments, the user can actuate the display region 2026.

The display region 2026 can display a halo 2024. A portion of the halo may be in the dark blue color. As shown in the process 2012, the totem can play a spin animation of the dark blue portion clockwise. Once the totem is paired, the totem can present a dark blue halo with a pulse animation. An example of the animations is described with reference to FIG. 20B. The totem may start the spin animation by displaying the pattern 2062. While the wireless pairing is in progress, the totem can present the patterns 2064, 2066, and 2068 sequentially as illustrated by arrows 1, 2, and 3. The totem can play the pattern 2062 again after the pattern 2068 if the pairing is still ongoing. If the pairing has completed successfully, the totem can present the pattern 2070 which can provide a visual indication to the user.

Although these examples are described with reference to pairing a totem, similar techniques can also be used for pairing other user input devices 466 or devices with display or illumination components. For example, the techniques can be applied to pair two or more of: a smartwatch, a smartphone, a wearable device, a totem, a tablet, a computer, a television, a camera, a peripheral device, an appliance, or other devices that have image recognition and processing capacities. As an example of pairing between a smartphone and the totem, the smartphone can use its camera to capture and analyze the illumination patterns on the totem. As another example, a wearable device may be paired with a smartwatch where the wearable device can capture and analyze a pattern displayed by the smartwatch (e.g., on a display screen of the smartwatch). The techniques described herein can further be applied to various types of wireless pairings such as Bluetooth pairing, WiFi pairing (e.g., Wi-Fi Direct™), or other types of wireless pairings. As an example of Bluetooth pairing, when the totem is in discoverable mode, the totem can display a light pattern indicating that it is in the discoverable mode. The wearable device can capture this light pattern and complete the pairing when the wearable device is also in the discoverable mode. When the light pattern encodes a triggering message, the wearable device can automatically enter the discoverable mode upon detection of the light pattern. As an example of wireless pairing, the totem can illuminate a light pattern indicating that a connection can be made to the totem. The wearable device can receive an invitation to connect to the totem upon detection of the light pattern. In addition to these examples of wireless pairings, the pairing techniques can also be applied to types of pairings other than the wireless pairing. For example, the techniques can also be used to share files among a group of user input devices at home via Ethernet connection.

Example Processes of Device Pairing with a Halo

Figure 20C:
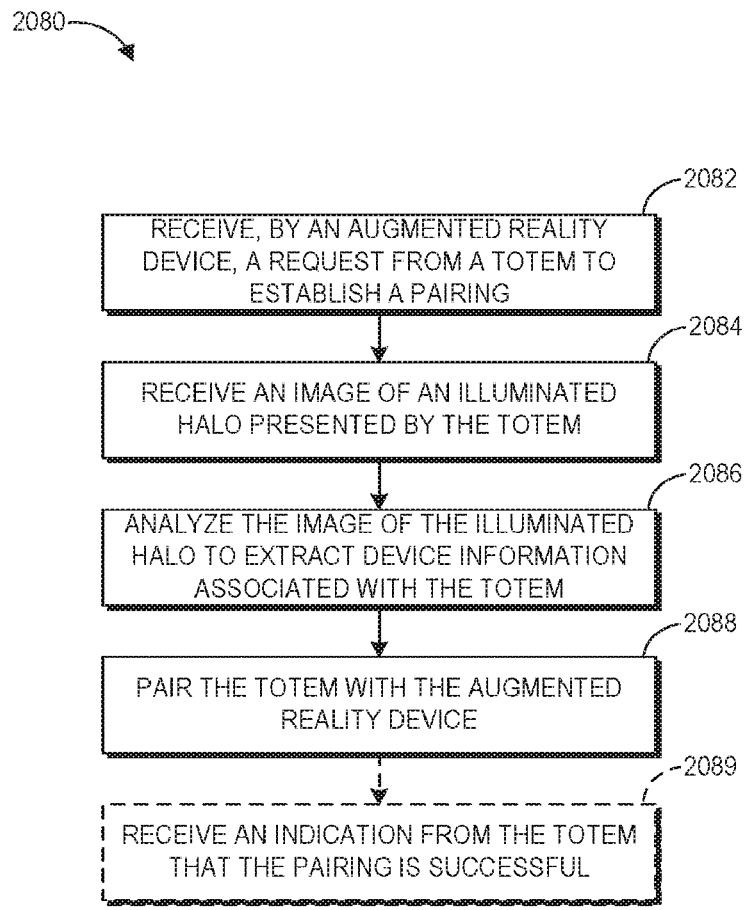
FIG. 20C illustrates an example process of device pairing with a halo.

FIG. 20C illustrates an example process 2080 of device pairing with a halo. The pairing may be between a wearable device and another device (e.g., a totem, a smartphone, a television, a smartwatch, etc.). The example process 2080 can be performed by a wearable device having an HMD and an outward-facing imaging system 464. The process 2080 can be used to assist pairing a totem with other devices, HMDs, etc.

At block 2082, the wearable device can receive a request from a totem to establish a pairing. For example, the totem can broadcast a signal to nearby devices for establishing a communication. The wearable device can receive the broadcast signal and identify the totem which has communicated the signal. As another example, the request may be a trigger message encoded in the light pattern of the totem.

At block 2084, the wearable device can receive an image of a halo presented by the totem. The image may be captured by the outward-facing imaging system 464. As described with reference to FIGS. 20A and 20B, the totem can use the halo to communicate device information needed for establishing the pairing via the light placement or movement patterns of the halo. For example, the halo may encode device information to a binary form.

At block 2086, the wearable device can analyze the image of the halo to extract device information. For example, the wearable device can use object recognizers 708*n* to identify the halo in the captured image. Where the halo encodes the device information in a binary form, the wearable device can convert the binary representation back to a decimal representation or an alphabetical representation of the device information.

At block 2088, based on the extracted device information, the wearable device can pair the totem with the wearable device. For example, the wearable device may add the device ID of the totem to a whitelist of devices with which the wearable device can share its information.

Optionally at block 2089, the wearable device can receive an indication from the totem showing that the pairing is successful. The indication may be an electro-magnetic signal. Additionally or alternatively, the totem can display a halo with a certain placement and movement indicating that the pairing is complete. For example, the totem can display a pulse animation of a circular blue halo. The outward-facing imaging system 464 can capture this halo in an image. Once the wearable device recognizes the light placement or movement pattern of the halo, the wearable device can determine that the pairing has been completed.

In some embodiments, the totem also provides a visual indication that the pairing is in progress. For example, the totem may present a halo with a rotating arc during the pairing. The rotating arc may be presented after the totem has provided the device information to the wearable device.

Although the examples are described herein with reference to a wearable device, in some embodiments, similar techniques can also be applied with another computing device. For example, the example process 2080 can be used to pair a cellphone configured to provide AR/VR/MR features with a totem.

Figure 20D:
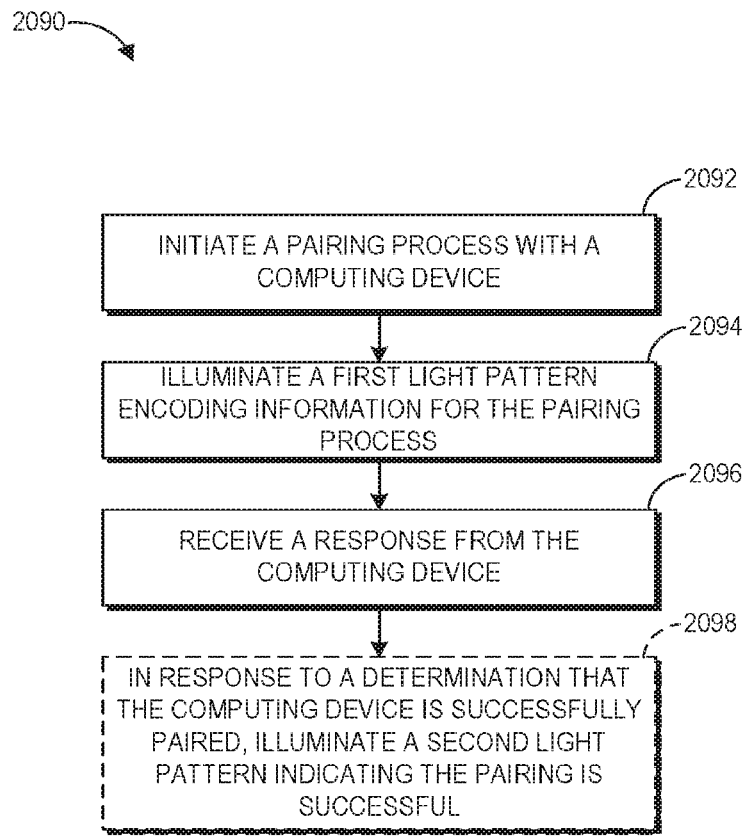
FIG. 20D illustrates another example process of device pairing with a halo.

FIG. 20D illustrates another example process 2090 of device pairing with a halo. The pairing may be between a totem and a computing device. The computing device may be a wearable device having a wearable display and an outward-facing imaging system 464, or other computing devices (e.g., a television, a smartwatch, a smartphone, tablet, another totem, etc.). The example process 2090 can be performed by the totem 1200.

At block 2092, the totem can initiate a pairing process with a computing device. For example, the totem can search for nearby devices that can be paired with the totem. The totem can also broadcast a signal and identify available devices for pairing based on the response to the signal received from other devices. The user can actuate the totem or the computing device to cause the totem to initiate the pairing process. For example, the user can press the home button 1256 for an extended period of time to cause the totem to enter a pairing process. In certain implementations, the totem can present a light pattern which indicates that the totem is now in the pairing mode. The light pattern may be captured by the computing device and can cause the computing device to enter into the pairing process with the totem.

At block 2094, the totem can illuminate a first light pattern encoding information for the pairing process 2094. The encoded information may include device information of the totem. The encoded information may also include a key for the computing device to connect with the totem. For example, the computing device can extract the key based on the light pattern extracted from the image and communicate the key back to the totem, via a wireless channel to achieve pairing. In some embodiments, the block 2092 may be optional. The computing device can automatically initiate the pairing process upon detection of the first light pattern in the block 2094.

At block 2096, the totem can receive a response from the computing device. The response may be the device information of the computing device. In some situations, the response may include a request for more information from the totem. The computing device can also provide other information in the response, such as, network communication information (e.g., a network port, an encryption standard, or a communication protocol) that the totem can use to communicate with the computing device. In some situations, the response can also include an indication that the computing device has added the totem to a list of accepted devices.

Optionally at block 2098, once the pairing process is completed, the totem can illuminate a second light pattern indicating that the pairing is successful. The second light pattern may be the pattern 2070 shown in FIG. 20B. In some embodiments, the totem can stop illuminating to indicate that the pairing has completed. Although the example process 2090 has been described above as being performed by a totem, it is to be understood that the example process 2090 can be performed by another device (e.g., a smartphone, a smartwatch, a computer, etc.).

Examples of Using Light Patterns of a Halo to Provide a Cue for an Object's Status The placement and movement of a halo's light patterns can be used to as a cue for indicating the status of an object. For example, certain light placement or movement patterns can be used to indicate whether a user has turned the totem on or off, whether the totem is in sleep mode, or whether the battery charging status of the totem. Non-limiting, illustrative examples are described below.

Figure 21A:
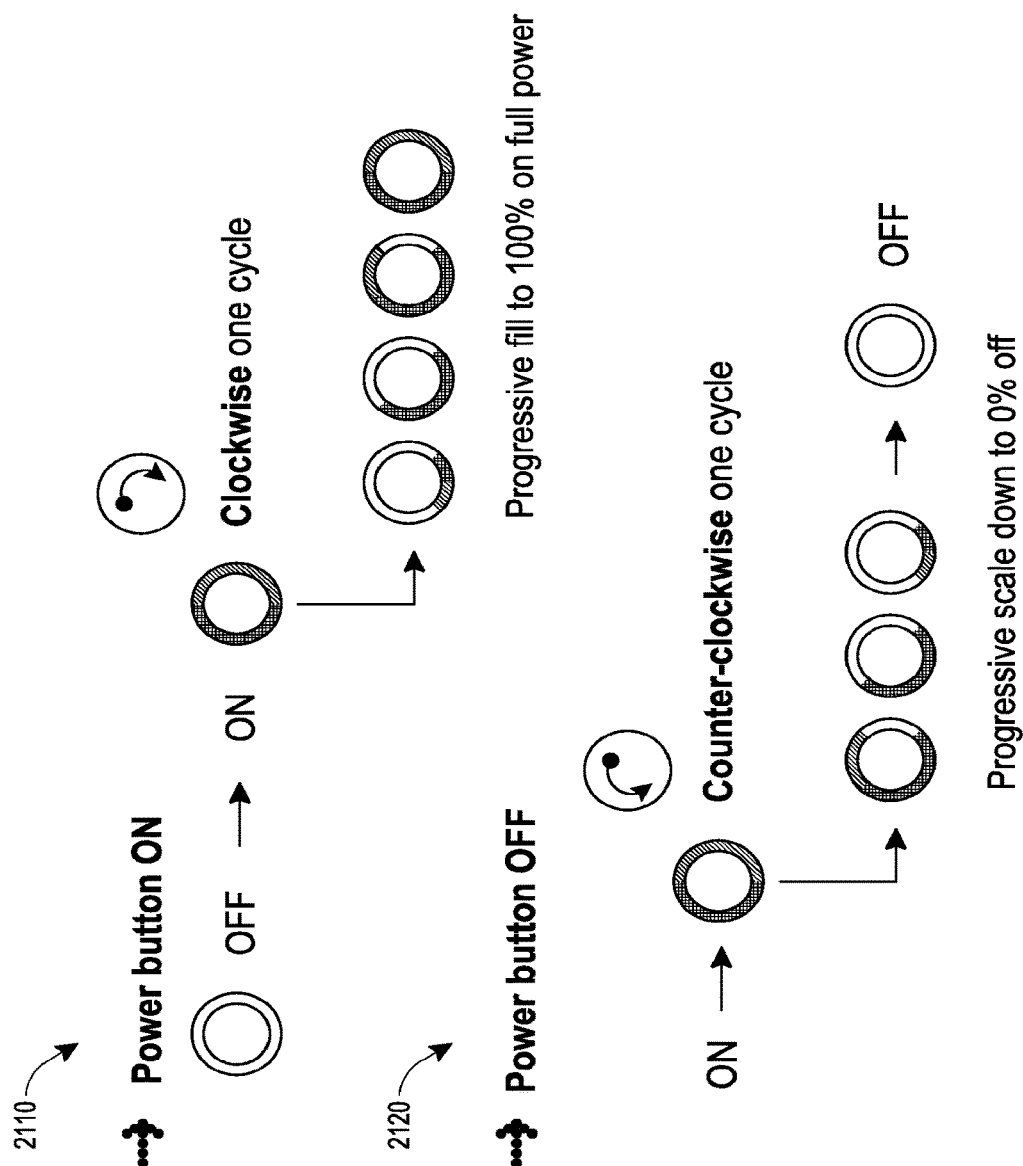
FIG. 21A illustrates an example of indicating the status of the totem.

FIG. 21A illustrates an example of indicating the status of the totem. As shown in the process 2110), when the power button is turned from off to on, the totem can present a portion of the halo and progressively fill the rest of the portions until the totem is fully turned on. The totem can also rotate the halo clockwise for one cycle during the power on process.

When the power button is switched from on to off, the totem can present (as illustrated in the process 2120) a full halo and rotate the halo counter-clockwise for one cycle. The totem can also progressively hide more portions of the halo until the totem is completely powered off (when the totem will no longer present a halo).

The halo color palette can be selected to be visually pleasing to users. Different color palettes can be used for different system functions, e.g., a startup color palette when the system is powered up (see, e.g., the process 2110 in FIG. 21A) and a shutdown color palette when the system is powered down (e.g., the process 2120 in FIG. 21A). For example, the startup color palette can represent colors typically seen during sunrise, and the shutdown color palette can represent colors typically seen during sunset. Other color palettes can be used for other system functions (e.g., charging or battery status or a sleep-idle mode, shown in FIGS. 21C, 21D). Color palettes can include colors, grayscales, illumination levels, etc. Illumination patterns can include illumination information that is communicated to a light source controller (which might be a controller disposed on the touch board 1394c) used to control the brightness of the totem light sources (e.g., LEDs 1383a, 1394a). The illumination information can include a color palette, timings (or rates of change) of when, for how long, and at what brightness level each of the LEDs (including individual colors producible by the LED) are illuminated, etc. Some LEDs may include additional or different control functionality, e.g., RGBA, which includes RGB plus an Alpha channel that indicates how opaque each pixel is and permits the totem to perform alpha compositing (allowing the appearance of partial or full transparency). The illumination information can include such additional or different control functionality, depending on the choice of light source used in the totem.

There can be an enormous variety of color palettes that can be displayed by RGB LEDs (e.g., where, commonly, each color can be set to 256 values, from 0 to 255). Color palettes can be selected for one or more of the halos described herein on the basis of any of a variety of different factors, e.g., user characteristics, contextual information, device usage or status, system functionality, etc.

The halo illumination pattern can include gradients in colors, shading, hues, etc. For example, due to the limited number of light sources in the totem (e.g., 12 RGB LEDs), varying the brightness of the colored light source can be used to provide a desired gradient (in color or intensity). A gradient can provide the visual illusion of intermediate endings or fadings out of an illumination pattern. The gradient can be provided by adjusting the brightness of the light sources dynamically (for time-varying illumination patterns). As an example, for a totem with 12 LEDs positioned at hours of the clock, an illumination pattern starting at 4 o'clock that extends 45 degrees toward 6 o'clock, with a gradient at the 6 o'clock end of the arc, could have LED brightness values set as: LEDs 1-3, brightness 0.0, LED 4, brightness 1.0, LED 5 brightness 1.0, LED 6 brightness 0.5, LEDs 7-12, brightness 0.0.

Other shutdown processes can involve user interaction with the totem, to confirm that the user wants to perform a shutdown operation (e.g., to shutdown, suspend, or restart the wearable device 200). For example, the display 220 of the wearable system 200 can display to the user a shutdown user interface when shutdown is selected by the user. In one example, the shutdown user interface displays a circular ring (suggestive of the circular light guide 1264 on the totem 1200) and a textual indication that the user is to move his or her thumb on the totem's touchpad 1260 to confirm the shutdown operation. For example, the user interface may display "Complete Circle to Power Off" and the circular ring may include an animation indicating the user is to move their thumb (say) clockwise around the touchpad 1260. If the user presses the home button 1256, the shutdown operation may be halted and the shutdown user interface may fade out.

If the user wants to complete the shutdown operation, the user can follow the displayed directions and move his or her thumb in a circular, clockwise path around the touchpad 1260. As the user does so, the light guide 1264 can illuminate to create an arc that follows the thumb's motion (and optionally, the display 220 can display an animated graphic showing progress around the circular ring). If the user's finger completes a full circle (confirming the shutdown operation), a haptic "bump" can be performed by the totem 1200 to provide the user with tactile feedback that the shutdown operation has been started (optionally, the system 200 can output an audio sound). The display 220 of the wearable system 200 can display a shutdown screen to the user and begin the shutdown operation. The light guide 1264 of the totem 1200 can display a shutdown illumination pattern (e.g., as shown in FIG. 21B).

Figure 21B:
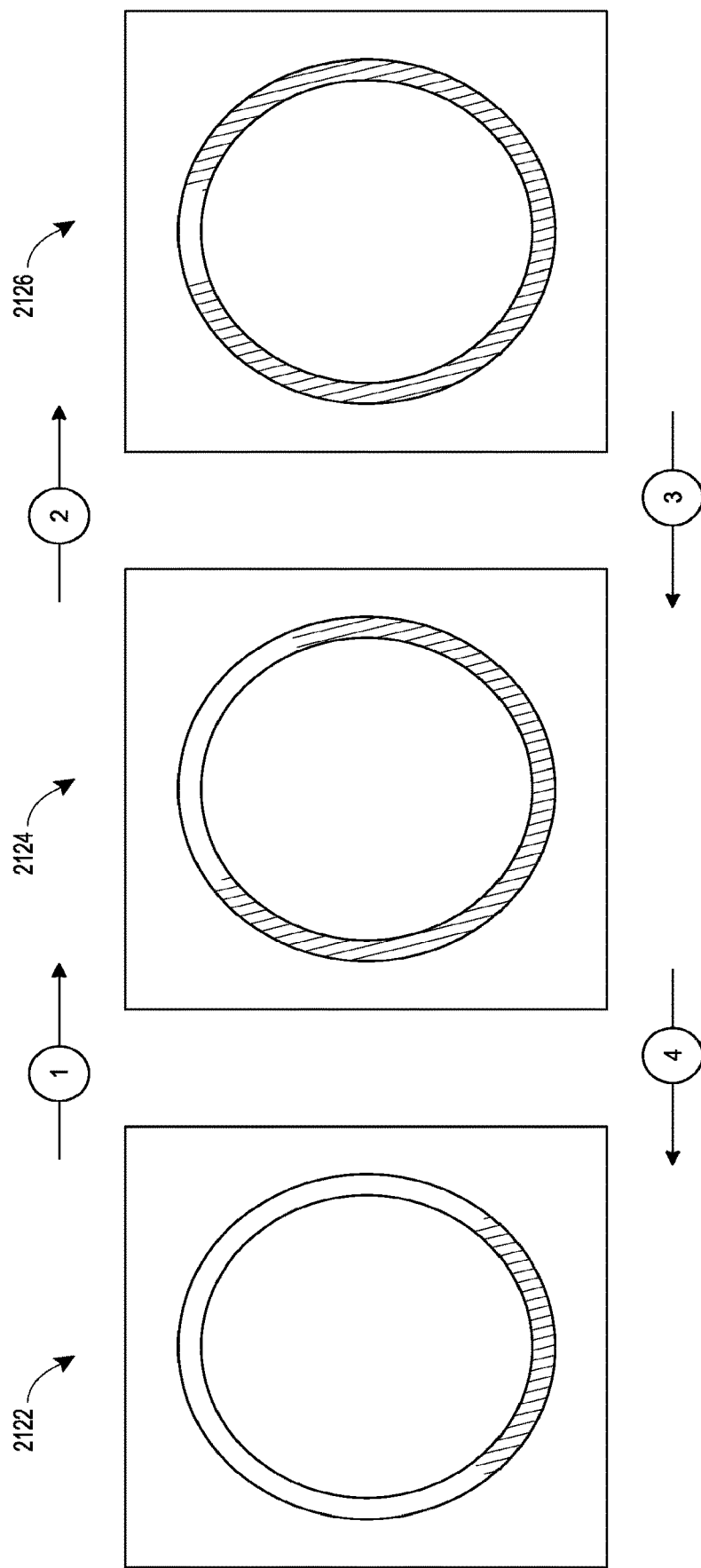
FIG. 21B illustrates an example of light placement or movement patterns during a power on and off process.

FIG. 21B illustrates an example of light placement or movement patterns of the halo during a power on and off process. During the power on process, the halo pattern can move from the pattern 2122 to the pattern 2124 and then to the pattern 2126 as shown by the arrows 1 and 2. During this process, the arc of the halo (which may be illuminated in a color, e.g. a yellow color) can get progressively longer in length and brighter in color.

On the other hand, during the power off process, the halo patterns can move from patterns 2126 to 2124 then to 2122 as shown by the arrows 3 and 4. In this process, the shape of the halo gradually can reduce from a full ring to a small arc.

Figures 21C, 21D:
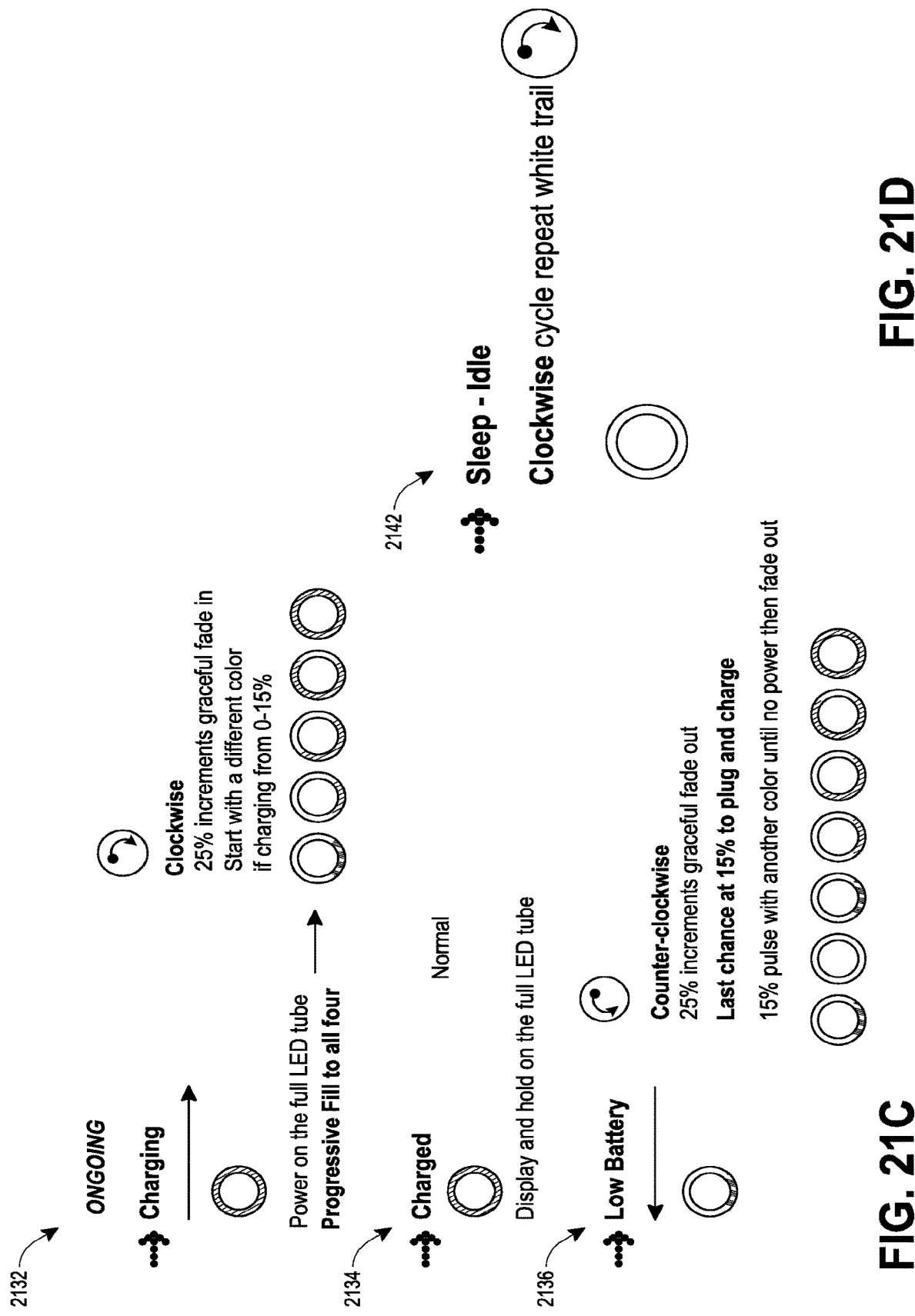
FIG. 21C illustrates an example of light placement or movement patterns which show a battery charging status.
FIG. 21D illustrates an example light pattern when the totem has entered into a sleep mode.

Additionally or alternatively, the halo can be configured to show the charging status of the battery 1720 of the totem, where the amount of battery may correspond to the size of the portion of the halo being displayed. FIG. 21C illustrates an example of placement and movement of light patterns which show a battery charging status. Process 2132 illustrates an animation sequence of the halo when the battery 1720 is charging. For example, the halo may be divided into four quadrants. Each quadrant may be associated with one or more LED lights. The totem can progressively fill all four quadrants by illuminating the LEDs in each quadrant. In certain implementations, rather than filling 1 quadrant at a time, the totem can gradually illuminate the LEDs to track the percentage of the battery remaining. For example, when there is 30% of the battery remaining, the totem can light up 30% of the LEDs.

If the battery is below 15% (for example) when the charging begins, the totem can present a halo with a first color (e.g., an orange color) in one of the four quadrants. Once the battery has reached 25% (for example), the totem can change the color of the halo from the first color to a second color (e.g., from orange to green). When the battery has reached 50% (for example), the totem can illuminated the portion of the halo (e.g., in the second color) associated with the next quadrant in the clockwise direction. The totem can continue fading in other quadrants as the totem is being charged. When the battery is fully charged, the totem can present a halo in the second color with all four quadrants illuminated (as shown in the process 2134).

While the battery is being consumed, the shape of the halo may initially be a full circle. The totem can gradually fade the halo out in the counter-clockwise direction as illustrated in the process 2136 as the amount of power decreases. In some embodiments, when there is only 15% (for example) of the battery remaining, the totem may turn the remaining portion of the halo to a third color (e.g., a red color) and play a pulsing animation until no power is remaining (where the totem can play a fade-out animation of the halo).

The halo can also be used to show whether the totem has entered into a sleep mode. FIG. 21D illustrates an example halo pattern when the totem has entered into the sleep mode. As indicated in the process 2142, when the totem has become idle because it has not detected user interactions within a threshold period of time, the totem can present a halo in the form of a trail (e.g., a white trail). The totem can also repeat the trail in a clockwise cycle.

Example Processes of Indicating a Status of a Totem with a Halo

Figure 21E:
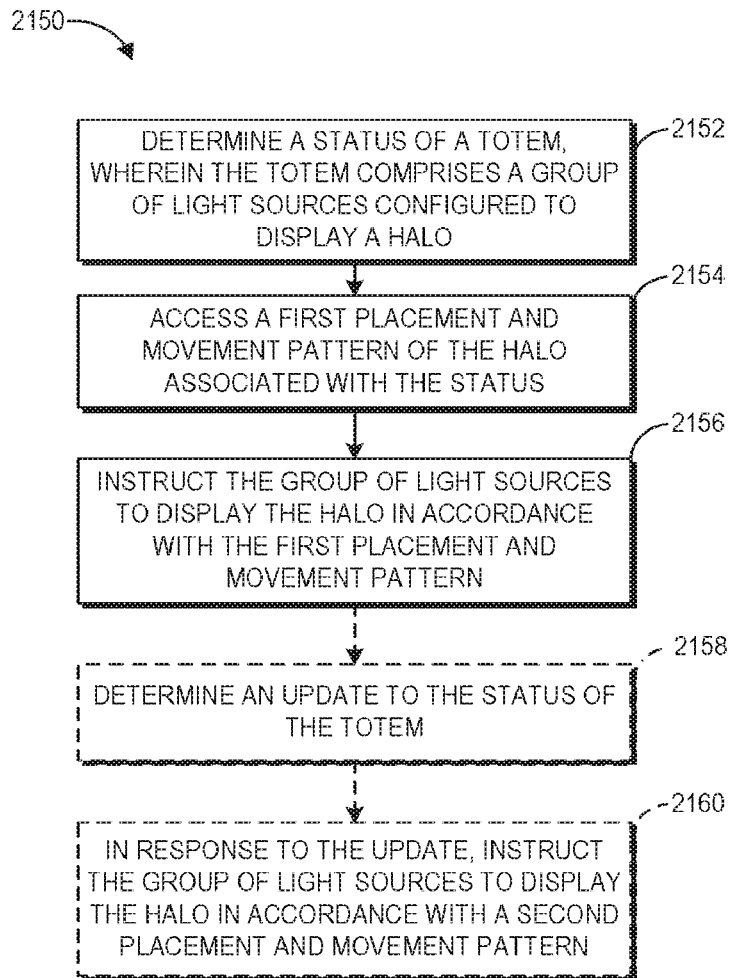
FIG. 21E illustrates an example process of indicating a status of a totem based on light placement or movement patterns.

FIG. 21E illustrates an example process of indicating a status of a totem based on light placement or movement patterns. The process 2150 in FIG. 21E can be performed by one or more components of the wearable system described herein. For example, the process 2150 can be performed by a totem or a wearable device.

At block 2152, the wearable system can determine a status of a totem. The totem can include a group of light sources (e.g., LEDs) configured to display a halo. The halo may be used to indicate the status of the totem. The status may include the battery status of the totem, such as, e.g., whether the totem is powered on/off, whether the totem is in a sleep mode, or the progress of battery charging or consumption.

At block 2154, the wearable system can access a first light pattern of the halo. The first light pattern may specify a placement or movement pattern for the halo. The first light pattern can be associated with the current status of the totem. For example, when the battery is currently low, the light placement or movement pattern of the halo may be a red arc around the 6 o'clock position.

At block 2156, the wearable system can instruct the group of LEDS to display the halo in accordance with the first light pattern. Continue with the previous example, the wearable system can generate and send an instruction to the LEDs located near the 6 o'clock positions (such as, e.g., the LED 9, the LED 10, and the LED 11 in the MUX 3 shown in FIG. 14B) to illuminate a red light.

The wearable system can continuously monitor the status of the totem. Optionally at block 2158, the wearable system can determine whether there is an update to the status. For example, while the battery of the totem may previously be less than 15%, the user may have plugged the totem into a power source for charging. Accordingly, the amount of battery may gradually increase.

At the optional block 2160, in response to the update, the wearable system can instruct the group of LEDs to display the halo in accordance with a light pattern. The second light pattern is associated with the update. For example, once the totem has entered into the charging mode, the color of the halo may be changed from red to green.

Although the examples herein are described with reference to indicating the status of the totem, similar techniques can also be used to indicate the status of other components of the totem such as the wearable display or the battery pack.

Examples of Using Light Patterns as a Cue for User Interactions

Figure 22B:
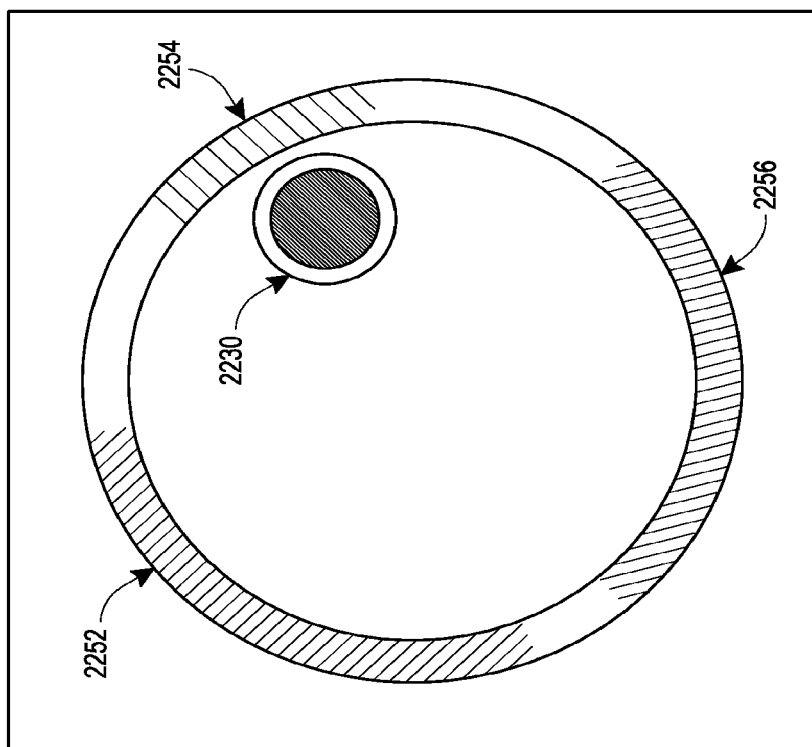

In addition to or in alternative to providing information on device status, the halo can also be used as a cue to indicate a current user interaction or to guide a user's interaction. FIGS. 22A and 22B illustrate example light placement or movement patterns that are used as cues for user interactions. FIG. 22A displays halo patterns 2210 and 2220. The halo patterns may be display by a light guide around a touch surface of a totem. The user can actuate the touch surface, for example, using his or her thumb 2230. The halo pattern 2210 can include an arc 2222 (which may be illuminated in a purple pink color) on the left side of the light guide. The length and brightness of the arc 2222 may reflect the distance between the user's finger and the portion of the light guide displaying the arc 2222.

As an example of indicating a current user's interactions with the totem, when the user's thumb is at position 2212, the halo pattern 2210 may be shown. The portion of the arc 2222 that is closest to the thumb 2230 may be the brightest. The brightness of the other portions of the arc may gradually reduce as they are farther away from the thumb 2230 and eventually transitioned into black (e.g., where the corresponding LEDs are turned off). In this example, the user can actuate the touch surface with a swipe gesture. For example, the user can swipe his or her thumb leftward. As the user moves his or her thumb 2230 leftward toward the arc 2222 (illustrated by the arrow 2214), the length of the arc 222 may increase from less than half of a circle to more than half of the circle). The brightness of the arc 2222 can also increase due to the reduced distance between the thumb 2230 and the arc 2222.

As another example, in FIG. 22B, the halo associated with the pattern 2250 can include three arcs 2252, 2254, 2256.

The arc 2252 is illustrated in a first pattern corresponding to a first color (which, e.g., may be a red), the arc 2254 is illustrated in a second pattern corresponding to a second color (which, e.g., may be blue), and the arc 2256 is illustrated in a third pattern corresponding to a third color (which, e.g., may be yellow). With reference to FIG. 14B, the arc 2252 may be illuminated by LED 1, LED 2, and LED 3; the arc 2254 may be illuminated by LED 5, LED 6, and LED 7; and the arc 2256 may be illuminated by LED 9, LED 10, and LED 11.

The pattern 2250 may be associated with a 3-way d-pad, with each arc being associated with a user interface operation. For example, the user can tap the region near the arc 2252 to move a virtual object leftward and tap the region near the arc 2254 to move the virtual object rightward. The user can also tap the region near the arc 2256 to select or release the virtual object. When the user's thumb 2230 is near an arc, the length of the arc may decrease while the brightness of the arc may increase. For example, when the user's thumb 2230 is near the arc 2254, the totem may turn off the LED 5 and LED 7 (shown in FIG. 14B) to reduce the size of the arc 2254. This change to the light placement or movement pattern of the halo can provide an indication that the user has initiated (or is about to initiate) a leftward movement of the virtual object. When the user's thumb moves away from the arc 2254, the totem may re-illuminate the LED 5 and LED 7 to increase the size of the arc 2254.

A totem can simulate functions of various user input devices, such as, e.g. a d-pad, a touch device, a 6DOF controller, etc. The light placement or movement patterns of the halo can be used to indicate the type of user input device that the totem is currently being used as or to indicate available user interface interactions. For example, while a user is browsing a webpage using the 3D display, the totem can be used as a touch device which supports a left/right swipe gesture. To provide an indication to the user that the swipe gesture is available, the totem can display the patterns shown in FIG. 22A.

In certain implementations, the wearable system can automatically select a suitable user input device configuration based on the contextual information. For example, the user may want to use a 3-way d-pad to move virtual objects in and out of the FOV and to select a virtual object. Accordingly, when the wearable device detects that the user is interacting with the virtual objects in his or her environment, the wearable device can instruct the totem to enable 3-way d-pad and present the halo pattern 2250 to inform the user that the 3-way d-pad is available.

FIG. 22C illustrates another example of using light patterns associated with a halo to provide an indication of an available user interface operation. The totem in FIG. 22C can be configured to serve as a star-shaped d-pad. To inform the user that the totem is currently being used as a star-shaped d-pad, the totem may light up the LED 2, LED 4, LED 6, LED 8, LED 10, and LED 0 in FIG. 14B. As an example, when a user selects a text box on the webpage, the totem may present the pattern 2260 to show that the user can use the star-shaped d-pad for text input. When the user actuates a region near an LED, the LED may display a brighter color to indicate that the user is actuating the region. For example, when the user actuates the region near the LED 0 (as illustrated in the pattern 2270), the totem may instruct the LED 0 to emit a brighter light.

In some embodiments, the totem may use the totem to inform the user that the user is performing a wrong user interaction or provide an indication of a correct/recommended user interaction. FIG. 23 illustrates an example of using a light pattern as an alert to indicate an incorrect or improper user operation. The user's thumb 2230 may initially be at the position 2312 on a touch surface. The touch surface may be surrounded by a light guide which can display the halo 2222. When user's thumb is at the position 2312, the light guide can display the halo pattern 2310. The user may need to move an object leftward by swiping to the left (e.g., by moving his or her thumb 2230 closer to the halo 2222. However, the user actually swipes rightward (as indicated by the arrow 2232), which is the incorrect direction to perform the desired operation of moving the object leftward. As a result the user's thumb is now at the position 2314. To remind the user that he or she needs to swipe to the left to properly move the object, the light guide may show the halo pattern 2320 where the halo 2222 appears to be longer in length and brighter in color. This can draw the user's attention to make sure that he or she moves his or her thumb 2230 in the correct direction.

Figure 24A:
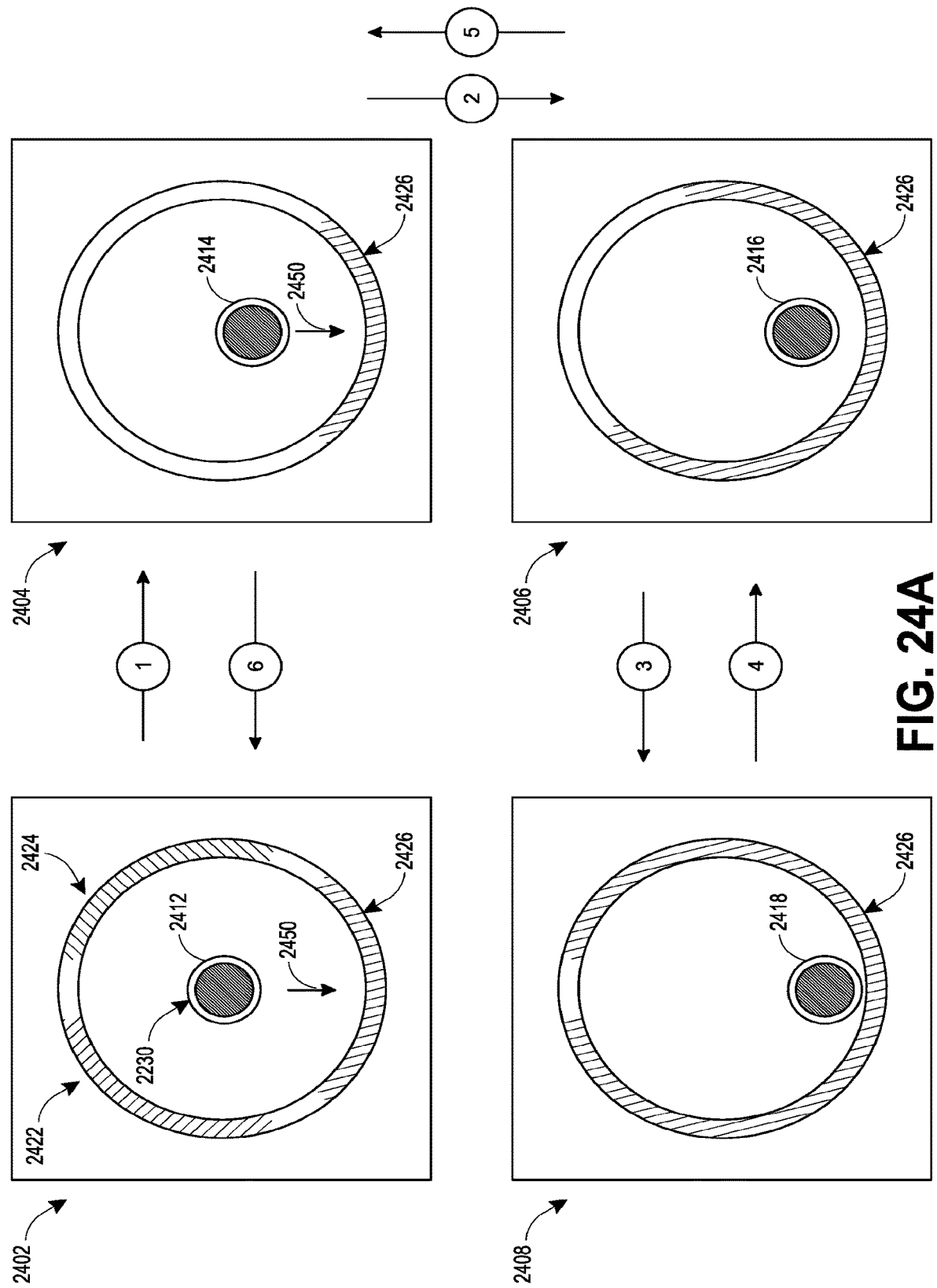
FIG. 24A illustrates an example light pattern for a swipe gesture.
Figure 24B:
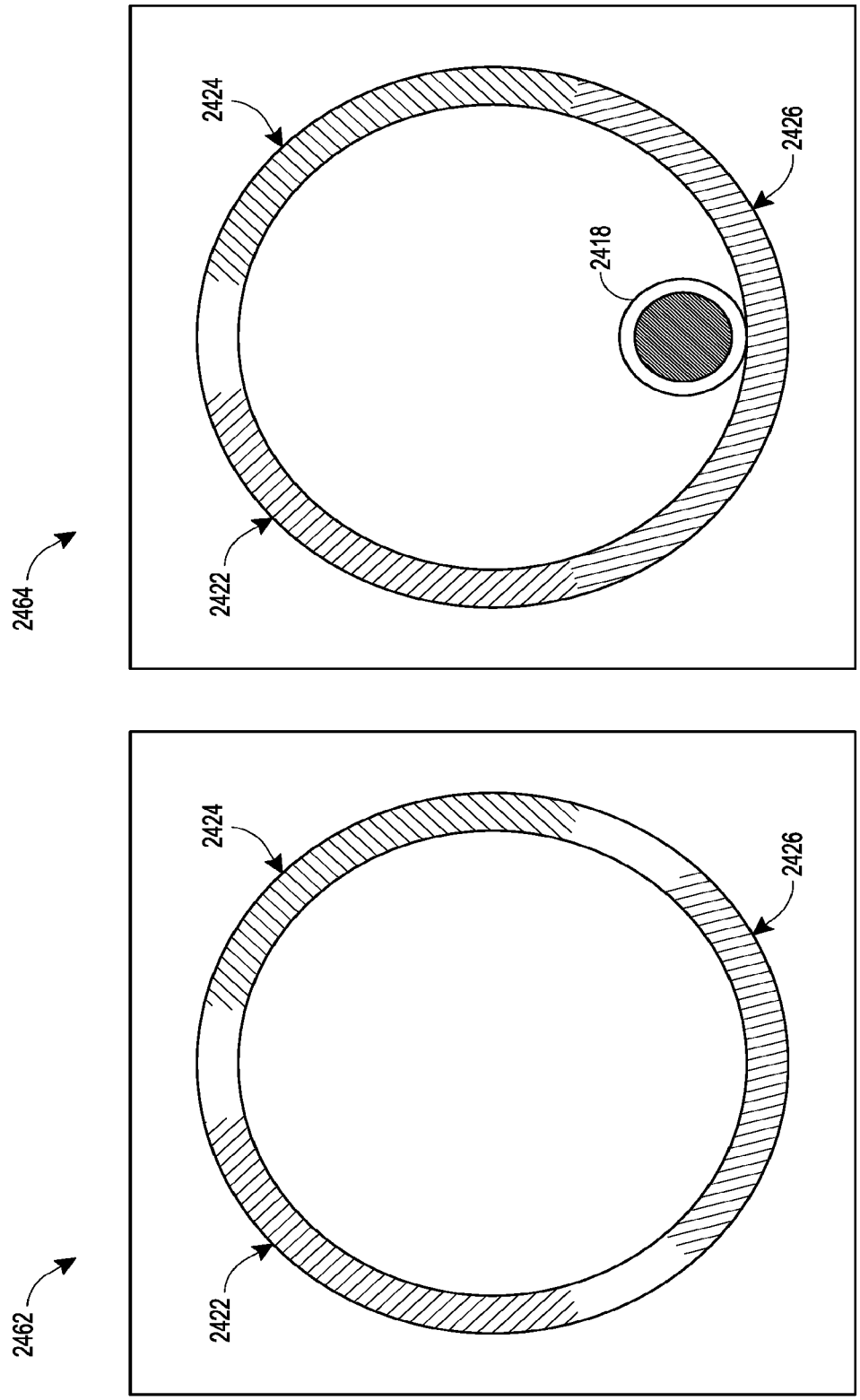
FIG. 24B illustrates an example light pattern for a touch gesture.

The patterns of the halo can vary depending on the type of user interaction. FIGS. 24A and 24B illustrate example patterns for a swipe gesture and a touch gesture respectively. The touchpad in FIGS. 24A and 24B can include a light guide which displays a halo. The touchpad can also include a touch surface which is surrounded by the light guide. The touch surface can receive user input such as a swipe gesture or a touch gesture.

The halo shown in FIGS. 24A and 24B can have 3 arcs 2422 (illuminated in a first color, e.g., red), 2424 (illuminated in a second color e.g., blue), and 2426 (illuminated in a third color, e.g., yellow). With reference to FIG. 14B, the arc 2422 may correspond to the LED 1, LED 2, and LED 3; the arc 2424 may correspond to the LED 5, LED 6, and LED 7; and the arc 2426 may correspond to the LED 9, LED 10, and LED 11.

The user's thumb 2230 may initially be at the position 2412 of the touch surface. The light guide can accordingly display the pattern 2402 for the halo. As indicated by the downward arrow 2450, the user can swipe downward toward the arc 2426. For example, the user can move his or her thumb 2230 from the position 2412 to the position 2414 (as shown by arrow 1). Upon detecting of the user's movement, the totem can dim the display of the arc 2422 and 2424 as shown in the pattern 2404. The user can further move his or her thumb downward as indicated by the arrow 2. In the pattern 2406, when the user's thumb reaches the position 2416, the totem can increase the brightness and length of the arc 2426. For example, the brightness of the LED 9, LED 10, and the LED 11 may increase. The totem can also illuminate the LED 0 and LED 8 (in the third color) to increase the length of the arc 2426. The totem can further illuminate the LED 7 in the third color (rather than the second color as shown in arc 2424) and illuminate the LED 1 in the third color (rather than the first color as shown in arc 2422). As user moves his or her thumb 2230 even further downward as shown by the arrow 3, all LEDs (except LED 4 which is on the opposite side of LED 10) can illuminate a light in the third color to show the expansion of the arc 2426 in the third color. On the other hand, when the user's thumb 2230 moves away from the arc 2426, the totem may display the patterns in accordance with the arrows 4, 5, and 6. Under this sequence, the size of the arc 2426 can gradually shrink and the other arcs 2422 and 2424 can gradually fade in.

The user can also actuate the touchpad in FIG. 24A with a touch gesture. FIG. 24B illustrates the halo patterns when the user actuates the touchpad with the touch gesture. The totem may initially display 3 arcs 2422, 2424, and 2426 as shown in pattern 2462. When the user touches a region close to the yellow arc 2426, the length of the arc 2426 may increase. As illustrated in the pattern 2464, when the user actuates the totem with a touch gesture at position 2418, the LED 0 and 8 may be illuminated (in the third color) to show the increased length. However, the arc 2426 will not expand to cover up other arcs (e.g., arcs 2422 and 2424) as compared to the pattern 2408 (which can correspond to a swipe gesture), even though the user's thumb is at the same position 2418.

Example Process of Providing a Cue for User Interactions on a Totem

Figure 24C:
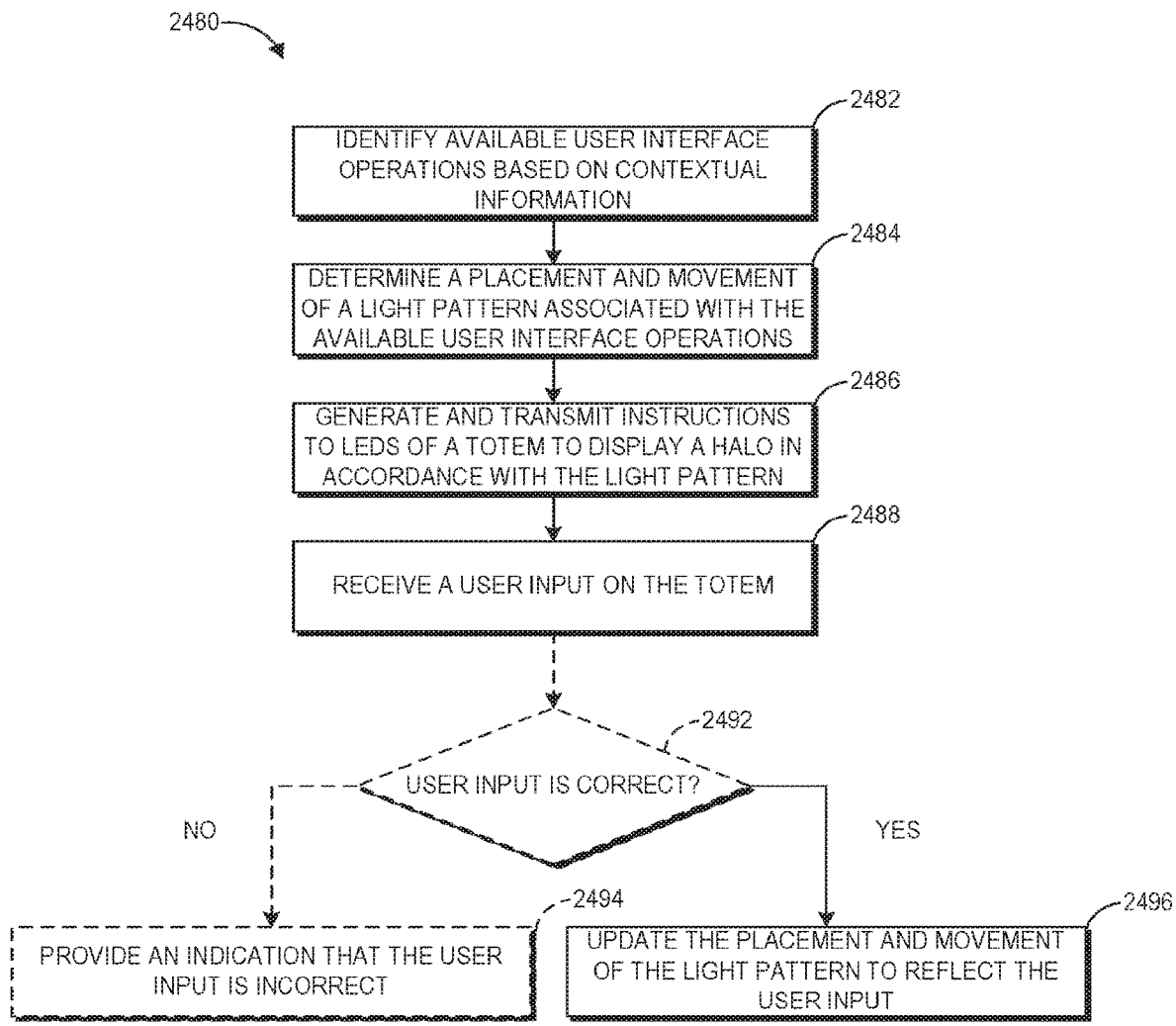
FIG. 24C illustrates an example process of providing a cue for user interactions on a totem.

FIG. 24C illustrates an example process of providing a cue for user interactions on a totem. The example process 2480 may be performed by components of the wearable systems, such as, e.g., a totem or a wearable device.

At block 2482, the wearable system can identify available user interface operations based on contextual information. For example, the wearable system can determine what types of user interactions are available and map these types of user interactions to the interactable regions of the totem. As an example, a browser can allow a user to scroll up/down, enlarge/shrink the size of a webpage, select an item on the browser, and move a cursor around within the browser. The wearable system can map the cursor movement and item selection to a first interactable region of the totem, where the user can swipe a touch surface to move the cursor and click the touch surface to select the item. The wearable system can also map the scrolling and resizing operations to a second interactable region. The second interactable region may surround the first interactable region. The second interactable region may simulate the functions of a d-pad, where the user can tap the up/down keys to scroll the webpage and tap the left/right keys to resize the webpage.

At block 2484, the wearable system can determine a placement or movement pattern of a halo associated with the available interface operations. Continuing with example above, the wearable system can display a halo with 4 arcs (as shown in FIG. 25B) to indicate that the totem has a second interactable region that the user can use as a d-pad.

At block 2486, the wearable system can generate and transit instructions to LEDs (shown in FIG. 14B) of a totem to display a halo in accordance with the light pattern. For example, where halo has 4 arcs, the wearable system can instruct the LED 1 to illuminate a blue color, LED 4 to illuminate a yellow color, LED 7 to illuminate a red color, and LED 10 to illuminate a green color.

At block 2488, the wearable system can receive a user input on the totem. For example, the totem can detect a swipe gesture or a touch gesture in the first interactable region or detect a tap gesture in the second interactable region. In some embodiments, the user input may also include actuating other components of the totem, such as the trigger 1212 or the home button 1256 (shown in FIG. 12) alone or in combination of user's poses (e.g., head pose or other body poses).

Optionally at block 2492, the wearable system can determine whether the user input is the correct input. The wearable system can make the determination based on the contextual information of the object with which the user is interacting. The wearable system can determine whether the user input belongs to the types of user inputs supported by the object. For example, a video recording application can allow user inputs via poses while a web browser can support a combination of swipe and touch gestures. Accordingly, when a user is browsing a webpage, the wearable system may not perform a user interface operation based on a change of the user's foot pose. As another example, one webpage may allow a user to view the web content but may not allow a user to input his or her comments. Accordingly, if the user tries to type a phrase, the wearable system may determine that the user's input is not the correct input because it is not supported by the webpage.

If the user input is not the correct input, optionally at block 2494, the wearable system can provide an indication that the user's input is incorrect. The indication may be provided in the form of visual, audio, haptic, or other feedback. For example, the totem can emphasize the correct input by providing a brighter color near the interactable region associated with the correct input. As another example, the totem may provide a vibration via a haptic actuator in the totem's body. As yet another example, the wearable system can provide an alert message via an HMD or via the speaker.

If the user input is the correct input, at block 2496, the wearable system can update the placement and movement of the light pattern to reflect the user input. For example, if a user taps the left side of the totem's touch surface, the totem may light up the LED near the user's tap. In some embodiments, once the totem receives the user's input, the totem can update the replacement and movement of the light pattern associated with the halo to reflect the user input, in addition to or in alternative to blocks 2492 and 2494.

Examples Interactions with Virtual Objects Using a Totem

The totem can include multiple interactable regions where each interactable region can be mapped to one or more types of user interactions or to a type of user input device. As described with reference to FIGS. 12A and 13A, in some embodiment, the totem have a first interactable region comprising a touch surface which can support touch events and gestures, such as e.g., a swipe gesture, and a second interactable region comprising a light guide. The light guide can illuminate a halo at 4 points around the touchpad or with 4 arcs each having a different color. This illumination pattern can show that the light guide is used as a d-pad. For example, the user can tap or press on the point of illumination to move a virtual object. The same user gesture can cause different user interface operations being performed depending whether the gesture is applied to the light guide or the touch surface (e.g., in the main center area of the touchpad). For example, the user may move a virtual object when user taps the light guide, but when the user taps the touch surface, the user may select the virtual object.

Figure 25A:
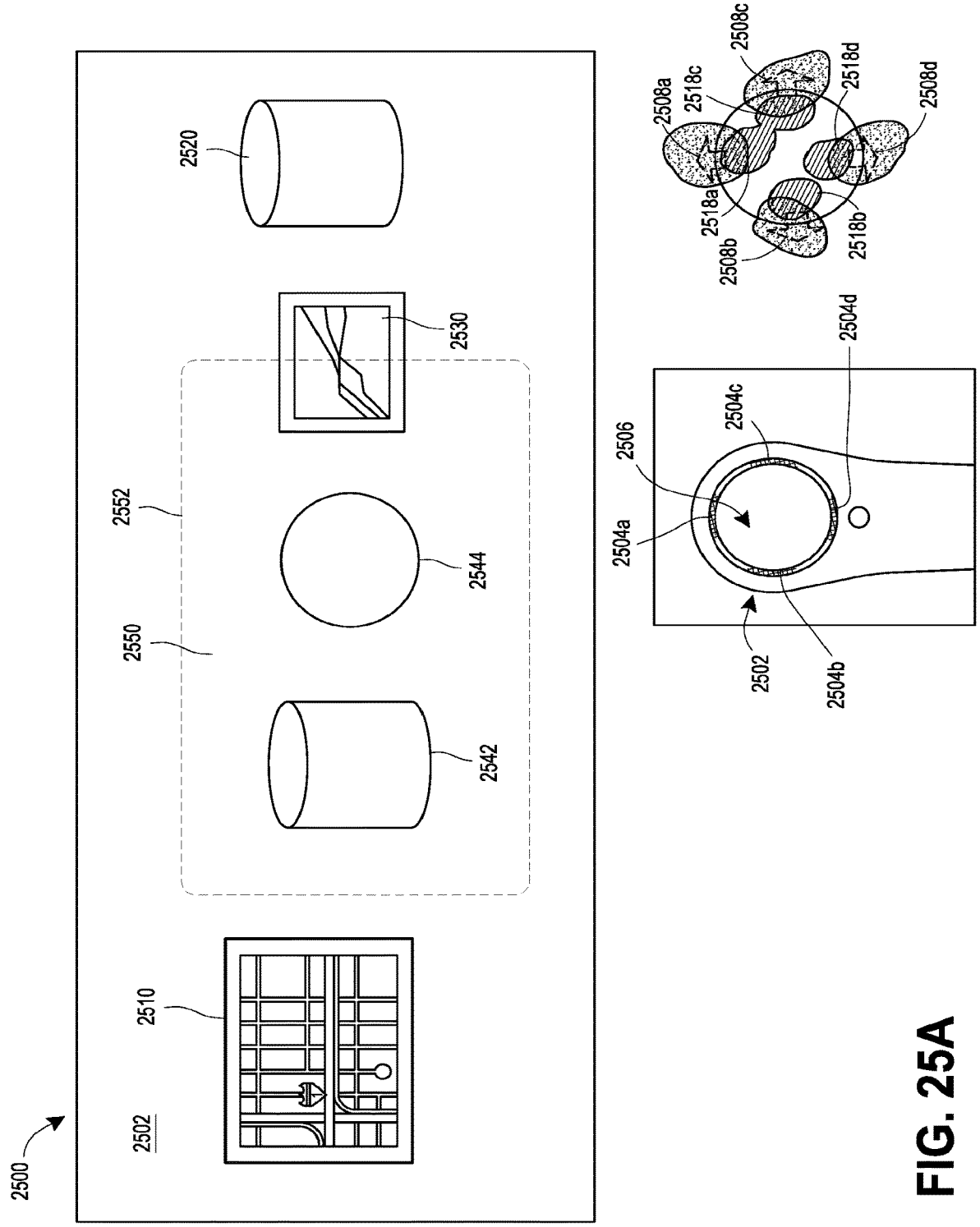
FIG. 25A illustrates an example interactive use of the light guide.

FIG. 25A illustrates an example interactive use of the light guide. The totem 2502 in FIG. 25A may be an example of the totem 1200 described herein. The totem 2502 can include a touchpad 2506 which can include a touch surface and a light guide, which can substantially surround the touch surface. The light guide can diffuse lights (e.g., emitted by LEDs underneath the light guide) to show a halo, which may include one or more arcs of a halo. In the example in FIG. 25A, the halo can include 4 arcs 2504a, 2504b, 2504c, and 2504d illuminated at 4 regions around the touch surface. The light guide can be interactable so as to receive user input (e.g., the user might depress a portion of the light guide). For example, the light guide can simulate the functions of a d-pad. The light guide can include an upward key 2508a, a right key 2508c, a down key 2508d, and a left key 2508b. The totem can provide visual indication on the locations of these keys. For example, the arc 2504a can correspond to the upward key 2508a; the arc 2504b can correspond to the left key 2508b; the arc 2504c can correspond to the right key 2508c, and the arc 2504d can correspond to the downward key 2508d.

A user can actuate the regions near the respective keys to perform user interface functions related to these keys. For example, a user can actuate the region 2518a to actuate the upward key 2508a; actuate the region 2518b to actuate the left key 2508b; actuate the region 2518c to actuate the right key 2508c; and actuate the region 2518d to actuate the downward key 2508d.

As an example of actuating the light guide, the user can move the virtual objects in and out of his or her FOV by actuating the light guide. Scene 2500 in FIG. 25A schematically illustrates an example of interacting with virtual objects in the FOV 2550 and the FOR 2502. As described with reference to FIG. 4, an FOR can comprise a portion of the environment around the user that is capable of being perceived by the user via the wearable system. The FOR 2502 can include a group of virtual objects (e.g. 2510, 2520, 2530, 2542, and 2544) which can be perceived by the user via a display 220. Within the FOR 2502, the portion of the world that a user perceives at a given time can be referred to as the FOV 2550 (e.g., the FOV 2550 may encompass the portion of the FOR that the user is currently looking toward). In the scene 2500, the FOV 2550 is schematically illustrated by the dashed line 2552. The user of the display can perceive multiple objects in the FOV 2550, such as the object 2542, the object 2544, and a portion of the object 2530. The FOV 2550 may correspond to the solid angle that is perceivable by the user when looking through the display such as, e.g., the stacked waveguide assembly 480 (FIG. 4) or the planar waveguide 600 (FIG. 6). As the user's pose changes (e.g., a head pose or an eye pose), the FOV 2550 will correspondingly change, and the objects within the FOV 2550 may also change. For example, the virtual object 2510 is initially outside the user's FOV 2550. If the user looks toward the virtual object 2510, the virtual object 2510 may move into the user's FOV 2550, and the virtual object 2530 may move outside the user's FOV 2550.

The user can actuate light guide to move virtual objects in and out of the FOV 2550 without changing his or her body poses. For example, the user can actuate the key 2508b to move the virtual objects in the FOV 2550 leftward. Accordingly, the virtual object 2530 may be moved entirely into the FOV 2550. As another example, the user can actuate the key 2508c to move virtual objects rightward and as a result, the virtual object 2510 may be moved into the FOV 2550 and the virtual object 2530 may be moved outside of the FOV.

Additionally or alternatively, the wearable system can assign a focus indicator to a virtual object in the FOV 2550 based on the user's direction of gaze or the location of the virtual object. For example, the wearable system can assign the focus indicator to a virtual object that intersects with the user's direction of gaze or to a virtual object that is closest to the center of the FOV. The focus indicator can comprise an aura (e.g., around the virtual object), a color, a perceived size or depth change (e.g., causing the virtual object to appear closer and/or larger when selected), or other visual effects which draw the user's attention. The focus indicator can also include audible or tactile effects such as vibrations, ring tones, beeps, etc. For example, the wearable system may initially assign the focus indicator to the virtual object 2544. When the user taps at the region 2518c, the user can actuate the key 2508c. Accordingly, the wearable system can move the virtual objects rightward to transport the focus indicator from the object 2544 to the object 2542, and the wearable system can move the object 2510 into the user's FOV 2550 while moving the object 2530 out of the user's FOV.

FIG. 25B illustrates an example interactive use of a totem with two interactable regions. As described with reference to FIG. 25A, the totem 2502 can include the touch surface 2506 and the light guide. The light guide can simulate the functions of a d-pad as described with reference to FIG. 25A and can display a halo having 4 arcs 2514*a*, 2514*b*, 2514*c*, and 2514*d*, with each arc having a different color.

The user can actuate the light guide or the touch surface 2506 to actuate the totem. For example, in a browser window, the user can actuate the touch surface 2506 to move a cursor. A left swipe on the touch surface 2506 can be mapped to the back function while a forward swipe on the touch surface 2506 can be mapped to the forward function for the browser page. A tap (illustrated by the position 2518) at the 6 o'clock position (illuminated with the arc 2514*d*) can cause the browser to scroll down and a tap at the 12 o'clock position (illuminated with the arc 2514*a*) can cause the browser to scroll up. Holding at the 6 o'clock position or the 12 o'clock position can quickly scroll the page.

The totem can provide visual feedback when the user actuates the totem. For example, when the user taps at the 6 o'clock position near the arc 2514*d*, the totem can increase the brightness of the arc 2514*d*. Haptic feedback can be used to distinguish whether the user has actuated the touch surface 2506 or the light guide. For example, when a user taps on the light guide, the actuator under the touchpad may be activated and provide a vibration.

Figure 25C:
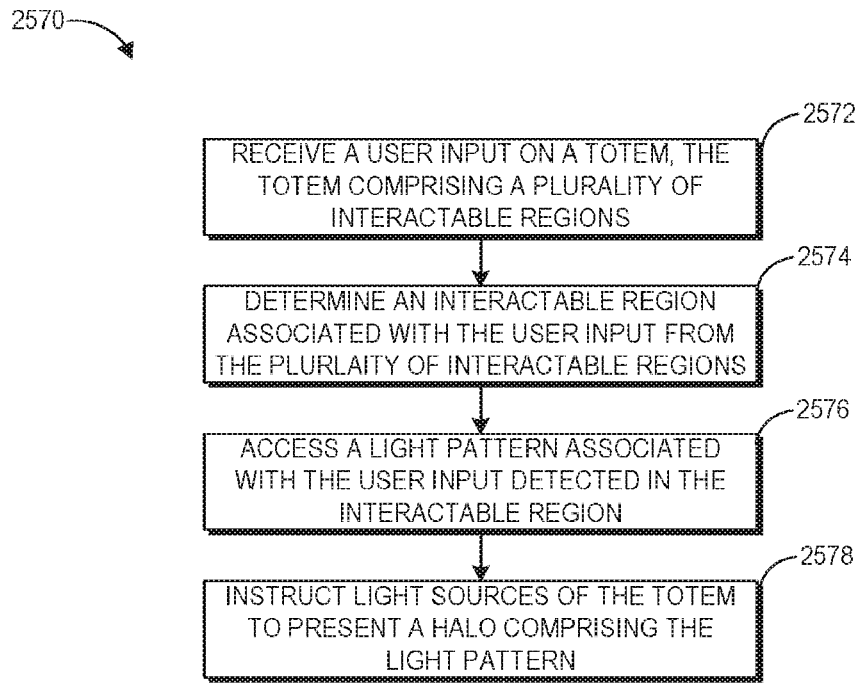
FIG. 25C illustrates an example process for interacting with a totem.

FIG. 25C illustrates an example process for interacting with a totem. The process 2570 may be performed by the wearable system (such as the totem or the wearable device) described herein.

At block 2572, the wearable system can receive a user input on a totem. The user input may include a hand gesture, such as a swipe, a tap, a touch, a press, etc. The totem can comprise a plurality of interactable regions. For example, the totem can include a touchpad which can include a touch surface and a light guide, both of which may be interactable.

At block 2574, the wearable system can determine an interactable region associated with the user input from the plurality of interactable regions. For example, the totem's touch sensor 1350 can determine whether the user has actuated the light guide or the touch surface. The touch sensor 1350 can also detect the user's gestures used for actuating the totem. For example, the touch sensor can detect whether the user actuates the totem using a swipe gesture or a tap gesture.

At block 2576, the wearable system can access a light pattern associated with the user input detected in the interactable region. As described with reference to FIGS. 24A and 24B, the light patterns may be different based on the type of user input (e.g., a touch gesture v. a tap gesture). The light patterns may also be different depending on which interactable region is actuated. For example, if the user actuates the touch surface, the light patterns may be those illustrated in FIG. 24A but if the user actuates the light guide, the light patterns may include those shown in FIG. 24B.

At block 2578, the wearable system can instruct the totem's light sources (e.g., LEDs) to present a halo comprising the light pattern. For example, the wearable system can provide instructions on which LEDS should light up, the brightness of the LEDs, the colors of the LEDs, the movement patterns associated with the light emitted by the LEDs, etc.

Examples Interactions with Physical Objects Using a Totem

Figure 26A:
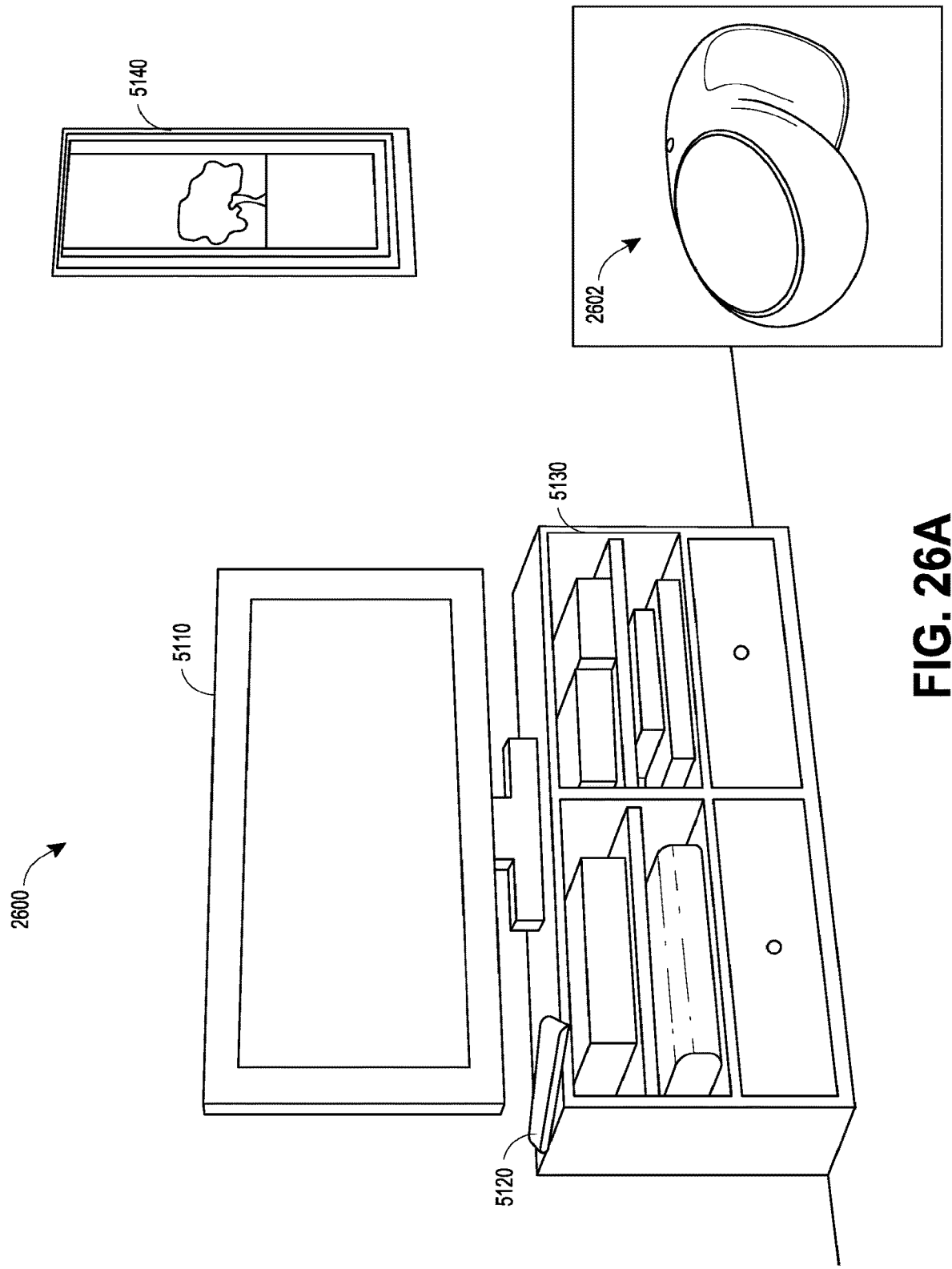
FIGS. 26A and 26B illustrate examples of interacting with physical objects using a totem.
Figure 26B:
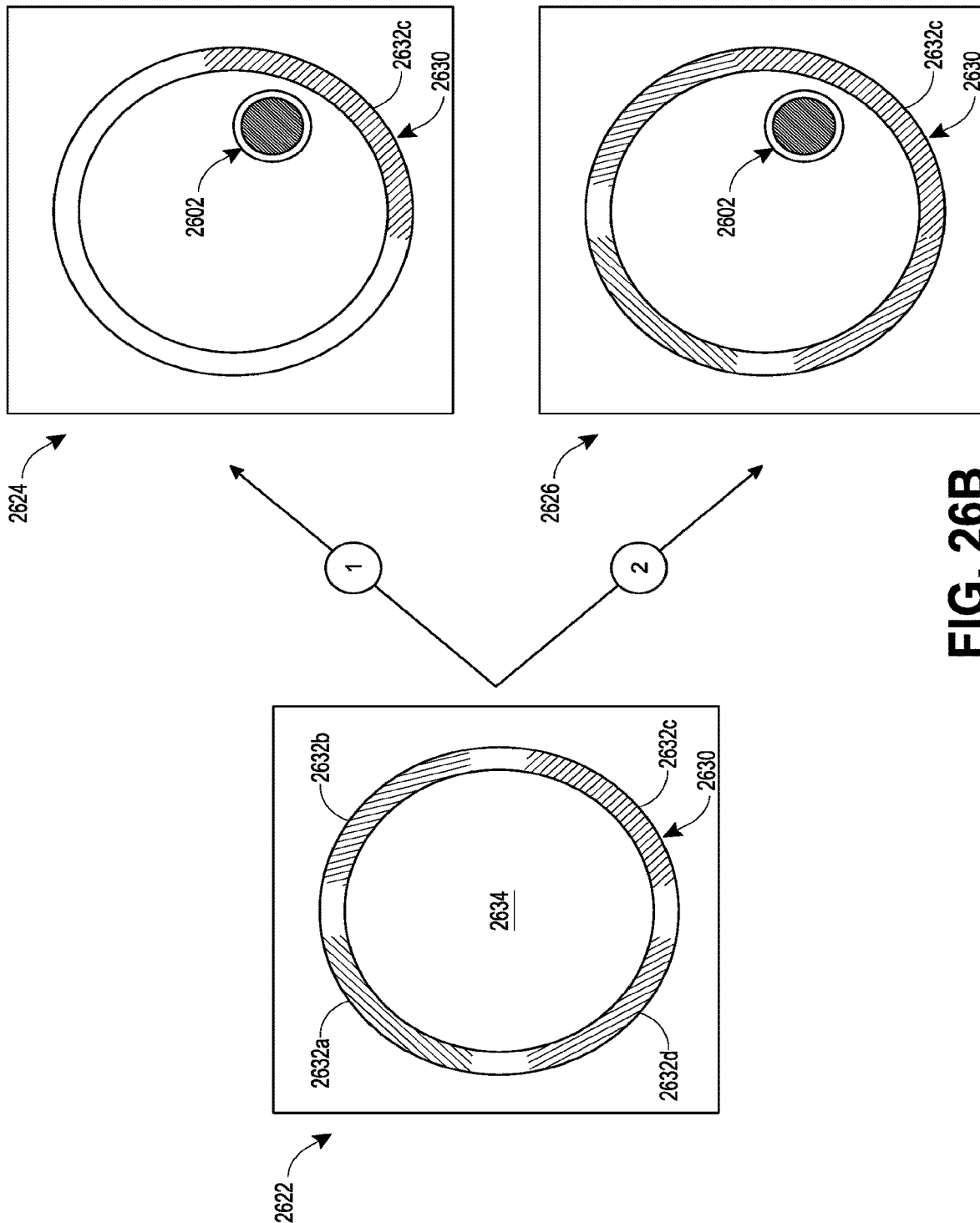

FIGS. 26A and 26B illustrate examples of interacting with physical objects using a totem. FIG. 26A illustrates an example of a physical environment 2600 which may be a living room of a user's home. The environment 2600 has physical objects such as, e.g., a television (TV) 5110, a physical remote control 5120 (sometimes simply referred to as a remote), a TV stand 5130, and a window 5140. The user can perceive the physical objects and interact with the physical objects. For example, the user may watch the TV 5110 and control the TV using the remote 5120. The user can control the remote 5120 to turn the TV 5110 on/off or change the channel or volume of the TV 5110.

The user can also interact with the TV 5110 using the totem 2602. The totem 2602 can be an embodiment of the totem 1200, which can include multiple interactable regions. The totem 2602 may be paired with the TV 5110 or the remote 5120 to simulate the functions of the remote 5120. The functions of the remote 5120 may be mapped to one or more interactable regions associated with the touchpad, a trigger, or a home button of the totem. The touchpad can include a touch surface 2634 and a light guide 2630, where the touch surface 2634 and the light guide 2630 may be mapped to different types of user interactions. For example, the touch surface 2634 can be used to switch channels via a swipe gesture. The light guide 2630 can be used as a d-pad for adjusting volumes or fast forward/backward via a tap gesture.

In FIG. 26B, the light guide can show a light pattern 2622 for a halo having four arcs: the arc 2632*a* (which may be in a first color, e.g., blue), the arc 2632*b* (which may be in a second color, e.g., yellow), the arc 2632*c* (which may be in a third color, e.g., red), and the arc 2632*d* (which may be in a fourth color, e.g., green). The arcs are positioned to form an x-shape. As illustrated by arrow 1, when the user 2602 touches a region near the arc 2632*c* on the light guide, the user can fast forward the program being played on the TV 5110. The totem can show the pattern 2624 to indicate that that the user has tapped near the arc 2632*c*. The arc 2632*c* appears to be brighter and longer while other arcs 2632*a*, 2632*b*, and 2632*d* are hidden in the pattern 2624.

The user can also change to the next channel by swiping to the right (as illustrated by arrow 2. The totem can illuminate a light pattern 2626 to show that the user has actuated the totem by a swipe gesture rather than a tap gesture. Even though the user's 2602 finger is at roughly the same position in the patterns 2626 and 2624, the light patterns illuminated in these two situations are different because the gestures used to actuate the totem are different. For example, although the brightness and length of the arc 2632*c* have increased, other arcs 2632*a*, 2632*b*, and 2632*d* are not hidden in the pattern 2626. Rather, the totem merely reduces the brightness of the other arcs.

Although the examples described with reference to FIGS. 26A and 26B are described without a wearable device, in some embodiments, the user can control a physical object using a totem while wearing the wearable device. For example, the user can perceive physical objects through the wearable device and perceive virtual objects projected by the wearable device. The user can interact with the physical objects as well as the virtual objects using the totem.

Examples 6DOF User Experiences with a Totem

Figure 27:
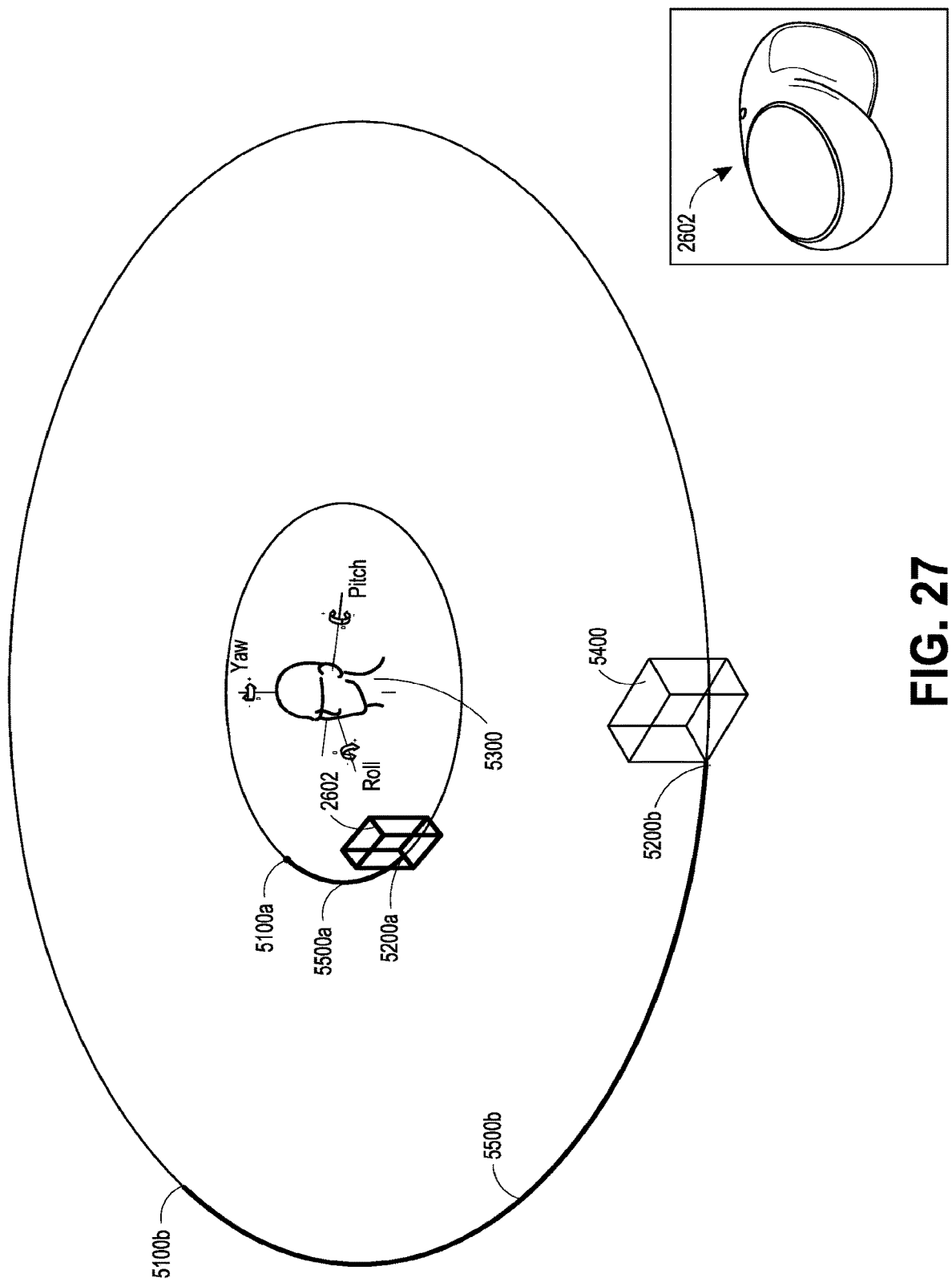
FIG. 27 illustrates an example of moving a virtual object with a six degrees-of-freedom (6DOF) totem.

FIG. 27 illustrates an example of moving a virtual object with a multi-DOF (e.g., 3DOF or 6DOF) totem. The user can change the position of the totem by moving forward/backward (surging), up/down (swaying), or left/right (heaving). The user can also change the orientation of the totem by titling side to side (rolling), titling forward and backward (pitching), or turning left and right (yawing). By changing the position and orientation of the totem, the user can perform user various interface operations (such as, e.g., by moving on rotating) on virtual objects.

A user may hold and move a virtual object by selecting the virtual object using the totem 2602 and move the virtual object by physically moving the totem 2602. For example, the totem 2602 may initially be at a first position 5100*a*. The user 5300 may select a target virtual object 5400 located at a first position 5100*b* by actuating the totem 504 (e.g., by actuating a touch sensitive pad on the totem). The target virtual object 5400 can be any type of virtual object that can be displayed and moved by the wearable system. For example, the virtual object may be an avatar, a user interface element (e.g., a virtual display), or any type of graphical element displayed by the wearable system. The user 5300 can move the target virtual object from the first position 5100*b* to a second position 5200*b* along a trajectory 5500*b* by moving the totem 2602 along a trajectory 5500*a*.

As another example, instead of moving the virtual object 5400 from 5100*b* to 5200*b*, the user 5300 may want to pull the virtual object 5400 closer to himself. Accordingly, the user can move the totem to closer to himself to bring the virtual object 5400 closer.

As yet another example, the totem 2602 may be at the position 5200*a*. The user can rotate the totem for 180 degrees clockwise, and the virtual object 5400 can accordingly be rotated for 180 degrees at the position 5200*b*.

The totem can emit certain light patterns indicating the type of user interaction. For example, the ring of LEDs may light a blue color when a user is moving the totem while light a green color when the user is rotating the totem. As another example, the totem light movement pattern may correspond to the rotation of the totem. For example, the light pattern may include an arc. As the user rotates the totem, the arc can also rotate in the direction of the user's rotation.

Examples of Decorative and Informative Visual Feedback on a Totem

Some wearable devices can have a limited FOV. Advantageously, in some embodiments, the totem can provide information associated with objects outside of the FOV using the light patterns illuminated by the totem.

Figure 28A:
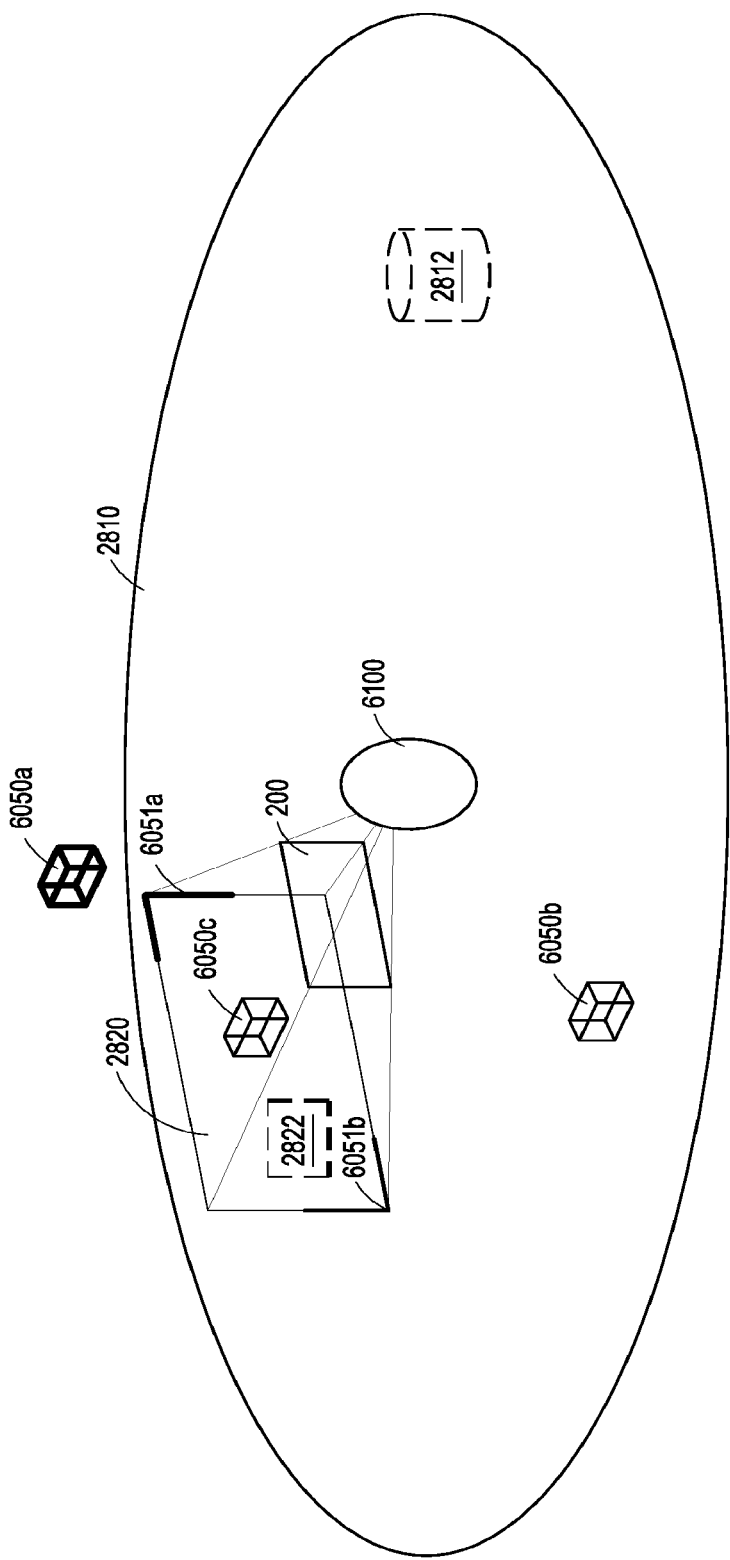

FIGS. 28A and 28B illustrate examples of providing information of objects via placement and movement of light patterns. FIG. 28A illustrates a person's FOV 2820 and FOR 2810. The FOR 2810 can contain a group of objects (e.g., objects 2812, 2822, 6050*b*, 6050*c*) which can be perceived by the user wearing the wearable system. The FOV 2820 can contain multiple objects (e.g., objects 6050, 2822). The FOV can depend on the size or optical characteristics of the wearable system, for example, clear aperture size of the transparent window or lens of the head mounted display through which light passes from the real world in front of the user to the user's eyes. In some embodiments, as the user's 6100 pose changes (e.g., head pose, body pose, and/or eye pose), the FOV 2820 can correspondingly change, and the objects within the FOV 2820 may also change. As described herein, the wearable system may include sensors such as cameras that monitor or image objects in the FOR 2810 as well as objects in the FOV 2820. In such embodiments, the wearable system may alert (for example, via the light patterns on the totem) the user of unnoticed objects or events occurring in the user's FOV 2820 or occurring outside the user's FOV but within the FOR 2810. In some embodiments, the wearable system can also distinguish between what the user 6100 is or is not directing attention to.

The objects in the FOV or the FOR may be virtual or physical objects. The virtual objects may include, for example, operating system objects such as e.g., a terminal for inputting commands, a file manager for accessing files or directories, an icon, a menu, an application for audio or video streaming, a notification from an operating system, and so on. The virtual objects may also include objects in an application such as e.g., avatars, virtual objects in games, graphics or images, etc. Some virtual objects can be both an operating system object and an object in an application. The wearable system can add virtual elements to the existing physical objects viewed through the transparent optics of the head mounted display, thereby permitting user interaction with the physical objects. For example, the wearable system may add a virtual menu associated with a medical monitor in the room, where the virtual menu may give the user the option to turn on or adjust medical imaging equipment or dosing controls using the wearable system. Accordingly, wearable system may present additional virtual image content to the wearer in addition to the object in the environment of the user.

The totem can provide information of objects that are outside of the FOV via the placement and movement of light patterns. The placement and movement of light patterns can be calculated and determined by various components of the wearable system, such as, e.g., the totem or the wearable device. The wearable system can use contextual information associated with the user or the objects to determine the light patterns. For example, the wearable system can employ factors such as, e.g., the location of the object (including the proximity of the object relative to the user or the user's FOV), the urgency of the object, the type of the object (such as, e.g., whether an object is interactable, what type of interactions are supported by the object, whether the object is physical or virtual), the property of the object (such as e.g. competitor's avatar v. friend's avatar), the volume of information (such as, e.g., the number of notifications), the user's preference, etc. As shown in the scene 2834 in FIG. 28B, because the object 2840 is further away from the user 6100 than it is in the scene 2832, the halo 2844 on the totem 2502 may appear to be smaller (e.g., have a shorter angular extent) than the halo 2842 (which has a larger angular extent). As another example, a halo may have a larger and brighter appearance because the object associated with the halo is more urgent or closer to the user's FOV.

The wearable system may assign a color to an aura based on the characteristics of the associated object. For example, the wearable system may assign a red color to the aura 6051*b* because the object 6050*b* is associated with the red color. Similarly, the wearable system may assign a blue color to the object 6051*a* because it is an operating system object and the wearable system assigns the blue color to all operating system objects.

The wearable system may assign a color to a halo based on the characteristics of the associated object. For example, the wearable system may assign a green color to the halos 2842 and 2844 because the object 2840 is associated with the green color. Similarly, the wearable system may assign a red color to the object 6050*b* because it is an operating system object and the wearable system assigns the red color to all operating system objects. As a result, the halo associated with operating system objects (including the object 6050*b*) may be in a red.

The appearance of the halo may change over time based on a change of the object associated with the halo. For example, a halo may grow thicker as the object associated with the halo receives more messages. As another example, the halo 2844 may get bigger (or brighter) as the object 2840 moves closer to the user or may grow smaller (or dimmer) as the object 2840 moves away from the user. The position of the halo may also change as the objects moves. For example, in FIG. 28A, the wearable system may initially show a halo associated with the object 6050b on the left side of the totem's light guide because the object 6050b is to the user's 6100 left. But when the object 6050b moves to the right side of the user 6100, the wearable system can update the position of the halo to the right side of the totem's light guide.

The appearance of the visual aura may also change based on a change of the user's pose. For example, with reference to FIG. 28A, as the user 6100 turns leftwards, the object 6050b may become closer to the user's FOV while the object 6050c. As a result, the halo associated with the object 6050b may become brighter (or larger).

In some situations, the FOR 2810 and the FOV 2820 can include invisible objects that a user cannot directly see. For example, a treasure hunt game may include hidden treasures (e.g. objects 2812, 2822 illustrated in dashed lines) in the user's FOR 2810. The treasure may not be directly visible to the user because it may be buried in a game object. However, the user can use a virtual tool in the game (such as e.g., a virtual shovel) to reveal the hidden object. As another example, a user's physical car keys may be underneath a stack of papers, and the user may not be able to perceive the physical car keys in the user's FOV. The halo can be used to provide an indication of the location of the hidden car keys. For example, the size and location of an arc of the halo can indicate the relative distance and orientation between the car keys and the totem. The location of the car keys may be determined based on the map of the user's environment (e.g., based on images acquired by the outward-facing imaging system at previous times) or may be determined based on a wireless communication between the totem (or other components of the wearable system) with the car keys where the keys are equipped with radio or wireless communication capacities.

As yet another example, objects (e.g., object 6050a) may be outside the user's visual FOR but may nonetheless potentially be perceived by a sensor (e.g., an electromagnetic sensor, a radio frequency sensor, a sensor associated with detecting wireless signals, or another environmental sensor) on the wearable device or the totem. For example, the object 6050a may be behind a wall in a user's environment so that the object 6050a is not visually perceivable by the user. However, the wearable device or the totem may include sensors that can communicate with the object 6050a.

The totem can provide information of invisible objects via the light patterns. The placement and movement of the light patterns can be based on contextual information associated with the invisible objects or the user. For example, the placement and movement of the light patterns on the light guide can act as a compass directing the user to look or move in a certain direction. As another example, the light patterns may provide a map of invisible objects in the user's environment. For example, the totem can illuminate a 30 degree red arc at the one o'clock position indicating the direction of a car key is at the user's front right while illuminating a 90 degree green arc at the six o'clock position indicating a user's cellphone is behind the user. The red arc and the green arc can also be used to indicate the proximity of the car key and the cellphone. For example, the cellphone is closer to the user than the car key and, as a result, the green arc is bigger than the red arc. As the user moves, the placement (or movement) of light patterns can also change. For example, as the user moves forward, the size of the green arc may decrease while the size of the red arc may increase.

In certain implementations, the wearable system may present a map of the user's physical or virtual environment which can indicate a location of the invisible objects. For example, an HMD can present a virtual map which shows an in-game object which a user can uncover. As another example, the HMD can provide, as AR/MR content a focus indicator or other types of visual indications of the hidden physical car keys (or a virtual object). As the user moves around in the environment, the appearance of the focus indicator (e.g., the size and relative direction from the user) may change. In some situations, the HMD can present a route to the invisible objects. The map presented by the HMD may be combined with the halo on the totem to guide the user to the invisible objects.

In some embodiments, the totem can present a halo which includes information associated with multiple objects. For example, a user 6100 may have a red object 6050b to his or her left and an invisible object 2812 behind him. The totem can present a halo which has a red arc on the left side of the light guide and a silver arc on the bottom of the light guide, where the red arc corresponds to the red object 6050b and the silver arc corresponds to the invisible object 2812.

In addition to or in alternative to using light patterns to provide information of objects, the display can also be configured to provide information of objects that are outside of the FOV or are invisible. For example, the display can display a visual aura for a corresponding object outside of the user's current FOV. A portion of the visual aura can be placed on the edge of the user's FOV of the display. The placement of the aura can be based on the contextual information of the object.

Besides visual auras, the wearable system can also inform the user about objects using a tactile or an audio effect. For example, in a mixed reality game, the wearable system may notify the user of an approaching competitor through vibrations on the totem. The wearable system may provide strong vibrations when the competitor is close to the user. In another example, the wearable system may use audible sounds to provide position information of a virtual object. The wearable system may also use a loud sound to alarm the user of a virtual competitor which is nearby. The tactile, audio, or visual feedback can be used in combination or in alternative to inform the user about the surrounding objects.

Figure 28C:
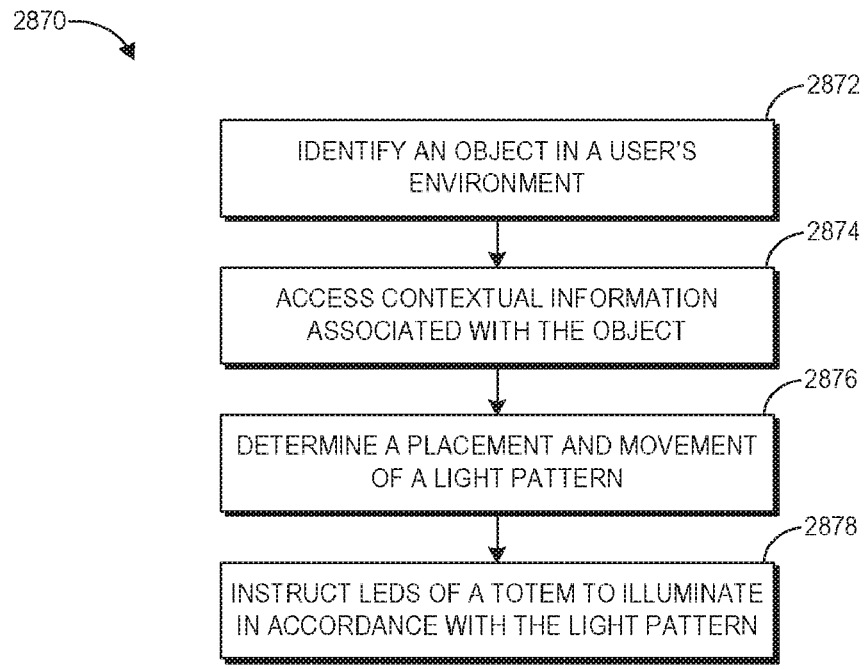
FIG. 28C illustrates an example process for providing information associated with an object using light patterns.

FIG. 28C illustrates an example process for providing information associated with an object using light patterns. The process 2870 can be performed by the wearable system (such as the totem or the wearable device) described herein.

At block 2872, the wearable system can identify an object in the user's environment. The object may be a physical or virtual object. The object may be in the user's FOR but is outside of the user's FOV. The object can also be hidden from the user's view. For example, the object may be behind another object (e.g., a wall) or may be visible only with a certain user interface interaction (e.g., when a user finishes a level in a game).

At block 2874, the wearable system can access contextual information associated with the object. The contextual information may be used to determine a movement and placement of light patterns associated with the object as shown at block 2874. For example, the brightness of a halo having the light pattern may be determined based on the proximity or urgency of the object. The color of the halo may also match the color of the object.

At block 2878, the wearable system can instruct the totem's LEDs to illuminate in accordance with the light patterns. For example, the instructions may include which LEDS should light up, the brightness of the LEDs, the colors of the LEDs, the movement patterns associated with the light emitted by the LEDs, etc.

FIG. 29A illustrates example light placement or movement patterns indicating the receipt of a notification. The patterns 2912 and 2914 include an iridescent pattern. The totem can display an iridescent trail in a clockwise cycle (as shown by the process 2920) to provide notifications. The notifications may be associated with a virtual object, such as, e.g., an email application, a game, a video application, etc. The notifications may also be associated with the operating system of the wearable device. One example notification may be an error message from the operating system of the wearable device. Additionally or alternatively, the notifications may be associated with physical objects. For example, the iridescence patterns 2912 and 2914 may indicate that the coffee machine in the user's kitchen has finished brewing.

The totem can repeat the iridescent trail until a threshold condition is reached. The threshold condition may be based on a duration of time, a user interaction (such as e.g., an actuation of the trigger 1212), or other contextual information.

Figure 29B:
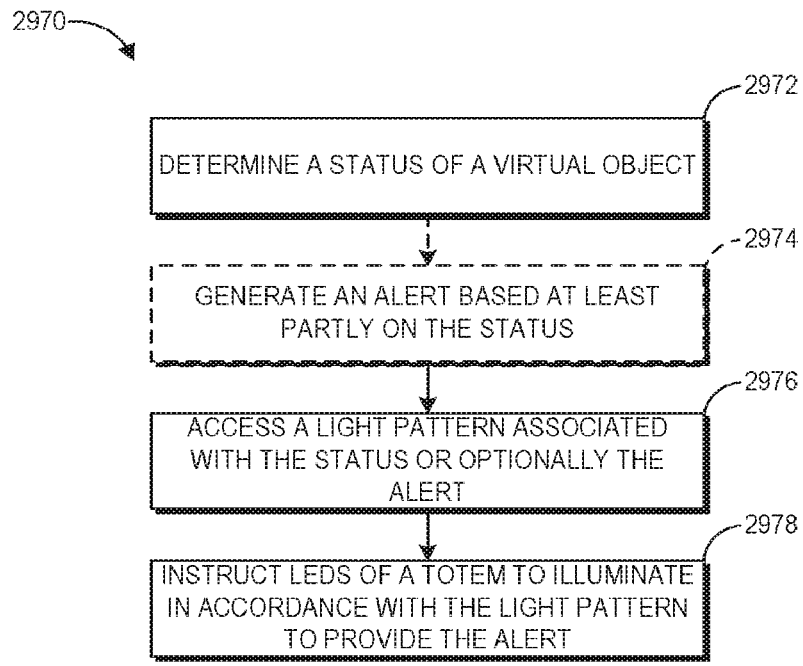
FIG. 29B illustrates an example process for providing a notification using light patterns on a totem.

FIG. 29B illustrates an example process for providing a notification using light patterns on a totem. The example process 2970 can be performed by the wearable system (such as the totem or the wearable device) described herein.

At block 2972, the wearable system can determine a status of a virtual object. For example, the status may include whether the virtual object has received new information (e.g., a new message), whether the virtual object is idle, whether the virtual object has run into a problem, etc.

Optionally at block 2974, the totem can generate an alert based at least partly on the status. For example, the virtual object may be a messenger application. When the virtual object receives a new message from the user's friend, the wearable system can generate an alert indicating that a new message has arrived.

At block 2976, the wearable system can access a light pattern associated with the status (or optionally the alert) of the virtual object. The placement or movement patterns may be determined based on the contextual information associated with the virtual object (or the alert), such as, e.g., the importance of the alert, the urgency of the alert, the location of the virtual object, the type of the virtual object, etc.

At block 2978, the wearable system can instruct the totem's LEDs to illuminate in accordance with the light pattern. For example, the wearable system can provide instructions on which LEDS should light up, the brightness of the LEDs, the colors of the LEDs, the movement patterns associated with the light emitted by the LEDs, etc.

In addition to or in alternative to providing information on objects that are outside of the FOV, the light patterns can also be used to provide information of objects that are not necessarily outside of the FOV. For example, when a user wins a level in a game, the totem may light up a halo which has the same colors as the game. As another example, with reference to FIG. 29A, the virtual application associated with the notification may be inside of the FOV. The user may interact with an email application, for example, by composing a message while receiving a notification that a new email has arrived.

The totem can provide visual feedback of the user's current interaction to a user or another person of the user's information. For example, when a user is recording a video with their HMD, the totem can illuminate a blinking red light pattern to reinforce to the user and to indicate to others nearby that the HMD is in a recording mode.

Figure 30:
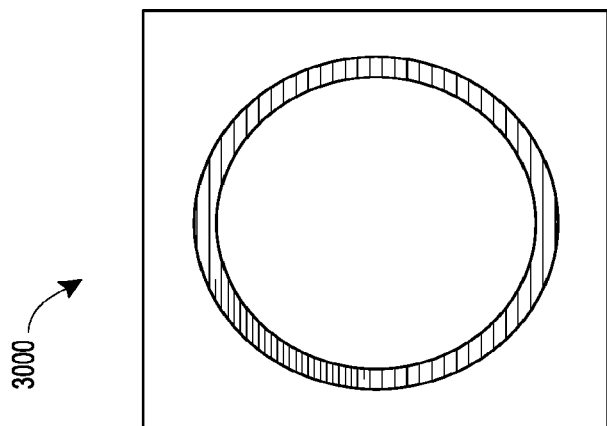
FIG. 30 illustrates an example light pattern that can be used to inform a person in the user's environment of the user's current interaction.

FIG. 30 illustrates an example light pattern that can be used to inform a person in the user's environment of the user's current interaction. For example, when the user is in a telepresence session, the totem can illuminate the light pattern 3000 (e.g., a green halo with a clockwise movement) via the light guide. The light pattern 3000 can inform the people in the user's environment that the user is in the telepresence. This may help other people from getting too close to the user and thereby prevent other people from interrupting the user's telepresence session. In addition to or in alternative to light patterns, other types of feedbacks such as, e.g., haptic, audio, video feedbacks, and so on, can also be used to indicate user's current interactions of the wearable system.

Additional Aspects

In a 1st aspect, a system comprising: a light emitting assembly of a user input device, wherein the light emitting assembly is configured to illuminate a plurality of light patterns for providing information of an object in an environment; a hardware processor communicatively coupled to the light emitting assembly and programmed to: identify an object in an environment of a user; access contextual information associated with the object; determine characteristics of a light pattern to be illuminated by the light emitting assembly based at least partly on the contextual information; and instruct the light emitting assembly to illuminate in accordance with the light pattern.

In a 2nd aspect, the system of aspect 1, wherein the object comprises at least one of: a physical object or a virtual object.

In a 3rd aspect, the system of aspect 2, wherein the status of the virtual object comprises at least one of: a current interaction with the virtual object by the user, whether the virtual object has received new information, whether the virtual object is idle, or whether the virtual object is in an error state.

In a 4th aspect, the system of any one of aspects 1-3, wherein the characteristics of the light pattern comprises at least one of: a brightness, a position, a shape, a size, or a color.

In a 5th aspect, the system of any one of aspects 1-4, wherein the contextual information associated with the object comprises at least one of: a location of the object, an urgency of the object, a type of the object, a property of the object, a volume of information associated with the object, or a preference of the user.

In a 6th aspect, the system of any one of aspects 1-5, wherein the system further comprises a wearable display device, and the object is invisible from a user's view or is outside via the wearable display device, and the hardware processor is programmed to determine at least one of a size, shape, or color of the light pattern to provide a cue to the user for locating the object.

In a 7th aspect, the system of any one of aspects 1-6, wherein object is a component of a wearable system for presenting virtual content to a user, and the light pattern indicates a status of the component of the wearable system.

In an 8th aspect, the system of aspect 7, wherein the component comprises at least one of: the user input device, a wearable display device, or a battery pack.

In a 9th aspect, the system of any one of aspects 1-8, wherein the status comprises at least one of: a battery status, a power charging status, a wireless pairing status between the wearable display device and the user input device, a status of a calibration process of the user input device, or a status of the wearable display device.

In a 10th aspect, the system of any one of aspects 1-9, wherein the light pattern encodes an alert or information associated with the object.

In an 11th aspect, the system of any one of aspects 1-10, wherein the status comprises at least one of: a current interaction with the object by the user, whether the object has received new information, whether the object is idle, or whether the object is in an error state.

In a 12th aspect, the system of any one of aspects 1-11, wherein the characteristics of the light patterns is configurable by a user via an application programming interface.

In a 13th aspect, a light-emitting user input device comprising: a touch component configured to accept a user input; a light emitting assembly configured to output a plurality of light patterns, the light emitting assembly at least partially surrounding the touch component; and a hardware processor communicatively coupled to the touch component and the light emitting assembly, and programmed to: identify a user interface operation supported by the touch component based on contextual information; determine a first light pattern associated with the user interface operation; generate and transmit instructions to the light emitting assembly to display a halo having the first light pattern; receive a user input on the touch component; and update the halo with a second light pattern to reflect the user input.

In a 14th aspect, the light-emitting user input device of aspect 13, wherein the contextual information comprises at least one of: an environment of the user, types of inputs supported by the light-emitting user input device, information associated with objects that the handheld user input device is configured to interact, or characteristics of a wearable device associated with the handheld user input device.

In a 15th aspect, the light-emitting user input device of aspect 13 or 14, wherein the light emitting assembly comprises a light guide and a ring of LEDs.

In a 16th aspect, the light-emitting user input device of any one of aspects 13-15, wherein the light emitting assembly is configured to accept a plurality of user inputs and wherein the hardware processor is further programmed to display the halo based at least partly on the plurality of user inputs supported by actuating the light guide.

In a 17th aspect, the light-emitting user input device of any one of aspects 13-16, wherein the user input comprises at least one of: a swipe, a tap, a press, or a touch gesture.

In an 18th aspect, the light-emitting user input device of any one of aspects, 13-17, wherein the light-emitting user input device comprises at least one of a totem, a smartwatch, or a smartphone.

In a 19th aspect, the light-emitting user input device of any one of aspects 13-18, wherein the first light pattern provides a cue to a user that the user interface operation is supported by the light-emitting user input device.

In a 20th aspect, the light-emitting user input device of any one of aspects 13-19, wherein the hardware processor is further programmed to: determine whether the received user input is improper based on the contextual information; and wherein the second light pattern provides a visual alert that the received user input is improper in response to a determination that the received user input is improper.

In a 21st aspect, the light-emitting user input device of any one of aspects 13-20, wherein at least a portion of the halo appears to be brighter or larger in the second light pattern as compared to the first light pattern.

In a 22nd aspect, the light-emitting user input device of any one of aspects 13-21, wherein characteristics of the plurality of light patterns is configurable by a user via an application programming interface.

In a 23rd aspect, the light-emitting user input device of aspect 22, wherein the characteristics comprise at least one of: a placement or movement pattern, a color, a brightness, a shape, or a size of an arc.

In a 24th aspect, the light-emitting user input device of any one of aspects 13-23, wherein the second light pattern indicates, at least one of the following in response to the user input: a battery status, a power charging status, a wireless pairing status between the handheld user input device and another computing device, or whether the handheld user input device is idle.

In a 25th aspect, a method comprising: under control of a hardware processor: identifying a type of user input supported by a light-emitting user input device based on contextual information, wherein the light-emitting user input device comprises a first element for illuminating a plurality of light patterns and a second element for receiving user inputs; determining a first light pattern associated with the type of user input supported; generating and transmitting instructions to the first element to illuminate a halo having the first light pattern; determining a second light pattern based on a user input on the light-emitting user input device; and updating the halo to the second light pattern in response to the user input.

In a 26th aspect, the method of aspect 25, wherein the first element is further configured to receive another user inputs, and wherein the type of user input for determining the first light pattern is associated with the other user inputs supported by the first element. Although aspects 25 and 26 recite the first element and the second element, the word element may be substituted by the word portion and the word element in these two aspects can include an individual component or a subcomponent, or a combination of components (subcomponents) of the light-emitting user input device.

In a 27th aspect, the method of aspect 25 or 26, wherein the contextual information comprises at least one of: an environment of the user, types of inputs supported by the light-emitting user input device, information associated with objects that the handheld user input device is configured to interact, or characteristics of a wearable device associated with the handheld user input device.

In a 28th aspect, the method of any one of aspects 25-27, wherein the type of user input comprises at least one of: a swipe, a tap, a press, or a touch input.

In a 29th aspect, the method of any one of aspects 25-28, wherein the first light pattern provides a cue to a user that the type of user input is supported by the light-emitting user input device.

In a 30th aspect, the method of any one of aspects 25-29, further comprising: determining whether the user input received by the light-emitting user input device is improper based on the contextual information; and wherein the second light pattern provides a visual alert that the user input is improper in response to a determination that the user input is improper.

In a 31st aspect, the method of any one of aspects 25-30, wherein at least a portion of the halo appears to be brighter or larger in the second light pattern as compared to the first light pattern.

In a 32nd aspect, a light-emitting user input device comprising: a plurality of interactable regions configured to receive user inputs, wherein at least one interactable region of the plurality of interactable regions comprises is part of a light emitting assembly of the light-emitting user input device; and a hardware processor programmed to: detect a user's actuation of the light-emitting user input device; determine an interactable region among the plurality of interactable regions corresponding to the user's actuation; translate the user's actuation into a user input for performing a user interface operation based at least on a type of the actuation and the interaction region associated with the actuation; and instruct the light emitting assembly to illuminate a light pattern in response to the user input.

In a 33rd aspect, the light-emitting user input device of aspect 32, wherein the light-emitting user input device further comprise a touch surface and the light emitting assembly comprises a light guide, and wherein the plurality of interactable regions comprises a first interactable region associated with the light guide and a second interactable region associated with the touch surface.

In a 34th aspect, the light-emitting user input device of aspect 33, wherein in response to a detection that the user actuated the first interactable region, the hardware processor is programmed to cause the light emitting assembly to illuminate a first light pattern associated with the user input in the first interactable region, and wherein in response to a detection that the user actuated the second interactable region, the hardware processor is programmed to cause the light emitting assembly to illuminate a second light pattern associated with the user input in the second interactable region.

In a 35th aspect, the light-emitting user input device of any one of aspects 32-34, wherein the light pattern is determined based at least partly on contextual information associated with the light-emitting user input device.

In a 36th aspect, the light-emitting user input device of any one of aspects 32-35, wherein the user's actuation comprises at least one of: a swipe, a tap, a press, or a touch gesture.

In a 37th aspect, the light-emitting user input device of any one of aspects 32-36, wherein the light pattern comprises an arcuate region having a color, an arcuate length, or a visual effect.

In a 38th aspect, the light-emitting user input device of any one of aspects 32-37, wherein the hardware processor is further programmed to communicate with a wearable device causing the wearable device to perform a user interface operation based on the user input.

In a 39th aspect, a method comprising: under control of a hardware processor: detecting a user's actuation of a light-emitting user input device, wherein the light-emitting user input device comprises a plurality of interactable regions; determining an interactable region among the plurality of interactable regions corresponding to the user's actuation; translating the user's actuation into a user input for performing a user interface operation based at least on a type of the actuation and the interaction region associated with the actuation; and causing a light emitting assembly of a light-emitting user input device to illuminate a light pattern in response to the user input.

In a 40th aspect, the method of aspect 39, wherein the plurality of interactable regions comprises a first interactable region supporting a first type of user input and a second interactable region supporting a second type of user input.

In a 41st aspect, the method of aspect 40, wherein in response to a detection that the user actuated the first interactable region, the hardware processor is programmed to cause the light emitting assembly to illuminate a first light pattern associated with the user input in the first interactable region, and wherein in response to a detection that the user actuated the second interactable region, the hardware processor is programmed to cause the light emitting assembly to illuminate a second light pattern associated with the user input in the second interactable region.

In a 42nd aspect, the method of aspect 40 or 41, wherein at least one of the first type of user input or the second type of user input is dependent on contextual information associated with a user's interactions with a wearable system, and wherein the contextual information comprises at least one of a type of application with which a user is interacting, available user inputs supported by the plurality of interactable regions, or a virtual environment of the user.

In a 43rd aspect, the method of any one aspects 39-42, wherein the light-emitting user input device comprises a touch surface which is divided into one or more interactable regions.

In a 44th aspect, the method of any one of aspects 39-43, wherein the light pattern is determined based at least partly on contextual information associated with the light-emitting user input device.

In a 45th aspect, the method of any one of aspects 39-44, wherein the plurality of interactable region comprises the light emitting assembly of the light-emitting user input device.

In a 46th aspect, the method of any one of aspects 39-45, wherein the user's actuation comprises at least one of: a swipe, a tap, a press, or a touch gesture.

In a 47th aspect, the method of any one of aspects 39-46, wherein the light pattern comprises an arcuate region having a color, an arcuate length, or a visual effect.

In a 48th aspect, a system for calibrating a light-emitting user input device, the system comprising: an outward-facing imaging system configured to image an environment; a light-emitting user input device configured to illuminate a light pattern; and a hardware processor in communication with the outward-facing imaging system and the light-emitting user input device and being programmed to: access first movement data acquired by a sensor of the light-emitting user input device associated with a movement of the light-emitting user input device from a first pose to a second pose; determine a first image of the light emitting user input device, wherein the first image comprises the light pattern corresponding to the first pose of the light-emitting user input device; determine a second image of the light-emitting user input device acquired by the outward-facing imaging system, wherein the second image comprises the light pattern corresponding to the second pose of the light-emitting user input device; analyze the second image to calculate second movement data associated with the movement of the light-emitting user input device; detect a discrepancy between the first movement data and the second movement data; and cause the sensor of the light-emitting user input device to be calibrated in response to a determination that the discrepancy passes a threshold condition.

In a 49th aspect, the system of aspect 48, wherein the movement of the light-emitting user input device from the first pose to the second pose comprise a change of at least one of a position or orientation the light-emitting user input device.

In a 50th aspect, the system of aspect 48 or 49, wherein the first pose or the second pose corresponds to a fiducial position of the light-emitting user input device.

In a 51st aspect, the system of any one of aspects 48-50, wherein the light pattern is associated with a halo illuminated by a plurality of light emitting diodes surrounding a touchable portion of the light-emitting user input device.

In a 52nd aspect, the system of any one of aspects 48-51, wherein to calculate the second movement data, the hardware processor is programmed to calculate a change in a shape of the halo in the first image and the second image.

In a 53rd aspect, the system of any one of aspects 48-52, wherein the light-emitting user input device is a totem for interaction with an augmented reality device.

In a 54th aspect, the system of aspect 53, wherein the sensor is part of an inertial measurement unit (IMU) of the totem, wherein the sensor is calibrated by adjusting at least one of a responsiveness of the totem to a user's movement, or a mapping between the user's movement and a measurement of the IMU.

In a 55th aspect, the system of aspect 53 or 54, wherein the totem is further configured to provide a visual indication to the user to move the light-emitting user input device from the first pose to the second pose.

In a 56th aspect, the system of any one of aspects 53-55, wherein the totem has three degrees-of-freedom.

In a 57th aspect, the system of any one of aspects 48-56, wherein the hardware processor is programmed to apply a computer vision algorithm to analyze the first image and the second image to identify the light pattern in the first image and the second image.

In a 58th aspect, the system of any one of aspects 48-57, wherein the light-emitting user input device can illuminate another light pattern in response to a determination that a calibration of the light-emitting user input device has been completed.

In a 59th aspect, the system of any one of aspects 48-58, wherein the hardware processor is programmed to determine a type of the calibration and wherein the light pattern illuminated by the light-emitting user input device corresponds to the type of the calibration.

In a 60th aspect, a method of calibrating a light-emitting user input device, the method comprising: under control of a hardware processor: receiving movement data of a light-emitting user input device at a pose, wherein the movement data is acquired by a sensor of the light-emitting user input device; receiving an image of the light-emitting user input device at the pose; analyzing the image to identify a shape of a light pattern illuminated by the light emitting user input device; calculating at least one of a first position or a first orientation of the light-emitting user input device at the pose based on the movement data; calculating at least one of a second position or a second orientation of the light-emitting user input device at the pose based on the shape of the light pattern; determining a discrepancy between the first position and the second position, or the first orientation and the second orientation; and calibrating the sensor of the light-emitting user input device in response to a determination that the discrepancy passes a threshold condition.

In a 61st aspect, the method of aspect 60, wherein the first position, the first orientation, the second position, or the second orientation is calculated with reference to a fiducial pose.

In a 62nd aspect, the method of aspect 60 or 61, wherein the shape of the light pattern in the image is an oval whereas the shape of the light pattern in the fiducial pose is a circle.

In a 63rd aspect, the method of any one of aspects 60-62, wherein at least one of a position or movement pattern of the light pattern corresponds to a type of the sensor being calibrated.

In a 64th aspect, the method of any one of aspects 60-63, further comprising: providing at least one of a visual, audio, or tactile feedback in response to a determination that the calibration is successful.

In a 65th aspect, the method of aspect 60, wherein calibrating the sensor comprises adjusting at least one of a responsiveness of the sensor to a user's movement, or a mapping between the user's movement and a measurement of the sensor.

In a 66th aspect, a system for calibrating a light-emitting user input device, the system comprising: an outward-facing imaging system configured to image an environment and; a hardware processor in communication with the outward-facing imaging system, and programmed to: receive an image of the environment; analyze the image to identify a light-emitting user input device; determine a first pose of the light-emitting user input device and a first appearance of a light pattern of an illuminated halo; identify a second appearance of the light pattern of the illuminated halo based at least partly on an analysis of the image; determine a first change to the light-emitting user input device's pose; receive movement data of the light-emitting user input device measured by the light-emitting user input device; calculate a second change to the light-emitting user input device's pose based at least in part on an analysis of the image; calculate a difference between the first change and the second change to determine whether the difference passes a threshold; and in response to a determination that the difference passes the threshold condition, calibrate the sensor of the light-emitting user input device.

In a 67th aspect, the system of aspect 66, wherein the pose of the light-emitting user input device comprises a position and an orientation of the light-emitting user input device.

In a 68th aspect, the system of aspect 66 or 67, wherein the light-emitting user input device comprises at least one of: a totem, a smartwatch, or a smartphone, and wherein the sensor is an IMU.

In a 69th aspect, the system of any one of aspects 66-68, wherein in response to a determination that the difference does not pass the threshold, the hardware processor is programmed to provide an indication that the sensor is calibrated.

In a 70th aspect, the system of any one of aspects 66-69, wherein the indication comprises a visual, audio, or haptic feedback on the light-emitting user input device.

In a 71st aspect, the system of any one of aspects 66-70, wherein the first position is a fiducial position of the light-emitting user input device.

In a 72nd aspect, the system of any one of aspects 66-71, wherein the light-emitting user input device is further configured to illuminate a series of light patterns for guiding a user of the light-emitting user input device to position the user input device into poses which comprises the first pose and the second pose.

In a 73rd aspect, the system of any one of aspects 66-72, wherein to calculate the second change to the light-emitting user input device's pose based at least in part on the analysis of the image, the hardware processor is programmed to determine a deformation of a shape of the light pattern in the second appearance with respect to the shape of the light pattern in the first appearance.

In a 74th aspect, the system of any one of aspects 66-73, wherein the light-emitting user input device is part of a wearable system which further comprises a wearable display for presenting virtual content in an augmented reality, virtual reality, or mixed reality environment.

In a 75th aspect, the system of aspect 66, wherein to calibrate the sensor, the hardware processor is programmed to adjust at least one of a responsiveness of the sensor to a user's movement, or a mapping between the user's movement and a measurement of the sensor.

In a 76th aspect, a method for calibrating a light-emitting user input device, the method comprising: under control of a light-emitting user input device comprising a light emitting assembly and a hardware processor: determining a first pose of the light-emitting user input device; causing the light emitting assembly to illuminate a first light pattern for guiding a user to move the light-emitting user input device into a second pose; in response to a determination that the light-emitting user input device is moved to the second pose: acquiring pose data of the light-emitting user input device; calibrating the light-emitting user input device based at least in part on the pose data; and providing an indication to the user that the calibration process is completed.

In a 77th aspect, the method of aspect 76, wherein determining the first pose is based at least in part on data acquired from an inertial measurement unit (IMU) of the light-emitting user input device.

In a 78th aspect, the method of any one of aspects 76-77, wherein the indication comprises at least one of an audio, visual, or tactile indication.

In a 79th aspect, the method of any one of aspects 76-78, wherein the indication comprises a second light pattern.

In an 80th aspect, the method of any one of aspects 76-79, wherein the pose data comprises at least one of position or orientation data of the light-emitting user input device.

In an 81st aspect, the method of any one of aspects 76-80, wherein the pose data of the light-emitting user input device comprises data acquired when the light-emitting user input device is at a plurality of poses.

In an 82nd aspect, the method of any one of aspects 76-81, further comprising: causing the light emitting assembly to illuminate a third light pattern indicating an initiation of a calibration process.

In an 83rd aspect, a system for calibrating a light-emitting user input device, the system comprising: one or more sensors configured to acquire movement data of the light-emitting user input device; a light emitting assembly of the light-emitting user input device configured to output a plurality of light patterns; and a hardware processor programmed to: provide a first indication to a user to position the light-emitting user input device to a pose; acquire movement data of the light-emitting user input device to the pose; calibrate the light-emitting user input device based at least in part on the movement data; and providing an indication to the user that the calibration process is completed.

In an 84th aspect, the system of aspect 83, wherein the first indication comprises a light pattern whose placement, movement or a combination provides guidance to the user to move the light-emitting user input device to the pose.

In an 85th aspect, the system of aspect 83 or 84, wherein the light-emitting user input device is part of a wearable system for interacting with an augmented or mixed reality environment, the first indication comprises a virtual image provided by a head-mounted display of the wearable system, which indicates the pose of the totem to be positioned by the user.

In an 86th aspect, the system of any one of aspects 83-85, wherein the hardware processor is further programmed to: provide a second indication informing that the light-emitting user input device is calibrated, in response to a determination that the light-emitting user input device is calibrated; or continue calibrating the light-emitting user input device in response to a determination that in response to a determination that the light-emitting user input device is not calibrated.

In an 87th aspect, the system of any one of aspects 83-86, wherein the hardware processor is further programmed to detect an initiation condition for starting a calibration process for the light-emitting user input device.

In an 88th aspect, the system of any one of aspects 83-87, wherein to calibrate the light-emitting user input device, the hardware processor is programmed to access an image comprising the light-emitting user input device at the pose and analyze the movement data and the image to identify discrepancy of at least one of a position or orientation of the light-emitting user input device between that calculated from the movement data and that determined from the image.

In an 89th aspect, the system of any one of aspects 83-88, wherein the light-emitting user input device comprises a totem which comprises a touch surface and the light emitting assembly is positioned adjacent to the touch surface.

In a 90th aspect, a wearable device for pairing a light-emitting user input device, the wearable device comprising: an outward-facing imaging system configured to image an environment; and a hardware processor in communication with the outward-facing imaging system, and programmed to: receive an image acquired by the outward-facing imaging system wherein the image comprises a light pattern illuminated by a light-emitting user input device; identify a light-emitting user input device to be paired with the wearable device; analyze the image to identify the light pattern which encodes information associated with pairing the light-emitting user input device with a wearable device; extract the information encoded in the light pattern for pairing the light-emitting user input device with the wearable device; and pair the light-emitting user input device with wearable device based at least in part on the extracted information.

In a 91st aspect, the wearable device of aspect 90, wherein the hardware processor is further programmed to: determine whether the pairing between the light-emitting user input device and the wearable device is successful; and in response to a determination that the pairing is successful, instruct the light-emitting user input device to illuminate another light pattern indicative of a successful pairing.

In a 92nd aspect, the wearable device of aspect 90 or 91, wherein the hardware processor is further programmed to communicate with the light-emitting user input device via a wireless connection in response to a determination that the pairing is successful.

In a 93rd aspect, the wearable device of aspect 92, wherein the wireless connection comprises a Bluetooth connection.

In a 94th aspect, the wearable device of any one of aspects 90-93, wherein the information encoded by the light pattern comprises device information of the light-emitting user input device.

In a 95th aspect, the wearable device of any one of aspects 90-94, wherein the light pattern encodes the information in a binary form.

In a 96th aspect, the wearable device of any one of aspects 90-95, wherein the light pattern comprises one or more colors which encode the information associated with the pairing.

In a 97th aspect, the wearable device of any one of aspects 90-96, wherein a portion of the light pattern includes light in a non-visible portion of the electromagnetic spectrum.

In a 98th aspect, the wearable system of any one of aspects 90-97, wherein the wearable device comprises a head-mounted display for presenting virtual content in a mixed reality environment and outward-facing imaging system comprises a camera mounted to the head-mounted display.

In a 99th aspect, a method for pairing a light-emitting user input device, the method comprising: under control of a hardware processor: initiating a pairing process between a light-emitting user input device and an electronic device; accessing an image acquired by a camera wherein the image comprises a light pattern illuminated by the light-emitting user input device; identifying the light-emitting user input device to be paired with the electronic device; analyzing the image to identify the light pattern which encodes information associated with pairing the light-emitting user input device with the electronic device; extracting the information encoded in the light pattern for pairing the light-emitting user input device with the electronic device; and pairing the light-emitting user input device with the electronic device based at least in part on the extracted information.

In a 100th aspect, the method of aspect 99, wherein the electronic device comprises a component of a wearable system for presenting virtual content in a mixed reality environment.

In a 101st aspect, the method of aspect 100, wherein the electronic device comprises another user input device or a head-mounted display.

In a 102nd aspect, the method of any one of aspects 99-101, further comprising: establishing a wireless connection between the light-emitting user input device and the electronic device in response to a determination that the pairing process is successful.

In a 103rd aspect, the method of any one of aspects 99-102, wherein the information encoded by the light pattern comprises device information of the light-emitting user input device, wherein the device information comprises at least one of a device identifier, identification information for the light-emitting user input device, or a key for pairing the light-emitting user input device with the electronic device.

In a 104th aspect, the method of aspect 103, wherein the light pattern encodes the information in a binary form.

In a 105th aspect, the method of any one of aspects 99-104, wherein the light pattern comprises one or more colors which encode the information of the pairing process.

In a 106th aspect, the method of any one of aspects 99-105, wherein a portion of the light pattern includes light in a non-visible portion of the electromagnetic spectrum.

In a 107th aspect, a system for pairing a light-emitting user input device, the system comprising: a plurality of light emitting diodes (LEDs) configured to output light patterns; a hardware processor programmed to: initiate a pairing process with an electronic device; cause one or more LEDs of the plurality of LEDs to illuminate a first light pattern encoding information for the pairing process; and in response to a determination that the electronic device is successfully paired, illuminate a second light pattern indicating the pairing is successful.

In a 108th aspect, the system of aspect 107, wherein the first light pattern encodes at least one of: device information associated with the user input device or a trigger message causes the other computing device to initiate a pairing process.

In a 109th aspect, the system of aspect 107 or 108, wherein the hardware processor is programmed to: receive a response from the electronic device during the pairing process; and cause second one or more LEDs of the plurality of LEDs to illuminate a third light pattern encoding a reply message in reply to the response.

In a 110th aspect, the system of any one of aspects 107-109, wherein illuminations of the one or more LEDs of the plurality of LEDs encode the information of the pairing process in a binary form.

In a 111st aspect, the system of any one of aspects 107-110, wherein colors associated with illuminations of the one or more LEDs encode the information of the pairing process.

In a 112nd aspect, the system of any one of aspects 107-111, wherein a portion of the first light pattern or the second light pattern includes light in a non-visible portion of the electromagnetic spectrum.

In a 113rd aspect, a method comprising: under control of a hardware processor of a first electronic device comprising a light emitting assembly for illuminating a plurality of light patterns: initiating a communication between the first electronic device and a second electronic device; causing the first electronic device to illuminate a light pattern encoding a message for the communication; receiving a response from the second electronic device; and causing an indication to be provided to a user of the first electronic device based at least in part on the response from the second electronic device.

In a 114th aspect, the method of aspect 113, wherein the communication comprises a pairing process between the first electronic device and the second electronic device.

In a 115th aspect, the method of aspect 114, wherein the first light pattern encodes at least one of: device information associated with the user input device or a trigger message causes the other computing device to initiate a pairing process.

In a 116th aspect, the method of aspect 114 or 115, wherein the indication comprises a second light pattern illuminated by the first electronic device indicating the pairing between the first electronic device and the second electronic device has been completed in response to a determination that the first electronic device and the second electronic device are successfully paired.

In a 117th aspect, the method of any one of aspects 113-116, wherein the indication comprises a third light pattern illuminated by the first electronic device encoding a reply message in reply to the response.

In a 118th aspect, the method of any one of aspects 113-117, wherein the first light pattern encodes information in the message in a binary form.

In a 119th aspect, the method of any one of aspects 113-118, wherein the light pattern comprises one or more colors which further encodes message of the communication.

In a 120th aspect, a light-emitting user input device comprising: a touchpad assembly configured to receive user inputs, wherein the touchpad assembly comprises: a touch surface, a touch sensor is coupled to the touch surface, where at least a portion of the touch sensor is underneath the touch surface and is configured to detect an actuation of the touch surface, a light-emitting assembly comprising an optical diffusive element and a plurality of light illuminating elements, wherein a light-emitting assembly is coupled to the touch sensor and the touch surface and is configured to display a plurality of light patterns, and a printed circuit board coupled to the light-emitting assembly and the touch sensor; and a body comprising for supporting the touchpad assembly.

In a 121st aspect, the light-emitting user input device of aspect 120, wherein at least a portion of the optical diffusive element is overlaid on the touch sensor and the touch sensor is further configured to detect an actuation of the optical diffusive element.

In a 122nd aspect, the light-emitting user input device of aspect 120 or 121, wherein the optical diffusive element comprises a light guide.

In a 123rd aspect, the light-emitting user input device of any one of aspects 120-122, wherein the optical diffusive element substantially surround the touch surface.

In a 124th aspect, the light-emitting user input device of any one of aspects 120-123, wherein the touchpad assembly further comprises an armature for holding the light-emitting assembly, the touch surface, and the touch sensor.

In a 125th aspect, the light-emitting user input device of any one of aspects 120-124, wherein the plurality of light illuminating elements comprises light emitting diodes.

In a 126th aspect, the light-emitting user input device of any one of aspects 120-125, further comprising a connection interface configured to establish a wireless connection with a wearable device configured to present mixed reality content;

In a 127th aspect, the light-emitting user input device of any one of aspects 120-126, wherein the body has an upper portion for supporting the touchpad assembly and a bottom portion configured to be removably mounted to a base.

In an 128th aspect, the light-emitting user input device of any one of aspects 120-127, wherein the body further comprises at least one of a trigger, bumper, or a home button for user interactions.

In an 129th aspect, the light emitting user input device of any one of aspects 120-128, further comprises a hardware processor programmed to control illumination of the plurality of light illuminating elements.

In an 130th aspect, a light-emitting user input device comprising: a body comprising an external touch surface; two or more sensors, at least one of which comprises a touch sensor positioned beneath the touch surface and configured to detect touch input applied to the touch surface; a plurality of light-emitting diodes (LEDs) positioned beneath the touch surface; a hardware processor programmed to: receive data from the two or more sensors; and activate one or more of the plurality of LEDs based on the data received from at least one or the two or more sensors.

In a 131st aspect, the light-emitting user input device of aspect 130, further comprising one or more optical components positioned adjacent one or more of the plurality of LEDs, the one or more optical components configured to diffuse light emitted by the one or more LEDs adjacent positioned thereto.

In a 132nd aspect, the light-emitting user input device of aspect 131, wherein the one or more optical components are positioned beneath the touch surface.

In a 133rd aspect, the light-emitting user input device of aspect 131 or 132, wherein the one or more optical components are positioned beside the touch surface.

In a 134th aspect, the light-emitting user input device of any one of aspects 131-133, wherein the one or more optical components comprise at least one light guide.

In a 135th aspect, the light-emitting user input device of any one of aspects 130-134, wherein the plurality of LEDs are arranged in a ring beneath the touch surface.

In a 136th aspect, the light-emitting user input device of any one of aspects 130-135, wherein the touch surface is circular.

In a 137th aspect, the light-emitting user input device of aspect 136, wherein the touch surface is a circular surface with a diameter between 27 mm-40 mm.

In a 138th aspect, the light-emitting user input device of any one of aspects 130-137, wherein the body further comprises an elongated portion configured to be held in a hand of a user of the light-emitting user input device.

In a 139th aspect, the light-emitting user input device of aspect 138, wherein the body further comprises an upper portion angled relative to the elongated portion.

In a 140th aspect, the light-emitting user input device of aspect 139, wherein the touch surface is included as part of the upper portion of the body.

In a 141st aspect, the light-emitting user input device of any one of aspects 130-140, further comprising a button, wherein the two or more sensors comprise a pressure sensor configured to detect actuation of the button.

In a 142nd aspect, the light-emitting user input device of any one of aspects 130-141, wherein the two or more sensors comprise an inertial measurement unit (IMU).

In a 143rd aspect, the light-emitting user input device of any one of aspects 130-142, further comprising a communication interface configured to establish communications with other electronic devices over a network.

In a 144th aspect, the light-emitting user input device of aspect 143, wherein the hardware processor is further programmed to activate one or more of the plurality of LEDs based on messages received from other electronic devices over the network.

In a 145th aspect, the light-emitting user input device of aspect 143 or 144, wherein the other electronic devices comprise components of an augmented reality (AR) system.

In a 146th aspect, a wearable system for calibrating a light-emitting user input device, the wearable system comprising: an outward-facing imaging system configured to image an environment; a light-emitting user input device configured to illuminate a light pattern; and a hardware processor programmed to: acquire first movement data associated with a movement of the light-emitting user input device from a first pose to a second pose; receive a first image of the light-emitting user input device from the outward-facing imaging system, wherein the first image comprises a first image of the light pattern and corresponds to the first pose of the light-emitting user input device; access a second image of the light emitting user input device, wherein the second image comprises a second image of the light pattern corresponds to the second pose of the light-emitting user input device; analyze the first image and the second image to calculate second movement data associated with the movement of the light-emitting user input device; detect a discrepancy between the first movement data and the second movement data; and calibrate the light-emitting user input device in response to a determination that the discrepancy passes a threshold condition.

In a 147th aspect, the wearable system of aspect 146, where the first pose and the second pose comprises a position and an orientation of the light-emitting user input device.

In a 148th aspect, the wearable system of any one of aspects 146-147, wherein the first pose or the second pose corresponds to a fiducial position of the light-emitting user input device.

In a 149th aspect, the wearable system of any one of aspects 146-148, wherein the light pattern is associated with a halo, and wherein to calculate the second movement data, the hardware processor is programmed to calculate a change in a shape of the halo in the first image and the second image.

In a 150th aspect, the wearable system of any one of aspects 146-149, wherein the light-emitting user input device comprises a totem, a smartphone, or a smartwatch.

In a 151st aspect, the wearable system of aspect 150, wherein to calibrate the light-emitting user input device, the hardware processor is programmed to calibrate an inertial measurement unit (IMU) of the totem.

In a 152nd aspect, the wearable system of aspect 150 or 151, wherein the light pattern provides an indication to the user of the light-emitting user input device to move the light-emitting user input device from the first pose to the second pose.

In a 153rd aspect, the wearable system of any one of aspects 146-152, wherein the hardware processor is programmed to apply a computer vision algorithm to analyze the first image and the second image.

In a 154th aspect, the wearable system of any one of aspects 146-153, wherein the outward-facing imaging system is part of a wearable device configured to present virtual content to a user.

In a 155th aspect, the wearable system of any one of aspects 146-154, wherein the light-emitting user input device can illuminate another light pattern in response to a determination that a calibration of the light-emitting user input device has been completed.

In a 156th aspect, a wearable system for calibrating a light-emitting user input device, the wearable system comprising: an outward-facing imaging system configured to image an environment; a hardware processor programmed to: receive an image of the environment; analyze the image to identify a light-emitting user input device; determine a first position of the light-emitting user input device and a first light pattern of an illuminated halo; identify a second light pattern of the illuminated halo based at least partly on an analysis of the image; determine a first change to the light-emitting user input device's position and orientation; receive movement data of the light-emitting user input device measured by an environmental sensor of the light-emitting user input device; calculate a second change to the light-emitting user input device's position and orientation; calculate a difference between the first change and the second change to determine whether the difference passes a threshold; and in response to a determination that the difference passes the threshold condition, calibrate the environmental sensor of the light-emitting user input device.

In a 157th aspect, the wearable system of aspect 156, wherein the light-emitting user input device comprises at least one of: a totem, a smartwatch, or a smartphone, and wherein the environmental sensor comprises an IMU.

In a 158th aspect, the wearable system of aspect 156 or 157, wherein in response to a determination that the difference does not pass the threshold, the hardware processor is programmed to provide an indication that the environmental sensor is calibrated.

In a 159th aspect, the wearable system of aspect 158, wherein the indication comprises a visual or haptic feedback on the light-emitting user input device.

In a 160th aspect, the wearable system of any one of aspects 156-159, wherein the first position is a fiducial position of the light-emitting user input device.

In a 161st aspect, a wearable system for calibrating a light-emitting user input device, the wearable system comprising: a light-emitting user input device comprising: a sensor configured to acquire movement data of the light-emitting device; a light emitting portion configured to output a light pattern; and a hardware processor programmed to: provide a first indication to position the light-emitting user input device to a pose; acquire the movement data of the light-emitting user input device associated with the pose; and calibrate the light-emitting user input device based on the movement data.

In a 162nd aspect, the wearable system of aspect 161, wherein the hardware processor is further programmed to: provide a second indication informing that the light-emitting user input device is calibrated, in response to a determination that the light-emitting user input device is calibrated; or continue calibrating the light-emitting user input device in response to a determination that in response to a determination that the light-emitting user input device is not calibrated.

In a 163rd aspect, the wearable system of aspect 161 or 162, wherein the first or the second indication comprises at least one of: a visual, audio, or haptic feedback.

In a 164th aspect, a wearable device comprising: an outward-facing imaging system configured to image an environment; and a hardware processor programmed to: identify a light-emitting user input device configured to illuminate a light pattern; establish a wireless connection between the wearable device and the light-emitting user input device; receive an image of the light-emitting user input device, wherein the image comprises the illuminated light pattern encoding device information associated with the light-emitting user input device; analyze the image of the illuminated light pattern to extract the device information associated with the light-emitting user input device; and pair the light-emitting user input device with wearable device.

In a 165th aspect, the wearable device of aspect 164, wherein the hardware processor is further configured to: determine whether the pairing between the light-emitting user input device and the wearable device is successful; and in response to a determination that the pairing is successful, instruct the light-emitting user input device to illuminate another light pattern indicative of a successful pairing.

In a 166th aspect, the wearable device of aspect 164 or 165, wherein the wireless connection comprises a Bluetooth connection.

In a 167th aspect, the wearable device of any one of aspects 164-166, wherein the light-emitting user input device comprises LEDs configured to output the light pattern, where illuminations of respective LEDs represent the device information in a binary form.

In a 168th aspect, a light-emitting user input device comprises: a plurality of light emitting diodes (LEDs) configured to output a light pattern; a hardware processor programmed to: initiate a pairing process with a wearable device; illuminate a first light pattern encoding information for the pairing process; receive a response from the wearable device regarding the pairing process; and in response to a determination that the computing device is successfully paired, illuminate a second light pattern indicating the pairing is successful.

In a 169th aspect, the light-emitting user input device of aspect 168, wherein the first light patterns encodes at least one of: device information associated with the user input device or a trigger message causes the other computing device to initiate a pairing process.

In a 170th aspect, the light-emitting user input device of aspect 168 or 169, wherein the response from the wearable device comprises a request for more information of the light-emitting user input device, and the hardware processor is programmed to illuminate a third light pattern encoding a reply message in reply to the response to the request.

In a 171st aspect, a handheld user input device comprising: a light emitting portion configured to output a light pattern; and a hardware processor programmed to: determine a status of the handheld user input device; access a first light pattern associated with the status; instruct light emitting portion to display a halo in accordance with the first light pattern; determine an update to the status of the handheld user input device; and in response to the update, instruct the light emitting portion to display the halo in accordance with a second light pattern.

In a 172nd aspect, the handheld user input device of aspect 171, wherein the handheld user input device further comprises a battery and wherein the status comprises at least one of: a battery status, a power charging status, a wireless pairing status between the handheld user input device and another computing device, or whether the handheld user input device is idle.

In a 173rd aspect, the handheld user input device of aspect 171 or 172, wherein the light emitting portion comprise a light guide and a ring of light-emitting diodes (LEDs).

In a 174th aspect, a wearable system for providing a status of a component of the wearable system, the wearable system comprising: a handheld user input device comprising a light emitting portion configured to output a light pattern; a wearable device comprising a wearable display and a battery pack; and a hardware processor programmed to: determine a status of the wearable device; access a first light pattern associated with the status; instruct light emitting portion of the handheld user input device to display a halo in accordance with the first light pattern; determine an update to the status of the wearable device; and in response to the update, instruct the light emitting portion of the handheld user input device to display the halo in accordance with a second light pattern.

In a 175th aspect, the wearable system of aspect 174, wherein the status comprises at least one of: a battery status, a power charging status, a wireless pairing status between the wearable device and the handheld user input device, or a status of the wearable display.

In a 176th aspect, a handheld user input device comprising: a touchpad configured to accept a user input; a light emitting portion configured to output a light pattern, the light emitting portion at least partially surrounding the touchpad; and a hardware processor programmed to: identify an available user interface operation associated with the touchpad based on contextual information; determine a light pattern associated with the available user interface operation; generate and transmit instructions to the light emitting portion to display a halo in accordance with the light pattern; receive a user input on the touchpad; and update a placement or movement of the light pattern to reflect the user input.

In a 177th aspect, the handheld user input device of aspect 176, wherein the contextual information comprises at least one of: an environment of the handheld user input device, available inputs associated with the handheld user input device, information associated with objects that the handheld user input device is configured to interact, or characteristics of a wearable device paired with the handheld user input device.

In a 178th aspect, the handheld user input device of aspect 176 or 177, wherein the light emitting portion comprises a light guide and a ring of LEDs.

In a 179th aspect, the handheld user input device of any one of aspects 176-178, wherein the light emitting portion is configured to accept a user input and wherein the hardware processor is further programmed to display the halo based at least partly on the user input associated with the light guide.

In a 180th aspect, the handheld user input device of any one of aspects 176-179, wherein the user input comprises at least one of: a swipe, a tap, a press, or a touch, and wherein the user input device comprises at least one of a totem, a smartwatch, or a smartphone.

In a 181st aspect, the handheld user input device of any one of aspects 176-180, wherein the hardware processor is further configured to: determine whether the received user input is improper; in response to a determination that the user input is improper, update the light pattern to reflect that the user input is improper.

In a 182nd aspect, the handheld user input device of any one of aspects 176-181, wherein to update the placement or movement of the light pattern to reflect the user input, the processor is programmed to update a color of the light pattern, update a shape of the light pattern, update a size or length of the light pattern, or update a visual effect of the light pattern.

In a 183rd aspect, a handheld user input device comprising: a light emitting portion configured to output a light pattern, the light emitting portion at least partially surrounding the touchpad; a plurality of interactable regions configured to receive a user input; and a hardware processor programmed to: detect the user input in an interactable region among the plurality of interactable regions; access a light pattern associated with the user input detected in the interactable region; and instruct the light emitting portion to present a halo comprising the light pattern.

In a 184th aspect, the handheld user input device of aspect 183, wherein the handheld user input device further comprise a touch surface and the light emitting portion further comprises a light guide, and wherein the plurality of interactable regions comprises a first interactable region associated with the light guide and a second interactable region associated with the touch surface.

In a 185th aspect, the handheld user input device of aspect 184, wherein in response to a detection that the user input is in the first interactable region, the hardware processor is programmed to access a first placement or movement of the light pattern associated with the user input in the first interactable region, and wherein in response to a detection that the user input is in the second interactable region, the hardware processor is programmed to access a second placement or movement of the light pattern associated with the user input in the second interactable region.

In a 186th aspect, the handheld user input device of any one of aspects 183-185, wherein the light pattern is determined based at least partly on contextual information associated with the handheld user input device.

In a 187th aspect, the handheld user input device of any one of aspects 183-186, wherein the user input comprises at least one of: a swipe, a tap, a press, or a touch.

In a 188th aspect, the handheld user input device of any one of aspects 183-187, wherein the halo comprises an arcuate region having a color, an arcuate length, or a visual effect.

In a 189th aspect, the handheld user input device of any one of aspects 183-188, wherein the hardware processor is further programmed to detect additional user input in the interactable region among the plurality of interactable regions and in response to the detection of additional user input, update the halo.

In a 190th aspect, a handheld user input device comprising: a light emitting portion configured to output a light pattern; and a hardware processor programmed to: identify an object in an environment of a user; access contextual information associated with the object; determine a placement or movement of a light pattern based at least partly on the contextual information; and instruct the light emitting portion to illuminate in accordance with the light pattern.

In a 191st aspect, the handheld user input device of aspect 190, wherein the object comprises at least one of: a physical object or a virtual object.

In a 192nd aspect, the handheld user input device of aspect 190 or 191, wherein the placement or movement of the light pattern comprises at least one of: a brightness, a position, a shape, or a size, a color of a halo.

In a 193rd aspect, the handheld user input device of any one of aspects 190-192, wherein the contextual information associated with the object comprises at least one of: a location of the object, an urgency of the object, a type of the object, a property of the object, a volume of information associated with the object, or a preference of the user.

In a 194th aspect, a wearable system for providing a status of a component of the wearable system, the wearable system comprising: a handheld user input device comprising a light emitting portion configured to output a light pattern; a wearable device configured to present virtual content to a user; and a hardware processor programmed to: identify an object in an environment of the user; access contextual information associated with the object; determine a placement or movement of a light pattern based at least partly on the contextual information; and instruct the light emitting portion of the handheld user input device to illuminate in accordance with the light pattern.

In a 195th aspect, the wearable system of aspect 194, wherein the contextual information is determined based at least partly on data acquired by an environmental sensor of the wearable device or the handheld user input device.

In a 196th aspect, the handheld user input device of any one of aspects 190-193 or the wearable system of any one of aspects 194-195, wherein the light pattern comprises a color, a shape, a size or length, or a visual effect.

In a 197th aspect, a handheld user input device comprising: a light emitting portion configured to output a light pattern; and a hardware processor programmed to: identify a virtual object in an environment of a user; determine a status of the virtual object; determine a placement or movement of a light pattern based at least partly on the status of the virtual object; and instruct the light emitting portion to illuminate in accordance with the light pattern indicative of the status.

In a 198th aspect, the handheld user input device of aspect 197, wherein the hardware processor is further programmed to generate an alert indicative of the status of the virtual object and wherein the alert is encoded in the light pattern.

In a 199th aspect, the handheld user input device of aspect 197 or 198, wherein the status of the virtual object comprises at least one of: a current interaction with the virtual object by the user, whether the virtual object has received new information, whether the virtual object is idle, or whether the virtual object is in an error state.

In a 200th aspect, a wearable system for providing a status of a component of the wearable system, the wearable system comprising: a handheld user input device comprising a light emitting portion configured to output a light pattern; a hardware processor programmed to: identify a virtual object in an environment of a user; determine a status of the virtual object; determine a placement or movement of a light pattern based at least partly on the status of the virtual object; and instruct the light emitting portion to illuminate in accordance with the light pattern indicative of the status.

In a 201st aspect, a system for configuring a placement or movement of a light pattern of a handheld user input device, the system comprising: a programming user interface configured to: receive an input associated with a placement or movement of a light pattern on a handheld user input device, wherein the handheld user input device comprising a light emitting portion configured to output the light pattern; provide a visualization of the placement or movement of the light pattern on a visual representation of the handheld user input device; and update instructions associated with the handheld user input device to reflect the placement or movement of the light pattern.

In a 202nd aspect, the system of aspect 201, wherein the light pattern is associated with a color, a length, a shape, a visual effect, or a position relative to the light emitting portion.

In a 203rd aspect, the system of aspect 202, wherein the visual effect comprises a fade-in, a fade-out, a blink, a flash, a rotation, a change in the color, a change in the shape, a change in the length, or a change in the position relative to the light emitting portion.

In a 204th aspect, the system of any one of aspects 201-203, wherein the programming user interface is further configured to display a visualization tab, a source code tab, or a pattern adjustment tool.

In a 205th aspect, a head-mounted display system comprising: a handheld user input device comprising: a touchpad configured to accept user input; and a light emitting portion configured to output a first light pattern from a plurality of light patterns, the light emitting portion at least partially surrounding the touchpad; and a head-mounted display configured to present virtual images to the user of the head-mounted display system.

In a 206th aspect, the head-mounted display system of aspect 205, wherein the head-mounted display comprises a light field display or a display configured to present the virtual images at a plurality of depth planes.

In a 207th aspect, the head-mounted display system of aspect 205 or 206, wherein the handheld user input device is configured to change the first light pattern to a second light pattern from the plurality of light patterns in response to one or more of: (1) user input received via the touchpad, (2) user input received from a touch sensitive portion of the light emitting portion, (3) contextual information, or (4) a communication from the head-mounted display.

The light emitting portion described with reference to aspects 146-207 may include, individually or in combination, a light guide, LEDs, or other components of the user input device which facilitate illuminations of the light patterns. Although the aspects 1-128 use the phrase light emitting assembly, these aspects may also recite light emitting portion instead.

Additional Considerations

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A light-emitting user input device for providing user input to a display system including a wearable display device, the light-emitting user input device comprising:
a plurality of interactable regions, including a central touch surface, configured to receive user inputs;
a light-emitting assembly comprising a light guide outside of and surrounding the central touch surface; and
a hardware processor communicatively coupled to the plurality of interactable regions and the light emitting assembly, the hardware processor to:
detect an actuation of the light-emitting user input device by a user of the wearable display device;
access contextual information indicating a virtual object that is being presented through the wearable display device and that the user is currently interacting with;
determine an interactable region among the plurality of interactable regions corresponding to the actuation;
based at least partly on the contextual information, translate the actuation into a user input for performing a user interface operation associated with the virtual object being interacted with, wherein the user interface operation is based at least on the virtual object being interacted with, a type of the actuation, and the interactable region associated with the actuation; and
instruct the light emitting assembly to illuminate a light pattern in response to the user input.

2. The light-emitting user input device of claim 1, wherein the plurality of interactable regions comprises
a first interactable region associated with the light guide and
a second interactable region associated with the central touch surface.

3. The light-emitting user input device of claim 2, wherein in response to a detection that the user actuated the first interactable region, the hardware processor is programmed to cause the light emitting assembly to illuminate a first light pattern associated with the user input in the first interactable region, and wherein in response to a detection that the user actuated the second interactable region, the hardware processor is programmed to cause the light emitting assembly to illuminate a second light pattern associated with the user input in the second interactable region.

4. The light-emitting user input device of claim 1, wherein the light pattern is determined based at least partly on the contextual information.

5. The light-emitting user input device of claim 1, wherein the actuation comprises at least one of: a swipe, a tap, a press, or a touch gesture.

6. The light-emitting user input device of claim 1, wherein the light pattern comprises an arcuate region having one or more of a color, an arcuate length, or a visual effect.

7. The light-emitting user input device of claim 1, wherein the hardware processor is further programmed to communicate with display system causing the display system to perform the user interface operation based on the user input.

8. A method comprising:
under control of a hardware processor:
detecting an actuation of a light-emitting user input device by a user of a wearable display device,
wherein the light-emitting user input device is configured to provide user input to a display system including the wearable display device, and
wherein the light-emitting user input device comprises a plurality of interactable regions, including a central touch surface, configured to receive inputs, and a light emitting assembly comprising a light guide outside of and surrounding the central touch surface;
accessing contextual information indicating a virtual object that is being presented through the wearable display device and that the user is currently interacting with;
determining an interactable region among the plurality of interactable regions corresponding to the actuation;
translating the actuation into a user input for performing a user interface operation based at least on the contextual information, wherein the user interface operation is associated with the virtual object being interacted with, and wherein the user interface operation is determined based at least on the virtual object being interacted with, a type of the actuation, and the interactable region associated with the actuation; and
causing the light emitting assembly to illuminate a light pattern in response to the user input.

9. The method of claim 8, wherein the plurality of interactable regions comprises a first interactable region supporting a first type of user input and a second interactable region supporting a second type of user input.

10. The method of claim 9, wherein in response to a detection that the user actuated the first interactable region, the hardware processor is programmed to cause the light emitting assembly to illuminate a first light pattern associated with the user input in the first interactable region, and wherein in response to a detection that the user actuated the second interactable region, the hardware processor is programmed to cause the light emitting assembly to illuminate a second light pattern associated with the user input in the second interactable region.

11. The method of claim 9, wherein at least one of the first type of user input or the second type of user input is dependent on the contextual information, and wherein the contextual information comprises at least one of a type of application with which a user is interacting, available user inputs supported by the plurality of interactable regions, or a virtual environment of the user.

12. The method of claim 8, wherein the light-emitting user input device comprises the central touch surface which is divided into one or more interactable regions.

13. The method of claim 8, wherein the light pattern is determined based at least partly on the contextual information.

14. The method of claim 8, wherein the plurality of interactable region comprises the light emitting assembly of the light-emitting user input device.

15. The method of claim 8, wherein the actuation comprises at least one of: a swipe, a tap, a press, or a touch gesture.

16. The method of claim 8, wherein the light pattern comprises an arcuate region having one or more of a color, an arcuate length, or a visual effect.

* * * * *